United States Patent
Rago et al.

(10) Patent No.: US 9,296,124 B2
(45) Date of Patent: Mar. 29, 2016

(54) SLURRY DISTRIBUTOR WITH A WIPING MECHANISM, SYSTEM, AND METHOD FOR USING SAME

(71) Applicant: United States Gypsum Company, Chicago, IL (US)

(72) Inventors: Bill Rago, Gurnee, IL (US); James Wittbold, Des Plaines, IL (US); Alfred C. Li, Naperville, IL (US); Chris C. Lee, Deerfield, IL (US)

(73) Assignee: United States Gypsum Company, Chicago, IL (US)

( * ) Notice: Subject to any disclaimer, the term of this patent is extended or adjusted under 35 U.S.C. 154(b) by 94 days.

(21) Appl. No.: 13/844,364

(22) Filed: Mar. 15, 2013

(65) Prior Publication Data

US 2013/0216717 A1    Aug. 22, 2013

Related U.S. Application Data

(63) Continuation-in-part of application No. 13/341,016, filed on Dec. 30, 2011, and a continuation-in-part of application No. 13/341,209, filed on Dec. 30, 2011, and a continuation-in-part of application No. 13/659,516, filed on Oct. 24, 2012.

(Continued)

(51) Int. Cl.
*B05B 15/02* (2006.01)
*B28B 19/00* (2006.01)
(Continued)

(52) U.S. Cl.
CPC ........... *B28B 19/0092* (2013.01); *B05C 5/0254* (2013.01); *B05C 5/0262* (2013.01); *B29C 33/30* (2013.01); *Y10T 137/87652* (2015.04)

(58) Field of Classification Search
CPC B05C 15/02; B05C 15/0208; B05C 15/0216; B05C 15/0225; B05C 15/0233
USPC .......................... 239/104, 106, 114, 116, 117
See application file for complete search history.

(56) References Cited

U.S. PATENT DOCUMENTS 1,452,702 A    4/1923 Pipe
1,905,733 A    4/1933 Moore
(Continued)

FOREIGN PATENT DOCUMENTS

AT    402826 B    7/1997
CN    2928447 Y    8/2007
(Continued)

OTHER PUBLICATIONS

Burrows, "A Decade's Experience of Gypsum Board Weight Reduction in the U.S.", 14. Internationale Baustofftagung (Weimar, Sep. 20-23, 2000), 1.0197-1.0207.
(Continued)

*Primary Examiner* — Davis Hwu
(74) *Attorney, Agent, or Firm* — Leydig, Voit & Mayer, Ltd.

(57) ABSTRACT

A slurry distributor can include a distribution conduit and a slurry wiping mechanism. The distribution conduit extends generally along a longitudinal axis and includes an entry portion, a distribution outlet in fluid communication with the entry portion, and a bottom surface extending between the entry portion and the distribution outlet. The distribution outlet extends a predetermined distance along a transverse axis, which is substantially perpendicular to the longitudinal axis. The slurry wiping mechanism includes a movable wiper blade in contacting relationship with the bottom surface of the distribution conduit. The wiper blade is reciprocally movable between a first position and a second position over a clearing path, which is disposed adjacent the distribution outlet.

25 Claims, 82 Drawing Sheets
(18 of 82 Drawing Sheet(s) Filed in Color)

Related U.S. Application Data

(60) Provisional application No. 61/428,706, filed on Dec. 30, 2010, provisional application No. 61/428,736, filed on Dec. 30, 2010, provisional application No. 61/550,827, filed on Oct. 24, 2011, provisional application No. 61/550,857, filed on Oct. 24, 2011, provisional application No. 61/550,873, filed on Oct. 24, 2011.

(51) Int. Cl.
*B05C 5/02* (2006.01)
*B29C 33/30* (2006.01)

(56) References Cited

U.S. PATENT DOCUMENTS

| | | | |
|---|---|---|---|
| 2,097,613 A | 11/1937 | Batcheller | |
| 2,203,072 A | 6/1940 | Albright | |
| 2,660,416 A | 11/1953 | Camp et al. | |
| 2,700,622 A | 1/1955 | Burwell | |
| 2,882,716 A | 4/1959 | Anderson | |
| 2,998,198 A | 8/1961 | Young | |
| 3,053,314 A * | 9/1962 | McGillis et al. | 239/123 |
| 3,083,756 A | 4/1963 | Page et al. | |
| 3,196,864 A * | 7/1965 | Johnson | 126/343.5 R |
| 3,198,867 A | 8/1965 | Siggers | |
| 3,296,346 A | 1/1967 | Shannon | |
| 3,297,601 A | 1/1967 | Ptasieaski et al. | |
| 3,359,146 A | 12/1967 | Lane et al. | |
| 3,363,769 A | 1/1968 | Wilmot et al. | |
| 3,380,333 A | 4/1968 | Clay et al. | |
| 3,400,190 A | 9/1968 | Donald | |
| 3,415,920 A | 12/1968 | Lee et al. | |
| 3,432,588 A | 3/1969 | Breidt et al. | |
| 3,458,907 A | 8/1969 | Shannon | |
| 3,459,620 A | 8/1969 | McCleary et al. | |
| 3,467,281 A | 9/1969 | Archer | |
| 3,494,993 A | 2/1970 | Breidt et al. | |
| 3,532,781 A | 10/1970 | Shannon | |
| 3,558,380 A | 1/1971 | Pook | |
| 3,583,681 A | 6/1971 | Brown | |
| 3,602,405 A | 8/1971 | Ames | |
| 3,644,169 A | 2/1972 | Phillips | |
| 3,663,562 A | 5/1972 | Magerlein et al. | |
| 3,740,027 A | 6/1973 | Kormos | |
| 3,760,036 A | 9/1973 | Matthews | |
| 3,795,259 A | 3/1974 | Brandin et al. | |
| 3,841,530 A | 10/1974 | Janninck | |
| 3,909,170 A | 9/1975 | Riboulet et al. | |
| 3,959,431 A | 5/1976 | Nissel | |
| 3,959,432 A | 5/1976 | Wiley | |
| 4,113,829 A | 9/1978 | Bowker et al. | |
| 4,153,403 A | 5/1979 | Schneider | |
| 4,175,591 A | 11/1979 | Welker | |
| 4,187,275 A | 2/1980 | Bracalielly et al. | |
| 4,268,236 A | 5/1981 | Peille et al. | |
| 4,279,673 A | 7/1981 | White et al. | |
| 4,288,263 A | 9/1981 | Delcoigne et al. | |
| 4,334,786 A | 6/1982 | Delcoigne et al. | |
| 4,354,885 A | 10/1982 | White | |
| 4,361,254 A | 11/1982 | Teraoku et al. | |
| 4,364,790 A | 12/1982 | Delcoigne et al. | |
| 4,533,300 A | 8/1985 | Westerlund et al. | |
| 4,557,261 A | 12/1985 | Rugheimer | |
| 4,588,299 A * | 5/1986 | Brown et al. | 366/8 |
| 4,618,294 A | 10/1986 | Brown | |
| 4,664,611 A | 5/1987 | Kumar | |
| 4,758,261 A | 7/1988 | Parker et al. | |
| 4,819,878 A | 4/1989 | Bailey et al. | |
| 4,827,921 A | 5/1989 | Rugheimer | |
| 4,934,596 A | 6/1990 | Hilton et al. | |
| 4,942,003 A | 7/1990 | Bold | |
| 5,211,511 A | 5/1993 | Deal, Jr. | |
| 5,211,965 A | 5/1993 | Kitagawa | |
| 5,261,485 A | 11/1993 | Thornton et al. | |
| 5,316,703 A | 5/1994 | Schrenk | |
| 5,320,677 A | 6/1994 | Baig | |
| 5,386,943 A * | 2/1995 | Peeters | 239/675 |
| 5,395,653 A | 3/1995 | Baum | |
| 5,508,072 A | 4/1996 | Andersen et al. | |
| 5,520,779 A | 5/1996 | Bold | |
| 5,580,409 A | 12/1996 | Andersen et al. | |
| 5,582,670 A | 12/1996 | Andersen et al. | |
| 5,622,729 A | 4/1997 | Mower | |
| 5,643,510 A | 7/1997 | Sucech | |
| 5,660,903 A | 8/1997 | Andersen et al. | |
| 5,660,904 A | 8/1997 | Andersen et al. | |
| 5,665,442 A | 9/1997 | Andersen et al. | |
| 5,679,381 A | 10/1997 | Andersen et al. | |
| 5,683,635 A | 11/1997 | Sucech et al. | |
| 5,709,593 A | 1/1998 | Guthrie et al. | |
| 5,714,001 A | 2/1998 | Savoly et al. | |
| 5,718,797 A | 2/1998 | Phillips et al. | |
| 5,720,913 A | 2/1998 | Andersen et al. | |
| 5,730,819 A | 3/1998 | Retti | |
| 5,766,525 A | 6/1998 | Andersen et al. | |
| 5,792,322 A | 8/1998 | Hergert et al. | |
| 5,794,642 A | 8/1998 | Zikeli et al. | |
| 5,800,647 A | 9/1998 | Andersen et al. | |
| 5,844,051 A | 12/1998 | Onzuka et al. | |
| 5,879,486 A | 3/1999 | Philips et al. | |
| 5,879,722 A | 3/1999 | Andersen et al. | |
| 5,908,240 A | 6/1999 | Hood et al. | |
| 5,972,426 A | 10/1999 | Kutsuzawa et al. | |
| 5,997,691 A | 12/1999 | Gautam et al. | |
| 6,057,000 A | 5/2000 | Cai | |
| 6,059,444 A | 5/2000 | Johnson et al. | |
| 6,123,445 A | 9/2000 | Grassi | |
| 6,153,040 A | 11/2000 | Rohlf et al. | |
| 6,286,422 B1 | 9/2001 | Lin et al. | |
| 6,323,159 B1 | 11/2001 | Raza | |
| 6,340,123 B1 | 1/2002 | Lee et al. | |
| 6,342,284 B1 | 1/2002 | Yu et al. | |
| 6,363,967 B1 | 4/2002 | Tanaka et al. | |
| 6,382,922 B1 | 5/2002 | Lewis et al. | |
| 6,402,062 B1 | 6/2002 | Bendig et al. | |
| 6,409,823 B1 | 6/2002 | Shake et al. | |
| 6,416,695 B1 | 7/2002 | Miller | |
| 6,427,877 B1 | 8/2002 | Trout | |
| 6,471,799 B1 | 10/2002 | Sasaki et al. | |
| 6,494,609 B1 | 12/2002 | Wittbold et al. | |
| 6,616,985 B2 | 9/2003 | Powell et al. | |
| 6,632,550 B1 | 10/2003 | Groza et al. | |
| 6,645,483 B2 | 11/2003 | McGhee | |
| 6,699,364 B2 | 3/2004 | Song et al. | |
| 6,752,895 B1 | 6/2004 | Song et al. | |
| 6,774,146 B2 | 8/2004 | Savoly et al. | |
| 6,800,131 B2 | 10/2004 | Yu et al. | |
| 6,872,280 B2 | 3/2005 | Tanaka et al. | |
| 6,874,930 B2 | 4/2005 | Wittbold et al. | |
| 6,878,321 B2 | 4/2005 | Hauber et al. | |
| 6,991,361 B2 | 1/2006 | Flood | |
| 7,007,914 B2 | 3/2006 | Petersen et al. | |
| 7,127,865 B2 | 10/2006 | Douglas | |
| 7,160,389 B2 * | 1/2007 | Gibson et al. | 118/302 |
| 7,172,403 B2 | 2/2007 | Burke | |
| 7,255,123 B2 | 8/2007 | Cedergaard et al. | |
| 7,296,919 B2 | 11/2007 | Petersen et al. | |
| 7,364,676 B2 | 4/2008 | Sucech | |
| 7,458,532 B2 | 12/2008 | Sloan | |
| 7,475,599 B2 | 1/2009 | Frank et al. | |
| 7,588,634 B2 | 9/2009 | Lynn et al. | |
| 7,690,834 B2 | 4/2010 | Nakamura et al. | |
| 7,718,019 B2 | 5/2010 | Wittbold et al. | |
| 7,731,794 B2 | 6/2010 | Yu et al. | |
| 7,736,720 B2 | 6/2010 | Yu et al. | |
| 7,771,851 B2 | 8/2010 | Song et al. | |
| 7,875,114 B2 | 1/2011 | Wittbold et al. | |
| 7,875,192 B2 | 1/2011 | Eigenmann et al. | |
| 7,980,922 B2 | 7/2011 | Kiesel et al. | |
| 8,016,960 B2 | 9/2011 | Wittbold et al. | |
| 8,030,377 B2 | 10/2011 | Dubey et al. | |
| 8,038,790 B1 | 10/2011 | Dubey et al. | |
| 8,057,915 B2 | 11/2011 | Song et al. | |

(56) References Cited

U.S. PATENT DOCUMENTS

| | | |
|---|---|---|
| 8,062,741 B2 | 11/2011 | Tonyan et al. |
| 8,088,218 B2 | 1/2012 | Blackburn et al. |
| 8,119,207 B2 | 2/2012 | Rigaudon et al. |
| 8,128,126 B2 | 3/2012 | Poupore et al. |
| 8,142,859 B2 | 3/2012 | Domey et al. |
| 8,142,915 B2 | 3/2012 | Blackburn et al. |
| 8,177,541 B2 | 5/2012 | Fahey |
| 8,197,952 B2 | 6/2012 | Yu et al. |
| 8,257,489 B2 | 9/2012 | Yu et al. |
| 8,444,787 B2 | 5/2013 | Wittbold et al. |
| 8,475,762 B2 | 7/2013 | Li et al. |
| 8,597,426 B2 | 12/2013 | Lee et al. |
| 8,801,852 B2 | 8/2014 | Lee et al. |
| 2002/0045074 A1 | 4/2002 | Yu et al. |
| 2002/0056690 A1* | 5/2002 | Wegner ............... 210/773 |
| 2003/0049450 A1 | 3/2003 | Song et al. |
| 2003/0068959 A1 | 4/2003 | Kajiwara et al. |
| 2003/0117891 A1 | 6/2003 | Wittbold et al. |
| 2003/0200714 A1 | 10/2003 | Minke et al. |
| 2004/0033314 A1 | 2/2004 | Rao et al. |
| 2004/0091406 A1 | 5/2004 | Wolfert et al. |
| 2004/0231916 A1 | 11/2004 | Englert et al. |
| 2005/0019618 A1 | 1/2005 | Yu et al. |
| 2005/0253098 A1 | 11/2005 | Petersen et al. |
| 2006/0035112 A1 | 2/2006 | Veeramasuneni et al. |
| 2006/0092759 A1 | 5/2006 | Petersen et al. |
| 2006/0198995 A1 | 9/2006 | Nideborn et al. |
| 2006/0243171 A1 | 11/2006 | Yu et al. |
| 2006/0244182 A1 | 11/2006 | Wittbold et al. |
| 2006/0244183 A1 | 11/2006 | Wittbold et al. |
| 2006/0278133 A1 | 12/2006 | Yu et al. |
| 2006/0283974 A1* | 12/2006 | Eguchi et al. ............... 239/102.1 |
| 2007/0022913 A1 | 2/2007 | Wang et al. |
| 2007/0048490 A1 | 3/2007 | Yu et al. |
| 2007/0048549 A1 | 3/2007 | Song et al. |
| 2007/0059513 A1 | 3/2007 | Yu et al. |
| 2007/0251628 A1 | 11/2007 | Yu et al. |
| 2008/0000392 A1 | 1/2008 | Blackburn et al. |
| 2008/0009565 A1 | 1/2008 | Wittbold et al. |
| 2008/0069762 A1 | 3/2008 | Lynn et al. |
| 2008/0090068 A1 | 4/2008 | Yu et al. |
| 2008/0110276 A1 | 5/2008 | Frank et al. |
| 2008/0141909 A1 | 6/2008 | Immordino et al. |
| 2008/0299413 A1 | 12/2008 | Song et al. |
| 2009/0090796 A1 | 4/2009 | Tian |
| 2009/0134550 A1 | 5/2009 | Dehennau et al. |
| 2009/0239977 A1 | 9/2009 | Dubey et al. |
| 2009/0257303 A1 | 10/2009 | Rayner et al. |
| 2009/0297765 A1 | 12/2009 | Domey et al. |
| 2010/0077939 A1 | 4/2010 | Trout |
| 2010/0081008 A1 | 4/2010 | Trout |
| 2010/0139528 A1 | 6/2010 | Yu et al. |
| 2010/0227073 A1 | 9/2010 | Frank et al. |
| 2010/0229714 A1 | 9/2010 | Tonyan et al. |
| 2010/0239886 A1 | 9/2010 | Yu et al. |
| 2010/0291305 A1 | 11/2010 | Wittbold et al. |
| 2011/0054053 A1 | 3/2011 | Lee et al. |
| 2011/0186664 A1 | 8/2011 | Lucas et al. |
| 2011/0192518 A1 | 8/2011 | Li |
| 2011/0195241 A1 | 8/2011 | Yu et al. |
| 2011/0211418 A1 | 9/2011 | Tassone et al. |
| 2011/0213043 A1 | 9/2011 | Blackburn et al. |
| 2011/0213085 A1 | 9/2011 | Tonelli et al. |
| 2011/0220586 A1* | 9/2011 | Levitt ............... 210/741 |
| 2011/0271903 A1 | 11/2011 | Durst et al. |
| 2011/0308432 A1 | 12/2011 | Wittbold et al. |
| 2012/0131857 A1 | 5/2012 | Ross-da Silva |
| 2012/0167805 A1 | 7/2012 | Wittbold et al. |
| 2012/0168527 A1 | 7/2012 | Li et al. |
| 2012/0170403 A1 | 7/2012 | Li et al. |
| 2012/0251813 A1 | 10/2012 | Yu et al. |
| 2012/0304545 A1 | 12/2012 | Park et al. |
| 2012/0308463 A1 | 12/2012 | Li et al. |
| 2013/0030841 A1 | 1/2013 | Bergstrom et al. |
| 2013/0098268 A1 | 4/2013 | Li et al. |
| 2013/0099027 A1 | 4/2013 | Li et al. |
| 2013/0099418 A1 | 4/2013 | Li et al. |
| 2013/0100759 A1 | 4/2013 | Wittbold et al. |
| 2013/0216717 A1 | 8/2013 | Rago et al. |
| 2013/0233880 A1 | 9/2013 | Rago et al. |
| 2013/0308411 A1 | 11/2013 | Wittbold et al. |
| 2014/0073711 A1 | 3/2014 | Lee et al. |
| 2014/0090730 A1 | 4/2014 | Buettner et al. |

FOREIGN PATENT DOCUMENTS

| | | |
|---|---|---|
| DE | 353695 | 5/1922 |
| DE | 3932573 A1 | 4/1991 |
| DE | 29514043 U1 | 11/1995 |
| DE | 19757678 A1 | 6/1999 |
| DE | 102008041423 A1 | 2/2010 |
| DE | 202009014417 U1 | 2/2010 |
| DE | 202011100879 U1 | 6/2011 |
| DE | 102010010872 A1 | 9/2011 |
| EP | 0003705 | 2/1979 |
| EP | 0225261 A1 | 6/1987 |
| EP | 0997784 A1 | 5/2000 |
| EP | 1085280 A1 | 3/2001 |
| EP | 1396696 A2 | 3/2004 |
| EP | 1491262 A2 | 12/2004 |
| EP | 2363269 A1 | 9/2011 |
| EP | 2514294 | 10/2012 |
| FR | 1357221 | 4/1964 |
| FR | 2112808 A5 | 6/1972 |
| GB | 1317359 A | 5/1973 |
| GB | 1420686 | 1/1976 |
| GB | 1520258 A | 8/1978 |
| GB | 2026372 A | 2/1980 |
| GB | 2044163 A | 10/1980 |
| GB | 2246694 A | 2/1992 |
| GB | 2410909 | 8/2005 |
| JP | 6190845 A | 7/1994 |
| JP | 9094814 A | 4/1997 |
| JP | H09141700 A | 6/1997 |
| JP | 9273421 A | 10/1997 |
| JP | 11148589 | 6/1999 |
| JP | 2004130672 | 4/2004 |
| JP | 2006095469 A | 4/2006 |
| JP | 2006334483 A | 12/2006 |
| WO | WO 9324290 | 12/1993 |
| WO | WO 97/05305 A1 | 2/1997 |
| WO | WO 98/25069 A1 | 6/1998 |
| WO | WO 2004/101402 A1 | 11/2004 |
| WO | WO 2011134844 A1 | 11/2011 |
| WO | WO 2011150455 A1 | 12/2011 |
| WO | WO 2012076526 | 6/2012 |
| WO | WO 2012/092534 A1 | 7/2012 |
| WO | WO 2012/092582 A1 | 7/2012 |
| WO | WO 2013/063044 A1 | 5/2013 |
| WO | WO 2013/063055 A2 | 5/2013 |
| WO | WO 2013/063073 A2 | 5/2013 |
| WO | WO 2013/063080 A2 | 5/2013 |
| WO | WO 2013/063055 A3 | 6/2013 |

OTHER PUBLICATIONS

International Search Report and Written Opinion from PCT/US2013/066008 (Feb. 7, 2014).

Mueller et al., "Controlling Set Times during Gypsum Board Production: Advance Additive Solutions", Global Gypsum Conference, Oct. 2011.

Peterson, Kurt, "Engineered Gypsum Panels, the Development and Application of Densified Zones at the Paper, Core Interface of Gypsum Panels", Proceedings of Gypsum 2000, 6th International Conference on Natural and Synthetic Gypsum, Toronto, Canada, May 2000, pp. 9-1-9-16.

TeeJet; "TeeJet LF 500 Slurry Controller", http://teejet.com/english/home/products/application-control-and-equipment/slurry-application-controls/teejet--lh-500-slurry-controller.aspx, accessed Jan. 8, 2015.

* cited by examiner

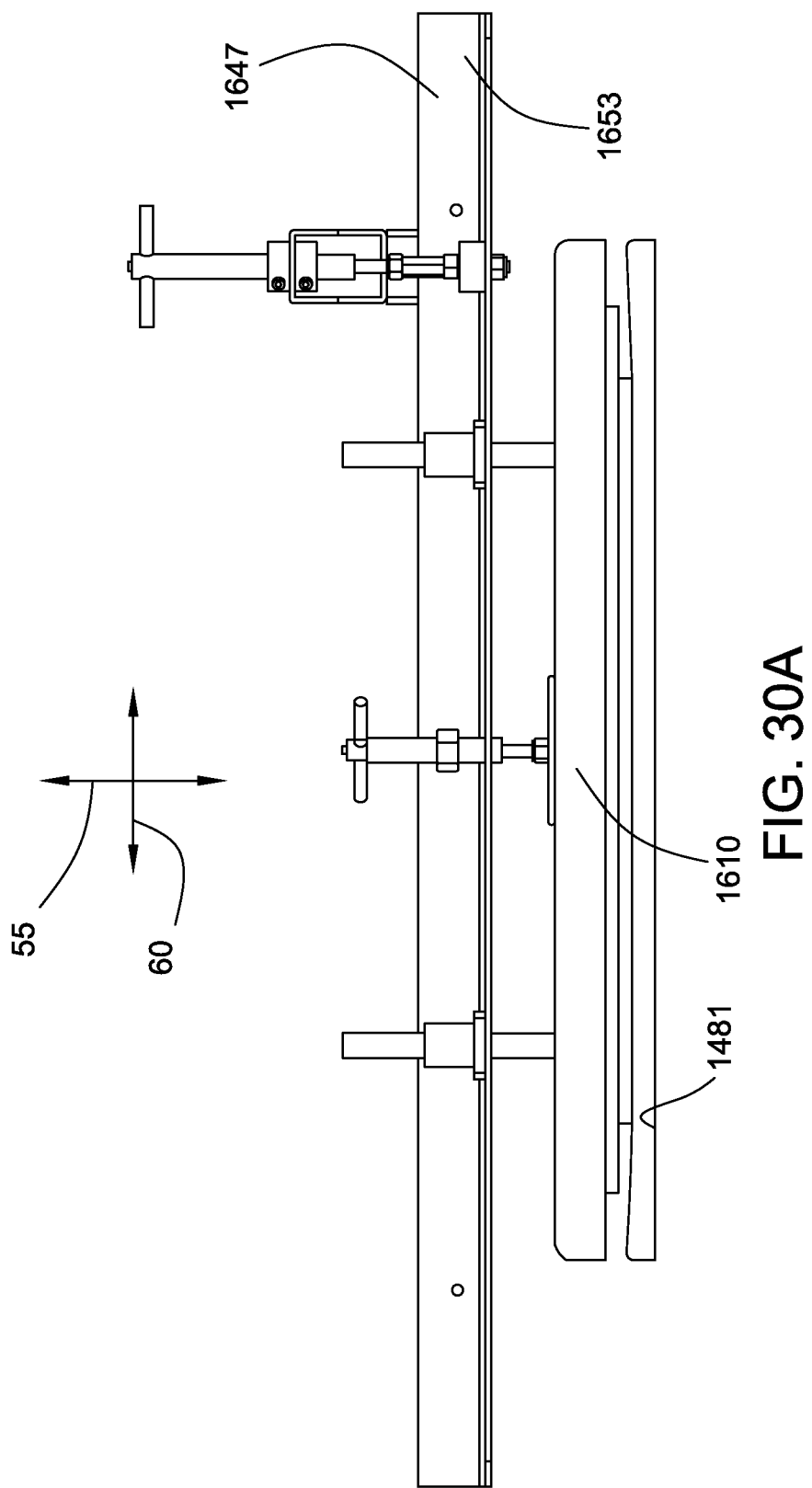

SLURRY DISTRIBUTOR WITH A WIPING MECHANISM, SYSTEM, AND METHOD FOR USING SAME

CROSS-REFERENCE TO RELATED APPLICATIONS

This patent application is a continuation-in-part of U.S. patent application Ser. Nos. 13/341,016, filed Dec. 30, 2011, and entitled, "Slurry Distribution System and Method"; 13/341,209, filed Dec. 30, 2011, and entitled, "Slurry Distributor, System and Method for Using Same"; and 13/659,516, filed Oct. 24, 2012, and entitled, "Slurry Distributor, System, and Method for Using Same."

U.S. patent application Ser. No. 13/341,016 claims the benefit of priority to U.S. Provisional Patent Application Nos. 61/428,706: filed Dec. 30, 2010, and entitled, "Slurry Distributor, System and Method for Using Same"; 61/428,736, filed Dec. 30, 2010, and entitled, "Slurry Distribution System and Method"; and 61/550,827, filed Oct. 24, 2011, and entitled, "Slurry Distributor, System, Method for Using, and Method for Making Same."

U.S. patent application Ser. No. 13/341,209 claims the benefit of priority to U.S. Provisional Patent Application Nos. 61/428,706, filed Dec. 30, 2010, and entitled, "Slurry Distributor, System and Method for Using Same"; 61/428,736, filed Dec. 30, 2010, and entitled, "Slurry Distribution System and Method"; 61/550,827, filed Oct. 24, 2011, and entitled, "Slurry Distributor, System, Method for Using, and Method for Making Same"; 61/550,857, filed Oct. 24, 2011, and entitled, "Flow Splitter for Slurry Distribution System"; and 61/550,873, filed Oct. 24, 2011, and entitled, "Automatic Device for Squeezing Slurry Splitter."

U.S. patent application Ser. No. 13/659,516 claims the benefit of priority to U.S. Provisional Patent Application Nos. 61/550,827, filed Oct. 24, 2011, and entitled, "Slurry Distributor, System, Method for Using, and Method for Making Same"; 61/550,857, filed Oct. 24, 2011, and entitled, "Flow Splitter for Slurry Distribution System"; and 61/550,873, filed Oct. 24, 2011, and entitled, "Automatic Device for Squeezing Slurry Splitter.

All of the foregoing related applications are incorporated in their entireties herein by this reference.

BACKGROUND

The present disclosure relates to continuous board (e.g., wallboard) manufacturing processes and, more particularly, to an apparatus, system and method for the distribution of an aqueous calcined gypsum slurry.

It is well-known to produce gypsum board by uniformly dispersing calcined gypsum (commonly referred to as "stucco") in water to form an aqueous calcined gypsum slurry. The aqueous calcined gypsum slurry is typically produced in a continuous manner by inserting stucco and water and other additives into a mixer which contains means for agitating the contents to form a uniform gypsum slurry. The slurry is continuously directed toward and through a discharge outlet of the mixer and into a discharge conduit connected to the discharge outlet of the mixer. An aqueous foam can be combined with the aqueous calcined gypsum slurry in the mixer and/or in the discharge conduit. The stream of slurry passes through the discharge conduit from which it is continuously deposited onto a moving web of cover sheet material supported by a forming table. The slurry is allowed to spread over the advancing web. A second web of cover sheet material is applied to cover the slurry and form a sandwich structure of a continuous wallboard preform, which is subjected to forming, such as at a conventional forming station, to obtain a desired thickness. The calcined gypsum reacts with the water in the wallboard preform and sets as the wallboard preform moves down a manufacturing line. The wallboard preform is cut into segments at a point along the line where the wallboard preform has set sufficiently, the segments are flipped over, dried (e.g., in a kiln) to drive off excess water, and processed to provide the final wallboard product of desired dimensions.

Prior devices and methods for addressing some of the operational problems associated with the production of gypsum wallboard are disclosed in commonly-assigned U.S. Pat. Nos. 5,683,635; 5,643,510; 6,494,609; 6,874,930; 7,007,914; and 7,296,919, which are incorporated herein by reference.

The weight proportion of water relative to stucco that is combined to form a given amount of finished product is often referred to in the art as the "water-stucco ratio" (WSR). A reduction in the WSR without a formulation change will correspondingly increase the slurry viscosity, thereby reducing the ability of the slurry to spread on the forming table. Reducing water usage (i.e., lowering the WSR) in the gypsum board manufacturing process can yield many advantages, including the opportunity to reduce the energy demand in the process. However, spreading increasingly viscous gypsum slurries uniformly on the forming table remains a great challenge.

Furthermore, in some situations where the slurry is a multi-phase slurry including air, air-liquid slurry separation can develop in the slurry discharge conduit from the mixer. As WSR decreases, the air volume increases to maintain the same dry density. The degree of air phase separated from the liquid slurry phase increases, thereby resulting in the propensity for larger mass or density variation.

It will be appreciated that this background description has been created by the inventors to aid the reader and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims and not by the ability of any disclosed feature to solve any specific problem noted herein.

SUMMARY

In one aspect, the present disclosure is directed to embodiments of a slurry distribution system for use in preparing a gypsum product. In one embodiment, a slurry distributor can include a feed conduit and a distribution conduit in fluid communication therewith. The feed conduit can include a first feed inlet in fluid communication with the distribution conduit and a second feed inlet disposed in spaced relationship with the first feed inlet and in fluid communication with the distribution conduit. The distribution conduit can extend generally along a longitudinal axis and include an entry portion and a distribution outlet in fluid communication therewith. The entry portion is in fluid communication with the first and second feed inlets of the feed conduit. The distribution outlet extends a predetermined distance along a transverse axis, which is substantially perpendicular to the longitudinal axis.

In other embodiments, a slurry distributor includes a feed conduit and a distribution conduit. The feed conduit includes a first entry segment with a first feed inlet and a second entry segment with a second feed inlet disposed in spaced relationship to the first feed inlet. The distribution conduit extends generally along a longitudinal axis and includes an entry portion and a distribution outlet in fluid communication with the entry portion. The entry portion is in fluid communication with the first and second feed inlets of the feed conduit. The distribution outlet extends a predetermined distance along a transverse axis. The transverse axis is substantially perpendicular to the longitudinal axis. The first and second feed inlets each has an opening with a cross-sectional area. The entry portion of the distribution conduit has an opening with a cross-sectional area which is greater than the sum of the cross-sectional areas of the openings of the first and second feed inlets.

In other embodiments, a slurry distributor includes a feed conduit, a distribution conduit, and at least one support segment. The feed conduit includes a first entry segment with a first feed inlet and a second entry segment with a second feed inlet disposed in spaced relationship to the first feed inlet. The distribution conduit extends generally along a longitudinal axis and includes an entry portion and a distribution outlet in fluid communication with the entry portion. The entry portion is in fluid communication with the first and second feed inlets of the feed conduit. Each support segment is movable over a range of travel such that the support segment is in a range of positions over which the support segment is in increasing compressive engagement with a portion of at least one of the feed conduit and the distribution conduit.

In another aspect of the present disclosure, a slurry distributor can be placed in fluid communication with a gypsum slurry mixer adapted to agitate water and calcined gypsum to form an aqueous calcined gypsum slurry. In one embodiment, the disclosure describes a gypsum slurry mixing and dispensing assembly which includes a gypsum slurry mixer adapted to agitate water and calcined gypsum to form an aqueous calcined gypsum slurry. A slurry distributor is in fluid communication with the gypsum slurry mixer and is adapted to receive a first flow and a second flow of aqueous calcined gypsum slurry from the gypsum slurry mixer and distribute the first and second flows of aqueous calcined gypsum slurry onto an advancing web.

The slurry distributor includes a first feed inlet adapted to receive the first flow of aqueous calcined gypsum slurry from the gypsum slurry mixer, a second feed inlet adapted to receive the second flow of aqueous calcined gypsum slurry from the gypsum slurry mixer, and a distribution outlet in fluid communication with both the first and the second feed inlets and adapted such that the first and second flows of aqueous calcined gypsum slurry discharge from the slurry distributor through the distribution outlet.

In another embodiment, a slurry distributor includes a feed conduit and a distribution conduit. The feed conduit includes an entry segment with a feed inlet and a feed entry outlet in fluid communication with the feed inlet. The entry segment extends along a first feed flow axis. The feed conduit includes a shaped duct having a bulb portion in fluid communication with the feed entry outlet of the entry segment. The feed conduit includes a transition segment in fluid communication with the bulb portion. The transition segment extends along a second feed flow axis, which is in non-parallel relationship with the first feed flow axis.

The distribution conduit extends generally along a longitudinal axis and includes an entry portion and a distribution outlet in fluid communication with the entry portion. The entry portion is in fluid communication with the feed inlet of the feed conduit. The distribution outlet extends a predetermined distance along a transverse axis, which is substantially perpendicular to the longitudinal axis.

The bulb portion has an area of expansion with a cross-sectional flow area that is greater than a cross-sectional flow area of an adjacent area upstream from the area of expansion relative to a flow direction from the feed inlet toward the distribution outlet distribution conduit. The shaped duct has a convex interior surface in confronting relationship with the feed entry outlet of the entry segment.

In still another embodiment, a slurry distributor includes a bifurcated feed conduit and a distribution conduit. The bifurcated feed conduit includes a first and a second feed portion each having an entry segment with a feed inlet and a feed entry outlet in fluid communication with the feed inlet, a shaped duct having a bulb portion in fluid communication with the feed entry outlet of the entry segment, and a transition segment in fluid communication with the bulb portion. The entry segment extends generally along a vertical axis. The transition segment extends along a longitudinal axis, which perpendicular to the vertical axis.

The distribution conduit extends generally along the longitudinal axis and includes an entry portion and a distribution outlet in fluid communication with the entry portion. The entry portion is in fluid communication with the first and second feed inlets of the feed conduit. The distribution outlet extends a predetermined distance along a transverse axis, which is substantially perpendicular to the longitudinal axis.

The first and second bulb portions each has an area of expansion with a cross-sectional flow area that is greater than a cross-sectional flow area of an adjacent area upstream from the area of expansion relative to a flow direction from the respective first and second feed inlets toward the distribution outlet distribution conduit. The first and second shaped ducts each has a convex interior surface in confronting relationship with the respective first and second feed entry outlets of the first and second entry segments.

In another embodiment, a slurry distributor includes a distribution conduit and a slurry wiping mechanism. The distribution conduit extends generally along a longitudinal axis, a distribution outlet in fluid communication with the entry portion, and a bottom surface extending between the entry portion and the distribution outlet. The distribution outlet extends a predetermined distance along a transverse axis, which is substantially perpendicular to the longitudinal axis. The slurry wiping mechanism includes a movable wiper blade in contacting relationship with the bottom surface of the distribution conduit. The wiper blade is reciprocally movable over a clearing path between a first position and a second position. The clearing path is disposed adjacent the distribution outlet.

In still another embodiment, a slurry distributor includes a distribution conduit and a profiling mechanism. The distribution conduit extends generally along a longitudinal axis and includes an entry portion and a distribution outlet in fluid communication with the entry portion. The distribution outlet extends a predetermined distance along a transverse axis, which is substantially perpendicular to the longitudinal axis. The distribution outlet includes an outlet opening having a width, along the transverse axis, and a height, along a vertical axis mutually perpendicular to the longitudinal axis and the transverse axis.

The profiling mechanism includes a profiling member in contacting relationship with the distribution conduit. The profiling member is movable over a range of travel such that the profiling member is in a range of positions over which the profiling member is in increasing compressive engagement with a portion of the distribution conduit adjacent the distribution outlet to vary the shape and/or size of the outlet opening.

In another aspect of the present disclosure, the slurry distributor can be used in a cementitious slurry mixing and dispensing assembly. For example, a slurry distributor can be used to distribute an aqueous calcined gypsum slurry upon an advancing web. In other embodiments, a gypsum slurry mixing and dispensing assembly includes a mixer and a slurry distributor in fluid communication with the mixer. The mixer is adapted to agitate water and calcined gypsum to form an aqueous calcined gypsum slurry. The slurry distributor includes a feed conduit and a distribution conduit:

The feed conduit includes a first entry segment with a first feed inlet and a second entry segment with a second feed inlet disposed in spaced relationship to the first feed inlet. The first feed inlet is adapted to receive a first flow of aqueous calcined gypsum slurry from the gypsum slurry mixer. The second feed inlet is adapted to receive a second flow of aqueous calcined gypsum slurry from the gypsum slurry mixer.

The distribution conduit extends generally along a longitudinal axis and includes an entry portion and a distribution outlet in fluid communication with the entry portion. The entry portion is in fluid communication with the first and second feed inlets of the feed conduit. The distribution outlet extends a predetermined distance along a transverse axis. The transverse axis is substantially perpendicular to the longitudinal axis. The distribution outlet is in fluid communication with both the first and the second feed inlets and is adapted such that the first and second flows of aqueous calcined gypsum slurry discharge from the slurry distributor through the distribution outlet.

The first and second feed inlets each has an opening with a cross-sectional area. The entry portion of the distribution conduit has an opening with a cross-sectional area which is greater than the sum of the cross-sectional areas of the openings of the first and second feed inlets.

A cementitious slurry mixing and dispensing assembly including a mixer adapted to agitate water and a cementitious material to form an aqueous cementitious slurry and a slurry distributor in fluid communication with the mixer. The slurry distributor can be any one of the various embodiments of a slurry distributor following principles of the present disclosure.

In still another aspect of the present disclosure, the slurry distribution system can be used in a method of preparing a cementitious product. For example, a slurry distributor can be used to distribute an aqueous calcined gypsum slurry upon an advancing web.

In some embodiments, a method of distributing an aqueous calcined gypsum slurry upon a moving web can be performed using a slurry distributor constructed according to principles of the present disclosure. A first flow of aqueous calcined gypsum slurry and a second flow of aqueous calcined gypsum slurry are respectively passed through a first feed inlet and a second feed inlet of the slurry distributor. The first and second flows of aqueous calcined gypsum slurry are combined in the slurry distributor. The first and second flows of aqueous calcined gypsum slurry are discharged from a distribution outlet of the slurry distributor upon the moving web.

In other embodiments, a method of preparing a gypsum product can be performed using a slurry distributor constructed according to principles of the present disclosure. A first flow of aqueous calcined gypsum slurry is passed at an average first feed velocity through a first feed inlet of a slurry distributor. A second flow of aqueous calcined gypsum slurry is passed at an average second feed velocity through a second feed inlet of the slurry distributor. The second feed inlet is in spaced relationship to the first feed inlet. The first and second flows of aqueous calcined gypsum slurry are combined in the slurry distributor. The combined first and second flows of aqueous calcined gypsum slurry are discharged at an average discharge velocity from a distribution outlet of the slurry distributor upon a web of cover sheet material moving along a machine direction. The average discharge velocity is less than the average first feed velocity and the average second feed velocity.

In another embodiment, a method of preparing a cementitious product can be performed using a slurry distributor constructed according to principles of the present disclosure. A flow of aqueous cementitious slurry is discharged from a mixer. A flow of aqueous cementitious slurry is passed at an average feed velocity through a feed inlet of a slurry distributor along a first feed flow axis. The flow of aqueous cementitious slurry is passed into a bulb portion of the slurry distributor. The bulb portion has an area of expansion with a cross-sectional flow area that is greater than a cross-sectional flow area of an adjacent area upstream from the area of expansion relative to a flow direction from the feed inlet. The bulb portion is configured to reduce the average velocity of the flow of aqueous cementitious slurry moving from the feed inlet through the bulb portion. The shaped duct has a convex interior surface in confronting relationship with first feed flow axis such that the flow of aqueous cementitious slurry moves in radial flow in a plane substantially perpendicular to the first feed flow axis The flow of aqueous cementitious slurry is passed into a transition segment extending along a second feed flow axis, which is in non-parallel relationship with the first feed flow axis. The flow of aqueous cementitious slurry is passed into a distribution conduit. The distribution conduit includes a distribution outlet extending a predetermined distance along a transverse axis, which is substantially perpendicular to the longitudinal axis.

In another embodiment, a method of preparing a cementitious product includes discharging a flow of aqueous cementitious slurry from a mixer. The flow of aqueous cementitious slurry is passed through an entry portion of a distribution conduit of a slurry distributor. The flow of aqueous cementitious slurry is discharged from a distribution outlet of the slurry distributor upon a web of cover sheet material moving along a machine direction. A wiper blade is reciprocally moved over a clearing path along a bottom surface of the distribution conduit between a first position and a second position to clear aqueous cementitious slurry therefrom. The clearing path is disposed adjacent the distribution outlet.

In still another embodiment, a method of preparing a cementitious product includes discharging a flow of aqueous cementitious slurry from a mixer. The flow of aqueous cementitious slurry is passed through an entry portion of a distribution conduit of a slurry distributor. The flow of aqueous cementitious slurry is discharged from an outlet opening of a distribution outlet of the slurry distributor upon a web of cover sheet material moving along a machine direction. The distribution outlet extends a predetermined distance along a transverse axis, which is substantially perpendicular to the longitudinal axis. The outlet opening has a width, along the transverse axis, and a height, along a vertical axis mutually perpendicular to the longitudinal axis and the transverse axis. A portion of the distribution conduit adjacent the distribution outlet is compressively engaged to vary the shape and/or size of the outlet opening.

Embodiments of a mold for use in a method for making a slurry distributor according to principles of the present disclosure are also disclosed herein. Embodiments of supports for a slurry distributor according to principles of the present disclosure are also disclosed herein.

Further and alternative aspects and features of the disclosed principles will be appreciated from the following detailed description and the accompanying drawings. As will be appreciated, the slurry distribution systems disclosed herein are capable of being carried out and used in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 30A is a view as in FIG. 30, illustrating a profiling member of the profiling mechanism in a compressed position.

DETAILED DESCRIPTION OF EXEMPLARY EMBODIMENTS

Figure 1:
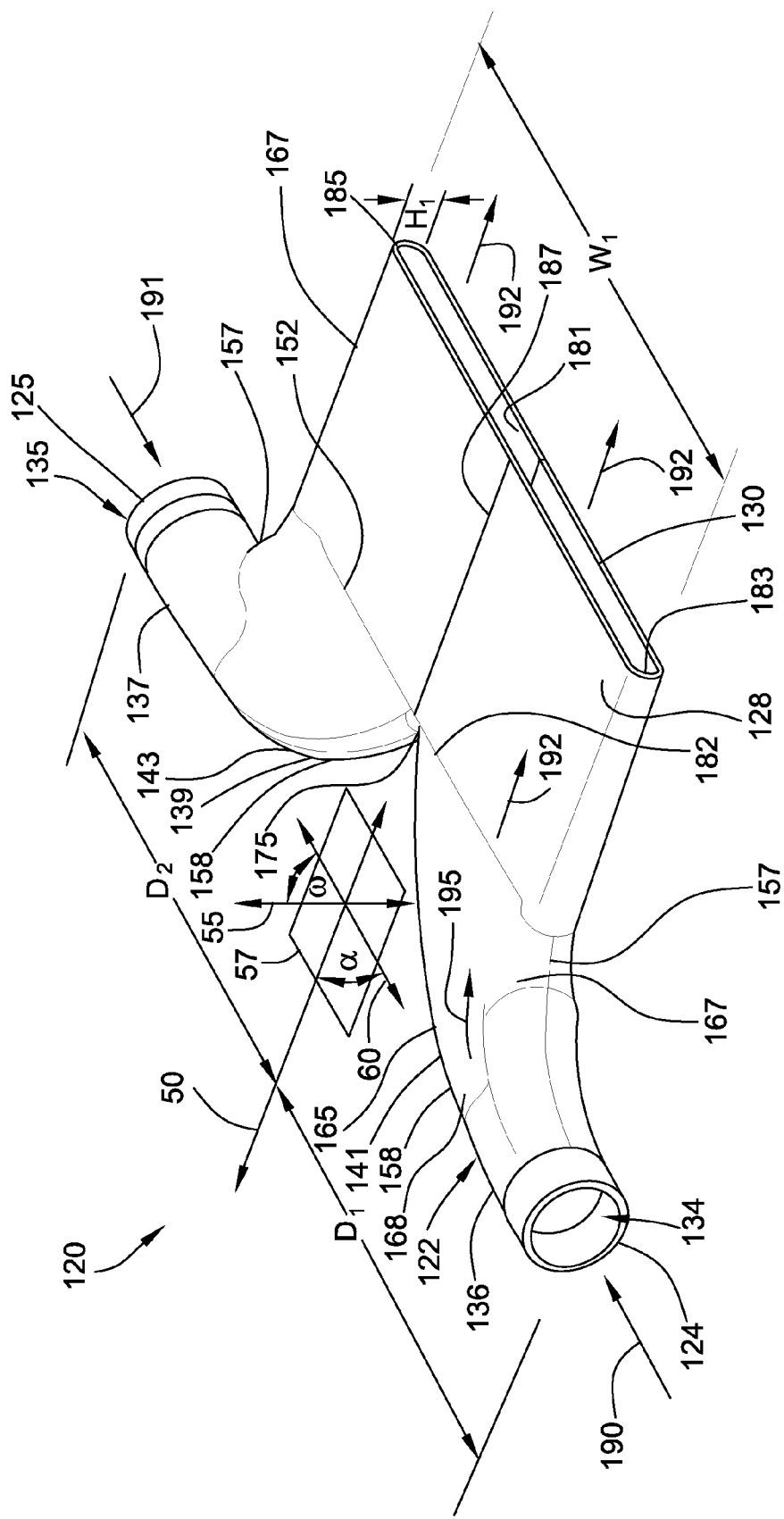
FIG. 1 is a perspective view of an embodiment of a slurry distributor constructed in accordance with principles of the present disclosure.

The present disclosure provides various embodiments of a slurry distribution system that can be used in the manufacture of products, including cementitious products such as gypsum wallboard, for example. Embodiments of a slurry distributor constructed in accordance with principles of the present disclosure can be used in a manufacturing process to effectively distribute a multi-phase slurry, such as one containing air and liquid phases, such as found in an aqueous foamed gypsum slurry, for example.

Embodiments of a distribution system constructed in accordance with principles of the present disclosure can be used to distribute a slurry (e.g., an aqueous calcined gypsum slurry) onto an advancing web (e.g., paper or mat) moving on a conveyor during a continuous board (e.g., wallboard) manufacturing process. In one aspect, a slurry distribution system constructed in accordance with principles of the present disclosure can be used in a conventional gypsum drywall manufacturing process as, or part of, a discharge conduit attached to a mixer adapted to agitate calcined gypsum and water to form an aqueous calcined gypsum slurry.

Embodiments of a slurry distribution system constructed in accordance with principles of the present disclosure are aimed at accomplishing wider distribution (along the cross-machine direction) of a uniform gypsum slurry. Embodiments of a slurry distribution system of the present disclosure are suitable for use with a gypsum slurry having a range of WSRs, including WSRs conventionally used to manufacture gypsum wallboard and those that are relatively lower and have a relatively higher viscosity. Furthermore, a gypsum slurry distribution system of the present disclosure can be used to help control air-liquid phase separation, such as, in aqueous foamed gypsum slurry, including foamed gypsum slurry having a very high foam volume. The spreading of the aqueous calcined gypsum slurry over the advancing web can be controlled by routing and distributing the slurry using a distribution system as shown and described herein.

A cementitious slurry mixing and dispensing assembly according to principles of the present disclosure can be used to form any type of cementitious product, such as a board, for example. In some embodiments, a cementitious board, such as a gypsum drywall, a Portland cement board or an acoustical panel, for example, can be formed.

The cementitious slurry can be any conventional cementitious slurry, for example any cementitious slurry commonly used to produce gypsum wallboard, acoustical panels including, for example, acoustical panels described in U.S. Patent Application Publication No. 2004/0231916, or Portland cement board. As such, the cementitious slurry can optionally further comprise any additives commonly used to produce cementitious board products. Such additives include structural additives including mineral wool, continuous or chopped glass fibers (also referred to as fiberglass), perlite, clay, vermiculite, calcium carbonate, polyester, and paper fiber, as well as chemical additives such as foaming agents, fillers, accelerators, sugar, enhancing agents such as phosphates, phosphonates, borates and the like, retarders, binders (e.g., starch and latex), colorants, fungicides, biocides, hydrophobic agent, such as a silicone-based material (e.g., a silane, siloxane, or silicone-resin matrix), and the like. Examples of the use of some of these and other additives are described, for instance, in U.S. Pat. Nos. 6,342,284; 6,632,550; 6,800,131; 5,643,510; 5,714,001; and 6,774,146; and U.S. Patent Application Publication Nos. 2004/0231916; 2002/0045074; 2005/0019618; 2006/0035112; and 2007/0022913.

Non-limiting examples of cementitious materials include Portland cement, sorrel cement, slag cement, fly ash cement, calcium alumina cement, water-soluble calcium sulfate anhydrite, calcium sulfate α-hemihydrate, calcium sulfate β-hemihydrate, natural, synthetic or chemically modified calcium sulfate hemihydrate, calcium sulfate dihydrate ("gypsum," "set gypsum," or "hydrated gypsum"), and mixtures thereof. In one aspect, the cementitious material desirably comprises calcined gypsum, such as in the form of calcium sulfate alpha hemihydrate, calcium sulfate beta hemihydrate, and/or calcium sulfate anhydrite. In embodiments, the calcined gypsum can be fibrous in some embodiments and non-fibrous in others. The calcined gypsum can include at least about 50% beta calcium sulfate hemihydrate. In other embodiments, the calcined gypsum can include at least about 86% beta calcium sulfate hemihydrate. The weight ratio of water to calcined gypsum can be any suitable ratio, although, as one of ordinary skill in the art will appreciate, lower ratios can be more efficient because less excess water must be driven off during manufacture, thereby conserving energy. In some embodiments, the cementitious slurry can be prepared by combining water and calcined gypsum in a range from about a 1:6 ratio by weight respectively to about 1:1 ratio, such as about 2:3, for board production depending on products.

Embodiments of a method of preparing a cementitious product, such as a gypsum product, in accordance with principles of the present disclosure can include distributing an aqueous calcined gypsum slurry upon an advancing web using a slurry distributor constructed in accordance with principles of the present disclosure. Various embodiments of a method of distributing an aqueous calcined gypsum slurry upon a moving web are described herein.

Figure 2:
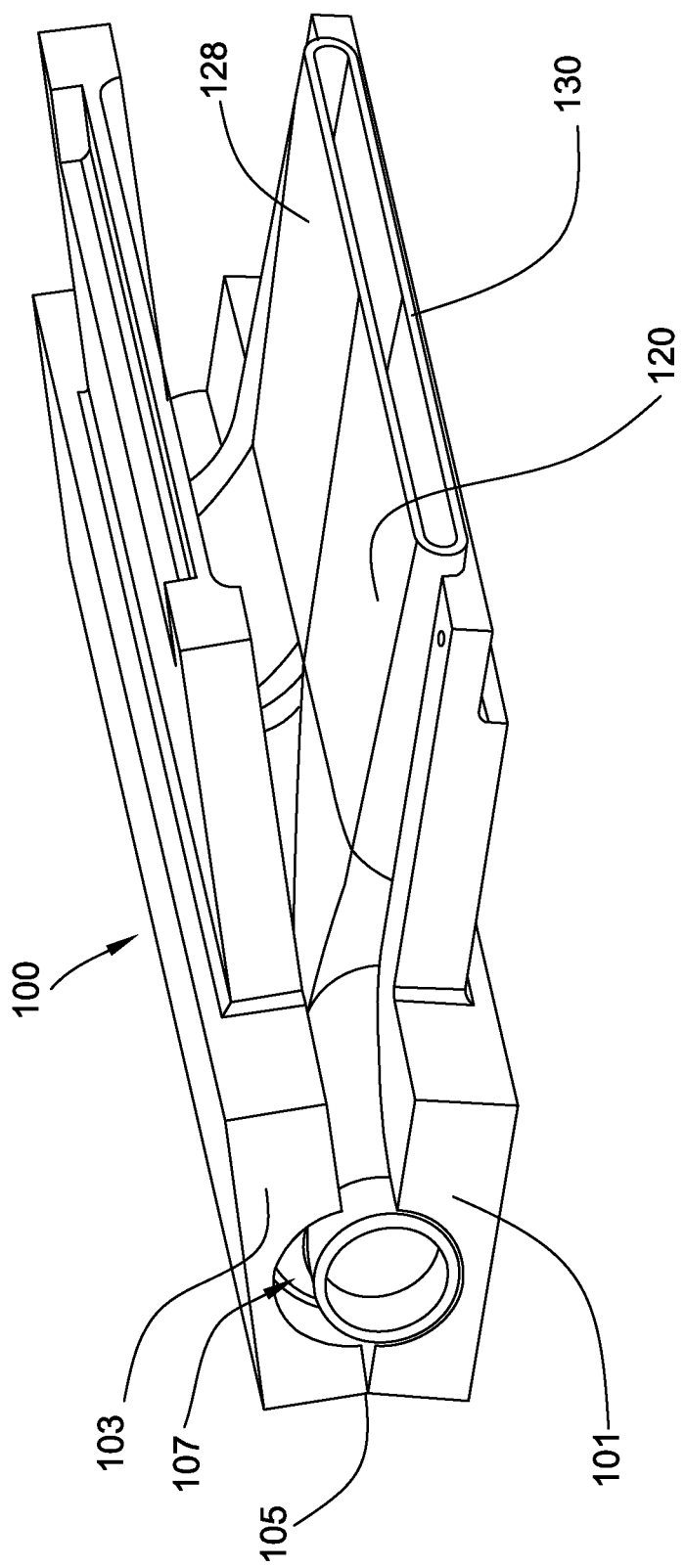
FIG. 2 is a perspective view of the slurry distributor of FIG. 1 and a perspective view of an embodiment of a slurry distributor support constructed in accordance with principles of the present disclosure.
Figure 3:
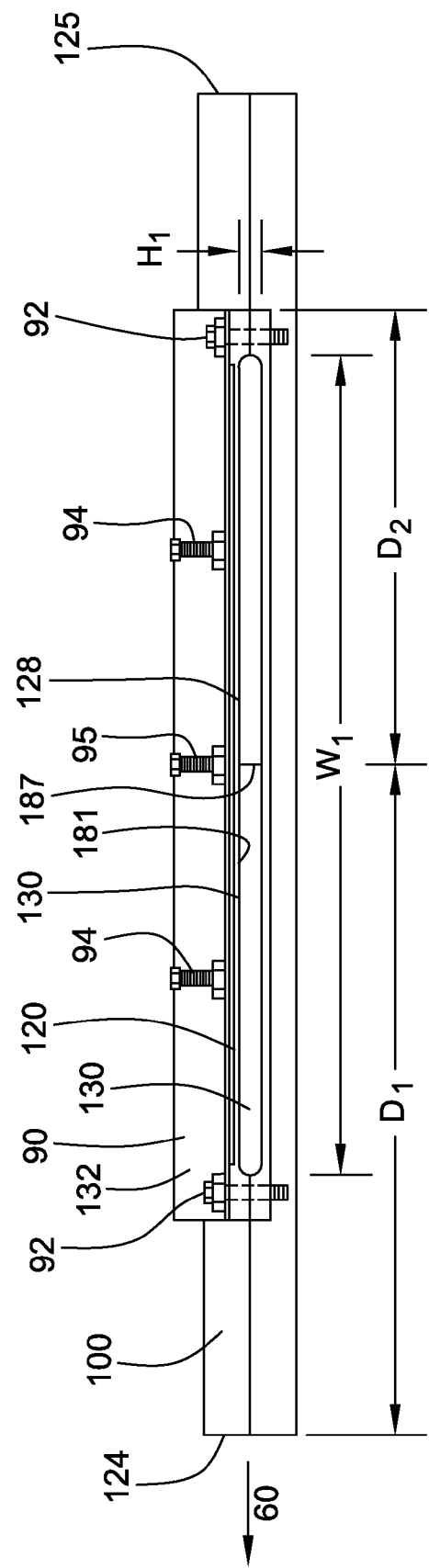
FIG. 3 is a front elevational view of the slurry distributor of FIG. 1 and the slurry distributor support of FIG. 2.
Figure 4:
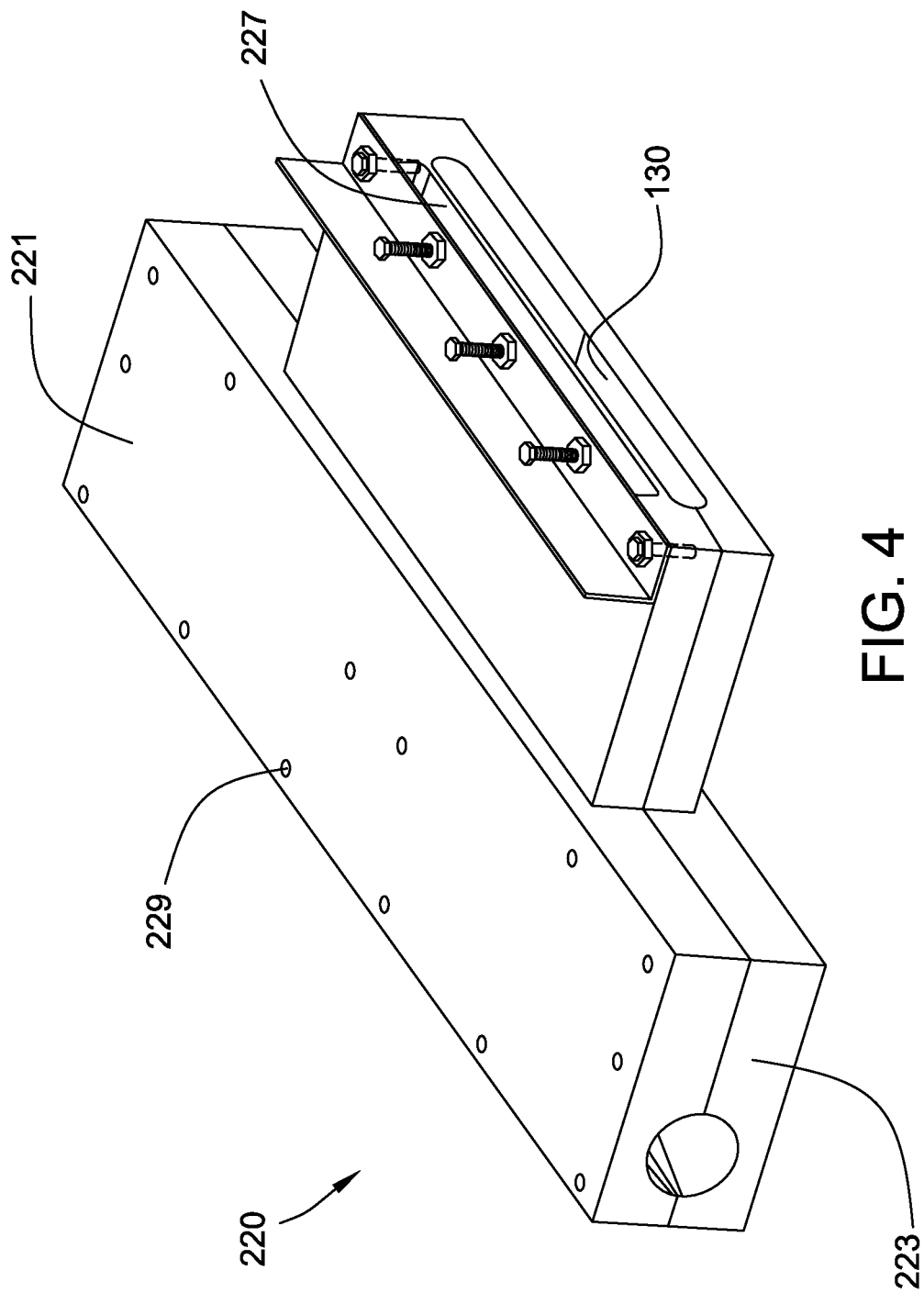
FIG. 4 is a perspective view of an embodiment of a slurry distributor constructed in accordance with principles of the present disclosure that defines an interior geometry that is similar to the slurry distributor of FIG. 1, but that is constructed from a rigid material and has a two-piece construction.
Figure 5:
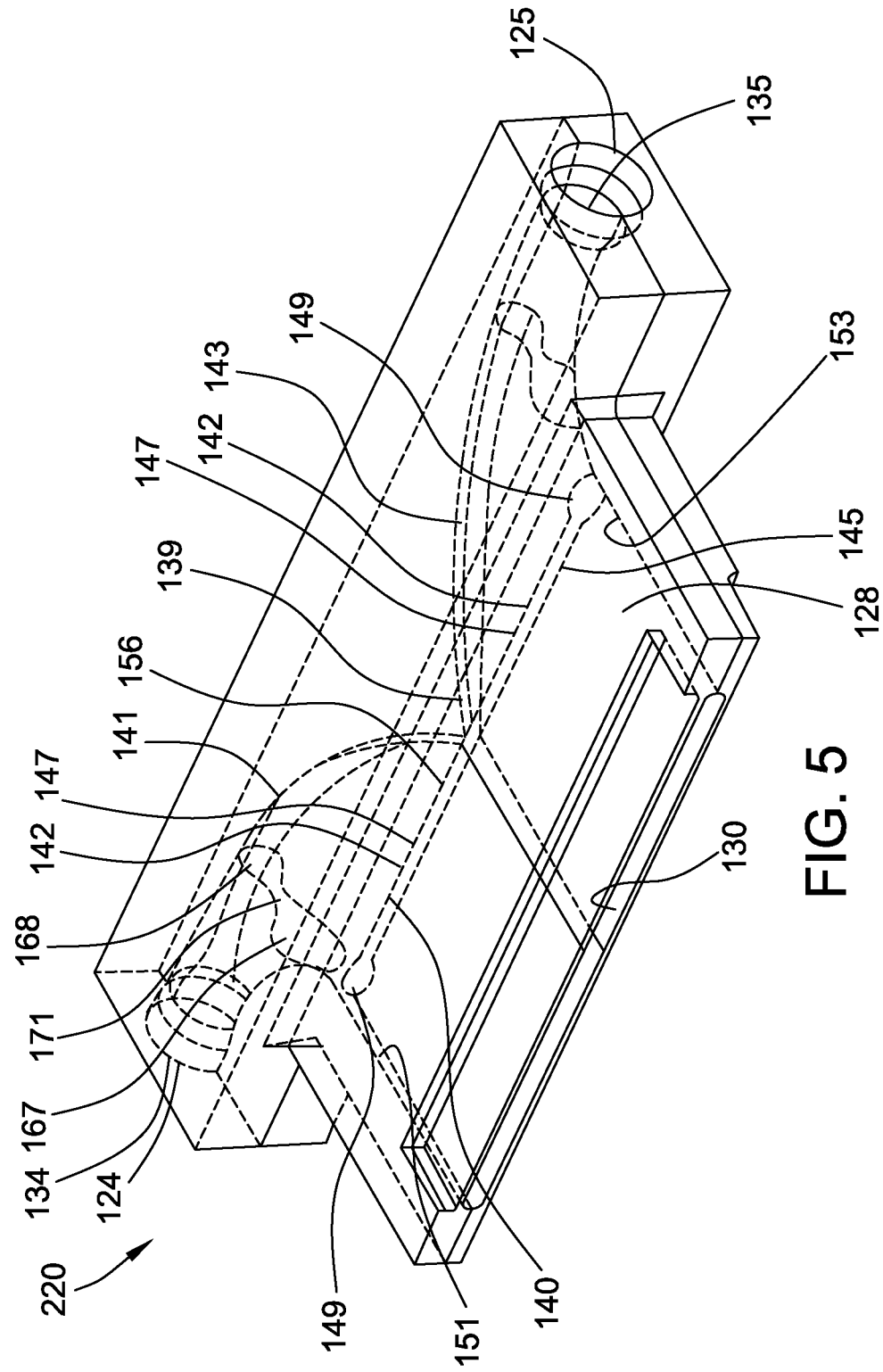
FIG. 5 is another perspective view of the slurry distributor of FIG. 4 but with a profiling system removed for illustrative purposes.

Turning now to the Figures, there is shown in FIGS. 1-3 an embodiment of a slurry distributor 120 according to principles of the present disclosure, and in FIGS. 4 and 5, another embodiment of a slurry distributor 220 according to principles of the present disclosure is shown. The slurry distributor 120 shown in FIGS. 1-3 is constructed from a resiliently flexible material, whereas the slurry distributor 220 shown in FIGS. 3 and 4 is made from a relatively rigid material. However, the interior flow geometry of both slurry distributors 120, 220 in FIGS. 1-5 is the same, and reference should also be made to FIG. 5 when considering the slurry distributor 120 of FIGS. 1-3.

Referring to FIG. 1, the slurry distributor 120 includes a feed conduit 122, which has first and second feed inlets 124, 125, and a distribution conduit 128, which includes a distribution outlet 130 and is in fluid communication with the feed conduit 128. A profiling system 132 (see FIG. 3) adapted to locally vary the size of the distribution outlet 130 of the distribution conduit 128 can also be provided.

Referring to FIG. 1, the feed conduit 122 extends generally along a transverse axis or cross-machine direction 60, which is substantially perpendicular to a longitudinal axis or machine direction 50. The first feed inlet 124 is in spaced relationship with the second feed inlet 125. The first feed inlet 124 and the second feed inlet 125 define respective openings 134, 135 that have substantially the same area. The illustrated openings 134, 135 of the first and second feed inlets 124, 125 both have a circular cross-sectional shape as illustrated in this example. In other embodiments, the cross-sectional shape of the feed inlets 124, 125 can take other forms, depending upon the intended applications and process conditions present.

The first and second feed inlets 124, 125 are in opposing relationship to each other along the cross-machine axis 60 such that the first and second feed inlets 124, 125 are disposed at substantially a 90° angle to the machine axis 50. In other embodiments the first and second feed inlets 124, 125 can be oriented in a different manner with respect to the machine direction. For example, in some embodiments, the first and second feed inlets 124, 125 can be at an angle between 0° and about 135° with respect to the machine direction 50.

The feed conduit 122 includes first and second entry segments 136, 137 and a bifurcated connector segment 139 disposed between the first and second entry segments 136, 137. The first and second entry segments 136, 137 are generally cylindrical and extend along the transverse axis 60 such that they are substantially parallel to a plane 57 defined by the longitudinal axis 50 and the transverse axis 60. The first and second feed inlets 124, 125 are disposed at the distal ends of the first and the second entry segments 136, 137, respectively, and are in fluid communication therewith.

In other embodiments the first and second feed inlets 124, 125 and the first and second entry segments 136, 137 can be oriented in a different manner with respect to the transverse axis 60, the machine direction 50, and/or the plane 57 defined by the longitudinal axis 50 and the transverse axis 60. For example, in some embodiments, the first and second feed inlets 124, 125 and the first and second entry segments 136, 137 can each be disposed substantially in the plane 57 defined by the longitudinal axis 50 and the transverse axis 60 at a feed angle θ with respect to the longitudinal axis or machine direction 50 which is an angle in a range up to about 135° with respect to the machine direction 50, and in other embodiments in a range from about 30° to about 135°, and in yet other embodiments in a range from about 45° to about 135°, and in still other embodiments in a range from about 40° to about 110°.

The bifurcated connector segment 139 is in fluid communication with the first and second feed inlets 124, 125 and the first and the second entry segments 136, 137. The bifurcated connector segment 139 includes first and second shaped ducts 141, 143. The first and second feed inlets 124, 125 of the feed conduit 22 are in fluid communication with the first and second shaped ducts 141, 143, respectively. The first and second shaped ducts 141, 143 of the connector segment 139 are adapted to receive a first flow in a first feed direction 190 and a second flow in a second flow direction 191 of aqueous calcined gypsum slurry from the first and second feed inlets 124, 125, respectively, and to direct the first and second flows 190, 191 of aqueous calcined gypsum slurry into the distribution conduit 128.

As shown in FIG. 5, the first and second shaped ducts 141, 143 of the connector segment 139 define first and second feed outlets 140, 145 respectively in fluid communication with the first and second feed inlets 124, 125. Each feed outlet 140, 145 is in fluid communication with the distribution conduit 128. Each of the illustrated first and second feed outlets 140, 145 defines an opening 142 with a generally rectangular inner portion 147 and a substantially circular side portion 149. The circular side portions 145 are disposed adjacent side walls 151, 153 of the distribution conduit 128.

In embodiments, the openings 142 of the first and second feed outlets 140, 145 can have a cross-sectional area that is larger than the cross-sectional area of the openings 134, 135 of the first feed inlet 124 and the second feed inlet 125, respectively. For example, in some embodiments, the cross-sectional area of the openings 142 of the first and second feed outlets 140, 145 can be in a range from greater than to about 300% greater than the cross-sectional area of the openings 134, 135 of the first feed inlet 124 and the second feed inlet 125, respectively, in a range from greater than to about 200% greater in other embodiments, and in a range from greater than to about 150% greater in still other embodiments.

In embodiments, the openings 142 of the first and second feed outlets 140, 145 can have a hydraulic diameter (4×cross-sectional area/perimeter) that is smaller than the hydraulic diameter of the openings 134, 135 of the first feed inlet 124 and the second feed inlet 125, respectively. For example, in some embodiments, the hydraulic diameter of the openings 142 of the first and second feed outlets 140, 145 can be about 80% or less than the hydraulic diameter of the openings 134, 135 of the first feed inlet 124 and the second feed inlet 125, respectively, about 70% or less in other embodiments, and about 50% or less in still other embodiments Referring back to FIG. 1, the connector segment 139 is substantially parallel to the plane 57 defined by the longitudinal axis 50 and the transverse axis 60. In other embodiments the connector segment 139 can be oriented in a different manner with respect to the transverse axis 60, the machine direction 50, and/or the plane 57 defined by the longitudinal axis 50 and the transverse axis 60.

The first feed inlet 124, the first entry segment 136, and the first shaped duct 141 are a mirror image of the second feed inlet 125, the second entry segment 137, and the second shaped duct 143, respectively. Accordingly, it will be understood that the description of one feed inlet is applicable to the other feed inlet, the description of one entry segment is applicable to the other entry segment, and the description of one shaped duct is applicable to the other shaped duct, as well in a corresponding manner.

The first shaped duct 141 is fluidly connected to the first feed inlet 124 and the first entry segment 136. The first shaped duct 141 is also fluidly connected to the distribution conduit 128 to thereby help fluidly connect the first feed inlet 124 and the distribution outlet 130 such that the first flow 190 of slurry can enter the first feed inlet 124; travel through the first entry segment 136, the first shaped duct 141, and the distribution conduit 128; and be discharged from the slurry distributor 120 through the distribution outlet 130.

Figure 9:
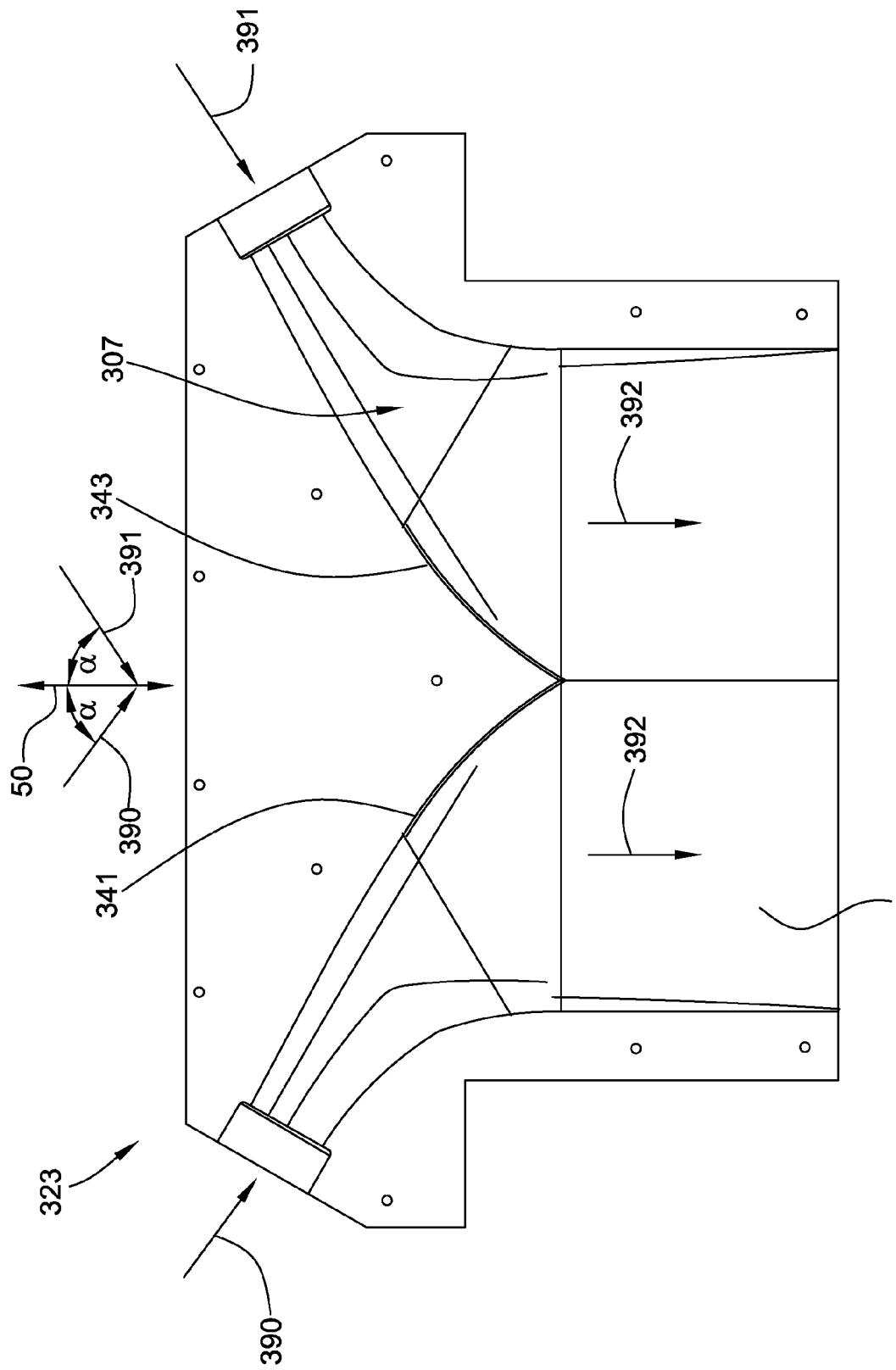
FIG. 9 is a top plan view of a first piece of the slurry distributor of FIG. 6, which has a two-piece construction.

The first shaped duct 141 has a front, outer curved wall 157 and an opposing rear, inner curved wall 158 defining a curved guide surface 165 adapted to redirect the first flow of slurry from the first feed flow direction 190, which is substantially parallel to the transverse or cross-machine direction 60, to an outlet flow direction 192, which is substantially parallel to the longitudinal axis or machine direction 50 and substantially perpendicular to the first feed flow direction 190. The first shaped duct 141 is adapted to receive the first flow of slurry moving in the first feed flow direction 190 and redirect the slurry flow direction by a change in direction angle α, as shown in FIG. 9, such that the first flow of slurry is conveyed into the distribution conduit 128 moving substantially in the outlet flow direction 192.

In use, the first flow of aqueous calcined gypsum slurry passes through the first feed inlet 124 in the first feed direction 190, and the second flow of aqueous calcined gypsum slurry passes through the second feed inlet 125 in the second feed direction 191. The first and second feed directions 190, 191 can be symmetrical with respect to each other along the longitudinal axis 50 in some embodiments. The first flow of slurry moving in the first feed flow direction 190 is redirected in the slurry distributor 120 through a change in direction angle α in a range up to about 135° to the outlet flow direction

192. The second flow of slurry moving in the second feed flow direction 191 is redirected in the slurry distributor 120 through a change in direction angle α in a range up to about 135° to the outlet flow direction 192. The combined first and second flows 190, 191 of aqueous calcined gypsum slurry discharge from the slurry distributor 120 moving generally in the outlet flow direction 192. The outlet flow direction 192 can be substantially parallel to the longitudinal axis or machine direction 50.

For example, in the illustrated embodiment, the first flow of slurry is redirected from the first feed flow direction 190 along the cross-machine direction 60 through a change in direction angle α of about ninety degrees about the vertical axis 55 to the outlet flow direction 192 along the machine direction 50. In some embodiments, the flow of slurry can be redirected from a first feed flow direction 190 through a change in direction angle α about the vertical axis 55 which is in a range up to about 135° to the outlet flow direction 192, and in other embodiments in a range from about 30° to about 135°, and in yet other embodiments in a range from about 45° to about 135°, and in still other embodiments in a range from about 40° to about 110°.

In some embodiments, the shape of the rear curved guide surface 165 can be generally parabolic, which in the illustrated embodiment can be defined by a parabola of the form $Ax^2+B$. In alternate embodiments, higher order curves may be used to define the rear curved guide surface 165 or, alternatively, the rear, inner wall 158 can have a generally curved shape that is made up of straight or linear segments that have been oriented at their ends to collectively define a generally curved wall. Moreover, the parameters used to define the specific shape factors of the outer wall can depend on specific operating parameters of the process in which the slurry distributor will be used.

At least one of the feed conduit 122 and the distribution conduit 128 can include an area of expansion having a cross-sectional flow area that is greater than a cross-sectional flow area of an adjacent area upstream from the area of expansion in a direction from the feed conduit 122 toward the distribution conduit 128. The first entry segment 136 and/or the first shaped duct 141 can have a cross section that varies along the direction of flow to help distribute the first flow of slurry moving therethrough. The shaped duct 141 can have a cross sectional flow area that increases in a first flow direction 195 from the first feed inlet 124 toward the distribution conduit 128 such that the first flow of slurry is decelerated as it passes through the first shaped duct 141. In some embodiments, the first shaped duct 141 can have a maximum cross-section flow area at a predetermined point along the first flow direction 195 and decrease from the maximum cross-sectional flow area at points further along the first flow direction 195.

In some embodiments, the maximum cross-sectional flow area of the first shaped duct 141 is about 200% of the cross-sectional area of the opening 134 of the first feed inlet 124 or less. In yet other embodiments, the maximum cross-sectional flow area of the shaped duct 141 is about 150% of the cross-sectional area of the opening 134 of the first feed inlet 124 or less. In still other embodiments, the maximum cross-sectional flow area of the shaped duct 141 is about 125% of the cross-sectional area of the opening 134 of the first feed inlet 124 or less. In yet other embodiments, the maximum cross-sectional flow area of the shaped duct 141 is about 110% of the cross-sectional area of the opening 134 of the first feed inlet 124 or less. In some embodiments, the cross-sectional flow area is controlled such that the flow area does not vary more than a predetermined amount over a given length to help prevent large variations in the flow regime.

In some embodiments, the first entry segment 136 and/or the first shaped duct 141 can include one or more guide channels 167, 168 that are adapted to help distribute the first flow of slurry toward the outer and/or the inner walls 157, 158 of the feed conduit 122. The guide channels 167, 168 are adapted to increase the flow of slurry around the boundary wall layers of the slurry distributor 120.

Referring to FIGS. 1 and 5, the guide channels 167, 168 can be configured to have a larger cross-sectional area than an adjacent portion 171 of the feed conduit 122 which defines a restriction that promotes flow to the adjacent guide channel 167, 168 respectively disposed at the wall region of the slurry distributor 120. In the illustrated embodiment, the feed conduit 122 includes the outer guide channel 167 adjacent the outer wall 157 and the sidewall 151 of the distribution conduit 128 and the inner guide channel 168 adjacent the inner wall 158 of the first shaped duct 141. The cross-sectional areas of the outer and inner guide channels 167, 168 can become progressively smaller moving in the first flow direction 195. The outer guide channel 167 can extend substantially along the sidewall 151 of the distribution conduit 128 to the distribution outlet 130. At a given cross-sectional location through the first shaped duct 141 in a direction perpendicular to the first flow direction 195, the outer guide channel 167 has a larger cross-sectional area than the inner guide channel 168 to help divert the first flow of slurry from its initial line of movement in the first feed direction 190 toward the outer wall 157.

Providing guide channels adjacent wall regions can help direct or guide slurry flow to those regions, which can be areas in conventional systems where "dead spots" of low slurry flow are found. By encouraging slurry flow at the wall regions of the slurry distributor 120 through the provision of guide channels, slurry buildup inside the slurry distributor is discouraged and the cleanliness of the interior of the slurry distributor 120 can be enhanced. The frequency of slurry buildup breaking off into lumps which can tear the moving web of cover sheet material can also be decreased.

In other embodiments, the relative sizes of the outer and inner guide channels 167, 168 can be varied to help adjust the slurry flow to improve flow stability and reduce the occurrence of air-liquid slurry phase separation. For example, in applications using a slurry that is relatively more viscous, at a given cross-sectional location through the first shaped duct 141 in a direction perpendicular to the first flow direction 195, the outer guide channel 167 can have a smaller cross-sectional area than the inner guide channel 168 to help urge the first flow of slurry toward the inner wall 158.

The inner curved walls 158 of the first and second shaped ducts 141, 142 meet to define a peak 175 adjacent an entry portion 152 of the distribution conduit 128. The peak 175 effectively bifurcates the connector segment 139. Each feed outlet 140, 145 is in fluid communication with the entry portion 152 of the distribution conduit 128.

The location of the peak 175 along the longitudinal axis 50 can vary in other embodiments. For example, the inner curved walls 158 of the first and second shaped ducts 141, 142 can be less curved in other embodiments such that the peak 175 is further away from the distribution outlet 130 along the longitudinal axis 50 than as shown in the illustrated slurry distributor 120. In other embodiments, the peak 175 can be closer to the distribution outlet 130 along the longitudinal axis 50 than as shown in the illustrated slurry distributor 120.

The distribution conduit 128 is substantially parallel to the plane 57 defined by the longitudinal axis 50 and the transverse axis 60 and is adapted to urge the combined first and second flows of aqueous calcined gypsum slurry from the first and second shaped ducts 141, 142 into a generally two-dimensional flow pattern for enhanced stability and uniformity. The distribution outlet 130 has a width that extends a predetermined distance along the transverse axis 60 and a height that extends along a vertical axis 55, which is mutually perpendicular to the longitudinal axis 50 and the transverse axis 60. The height of the distribution outlet 130 is small relative to its width. The distribution conduit 128 can be oriented relative to a moving web of cover sheet upon a forming table such that the distribution conduit 128 is substantially parallel to the moving web.

The distribution conduit 128 extends generally along the longitudinal axis 50 and includes the entry portion 152 and the distribution outlet 130. The entry portion 152 is in fluid communication with the first and second feed inlets 124, 125 of the feed conduit 122. Referring to FIG. 5, the entry portion 152 is adapted to receive both the first and the second flows of aqueous calcined gypsum slurry from the first and second feed inlets 124, 125 of the feed conduit 122. The entry portion 152 of the distribution conduit 128 includes a distribution inlet 154 in fluid communication with the first and second feed outlets 140, 145 of the feed conduit 122. The illustrated distribution inlet 154 defines an opening 156 that substantially corresponds to the openings 142 of the first and second feed outlets 140, 145. The first and second flows of aqueous calcined gypsum slurry combine in the distribution conduit 128 such that the combined flows move generally in the outlet flow direction 192 which can be substantially aligned with the line of movement of a web of cover sheet material moving over a forming table in a wallboard manufacturing line.

The distribution outlet 130 is in fluid communication with the entry portion 152 and thus the first and second feed inlets 124, 125 and the first and second feed outlets 140, 145 of the feed conduit 122. The distribution outlet 130 is in fluid communication with the first and second shaped ducts 141, 143 and is adapted to discharge the combined first and second flows of slurry therefrom along the outlet flow direction 192 upon a web of cover sheet material advancing along the machine direction 50.

Referring to FIG. 1, the illustrated distribution outlet 130 defines a generally rectangular opening 181 with semi-circular narrow ends 183, 185. The semi-circular ends 183, 185 of the opening 181 of the distribution outlet 130 can be the terminating end of the outer guide channels 167 disposed adjacent the side walls 151, 153 of the distribution conduit 128.

The opening 181 of the distribution outlet 130 has an area which is greater than the sum of the areas of the openings 134, 135 of the first and second feed inlets 124, 125 and is smaller than the area of the sum of the openings 142 of the first and second feed outlets 140, 145 (i.e., the opening 156 of the distribution inlet 154). Accordingly, the cross-sectional area of the opening 156 of the entry portion 152 of the distribution conduit 128 is greater than the cross-sectional area of the opening 181 of the distribution outlet 130.

For example, in some embodiments, the cross-sectional area of the opening 181 of the distribution outlet 130 can be in a range from greater than to about 400% greater than the sum of the cross-sectional areas of the openings 134, 135 of the first and second feed inlets 124, 125, in a range from greater than to about 200% greater in other embodiments, and in a range from greater than to about 150% greater in still other embodiments. In other embodiments, the ratio of the sum of the cross-sectional areas of the openings 134, 135 of the first and second feed inlets 124, 125 to the cross-sectional area of the opening 181 of the distribution outlet 130 can be varied based upon one or more factors, including the speed of the manufacturing line, the viscosity of the slurry being distributed by the distributor 120, the width of the board product being made with the distributor 120, etc. In some embodiments, the cross-sectional area of the opening 156 of the entry portion 152 of the distribution conduit 128 can be in a range from greater than to about 200% greater than the cross-sectional area of the opening 181 of the distribution outlet 130, in a range from greater than to about 150% greater in other embodiments, and in a range from greater than to about 125% greater in still other embodiments.

The distribution outlet 130 extends substantially along the transverse axis 60. The opening 181 of the distribution outlet 130 has a width $W_1$ of about twenty-four inches along the transverse axis 60 and a height $H_1$ of about one inch along the vertical axis 55 (see FIG. 3, also). In other embodiments, the size and shape of the opening 181 of the distribution outlet 130 can be varied.

The distribution outlet 130 is disposed intermediately along the transverse axis 60 between the first feed inlet 124 and the second feed inlet 125 such that the first feed inlet 124 and the second feed inlet 125 are disposed substantially the same distance $D_1$, $D_2$ from a transverse central midpoint 187 of the distribution outlet 130 (see FIG. 3, also). The distribution outlet 130 can be made from a resiliently flexible material such that its shape is adapted to be variable along the transverse axis 60, such as by the profiling system 32, for example.

It is contemplated that the width $W_1$ and/or height $H_1$ of the opening 181 of the distribution outlet 130 can be varied in other embodiments for different operating conditions. In general, the overall dimensions of the various embodiments for slurry distributors as disclosed herein can be scaled up or down depending on the type of product being manufactured (for example, the thickness and/or width of manufactured product), the speed of the manufacturing line being used, the rate of deposition of the slurry through the distributor, the viscosity of the slurry, and the like. For example, the width $W_1$, along the transverse axis 60, of the distribution outlet 130 for use in a wallboard manufacturing process, which conventionally is provided in nominal widths no greater than fifty-four inches, can be within a range from about eight to about fifty-four inches in some embodiments, and in other embodiments within a range from about eighteen inches to about thirty inches. In other embodiments, the ratio of the width $W_1$, along the transverse axis 60, of the distribution outlet 130 to the maximum nominal width of the panel being produced on the manufacturing system using the slurry distributor constructed according to principles of the present disclosure can be in a range from about ⅐ to about 1, in a range from about ⅓ to about 1 in other embodiments, in a range from about ⅓ to about ⅔ in yet other embodiments, and in a range from about ½ to about 1 in still other embodiments.

The height of the distribution outlet can be within a range from about 3/16 inch to about two inches in some embodiments, and in other embodiments between about 3/16 inch and about an inch. In some embodiments including a rectangular distribution outlet, the ratio of the rectangular width to the rectangular height of the outlet opening can be about 4 or more, in other embodiments about 8 or more, in some embodiments from about 4 to about 288, in other embodiments from about 9 to about 288, in other embodiments from about 18 to about 288, and in still other embodiments from about 18 to about 160.

The distribution conduit 128 includes a converging portion 182 in fluid communication with the entry portion 152. The height of the converging portion 182 is less than the height at the maximum cross-sectional flow area of the first and second shaped ducts 141, 143 and less than the height of the opening 181 of the distribution outlet 130. In some embodiments, the height of the converging portion 182 can be about half the height of the opening 181 of the distribution outlet 130.

The converging portion 182 and the height of the distribution outlet 130 can cooperate together to help control the average velocity of the combined first and second flows of aqueous calcined gypsum being distributed from the distribution conduit 128. The height and/or width of the distribution outlet 130 can be varied to adjust the average velocity of the combined first and second flows of slurry discharging from the slurry distributor 120.

In some embodiments, the outlet flow direction 192 is substantially parallel to the plane 57 defined by the machine direction 50 and the transverse cross-machine direction 60 of the system transporting the advancing web of cover sheet material. In other embodiments, the first and second feed directions 190, 191 and the outlet flow direction 192 are all substantially parallel to the plane 57 defined by the machine direction 50 and the transverse cross-machine direction 60 of the system transporting the advancing web of cover sheet material. In some embodiments, the slurry distributor can be adapted and arranged with respect to the forming table such that the flow of slurry is redirected in the slurry distributor 120 from the first and second feed directions 190, 191 to the outlet flow direction 192 without undergoing substantial flow redirection by rotating about the cross-machine direction 60.

In some embodiments, the slurry distributor can be adapted and arranged with respect to the forming table such that the first and second flows of slurry are redirected in the slurry distributor from the first and second feed directions 190, 191 to the outlet flow direction 192 by redirecting the first and second flows of slurry by rotating about the cross-machine direction 60 over an angle of about forty-five degrees or less. Such a rotation can be accomplished in some embodiments by adapting the slurry distributor such that the first and second feed inlets 124, 125 and the first and second feed directions 190, 191 of the first and second flows of slurry are disposed at a vertical offset angle ω with respect to the vertical axis 55 and the plane 57 formed by the machine axis 50 and the cross-machine axis 60. In embodiments, the first and second feed inlets 124, 125 and the first and second feed directions 190, 191 of the first and second flows of slurry can be disposed at a vertical offset angle ω within a range from zero to about sixty degrees such that the flow of slurry is redirected about the machine axis 50 and moves along the vertical axis 55 in the slurry distributor 120 from the first and second feed directions 190, 191 to the outlet flow direction 192. In embodiments, at least one of the respective entry segment 136, 137 and the shaped ducts 141, 143 can be adapted to facilitate the redirection of the slurry about the machine axis 50 and along the vertical axis 55. In embodiments, the first and second flows of slurry can be redirected from the first and second feed directions 190, 191 through a change in direction angle α about an axis substantially perpendicular to vertical offset angle ω and/or one or more other rotational axes within a range of about forty-five degrees to about one hundred fifty degrees to the outlet flow direction 192 such that the outlet flow direction 192 is generally aligned with the machine direction 50.

In use, first and second flows of aqueous calcined gypsum slurry pass through the first and second feed inlets 124, 125 in converging first and second feed directions 190, 191. The first and second shaped ducts 141, 143 redirect the first and second flows of slurry from the first feed direction 190 and the second feed direction 191 so that the first and second flows of slurry move over a change in direction angle α from both being substantially parallel to the transverse axis 60 to both being substantially parallel to the machine direction 50. The distribution conduit 128 can be positioned such that it extends along the longitudinal axis 50 which substantially coincides with the machine direction 50 along which a web of cover sheet material moves in a method making a gypsum board. The first and second flows of aqueous calcined gypsum slurry combine in the slurry distributor 120 such that the combined first and second flows of aqueous calcined gypsum slurry pass through the distribution outlet 130 in the outlet flow direction 192 generally along the longitudinal axis 50 and in the direction of the machine direction.

Referring to FIG. 2, a slurry distributor support 100 can be provided to help support the slurry distributor 120, which in the illustrated embodiment is made from a flexible material, such as PVC or urethane, for example. The slurry distributor support 100 can be made from a suitable rigid material to help support the flexible slurry distributor 120. The slurry distributor support 100 can include a two-piece construction. The two pieces 101, 103 can be pivotally movable with respect to each other about a hinge 105 at the rear end thereof to allow for ready access to an interior 107 of the support 100. The interior 107 of the support 100 can be configured such that the interior 107 substantially conforms to the exterior of the slurry distributor 120 to help limit the amount of movement the slurry distributor 120 can undergo with respect to the support 100 and/or to help define the interior geometry of the slurry distributor 120 through which a slurry will flow.

Referring to FIG. 3, in some embodiments, the slurry distributor support 100 can be made from a suitable resiliently flexible material that provides support and is able to be deformed in response to the profiling system 132 mounted to the support 100. The profiling system 132 can be mounted to the support 100 adjacent the distribution outlet 130 of the slurry distributor 120. The profiling system 132 so installed can act to vary the size and/or shape of the distribution outlet 130 of the distribution conduit 128 by also varying the size and/or shape of the closely conforming support 100, which in turn, influences the size and/or shape of the distribution outlet 130.

Referring to FIG. 3, the profiling system 132 can be adapted to selectively change the size and/or shape of the opening 181 of the distribution outlet 130. In some embodiments, the profiling system can be used to selectively adjust the height $H_1$ of the opening 181 of the distribution outlet 130.

The illustrated profiling system 132 includes a plate 90, a plurality of mounting bolts 92 securing the plate to the distribution conduit 128, and a series of adjustment bolts 94, 95 threadingly secured thereto. The mounting bolts 92 are used to secure the plate 90 to the support 100 adjacent the distribution outlet 130 of the slurry distributor 120. The plate 90 extends substantially along the transverse axis 60. In the illustrated embodiment, the plate 90 is in the form of a length of angle iron. In other embodiments, the plate 90 can have different shapes and can comprise different materials. In still other embodiments, the profiling system can include other components adapted to selectively change the size and/or shape of the opening 181 of the distribution outlet 130.

The illustrated profiling system 132 is adapted to locally vary along the transverse axis 60 the size and/or shape of the opening 181 of the distribution outlet 130. The adjustment bolts 94, 95 are in regular, spaced relationship to each other along the transverse axis 60 over the distribution outlet 130. The adjustment bolts 94, 95 are independently adjustable to locally vary the size and/or shape of the distribution outlet 130.

The profiling system 132 can be used to locally vary the distribution outlet 130 so as to alter the flow pattern of the combined first and second flows of aqueous calcined gypsum slurry being distributed from the slurry distributor 120. For example, the mid-line adjustment bolt 95 can be tightened down to constrict the transverse central midpoint 187 of the distribution outlet 130 to increase the edge flow angle away from the longitudinal axis 50 to facilitate spreading in the cross-machine direction 60 and to improve the slurry flow uniformity in the cross-machine direction 60.

The profiling system 132 can be used to vary the size of the distribution outlet 130 along the transverse axis 60 and maintain the distribution outlet 130 in the new shape. The plate 90 can be made from a material that is suitably strong such that the plate 90 can withstand opposing forces exerted by the adjustment bolts 94, 95 in response to adjustments made by the adjustment bolts 94, 95 in urging the distribution outlet 130 into a new shape. The profiling system 132 can be used to help even out variations in the flow profile of the slurry (for example, as a result of different slurry densities and/or different feed inlet velocities) being discharged from the distribution outlet 130 such that the exit pattern of the slurry from the distribution conduit 128 is more uniform.

In other embodiments, the number of adjustment bolts can be varied such that the spacing between adjacent adjustment bolts changes. In other embodiments, such as where the width $W_1$ of the distribution outlet 130 is different, the number of adjustment bolts can also be varied to achieve a desired adjacent bolt spacing. In yet other embodiments, the spacing between adjacent bolts can vary along the transverse axis 60, for example to provide greater locally-varying control at the side edges 183, 185 of the distribution outlet 130.

A slurry distributor constructed in accordance with principles of the present disclosure can comprise any suitable material. In some embodiments, a slurry distributor can comprise any suitable substantially rigid material which can include a suitable material which can allow the size and shape of the outlet to be modified using a profile system, for example. For example, a suitably rigid plastic, such as ultra-high molecular weight (UHMW) plastic, or metal can be used. In other embodiments, a slurry distributor constructed in accordance with principles of the present disclosure can be made from a flexible material, such as a suitable flexible plastic material, including poly vinyl chloride (PVC) or urethane, for example. In some embodiments, a slurry distributor constructed in accordance with principles of the present disclosure can include a single feed inlet, entry segment, and shaped duct which is in fluid communication with a distribution conduit.

A gypsum slurry distributor constructed in accordance with principles of the present disclosure can be used to help provide a wide cross machine distribution of aqueous calcined gypsum slurry to facilitate the spreading of high viscous/lower WSR gypsum slurries on a web of cover sheet material moving over a forming table. The gypsum slurry distribution system can be used to help control air-slurry phase separation, as well.

In accordance with another aspect of the present disclosure, a gypsum slurry mixing and dispensing assembly can include a slurry distributor constructed in accordance with principles of the present disclosure. The slurry distributor can be placed in fluid communication with a gypsum slurry mixer adapted to agitate water and calcined gypsum to form an aqueous calcined gypsum slurry. In one embodiment, the slurry distributor is adapted to receive a first flow and a second flow of aqueous calcined gypsum slurry from the gypsum slurry mixer and distribute the first and second flows of aqueous calcined gypsum slurry onto an advancing web.

The slurry distributor can comprise a part of, or act as, a discharge conduit of a conventional gypsum slurry mixer (e.g., a pin mixer) as is known in the art. The slurry distributor can be used with components of a conventional discharge conduit. For example, the slurry distributor can be used with components of a gate-canister-boot arrangement as known in the art or of the discharge conduit arrangements described in U.S. Pat. Nos. 6,494,609; 6,874,930; 7,007,914; and 7,296,919.

A slurry distributor constructed in accordance with principles of the present disclosure can advantageously be configured as a retrofit in an existing wallboard manufacturing system. The slurry distributor preferably can be used to replace a conventional single or multiple-branch boot used in conventional discharge conduits. This gypsum slurry distributor can be retrofitted to an existing slurry discharge conduit arrangement, such as that shown in U.S. Pat. No. 6,874,930 or 7,007,914, for example, as a replacement for the distal dispensing spout or boot. However, in some embodiments, the slurry distributor may, alternatively, be attached to one or more boot outlet(s).

Referring to FIGS. 4 and 5, the slurry distributor 220 is similar to the slurry distributor 120 of FIGS. 1-3, except that it is constructed from a substantially rigid material. The interior geometry 207 of the slurry distributor 220 of FIGS. 4 and 5 is similar to that of the slurry distributor 120 of FIGS. 1-3, and like reference numerals are used to indicate like structure. The interior geometry 207 of the slurry distributor 207 is adapted to define a flow path for the gypsum slurry traveling therethrough which is of the manner of a streamline flow, undergoing reduced or substantially no air-liquid slurry phase separation and substantially without undergoing a vortex flow path.

In some embodiments, the slurry distributor 220 can comprise any suitable substantially rigid material which can include a suitable material which can allow the size and shape of the outlet 130 to be modified using a profile system, for example. For example, a suitably rigid plastic, such as UHMW plastic, or metal can be used.

Referring to FIG. 4, the slurry distributor 220 has a two-piece construction. An upper piece 221 of the slurry distributor 220 includes a recess 227 adapted to receive a profiling system 132 therein. The two pieces 221, 223 can be pivotally movable with respect to each other about a hinge 205 at the rear end thereof to allow for ready access to an interior 207 of the slurry distributor 220. Mounting holes 229 are provided to facilitate the connection of the upper piece 221 and its mating lower piece 223.

Figure 6:
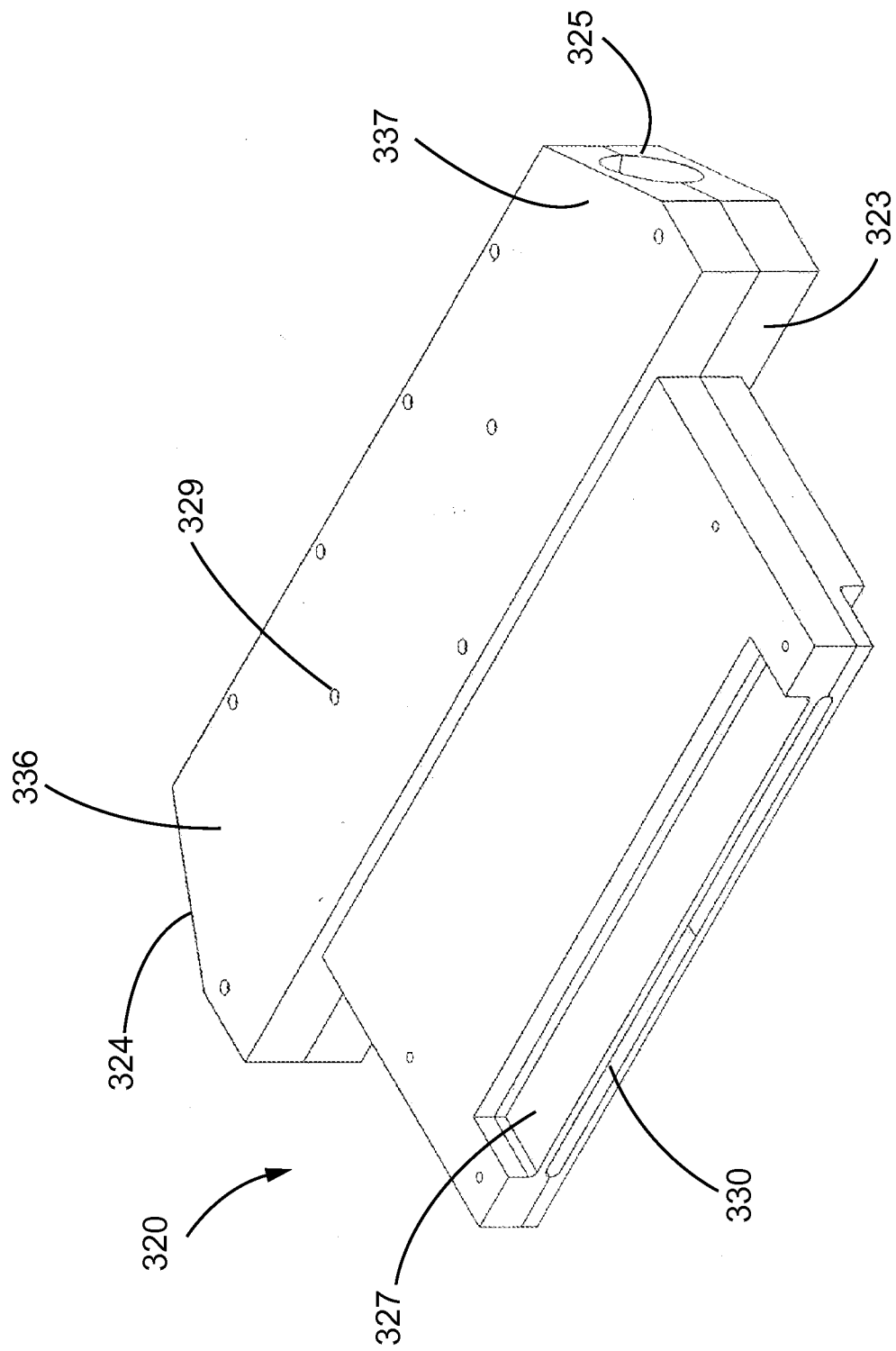
FIG. 6 is an isometric view of another embodiment of a slurry distributor constructed in accordance with principles of the present disclosure, which includes a first feed inlet and a second feed inlet disposed at about a sixty degree feed angle with respect to a longitudinal axis or machine direction of the slurry distributor.
Figure 7:
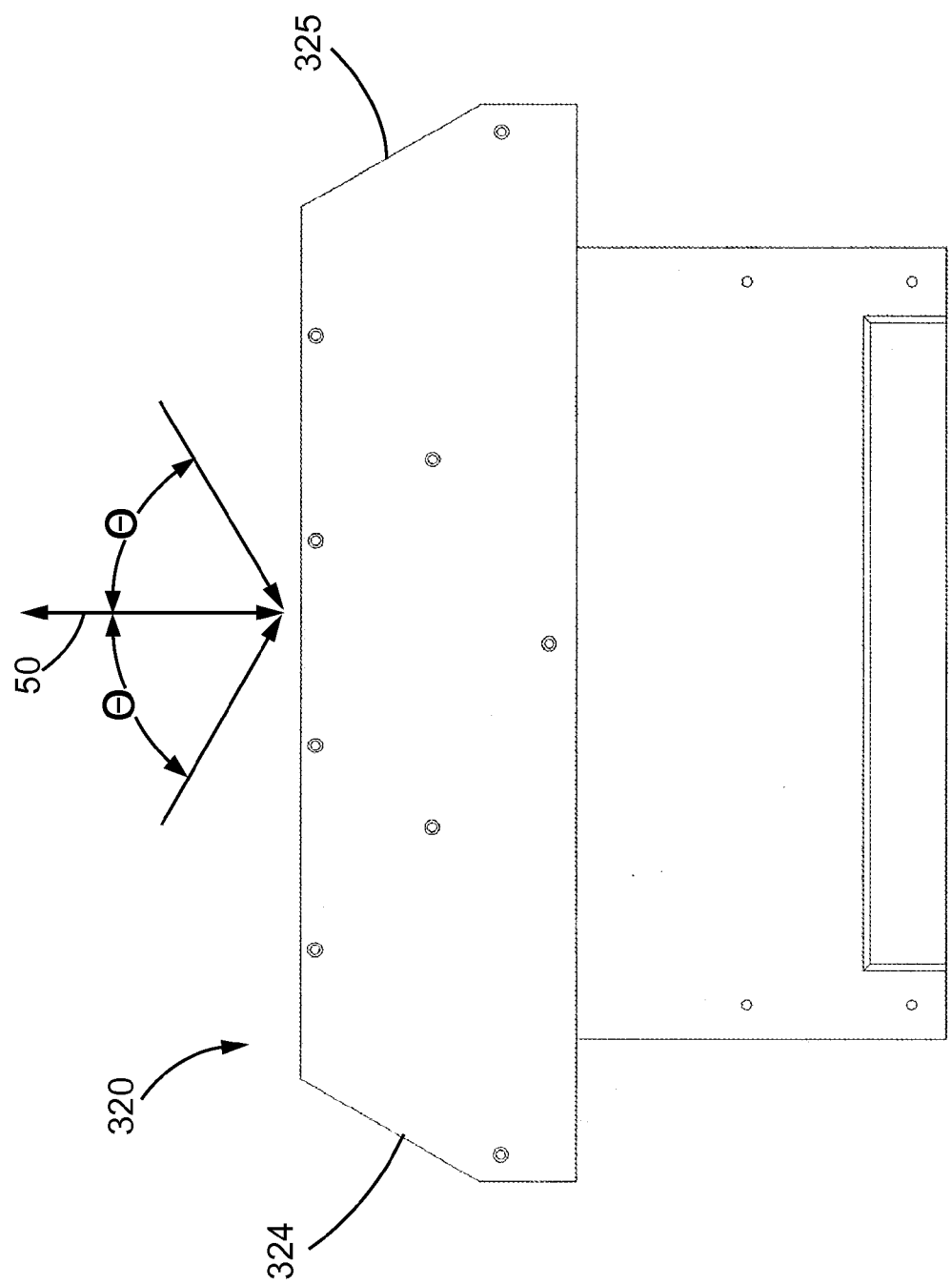
FIG. 7 is a top plan view of the slurry distributor of FIG. 6.
Figure 8:
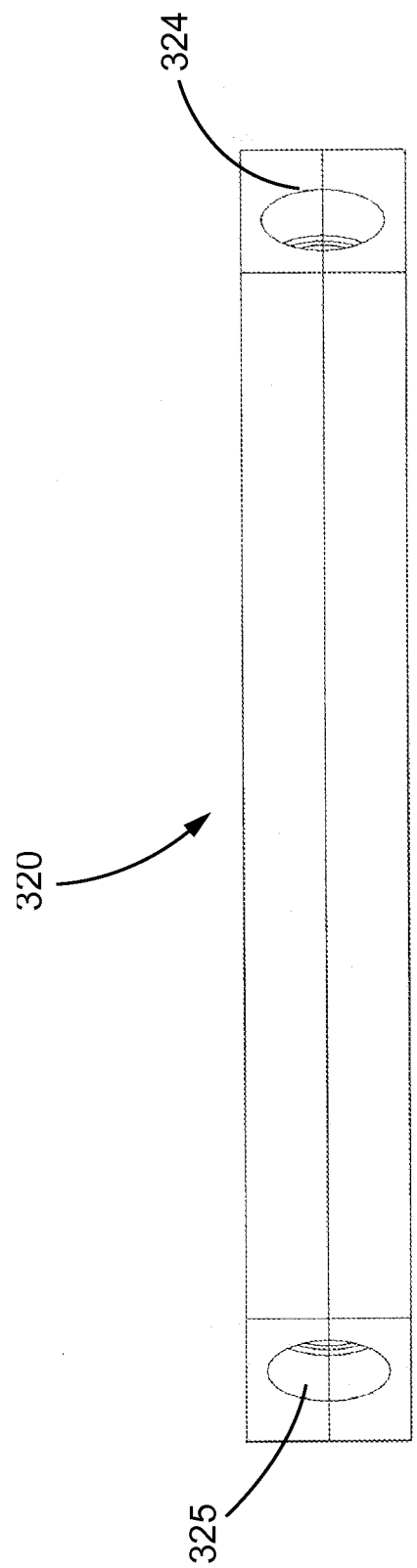
FIG. 8 is a rear elevational view of the slurry distributor of FIG. 6.

Referring to FIGS. 6-8, another embodiment of a slurry distributor 320 constructed in accordance with principles of the present disclosure is shown which is constructed from a rigid material. The slurry distributor 320 of FIGS. 6-8 is similar to the slurry distributor 220 of FIGS. 4 and 5 except that the first and second feed inlets 324, 325 and the first and second entry segments 336, 337 of the slurry distributor 320 of FIGS. 6-8 are disposed at a feed angle θ with respect to the longitudinal axis or machine direction 50 of about 60° (see FIG. 7).

The slurry distributor 320 has a two-piece construction including an upper piece 321 and its mating lower piece 323. The two pieces 321, 323 of the slurry distributor 320 can be secured together using any suitable technique, such as by using fasteners through a corresponding number of mounting holes 329 provided in each piece 321, 323, for example. The upper piece 321 of the slurry distributor 320 includes a recess 327 adapted to receive a profiling system 132 therein. The slurry distributor 320 of FIGS. 6-8 is similar in other respects to the slurry distributor 220 of FIGS. 4 and 5.

Figure 10:
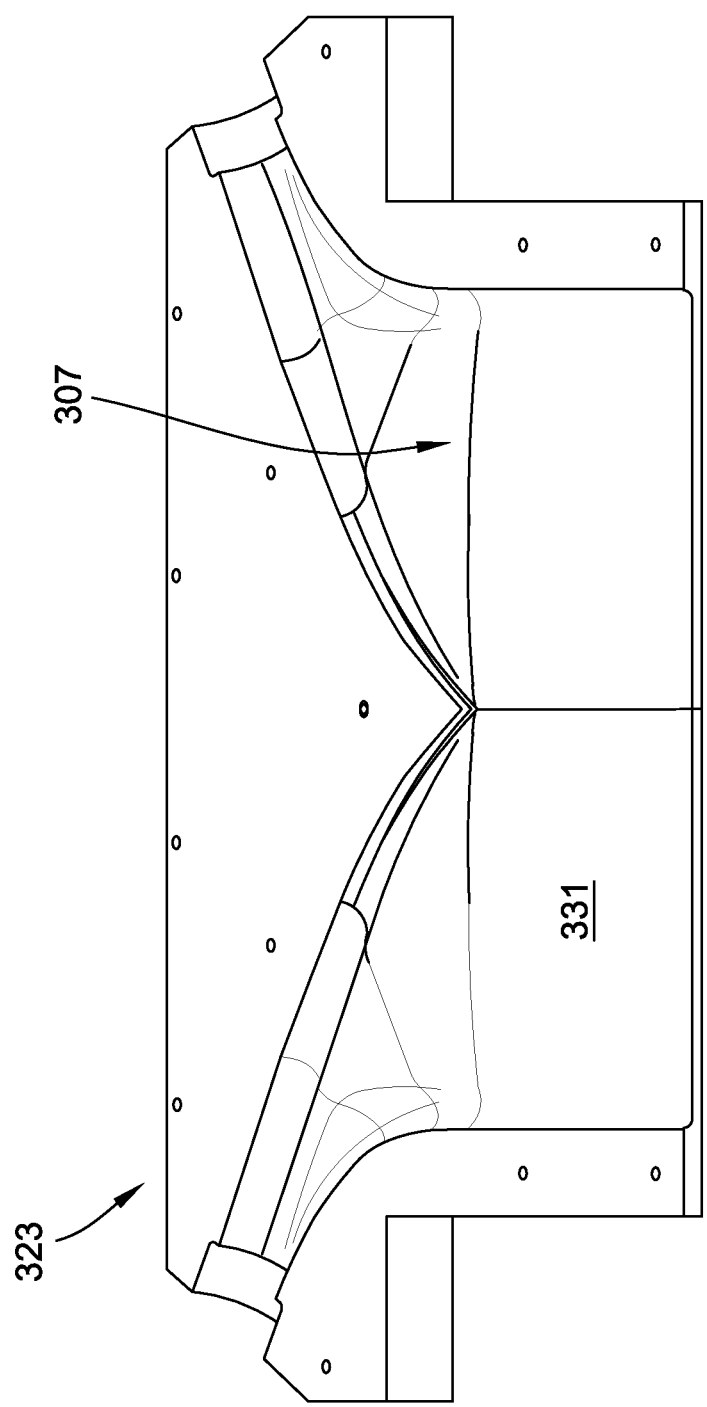
FIG. 10 is a front perspective view of the slurry distributor piece of FIG. 9.

Referring to FIGS. 9 and 10, the lower piece 323 of the slurry distributor 320 of FIG. 6 is shown. The lower piece 323 defines a first portion 331 of the interior geometry 307 of the slurry distributor 320 of FIG. 6. The upper piece 323 defines a symmetrical second portion of the interior geometry 307 such that when the upper and lower pieces 321, 323 are mated together, as shown in FIG. 6, they define the complete interior geometry 307 of the slurry distributor 320 of FIG. 6.

Referring to FIG. 9, the first and second shaped ducts 341, 343 are adapted to receive the first and second flows of slurry moving in the first and second feed flow directions 390, 391 and redirect the slurry flow direction by a change in direction angle α such that the first and second flows of slurry are conveyed into the distribution conduit 328 moving substantially in the outlet flow direction 392, which is aligned with the machine direction or longitudinal axis 50.

Figure 11:
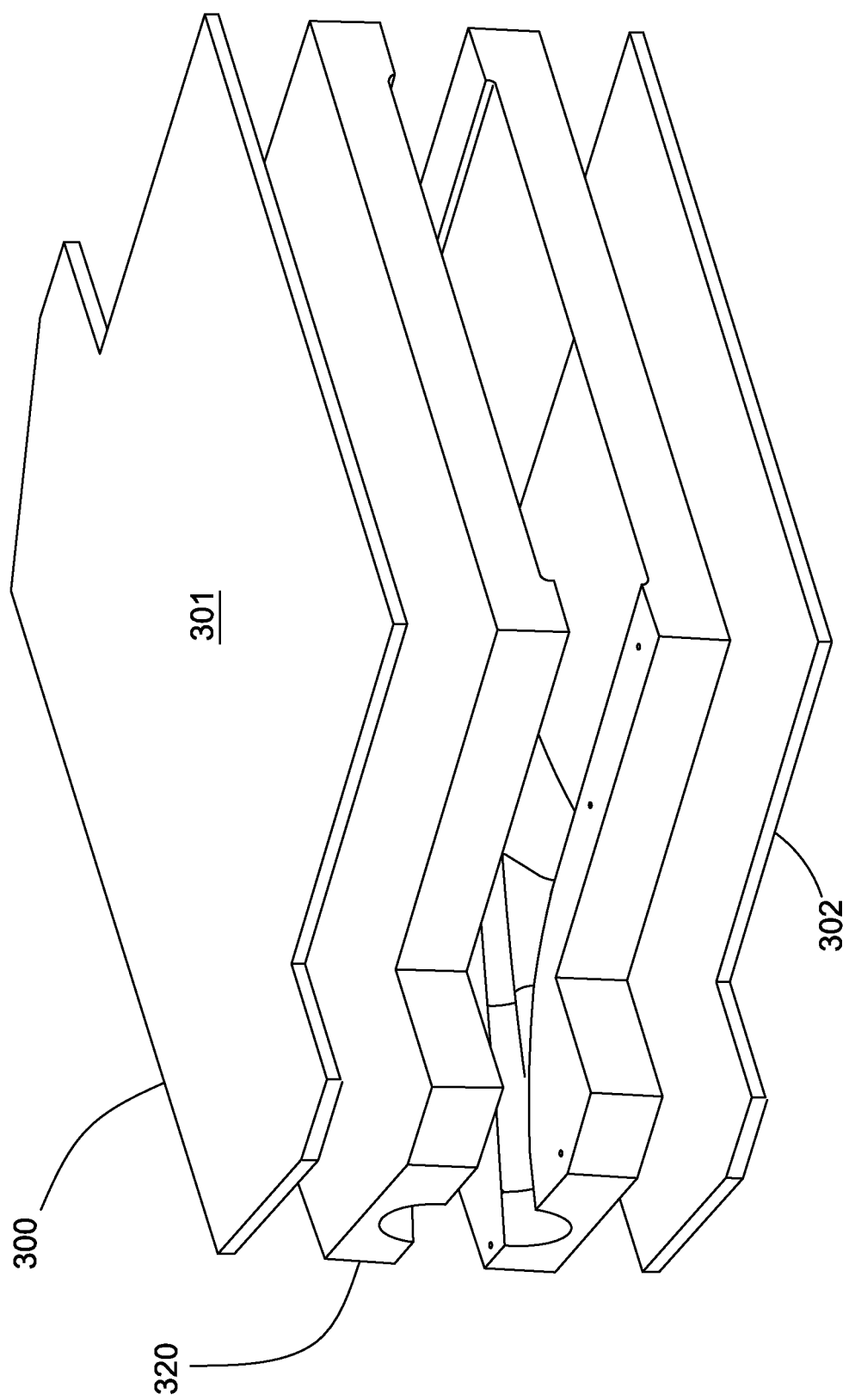
FIG. 11 is an exploded view of the slurry distributor of FIG. 6 and a support system for the slurry distributor constructed in accordance with principles of the present disclosure.
Figure 12:
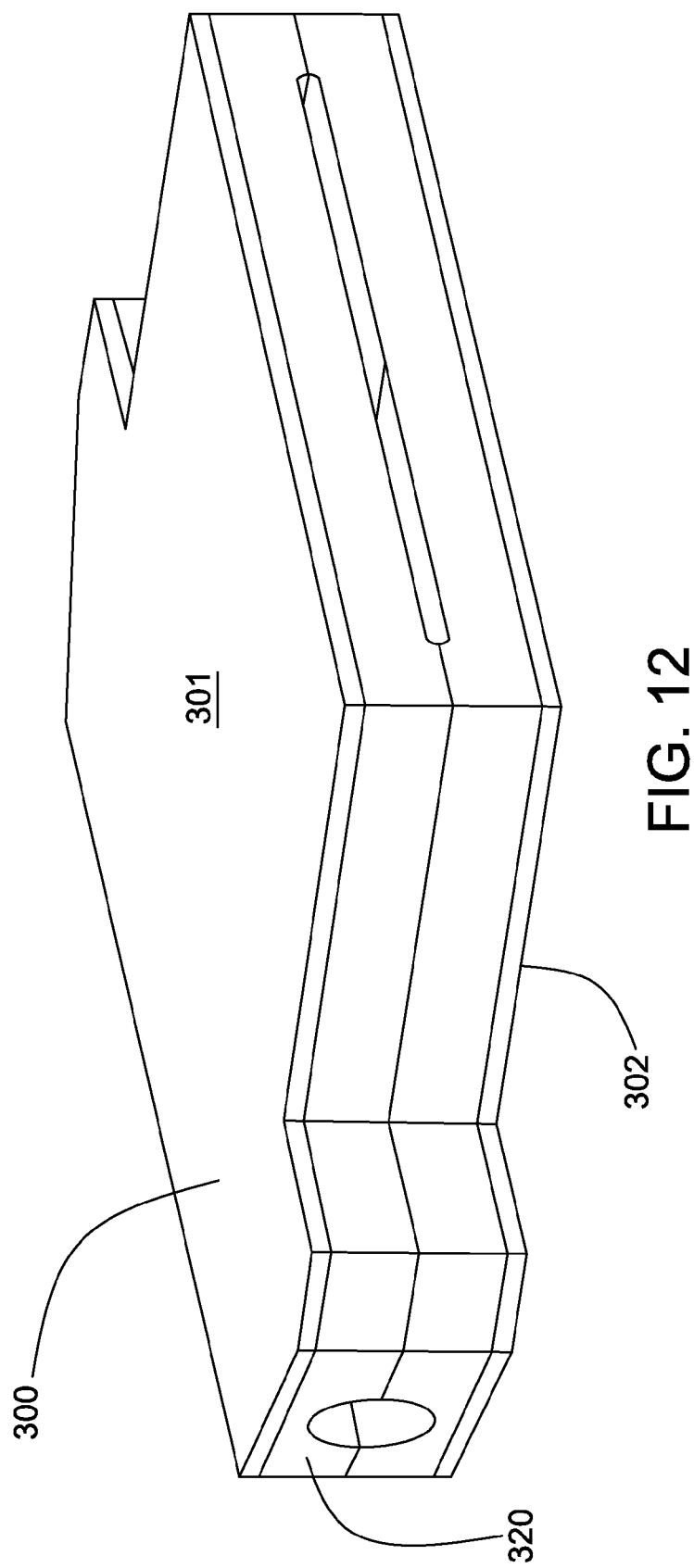
FIG. 12 is a perspective view of the slurry distributor and the support system of FIG. 11.

FIGS. 11 and 12 depict another embodiment of a slurry distributor support 300 for use with the slurry distributor 320 of FIG. 6. The slurry distributor support 300 can include a top and bottom support plate 301, 302 constructed from a suitably rigid material, such as metal, for example. The support plates 301, 302 can be secured to the distributor through any suitable means. In use, the support plates 301, 302 can help support the slurry distributor 320 in place over a machine line including a conveyor assembly supporting and transporting a moving cover sheet. The support plates 301, 302 can be mounted to appropriate uprights placed on either side of the conveyor assembly.

Figure 13:
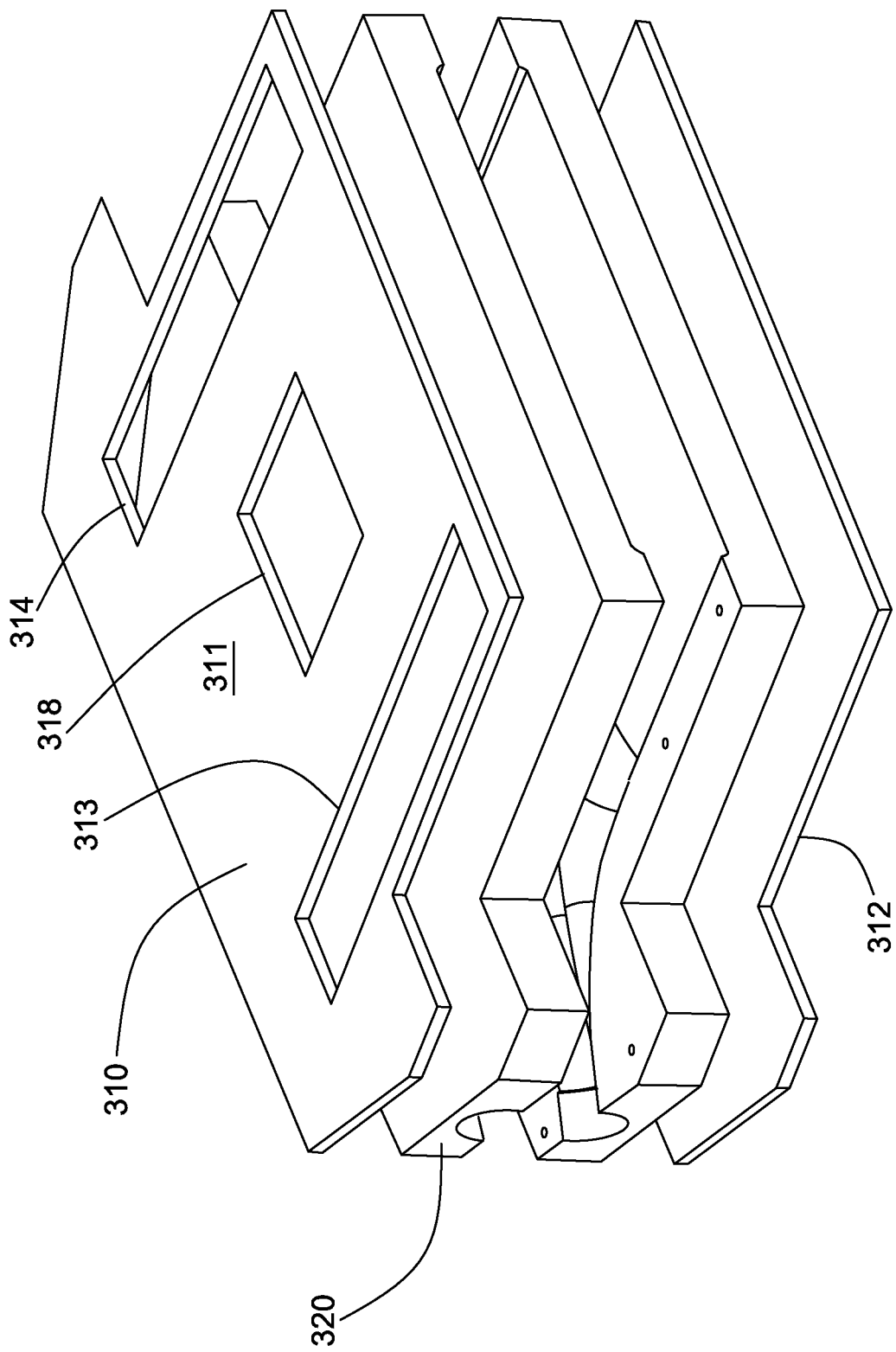
FIG. 13 is an exploded view of the slurry distributor of FIG. 6 and another embodiment of a support system constructed in accordance with principles of the present disclosure.
Figure 14:
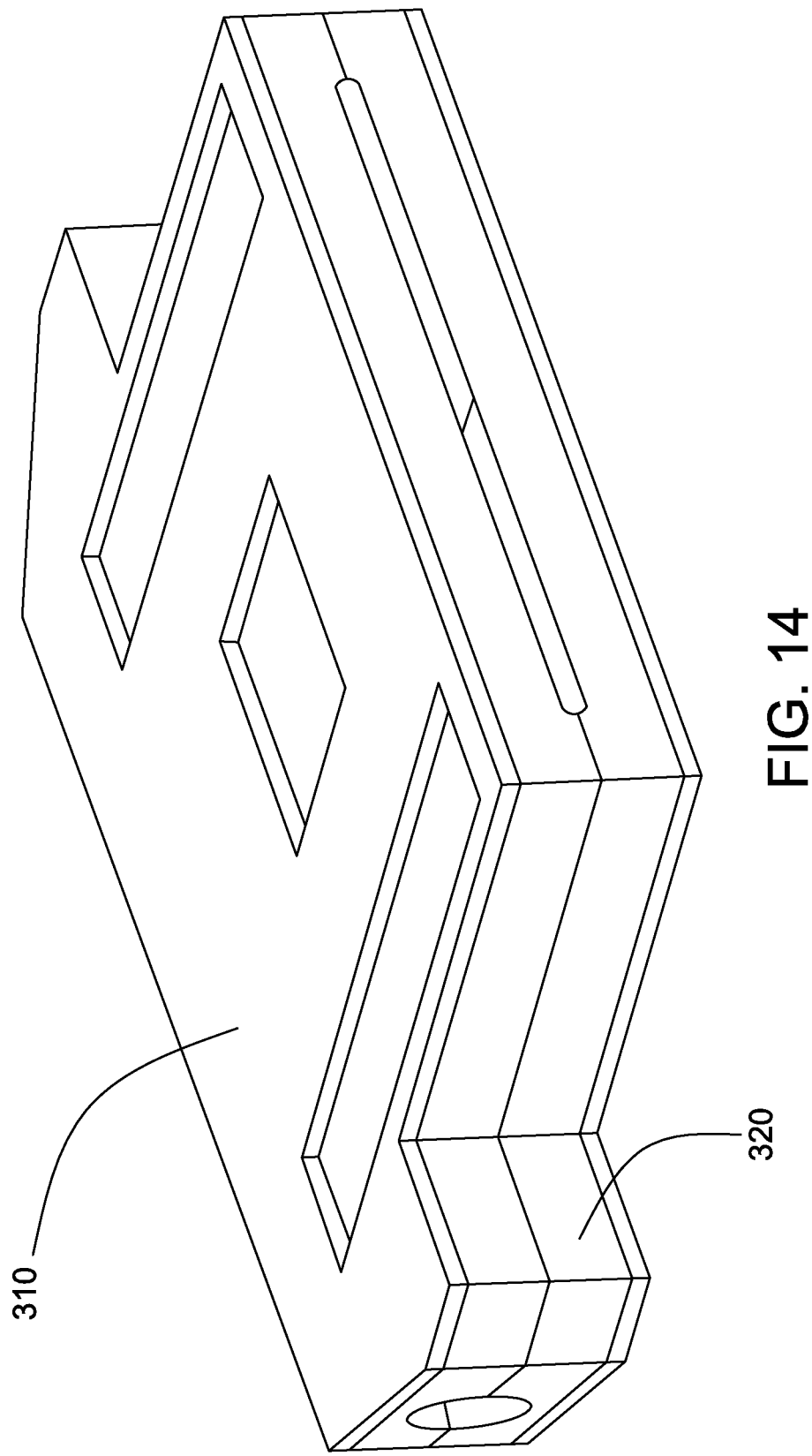
FIG. 14 is a perspective view of the slurry distributor and the support system of FIG. 13.

FIGS. 13 and 14 depict yet another embodiment of a slurry distributor support 310 for use with the slurry distributor 320 of FIG. 6, which also includes top and bottom support plates 311, 312. Cutouts 313, 314, 318 in the top support plate 311 can make the support 310 lighter than it would otherwise be and provide access to portions of the slurry distributor 320, such as those portions accommodating mounting fasteners, for example. The slurry distributor support 310 of FIGS. 13 and 14 can be similar in other respects to the slurry distributor support 300 of FIGS. 11 and 12.

FIGS. 15-19 illustrate another embodiment of a slurry distributor 420, which is similar to the slurry distributor 320 of FIGS. 6-8, except that it is constructed from a substantially flexible material. The slurry distributor 420 of FIGS. 15-19 also includes first and second feed inlets 324, 325 and first and second entry segments 336, 337 which are disposed at a feed angle θ with respect to the longitudinal axis or machine direction 50 of about 60° (see FIG. 7). The interior geometry 307 of the slurry distributor 420 of FIGS. 15-19 is similar to that of the slurry distributor 320 of FIGS. 6-8, and like reference numerals are used to indicate like structure.

Figure 15:
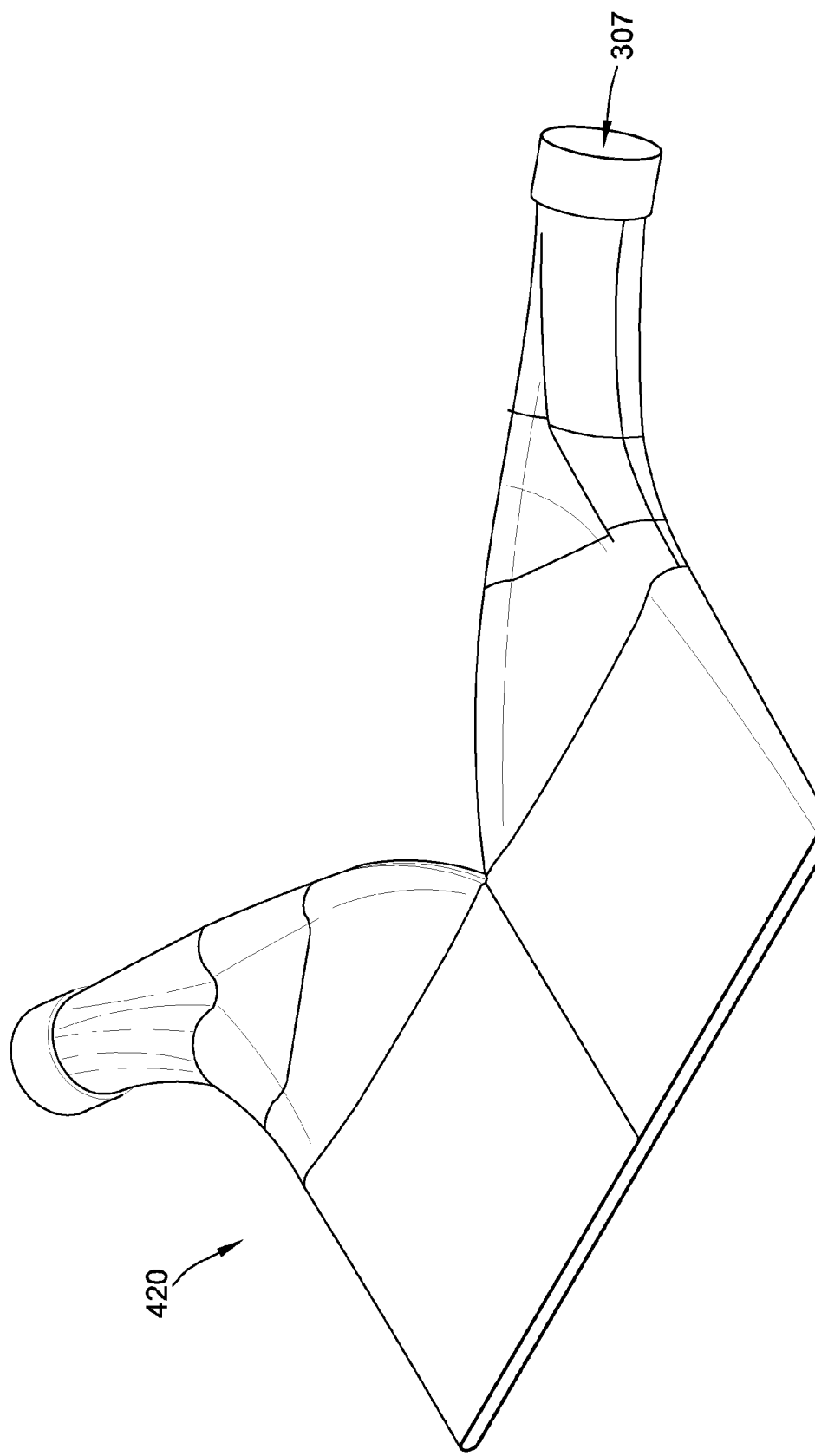
FIG. 15 is a perspective view of an embodiment of a slurry distributor constructed in accordance with principles of the present disclosure that defines an interior geometry that is similar to the slurry distributor of FIG. 6, but that is constructed from a flexible material and has an integral construction.
Figure 16:
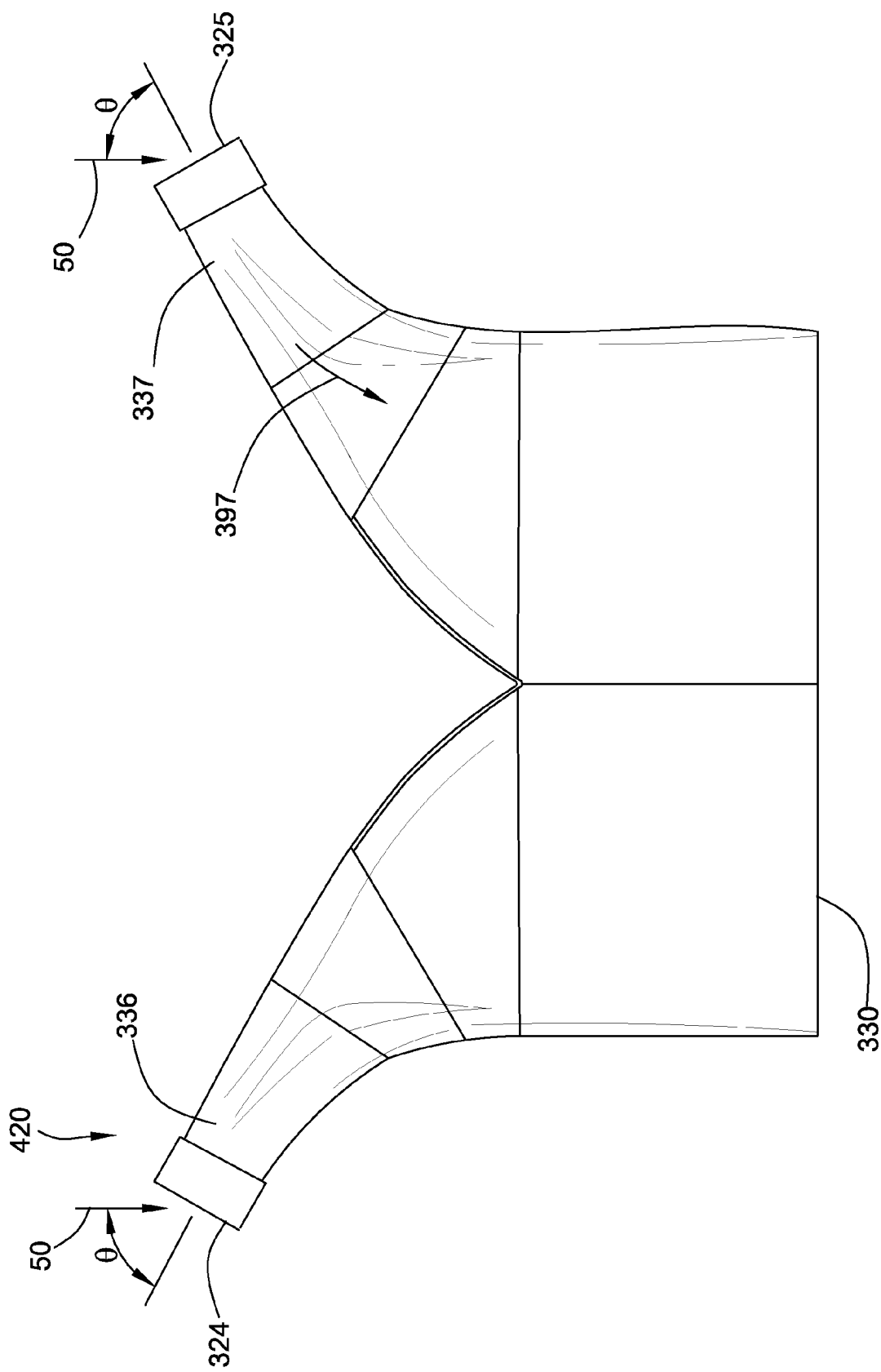
FIG. 16 is a top plan view of the slurry distributor of FIG. 15.
Figure 17:
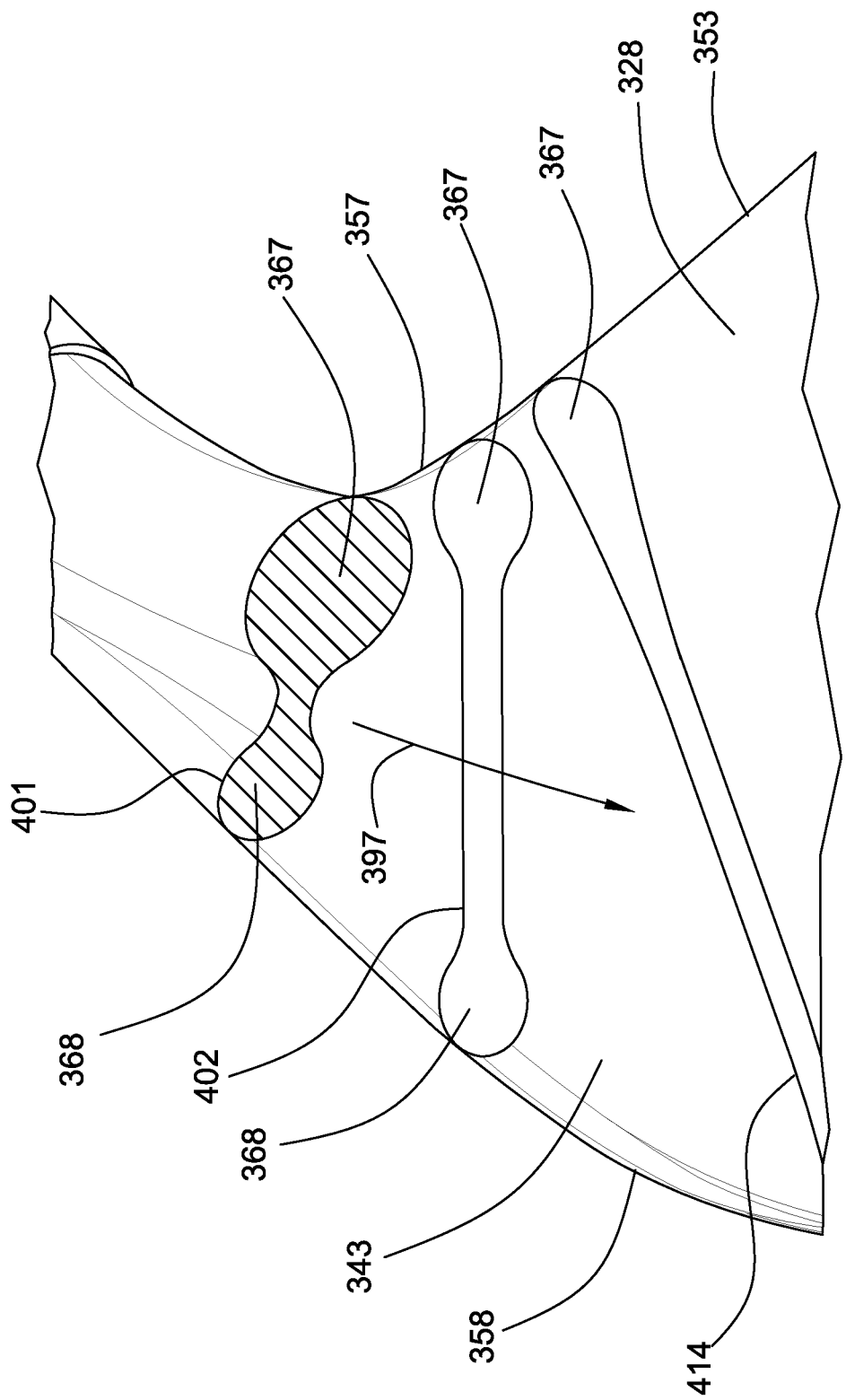
FIG. 17 is an enlarged, perspective view of the interior geometry defined by the slurry distributor of FIG. 15, illustrating progressive cross-sectional flow areas of a portion of the feed conduit thereof.
Figure 18:
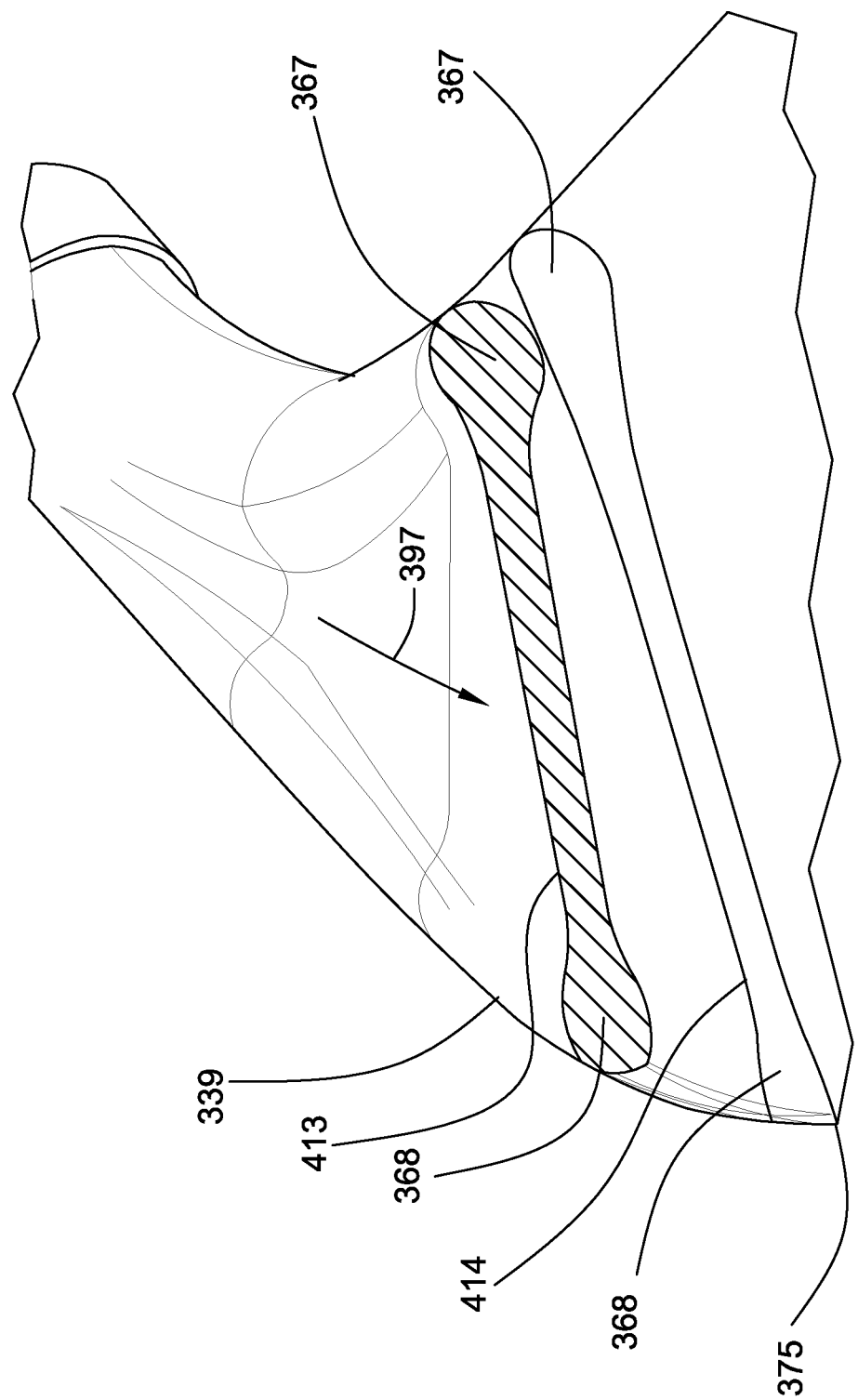
FIG. 18 is an enlarged, perspective view of the interior geometry of the slurry distributor of FIG. 15, illustrating another progressive cross-sectional flow area of the feed conduit.
Figure 19:
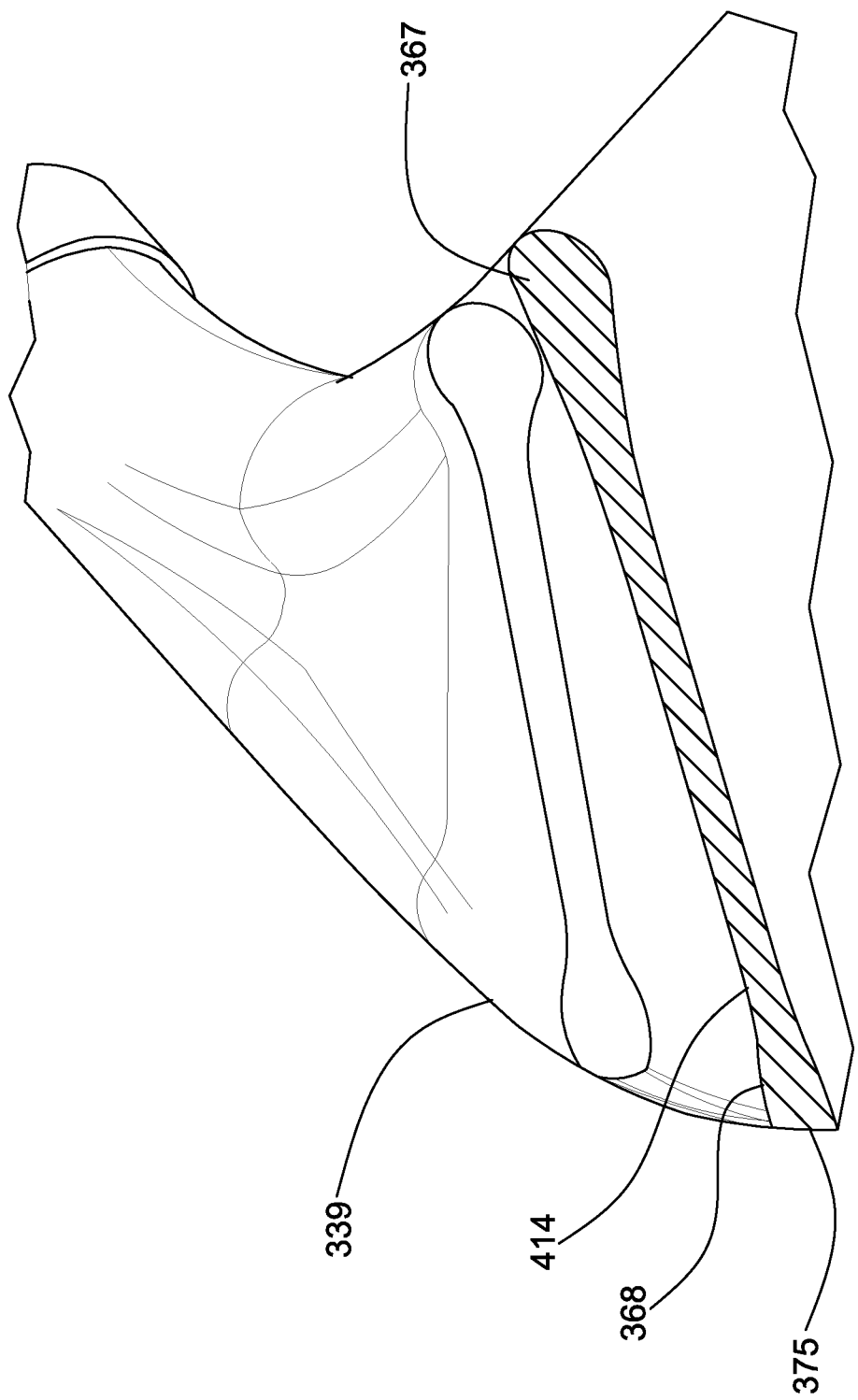
FIG. 19 is an enlarged, perspective view of the interior geometry of the slurry distributor of FIG. 15, illustrating yet another progressive cross-sectional flow area of the feed conduit which is aligned with a half of an entry portion to a distribution conduit of the slurry distributor of FIG. 15.

FIGS. 17-19 progressively depict the interior geometry of the second entry segment 337 and the second shaped duct 343 of the slurry distributor 420 of FIGS. 15 and 16. The cross-sectional areas 411, 412, 413, 414 of the outer and inner guide channels 367, 368 can become progressively smaller moving in a second flow direction 397 toward the distribution outlet 330. The outer guide channel 367 can extend substantially along the outer wall 357 of the second shaped duct 343 and along the sidewall 353 of the distribution conduit 328 to the distribution outlet 330. The inner guide channel 368 is adjacent the inner wall 358 of the second shaped duct 343 and terminates at the peak 375 of the bisected connector segment 339. The slurry distributor 420 of FIGS. 15-19 is similar in other respects to the slurry distributor 120 of FIG. 1 and the slurry distributor 320 of FIG. 6.

Figure 20:
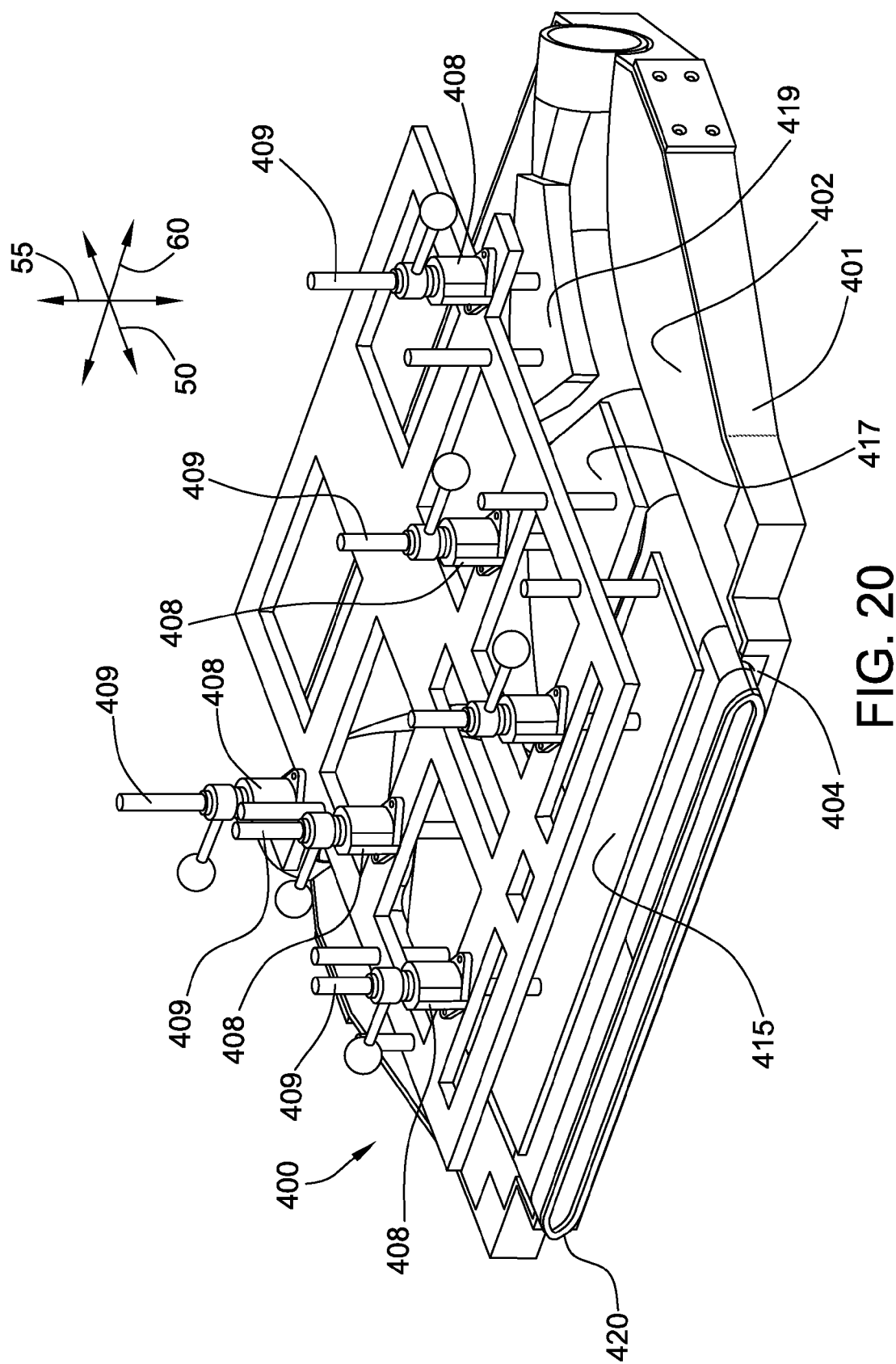
FIG. 20 is a perspective view of the slurry distributor of FIG. 15 and another embodiment of a support system constructed in accordance with principles of the present disclosure.
Figure 21:
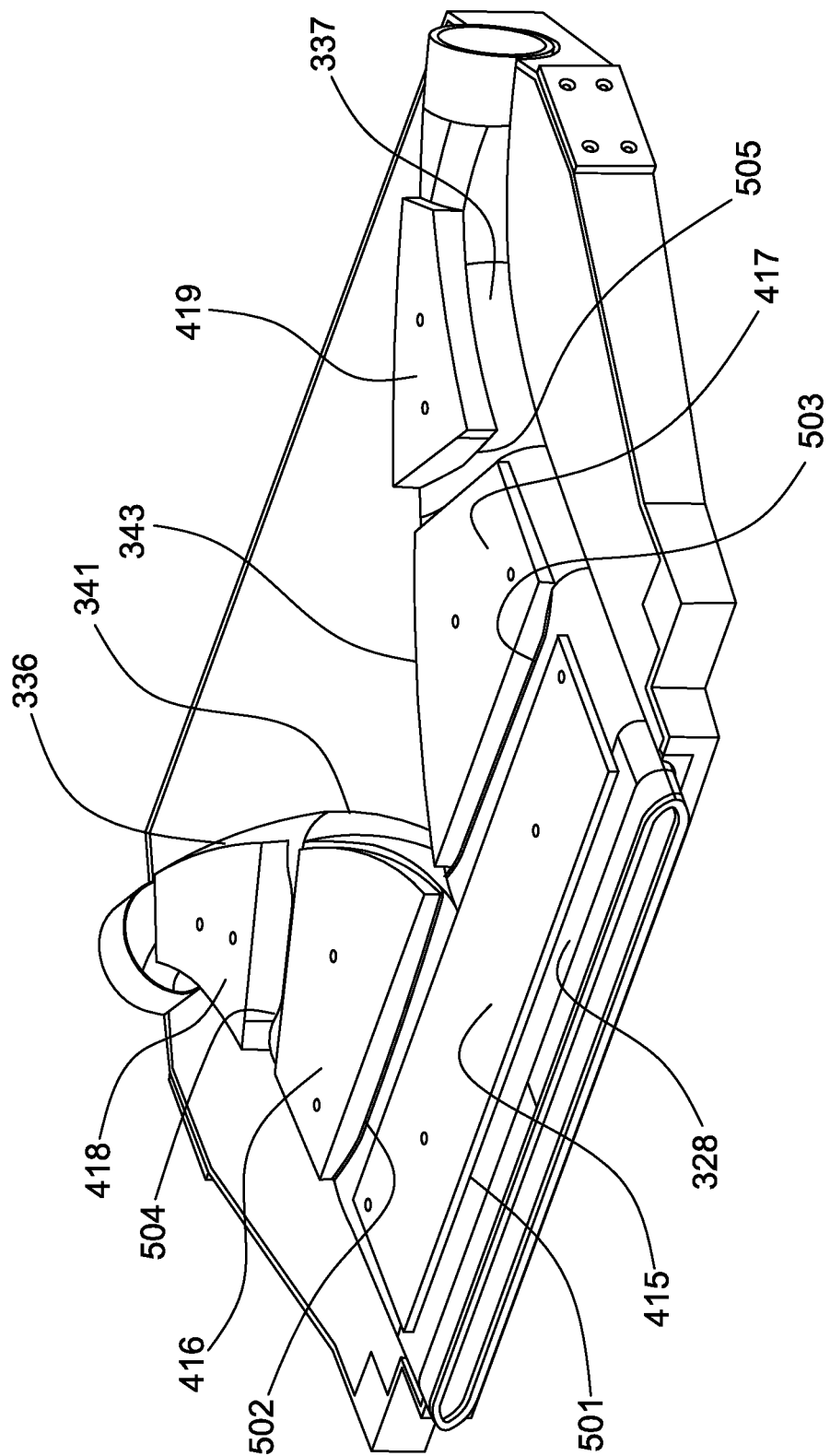
FIG. 21 is a perspective view as in FIG. 20, but with a support frame removed for illustrative purposes to show a plurality of retaining plates in distributed relationship with the slurry distributor of FIG. 15.

Referring to FIGS. 20 and 21, the illustrated embodiment of the slurry distributor 420 is made from a flexible material, such as PVC or urethane, for example. A slurry distributor support 400 can be provided to help support the slurry distributor 420. The slurry distributor support 400 can include a support member, which in the illustrated embodiment is in the form of a bottom support tray 401 filled with a suitable supporting medium 402 which defines a supporting surface 404. The supporting surface 404 is configured to substantially conform to at least a portion of an exterior of at least one of the feed conduit 322 and the distribution conduit 328 to help limit the amount of relative movement between the slurry distributor 420 and the support tray 401. In some embodiments, the supporting surface 404 can also help maintain the interior geometry of the slurry distributor 420 through which a slurry will flow.

The slurry distributor support 400 can also include a movable support assembly 405 disposed in spaced relationship to bottom support tray 401. The movable support assembly 405 can be positioned above the slurry distributor 420 and adapted to be placed in supporting relationship with the slurry distributor 420 to help maintain the interior geometry 307 of the slurry distributor in a desired configuration.

The movable support assembly 405 can include a support frame 407 and a plurality of support segments 415, 416, 417, 418, 419 which are movably supported by the support frame 407. The support frame 407 can be mounted to at least one of the bottom support tray 401 or a suitably arranged upright or uprights to retain the support frame 407 in fixed relationship to the bottom support tray 401.

In embodiments, at least one support segment 415, 416, 417, 418, 419 is independently movable relative to another support segment 415, 416, 417, 418, 419. In the illustrated embodiment, each support segment 415, 416, 417, 418, 419 can be independently movable relative to the support frame 407 over a predetermined range of travel. In embodiments, each support segment 415, 416, 417, 418, 419 is movable over a range of travel such that each support segment is in a range of positions over which the respective support segment 415, 416, 417, 418, 419 is in increasing compressive engagement with a portion of at least one of the feed conduit 322 and the distribution conduit 328.

The position of each support segment 415, 416, 417, 418, 419 can be adjusted to place the support segments 415, 416, 417, 418, 419 in compressive engagement with at least a portion of the slurry distributor 420. Each support segment 415, 416, 417, 418, 419 can be independently adjusted to place each support segment 415, 416, 417, 418, 419 either in further compressive engagement with at least a portion of the slurry distributor 420, thereby locally compressing the interior of the slurry distributor 420, or in reduced compressive engagement with at least a portion of the slurry distributor 420, thereby allowing the interior of the slurry distributor 420 to expand outwardly, such as in response to aqueous gypsum slurry flowing therethrough.

In the illustrated embodiment, each of the support segments 415, 416, 417 is movable over a range of travel along the vertical axis 55. In other embodiments, at least one of the support segments can be movable along a different line of action.

The movable support assembly 405 includes a clamping mechanism 408 associated with each support segment 415, 416, 417, 418, 419. Each clamping mechanism 408 can be adapted to selectively retain the associated support segment 415, 416, 417, 418, 419 in a selected position relative to the support frame 407.

In the illustrated embodiment, a rod 409 is mounted to each support segment 415, 416, 417, 418, 419 and extends upwardly through a corresponding opening in the support frame 407. Each clamping mechanism 408 is mounted to the support frame 407 and is associated with one of the rods 409 projecting from a respective support segment 415, 416, 417, 418, 419. Each clamping mechanism 408 can be adapted to selectively retain the associated rod 409 in fixed relationship to the support frame 407. The illustrated clamping mechanisms 408 are conventional lever-actuated clamps which encircle the respective rod 409 and allow for infinitely variable adjustment between the clamping mechanism 408 and the associated rod 409.

As one skilled in the art will appreciate, any suitable clamping mechanism 408 can be used in other embodiments. In some embodiments, each associated rod 409 can be moved via a suitable actuator (either hydraulic or electric, e.g.) which is controlled via a controller. The actuator can function as a clamping mechanism by retaining the associated support segment 415, 416, 417, 418, 419 in a fixed position relative to the support frame 407.

Referring to FIG. 21, the support segments 415, 416, 417, 418, 419 can each include a contacting surface 501, 502, 503, 504, 505 which is configured to substantially conform to a surface portion of the desired geometric shape of at least one of the feed conduit 322 and the distribution conduit 328 of the slurry distributor 420. In the illustrated embodiment, a distributor conduit support segment 415 is provided which includes a contacting surface 501 which conforms to the exterior and interior shape of a portion of the distributor conduit 328 over which the distributor conduit support segment 415 is disposed. A pair of shaped duct support segments 416, 417 is provided which respectively include a contacting surface 502, 503 which conforms to the exterior and interior shape of a portion of the first and the second shaped ducts 341, 343, respectively, over which the shaped duct support segments 416, 417 are disposed. A pair of entry support segments 418, 419 is provided which respectively include a contacting surface 504, 505 which conforms to the exterior and interior shape of a portion of the first and the second entry segments 336, 337, respectively, over which the shaped duct support segments 418, 419 are disposed. The contacting surfaces 501, 502, 503, 504, 505 are adapted to be placed in contacting relationship with a selected portion of the slurry distributor 420 to help maintain the contacted portion of the slurry distributor 420 in position to help define the interior geometry 307 of the slurry distributor 420.

In use, the movable support assembly 405 can be operated to place each support segment 415, 416, 417, 418, 419 independently in a desired relationship with the slurry distributor 420. The support segments 415, 416, 417, 418, 419 can help maintain the interior geometry 307 of the slurry distributor 420 to promote the flow of slurry therethrough and to help ensure the volume defined by the interior geometry 307 is substantially filled with slurry during use. The location of the particular contacting surface of a given support segment 415, 416, 417, 418, 419 can be adjusted to modify locally the interior geometry of the slurry distributor 420. For example, the distributor conduit support segment 415 can be moved along the vertical axis 55 closer to the bottom support tray 401 to decrease the height of the distribution conduit 328 in an area over which the distributor conduit support segment 415 is.

In other embodiments, the number of support segments can be varied. In still other embodiments, the size and/or shape of a given support segment can be varied.

FIGS. 22-27 illustrate another embodiment of a slurry distributor 1420 constructed according to principles of the present disclosure. The slurry distributor 1420 is made from a substantially flexible material, such as PVC or urethane, for example. The slurry distributor 1420 of FIGS. 22-27 also includes first and second feed inlets 1424, 1425 and first and second entry segments 1436, 1437 which are disposed at a feed angle θ which is substantially parallel to the longitudinal axis or machine direction 50 (see FIG. 24).

The slurry distributor 1420 includes a bifurcated feed conduit 1422, a distribution conduit 1428, a slurry wiping mechanism 1417, and a profiling mechanism 1432. A slurry distributor support 1400 can be provided to help support the slurry distributor 1420.

Figure 22:
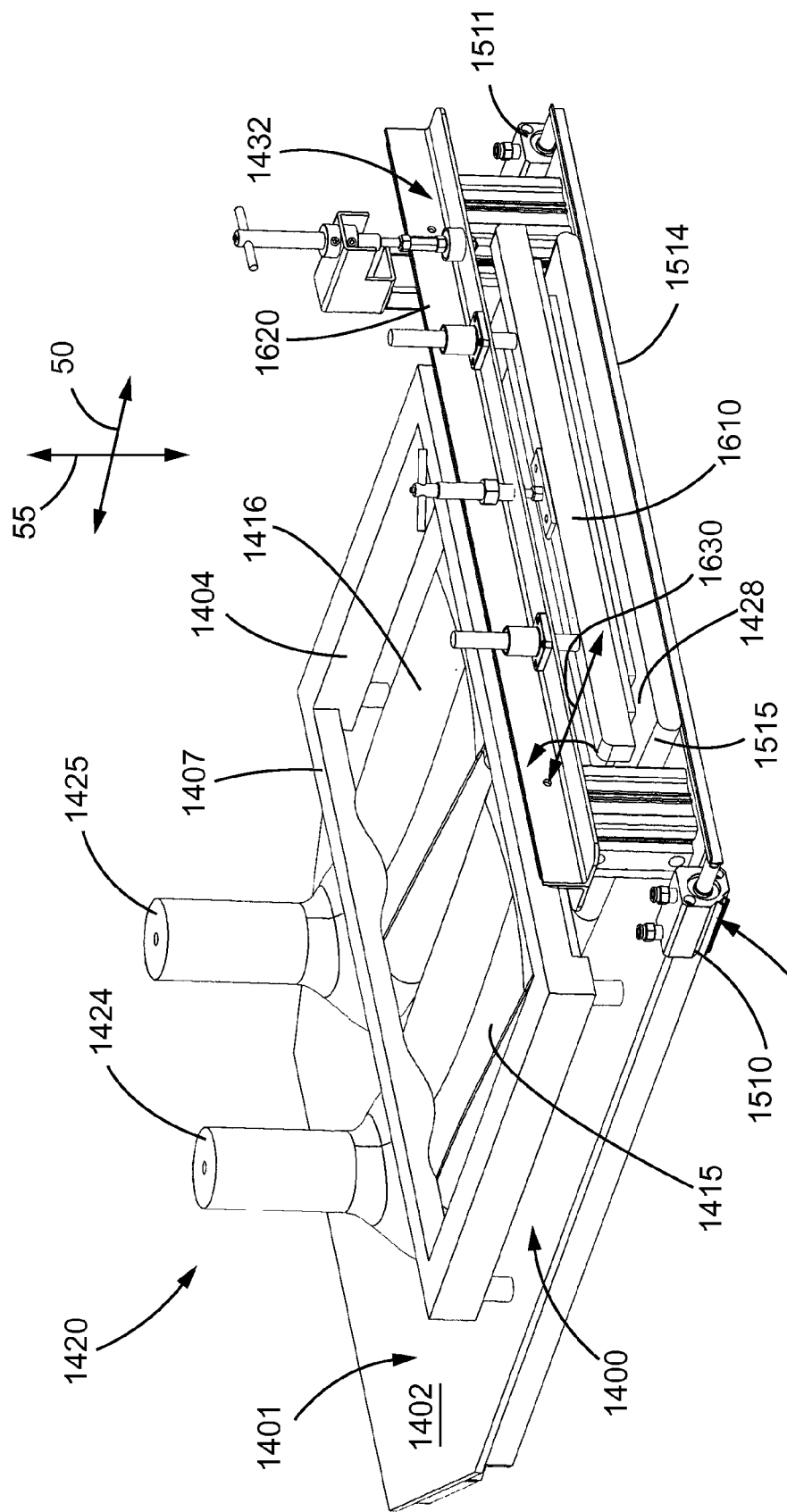
FIG. 22 is a front perspective view of another embodiment of a slurry distributor and another embodiment of a support system constructed in accordance with principles of the present disclosure.
Figure 23:
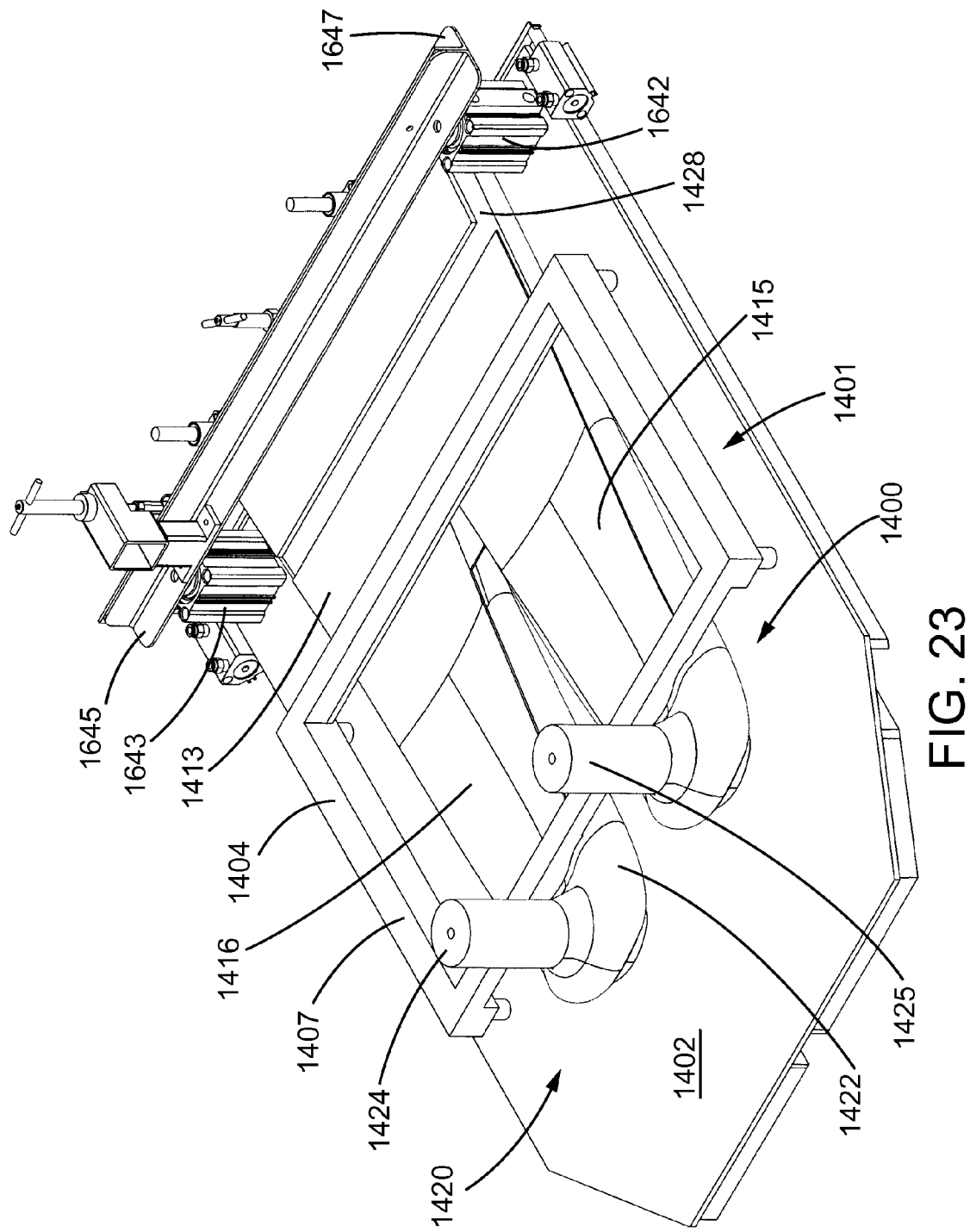
FIG. 23 is a rear perspective view of the slurry distributor and the support system of FIG. 22.
Figure 24:
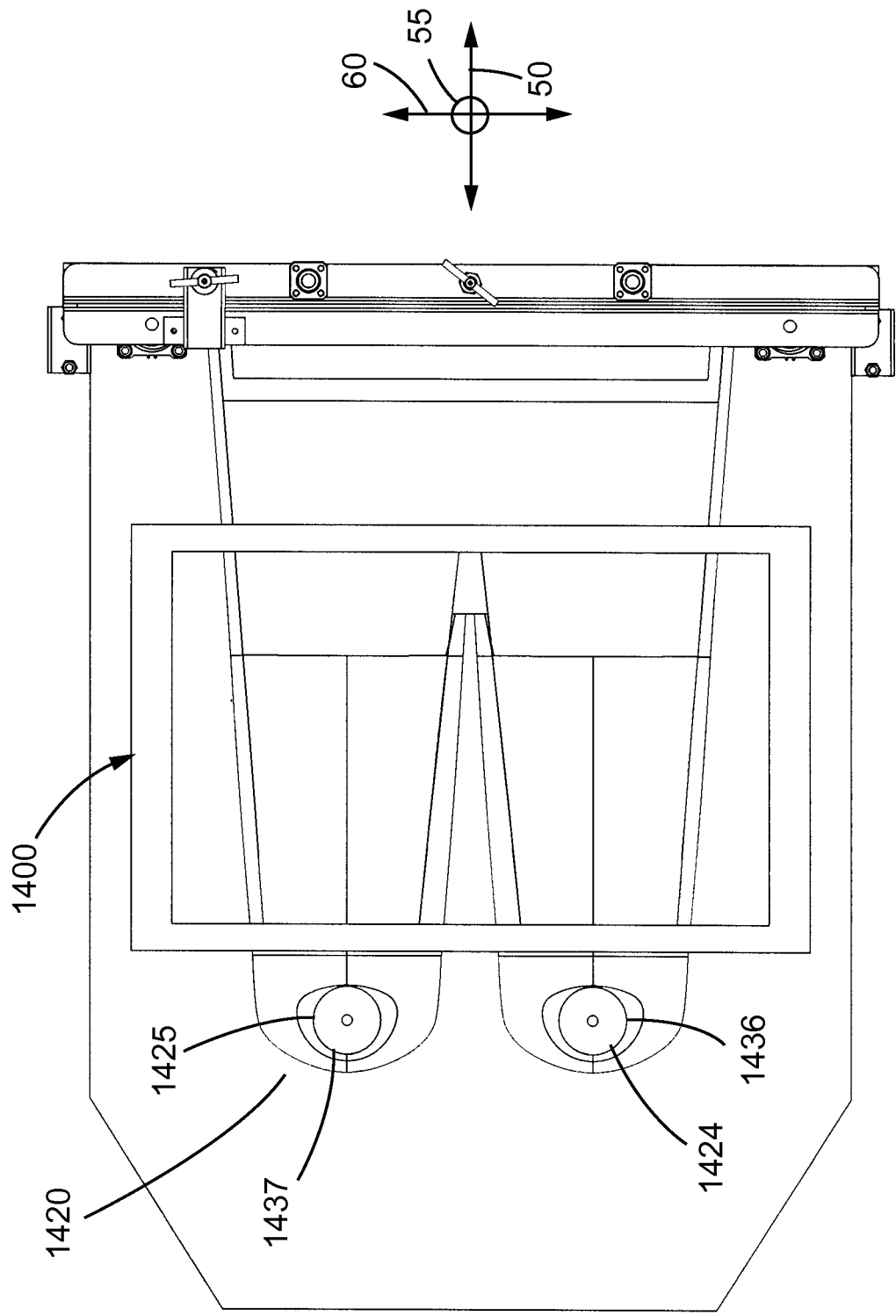
FIG. 24 is a top plan view of the slurry distributor and the support system of FIG. 22.
Figure 25:
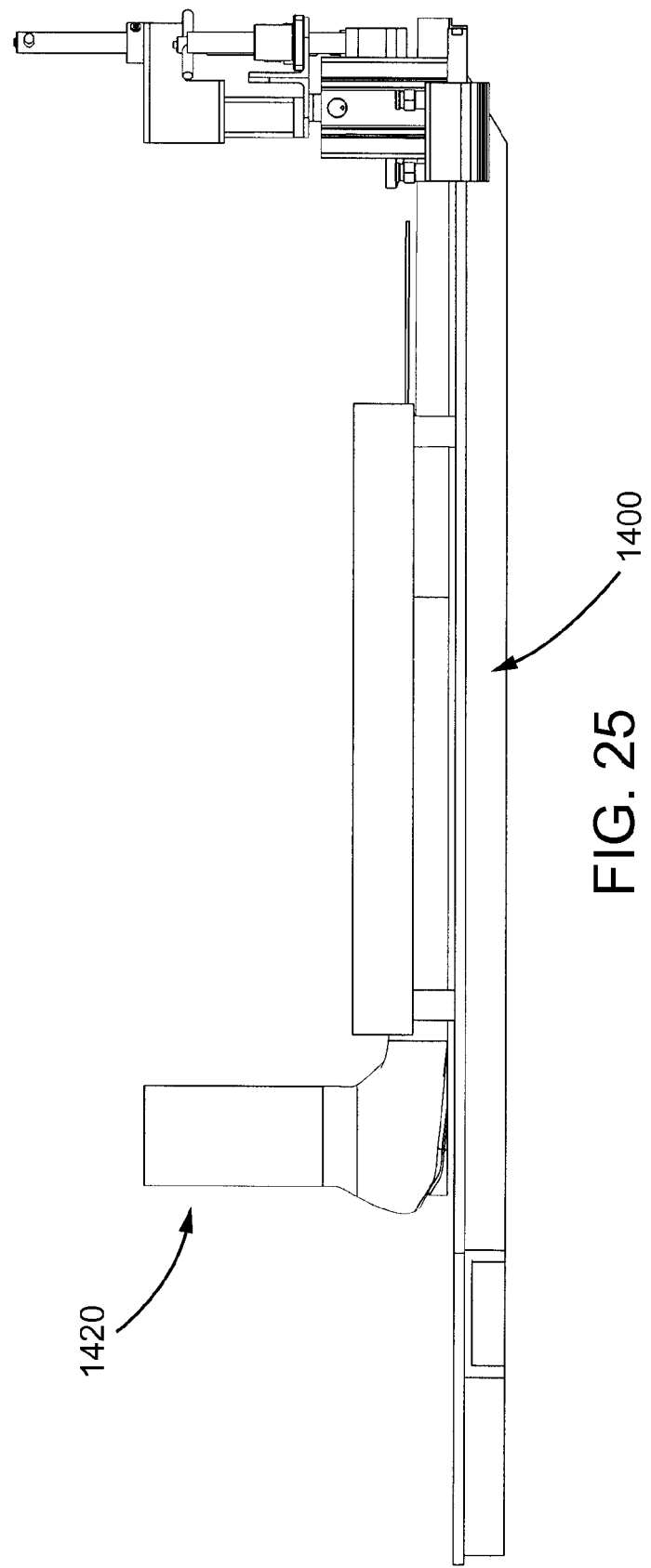
FIG. 25 is a side elevational view of the slurry distributor and the support system of FIG. 22.

Referring to FIGS. 22 and 23, the slurry distributor support 1400 can include a support member, which in the illustrated embodiment is in the form of a bottom support member 1401 which defines a supporting surface 1402. The supporting surface 1402 can be configured to substantially conform to at least a portion of an exterior of at least one of the feed conduit 1422 and the distribution conduit 1428 to help limit the amount of relative movement between the slurry distributor 1420 and the bottom support member 1401. In some embodiments, the supporting surface 1402 can also help maintain the interior geometry of the slurry distributor 1420 through which a slurry will flow. In embodiments, additional anchoring structure can be provided to help secure the slurry distributor 1420 to the bottom support member 1401.

The slurry distributor support 1400 can also include an upper support member 1404 disposed in spaced relationship to the bottom support member 1401. The upper support member 1404 can be positioned above the slurry distributor 1420 and adapted to be placed in supporting relationship with the slurry distributor 1420 to help maintain the interior geometry 1407 of the slurry distributor 1420 in a desired configuration.

The upper support member 1404 can include a support frame 1407 and a plurality of support segments 1413, 1415, 1416 which are fixedly supported by the support frame 1407. The support frame 1407 can be mounted to at least one of the bottom support member 1401 or one or more suitably arranged uprights to retain the support frame 1407 in fixed relationship to the bottom support tray 1401. The support segments 1413, 1415, 1416 can each have contacting surface which is configured to substantially conform to a surface portion of the desired geometric shape of at least one of the feed conduit 1422 and the distribution conduit 1428 of the slurry distributor 1420. In embodiments, the support frame 1407 can be adapted to movably adjust the spatial relationship between the support segments 1413, 1415, 1416 and the slurry distributor 1420. For example in some embodiments, the support frame 1407 can move the support segments 1413, 1415, 1416 over a range of travel over the vertical axis 55.

Referring to FIG. 22, the slurry wiping mechanism 1417 includes a pair of actuators 1510, 1511 operably arranged with a wiper blade 1514 to selectively reciprocally move the wiper blade 1514. The actuators 1510, 1511 are mounted to the bottom support member 1401 adjacent a distal end 1515 of the distribution conduit 1428. The wiper blade 1514 extends transversely between the actuators 1510, 1511.

Figure 26:
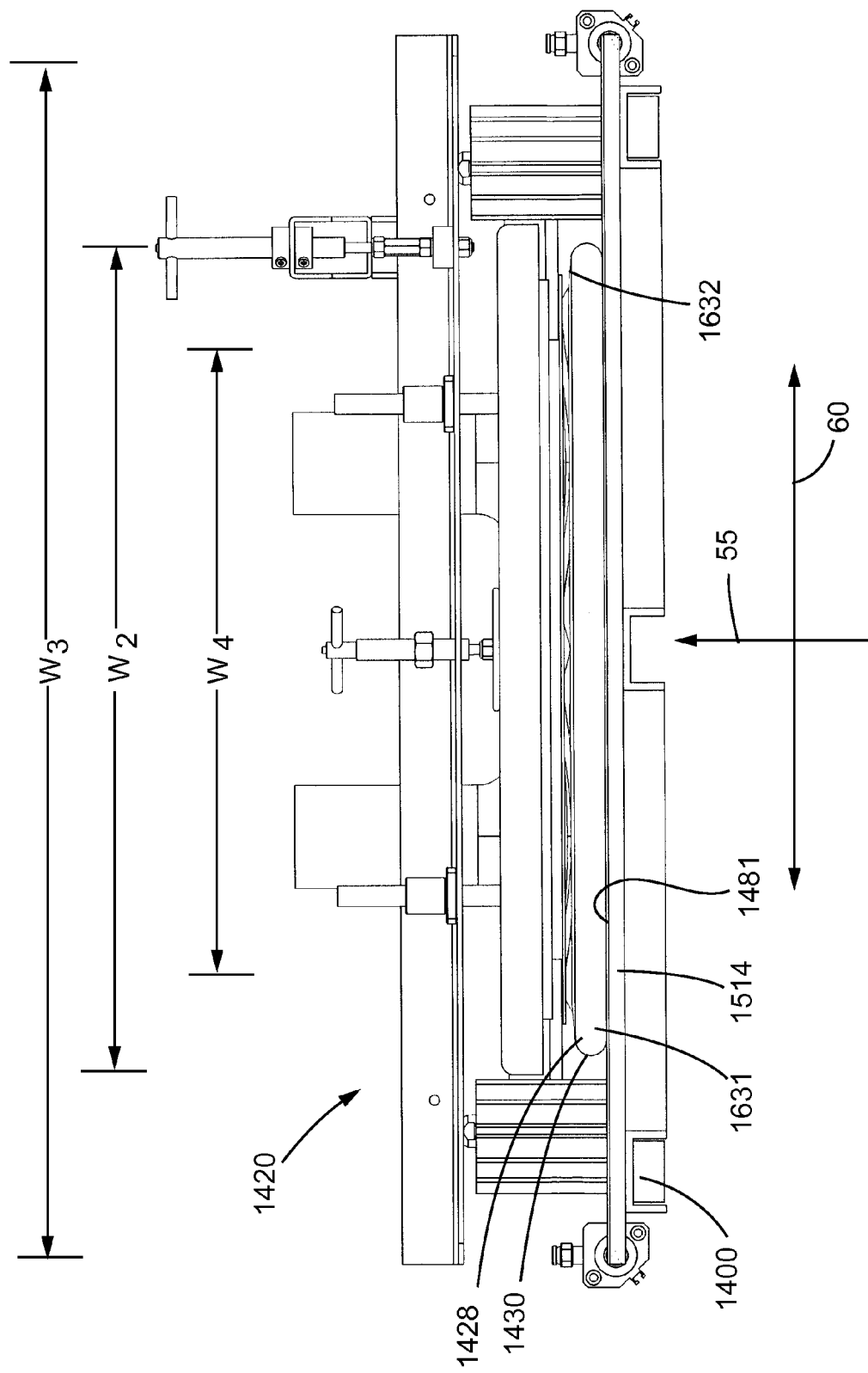
FIG. 26 is a front elevational view of the slurry distributor and the support system of FIG. 22.

Referring to FIG. 26, the distribution outlet 1430 includes an outlet opening 1481 having a width $W_2$, along the transverse axis 60. The wiper blade 1514 extends a predetermined width $W_3$ distance along the transverse axis 60. The width $W_2$ of the outlet opening 1481 is smaller than the width $W_3$ of the wiper blade 1514 such that the wiper blade 1514 is wider than the outlet opening 1481.

Figure 28:
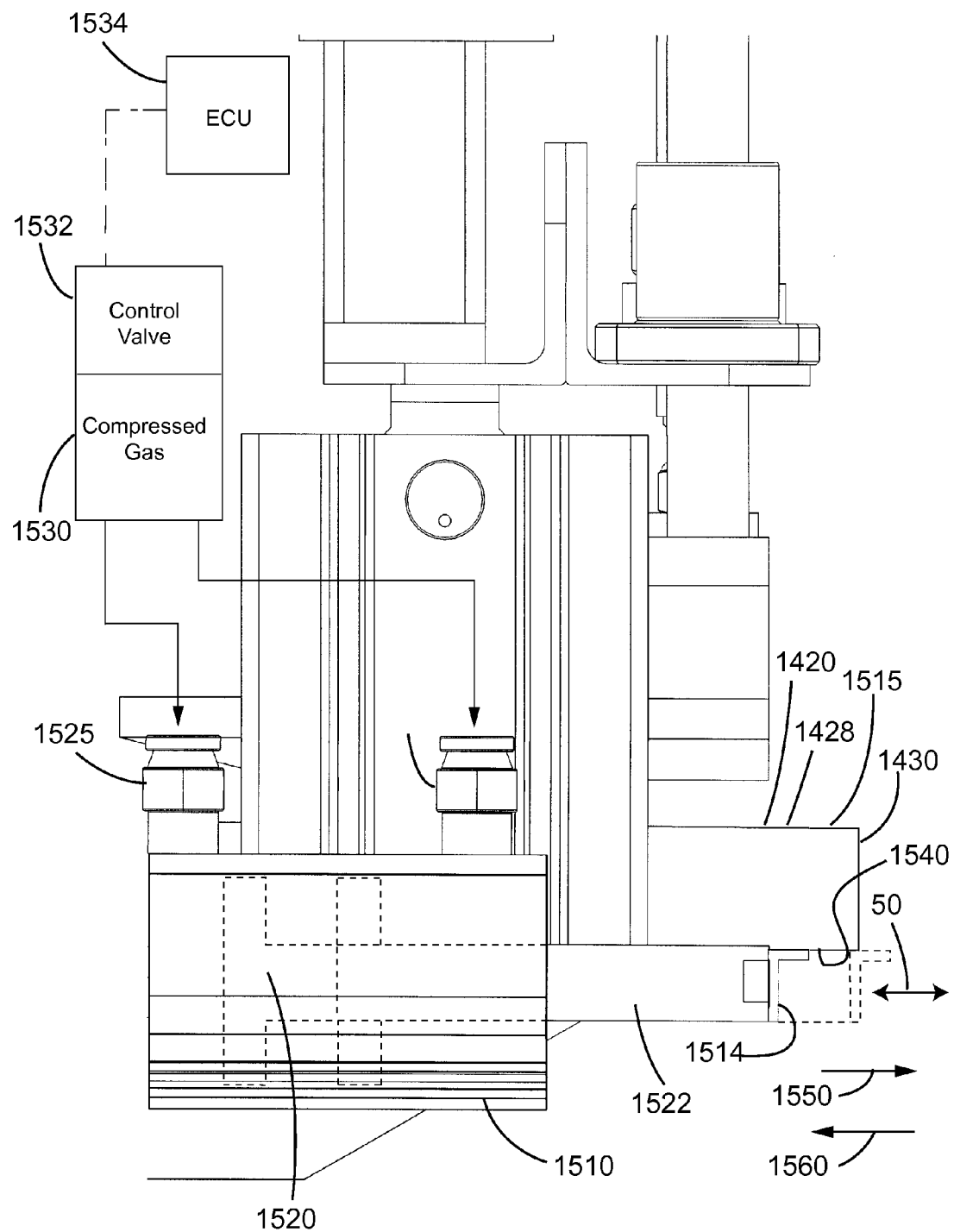
FIG. 28 is an enlarged, detail view of a distal portion of the slurry distributor, illustrating an embodiment of a slurry wiping mechanism constructed in accordance with principles of the present disclosure.

Referring to FIG. 28, in the illustrated embodiments, each actuator 1510, 1511 comprises a double-acting pneumatic cylinder having a reciprocally movable piston 1520. A rod 1522 of the piston 1520 is connected to the wiper blade 1514. In embodiments, a pair of pneumatic air lines can be respectively connected to a drive port 1525 and a retract port 1526. A source of pressurized gas 1530 can be controlled using a suitable control valve assembly 1532 controlled by a controller 1534 to selectively reciprocally move the wiper blade 1514 along the longitudinal axis 50. In embodiments an air line can tie the drive ports 1525 of both actuators 1510, 1511 together in parallel, and a separate air line can tie the retract ports 1526 of both actuators 1510, 1511 together in parallel. In other embodiments, the actuators can be anything capable of reciprocally moving the wiper blade including, for example, hand operated devices.

The movable wiper blade 1514 is in contacting relationship with a bottom surface 1540 of the distribution conduit 1428. The wiper blade 1514 is reciprocally movable over a clearing path between a first position and a second position (shown in phantom lines). The clearing path is disposed adjacent the distal end 1515 of the distribution conduit 1428 which includes the distribution outlet 1430. The wiper blade reciprocally moves longitudinally along the clearing path. In the illustrated embodiment, the first position of the wiper blade 1514 is longitudinally upstream of the distribution outlet 1430, and the second position is longitudinally downstream of the distribution outlet 1430.

The controller 1534 is adapted to selectively control the actuators to reciprocally move the wiper blade 1514. In embodiments, the controller 1534 is adapted to move the wiper blade 1514 in a clearing direction 1550 from the first position to the second position over a wiping stroke and to move the wiper blade in an opposing, return direction 1560 from the second position to the first position over a return stroke. In embodiments, the controller 1534 is adapted to move the wiper blade 1514 such that the time to move over the wiping stroke is substantially the same as the time to move over the return stroke.

In embodiments, the controller 1534 can be adapted to move the wiper blade 1514 reciprocally between the first position and the second position in a cycle having a sweep period. The sweep period includes a wiping portion comprising the time to move over the wiping stroke, a returning portion comprising the time to move over the return stroke, and an accumulation delay portion comprising a predetermined period of time in which the wiper blade 1514 remains in the first position. In embodiments, the wiping portion is substantially the same as the returning portion. In embodiments, the controller 1534 is adapted to adjustably vary the accumulation delay portion.

Figure 34:
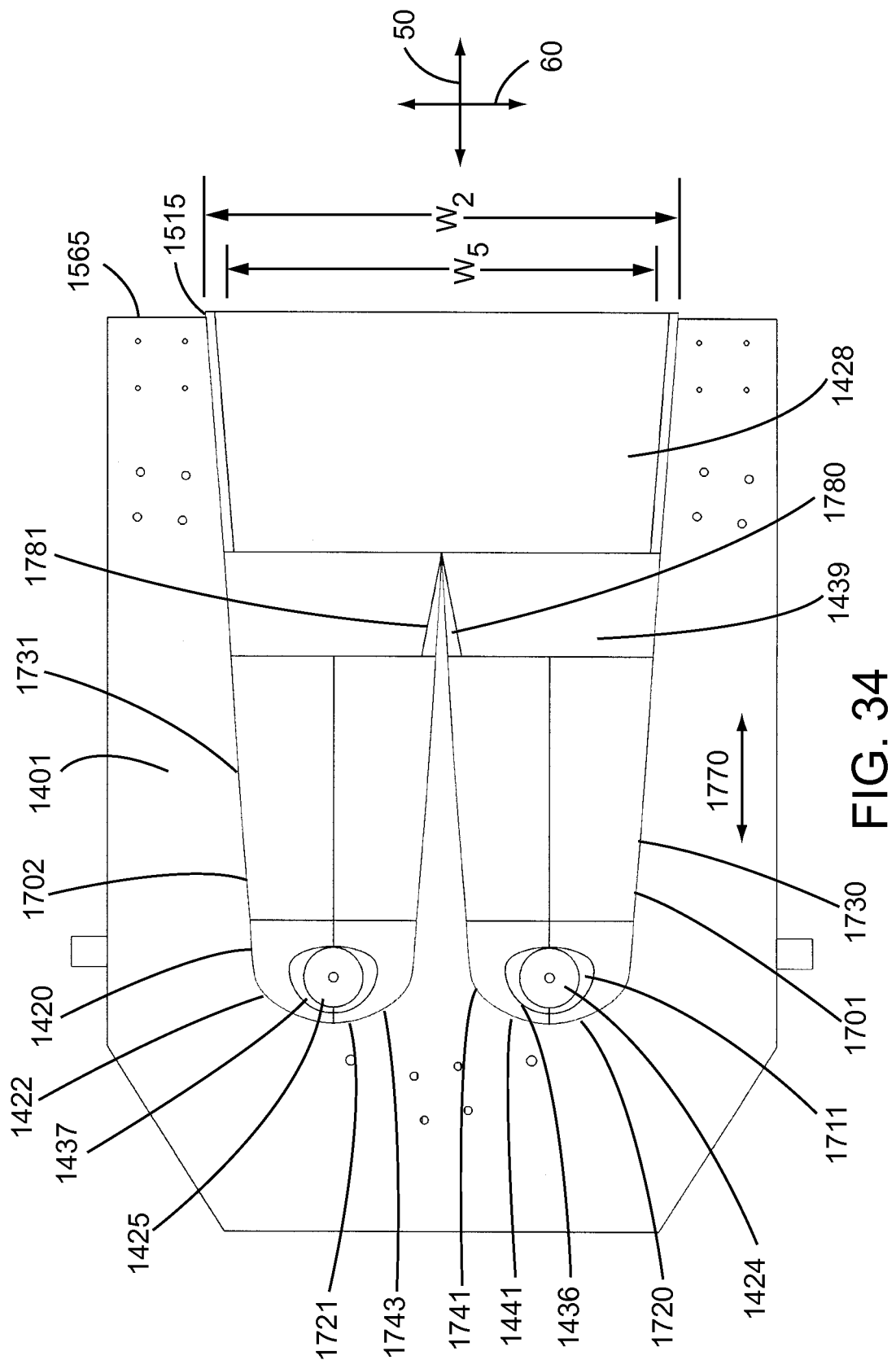
FIG. 34 is a top plan view of the slurry distributor and the support system of FIG. 22 with a support frame removed for illustrative purposes.

Referring to FIG. 34, the bottom support member 1401 supporting the bottom surface of the distribution conduit 1428 includes a perimeter 1565. The distribution outlet 1430 is longitudinally offset from the bottom support member 1401 such that the distal outlet portion 1515 of the distribution conduit 1428 extends from the perimeter 1565 of the bottom support member 1401. Referring back to FIG. 28, the wiper blade 1514 supports the distal outlet portion 1515 of the slurry distributor 1420 when the wiper blade is in the first position.

Referring to FIG. 22, the profiling mechanism 1432 includes a profiling member 1610 in contacting relationship with the distribution conduit 1428 and a support assembly 1620 adapted to allow the profiling member 1610 to have at least two degrees of freedom. In embodiments, the profiling member is translatable along at least one axis and rotatable about at least one pivot axis. In embodiments the profiling member is movable along the vertical axis 55 and rotatable about a pivot axis 1630 that is substantially parallel to the longitudinal axis 50.

Figure 30:
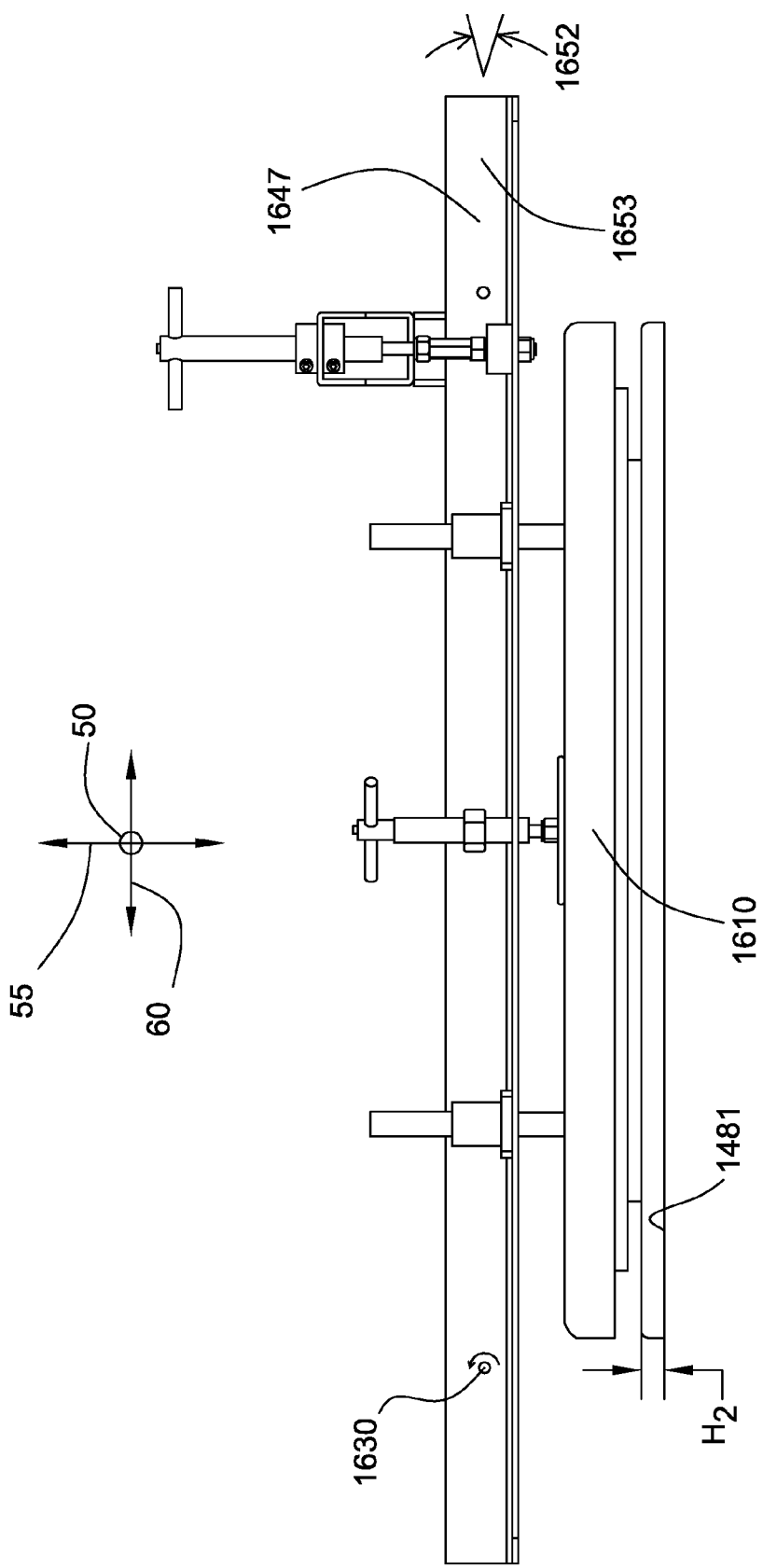
FIG. 30 is a front elevational view of the profiling mechanism of FIG. 29.

Referring to FIGS. 26, 30 and 30A, the profiling member 1610 is movable over a range of travel such that the profiling member 1610 is in a range of positions over which the profiling member 1610 is in increasing compressive engagement with a portion of the distribution conduit 1428 adjacent the distribution outlet 1430 to vary the shape and/or size of the outlet opening 1430.

Referring to FIG. 26, the outlet opening 1481 of the distribution outlet 1430 has a width $W_2$ along the transverse axis 60. The contacting profiling segment of the profiling member 1410 has a width $W_4$ extending a predetermined distance along the transverse axis. In embodiments the width $W_2$ of the outlet opening 1481 is larger than the width $W_4$ of the profiling member 1410. In other embodiments the width $W_2$ of the outlet opening 1481 is less than or equal to the width $W_4$ of the profiling member 1410. The profiling member 1410 is positioned such that a pair of lateral portions 1631, 1632 of the distribution outlet 1430 is in lateral offset relationship to the profiling member 1410 such that the profiling member does not engage the lateral portions 1631, 1632. In some embodiments, the lateral portions 1631, 1632 can have a combined width of about one-fourth of the width $W_2$ the outlet opening 1481.

Referring to FIG. 23, the support assembly 1620 includes a pair of stationary uprights 1642, 1643, a transverse stationary support member 1645, and a transverse pivotal support member 1647 that is pivotally connected to the transverse stationary support member 1645 using any suitable pivotal connection. The stationary uprights 1642, 1643 can be mounted to the bottom support member 1401. The transverse stationary support member 1645 can extend transversely between the stationary uprights 1642, 1643.

Referring to FIGS. 29, 30, 30B, and 31, the pivotal support member 1647 is rotatable about the pivot axis 1630 over an arc length 1652 with respect to the stationary support member 1645. In embodiments, the arc length 1652 allows for tilting a pivot end 1653 of the pivotal support member 1647 both upward above the transverse axis 60 and downward below the transverse axis 60. The pivotal support member 1647 supports the profiling member 1610.

In embodiments, the profiling member 1610 is translatable along the vertical axis 55 and rotatable about the pivot axis 1630 which is substantially parallel to the longitudinal axis 50. The profiling member 1610 is rotatable about the pivot axis 1630 over the arc length 1652 such that the profiling member 1610 is in a range of positions over which the profiling member is in variable compressive engagement with the portion of the distribution conduit 1428 across the transverse axis 60 such that the height $H_2$ of the outlet opening 1481 varies along the transverse axis 60.

Figure 29:
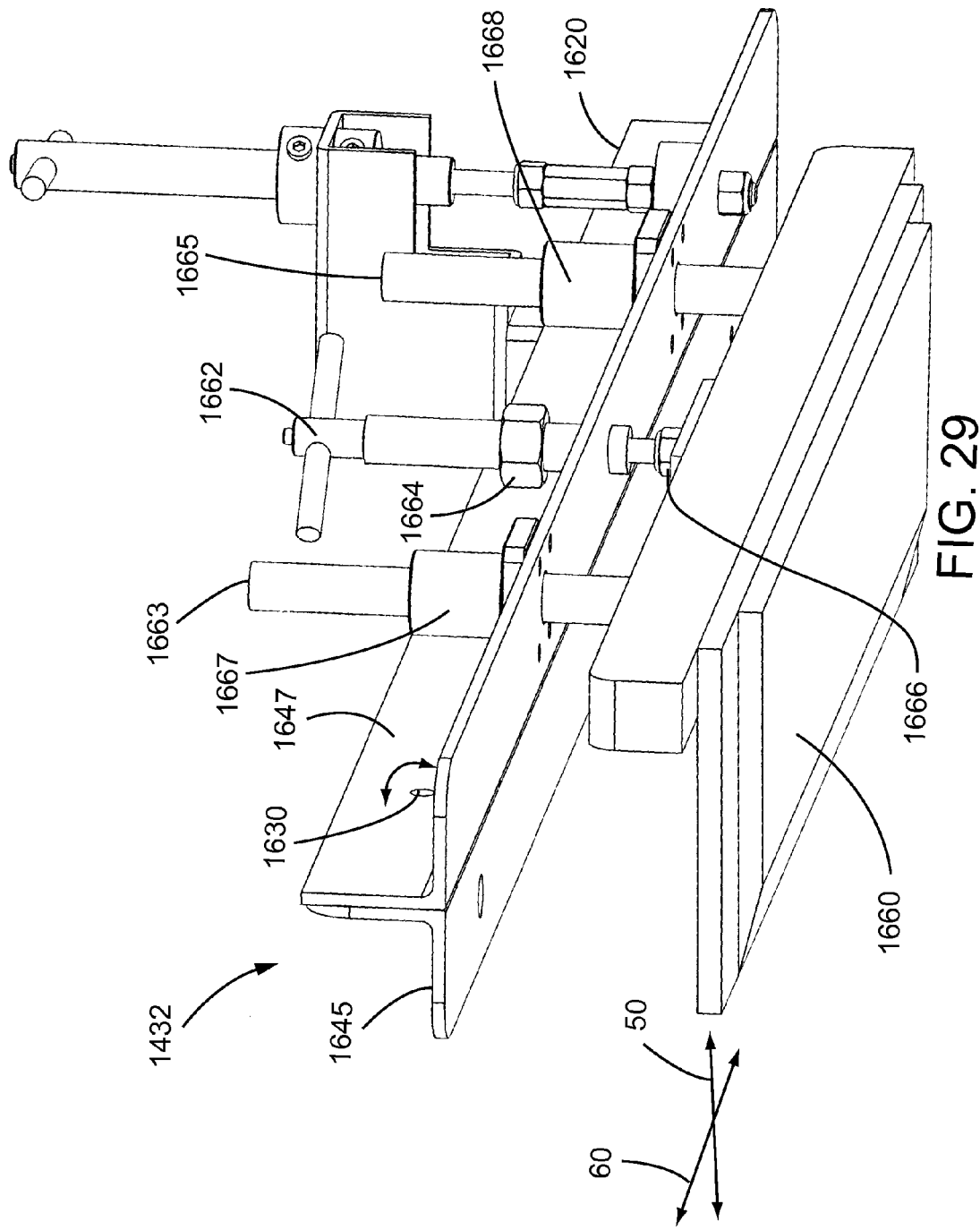
FIG. 29 is a perspective view of a profiling mechanism constructed in accordance with principles of the present disclosure and used in the slurry distributor of FIG. 22.
Figure 33:
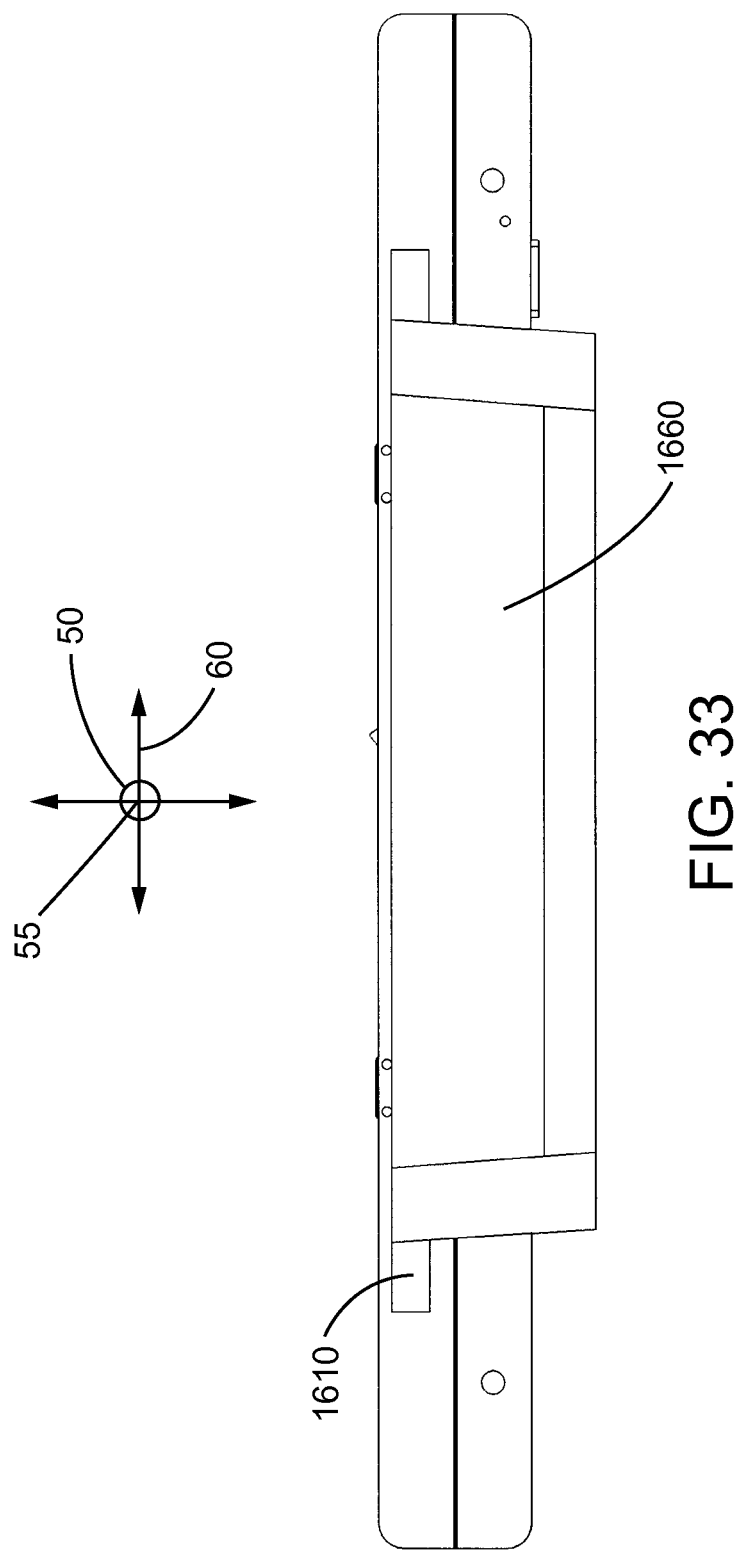
FIG. 33 is a bottom elevational view of the profiling mechanism of FIG. 29.

Referring to FIGS. 29 and 33, the profiling member 1610 includes an engagement segment 1660 extending generally longitudinally and transversely and a translation adjustment rod 1662 extending generally vertically from the engagement segment 1660. The translation adjustment rod 1662 of the profiling member 1610 is movably secured to the pivotal support member 1647 of the support assembly 1620 such that the profiling member 1610 is movable along the vertical axis 55 over a range of vertical positions. A pair of translation guide rods 1663, 1665 are connected to the engagement segment 1660 and extends through a respective collar 1667, 1668 mounted to the pivotal support member 1647. The guide rods 1663, 1665 are movable with respect to the collars 1667, 1668 along the vertical axis 55.

The support assembly 1620 can include a clamp mechanism adapted to selectively engage the translation adjustment rod 1662 to secure the profiling member 1610 in a selected one of the range of vertical positions. In the illustrated embodiment, a threaded connection between the translation adjustment rod 1662 and the pivotal support member 1647 functions as a clamp mechanism. A lock nut 1664 is provided to secure the threaded translation adjustment rod 1662 in place. An elastic nut 1666 is disposed near a distal end 1657 of the translation adjustment rod 1662 to maintain a sufficient clearance for a cap screw 1669 (see FIG. 30C) affixed to the distal end to be allowed to rotate. Referring to FIG. 30C, a blind hole 1658 is defined in the profiling member 1610 to accommodate the cap screw 1669 to allow the cap screw to rotate about the axis of the translation adjustment rod 1662.

Figure 30B:
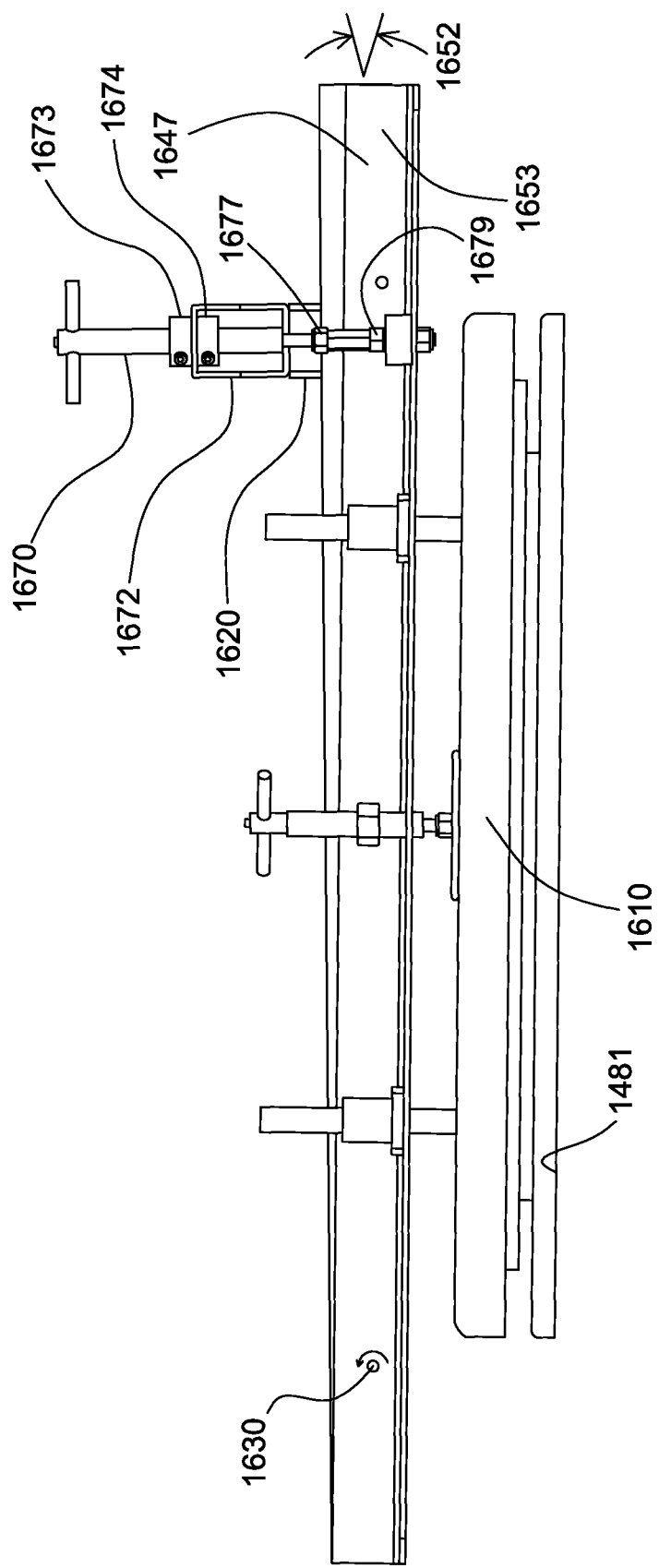
FIG. 30B is a view as in FIG. 30, illustrating the profiling member of the profiling mechanism in a pivoted position.
Figure 30C:
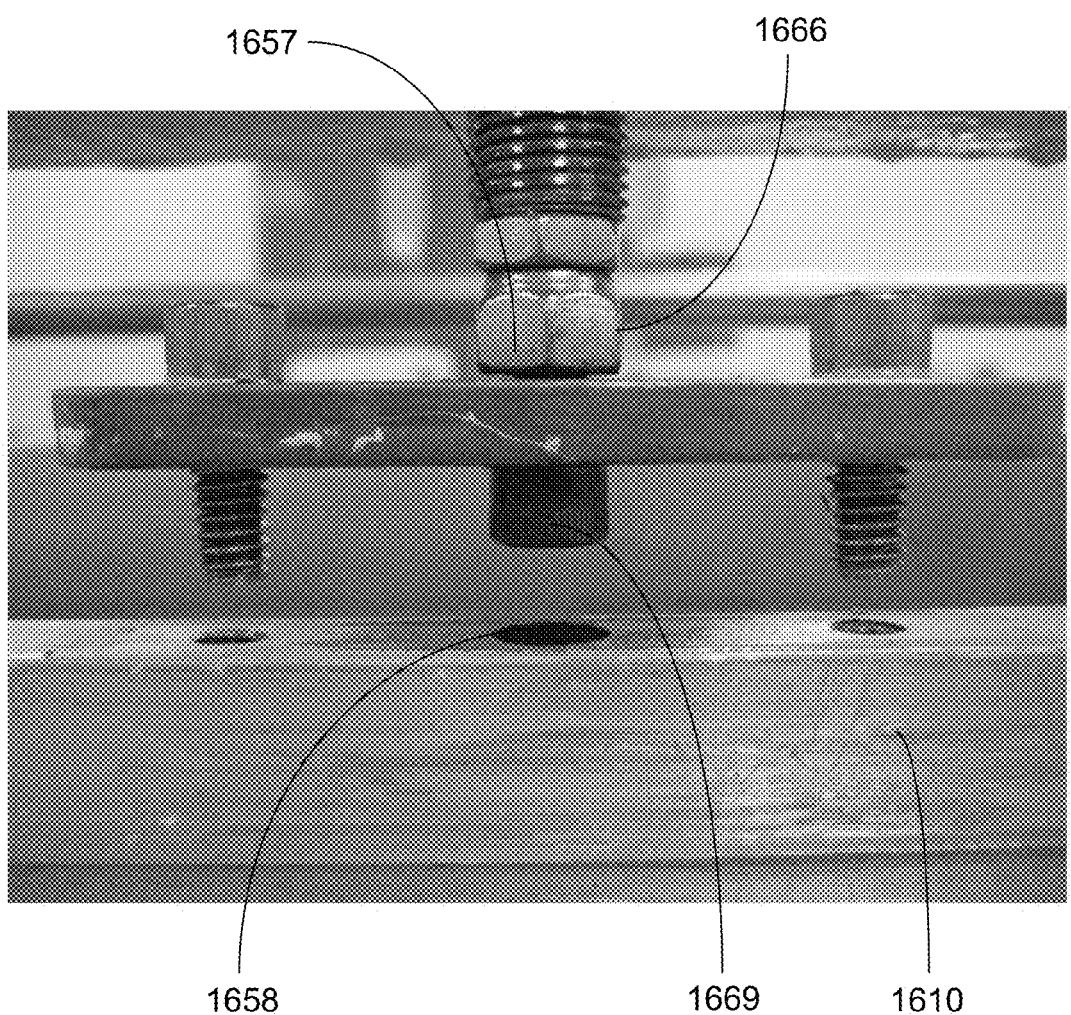
FIG. 30C is an enlarged, detail exploded view of the profiling member, illustrating a connection technique between a translation rod and a profiling segment.
Figure 31:
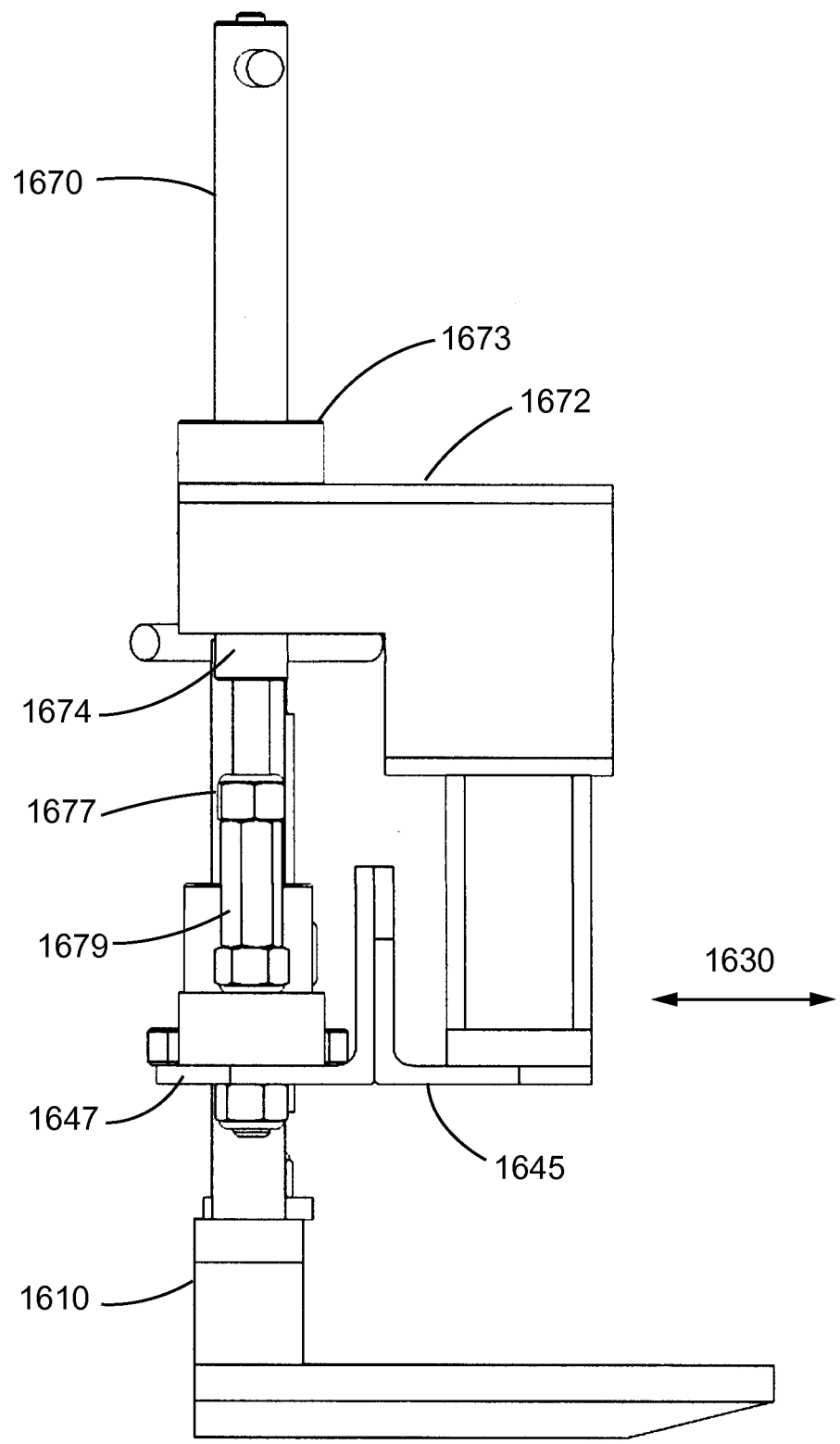
FIG. 31 is a side elevational view of the profiling mechanism of FIG. 29.
Figure 32:
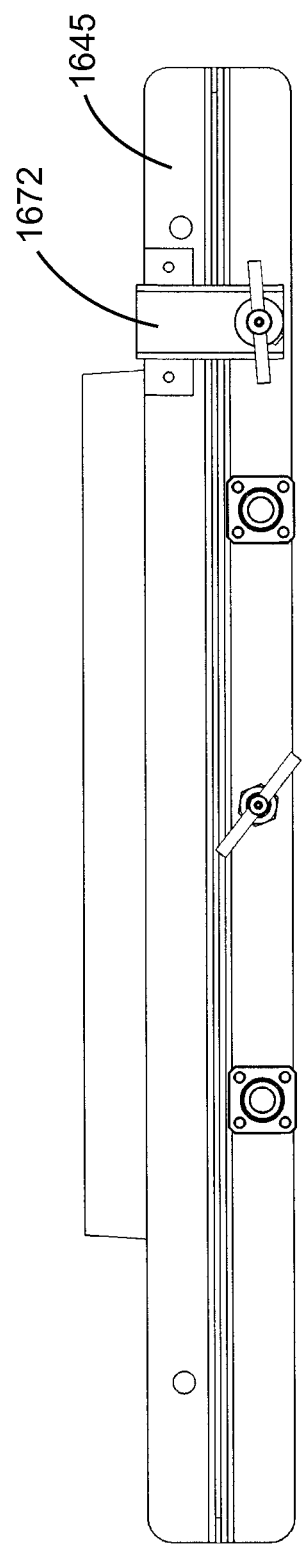
FIG. 32 is a top plan view of the profiling mechanism of FIG. 29.

Referring to FIGS. 30B and 31, the support assembly 1620 can be adapted to rotatably support the profiling member 1610 such that the profiling member 1610 is rotatable about the pivot axis 1630 over a range of positions along the arc length 1652. The support assembly 1620 includes a rotation adjustment rod 1670 extending between the stationary support member 1645 and the pivotal support member 1647 by way of a support bracket 1672 connected to the stationary support member 1645 (see FIG. 31 also). The rotation adjustment rod 1670 is movably secured to the stationary support member 1645 through a threaded connection with the support bracket 1672 such that moving the rotation adjustment rod 1670 with respect to the stationary support member 1645, by rotating its T-handle, pivots the pivotal support member 1647 about the pivot axis 1630 with respect to the stationary support member 1645. The support bracket 1672 can be configured such that it can allow for some flexing during a tilt operation. Shaft collars 1673, 1674 can be provided for added reliability.

The support assembly 1620 can include a clamp mechanism adapted to selectively engage the rotation adjustment rod 1670 to secure the profiling member 1610 in a selected one of the range of positions along the arc length 1652. In the illustrated embodiment, a jam nut 1677 can be provided to lock the threaded rod 1670 to the barrel nut 1679.

Figure 40:
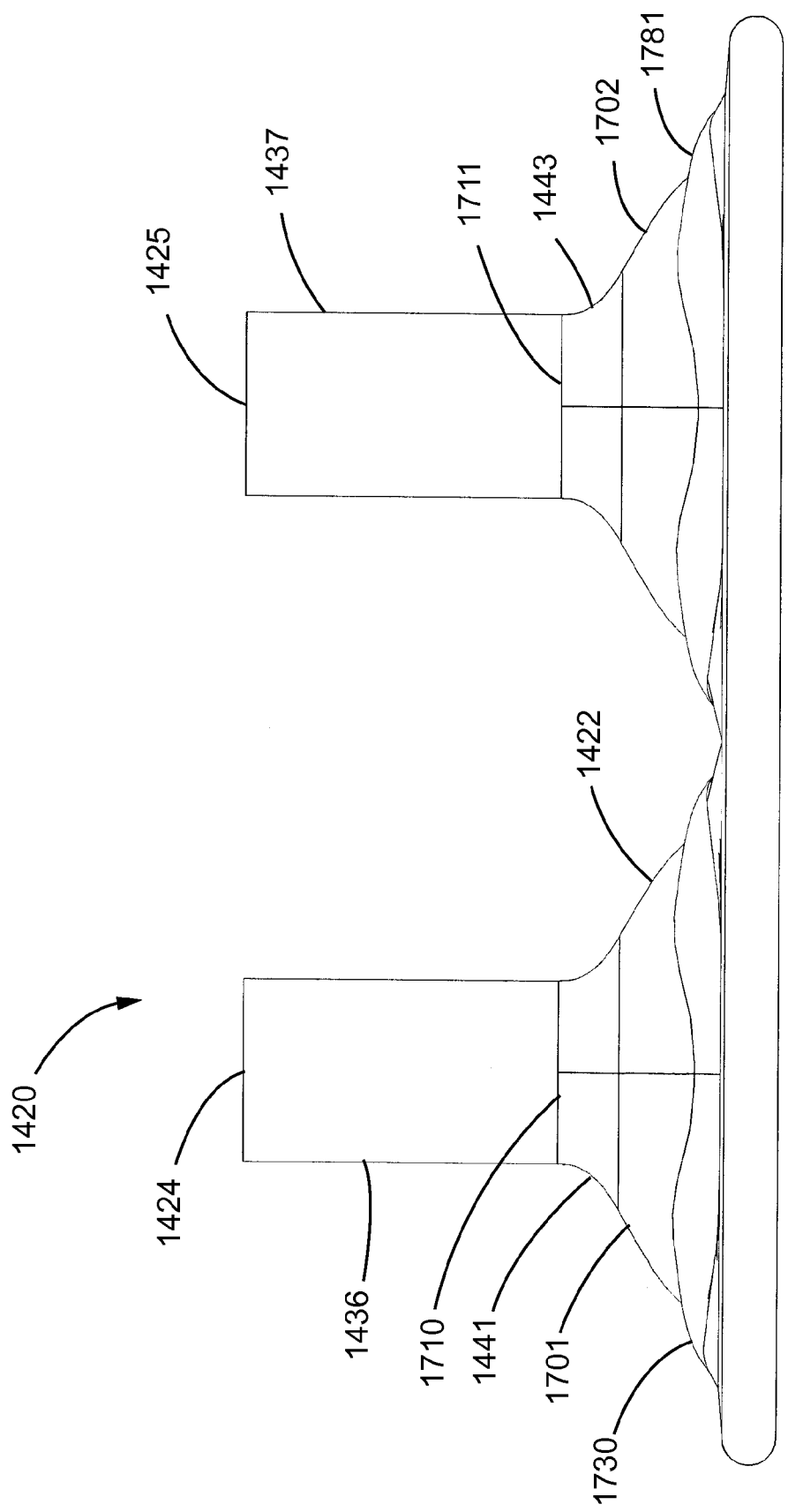
FIG. 40 is a front elevational view of the slurry distributor of FIG. 22.

Referring to FIGS. 34 and 40, the bifurcated feed conduit 1422 of the slurry distributor 1420 includes a first and a second feed portion 1701, 1702. Each of the first and second feed portions 1701, 1702 has a respective entry segment 1436, 1437 with a feed inlet 1424, 1425 and a feed entry outlet 1710, 1711 in fluid communication with the feed inlet 1424, 1425, a shaped duct 1441, 1443 having a bulb portion 1720, 1721 (see FIG. 41 also) in fluid communication with the feed entry outlet 1710, 1711 of the respective entry segment 1436, and a transition segment 1730, 1731 in fluid communication with the respective bulb portion 1720, 1721.

Referring to FIG. 34, the first and second feed inlets 1424, 1425 and the first and second entry segments 1436, 1437 can be disposed at a respective feed angle θ, measured as the degree of rotation relative to the vertical axis 55, in a range up to about 135° with respect to the longitudinal axis 50. The illustrated first and second feed inlets 1424, 1425 and the first and second entry segments 1436, 1437 are disposed at a respective feed angle θ substantially aligned with the longitudinal axis 50.

The first feed portion 1701 is substantially identical the second feed portion 1702. It should be understood, therefore, that the description of one feed portion is equally applicable to the other feed portion, as well. In other embodiments there can be only a single feed portion or in still further embodiments there can be more than two feed portions.

Figure 35:
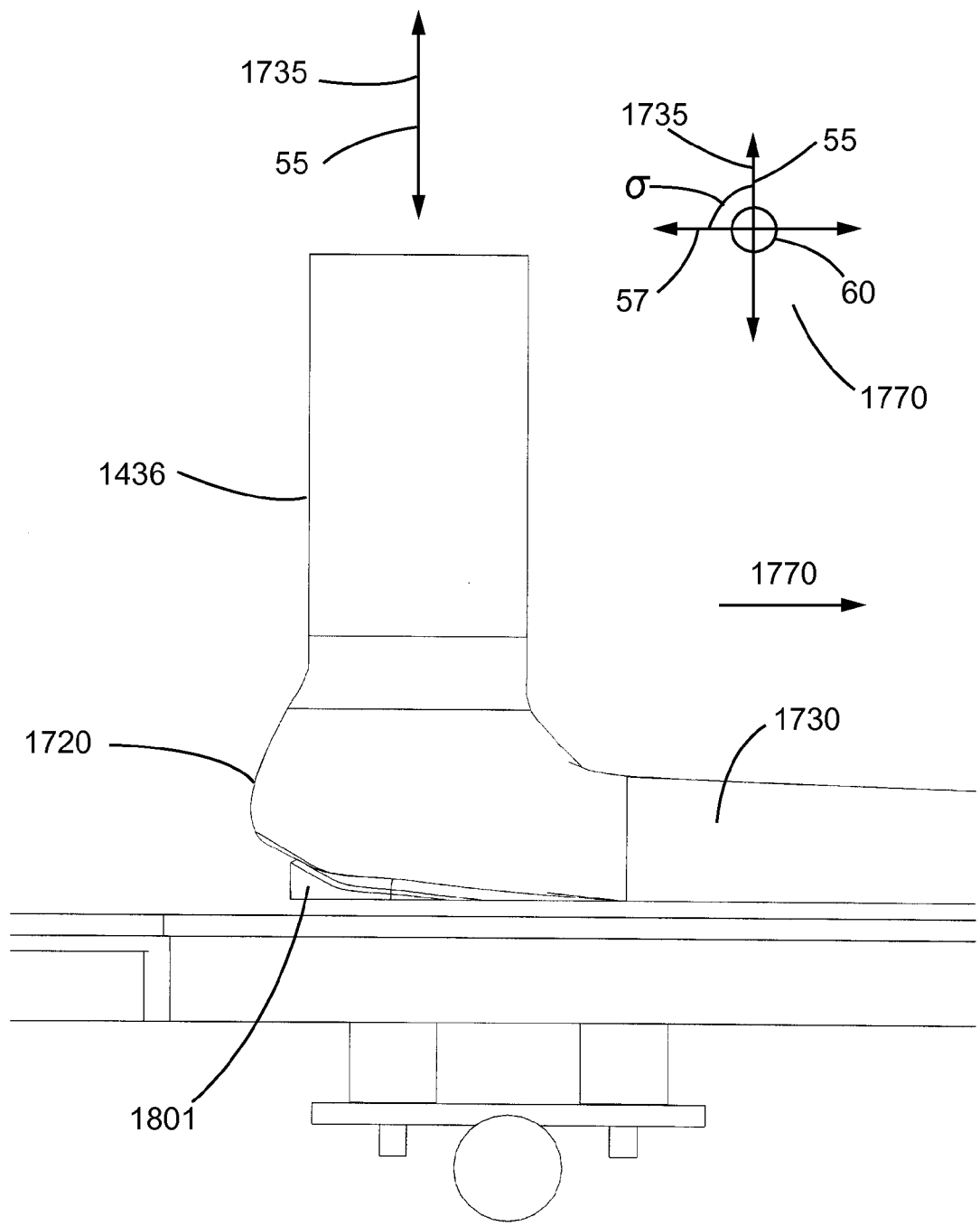
FIG. 35 is an enlarged, detail view taken from the side of a bulb portion of the slurry distributor of FIG. 22.

Referring to FIG. 35, the entry segment 1436 is generally cylindrical and extends along a first feed flow axis 1735. The first feed flow axis 1735 of the illustrated entry segment 1436 extends generally along the vertical axis 55.

In other embodiments, the first feed flow axis 1735 can have a different orientation with respect to the plane 57 defined by the longitudinal axis 50 and the transverse axis 60. For example, in other embodiments, the first feed flow axis 1735 can be disposed at a feed pitch angle σ, measured as the degree of rotation relative to the transverse axis 60, that is non-perpendicular to the plane 57 defined by the longitudinal axis 50 and the transverse axis 60. In embodiments the pitch angle σ, measured from the longitudinal axis 50 in a direction opposing the machine direction 92 upward to the vertical axis 55 as shown in FIG. 35, can be anywhere in a range from about zero to about one hundred thirty-five degrees, from about fifteen to about one hundred twenty degrees in other embodiments, from about thirty to about one hundred five degrees in still other embodiments, from about forty-five to about one hundred five degrees in yet other embodiments, and from about seventy-five to about one hundred five degrees in other embodiments. In other embodiments, the first feed flow axis 1735 can be disposed at a feed roll angle, measured as the degree of rotation relative to the longitudinal axis 50, that is non-perpendicular to the plane 57 defined by the longitudinal axis 50 and the transverse axis 60.

Referring to FIG. 34, the shaped duct 1441 includes a pair of lateral sidewalls 1740, 1741 and the bulb portion 1720. The shaped duct 1441 is in fluid communication with the feed entry outlet 1711 of the entry segment 1436. Referring to FIG. 35, the bulb portion 1720 is configured to reduce the average velocity of a flow of slurry moving from the entry segment 1436 through the bulb portion 1720 to the transition segment 1730. In embodiments, the bulb portion 1720 is configured to reduce the average velocity of a flow of slurry moving from the entry segment 1436 through the bulb portion 1720 to the transition segment 1730 by at least twenty percent.

Figure 45:
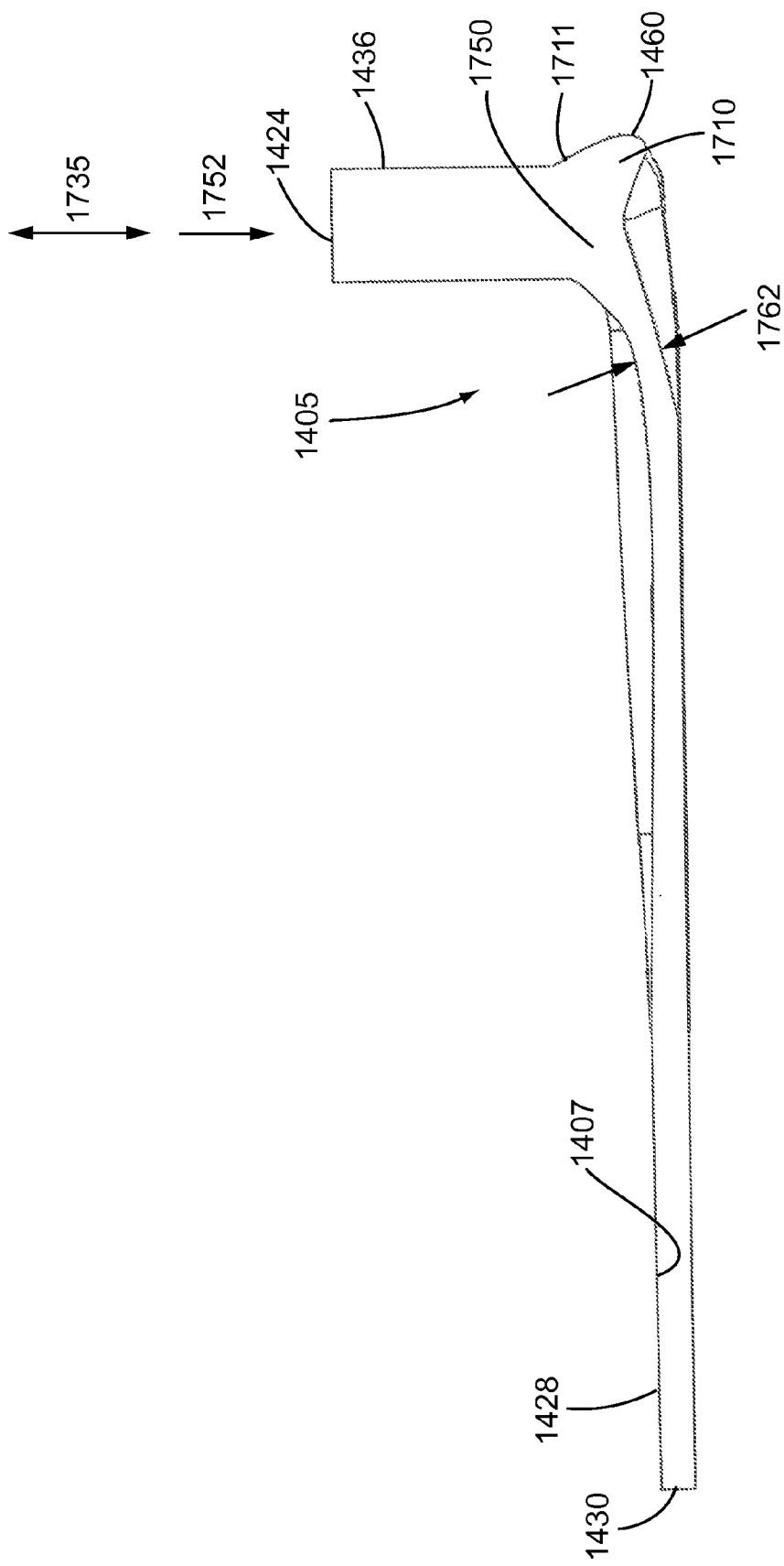
FIG. 45 is a cross-sectional view taken along line 45-45 in FIG. 44.
Figure 46:
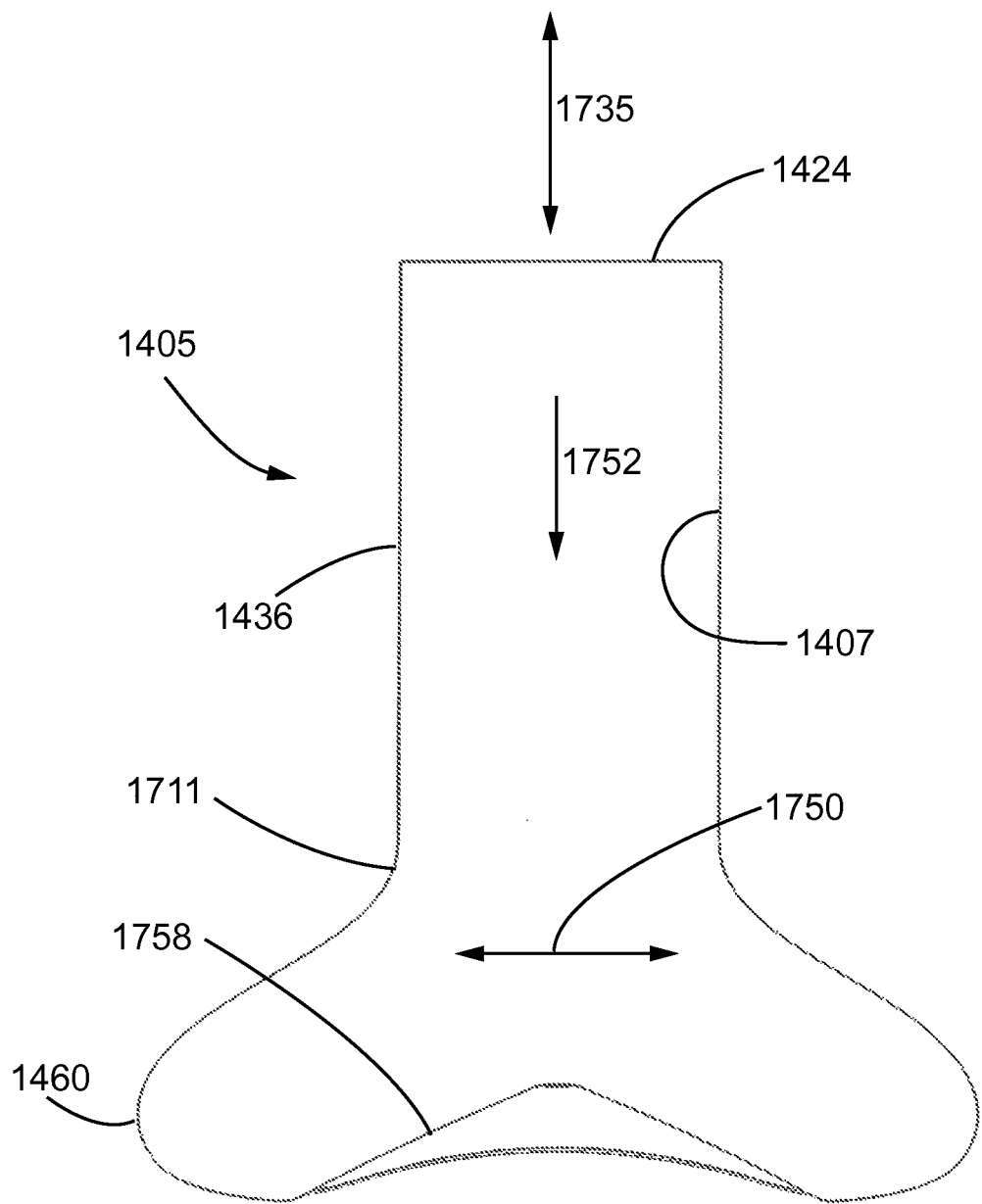
FIG. 46 is a cross-sectional view taken along line 46-46 in FIG. 44.
Figure 47:
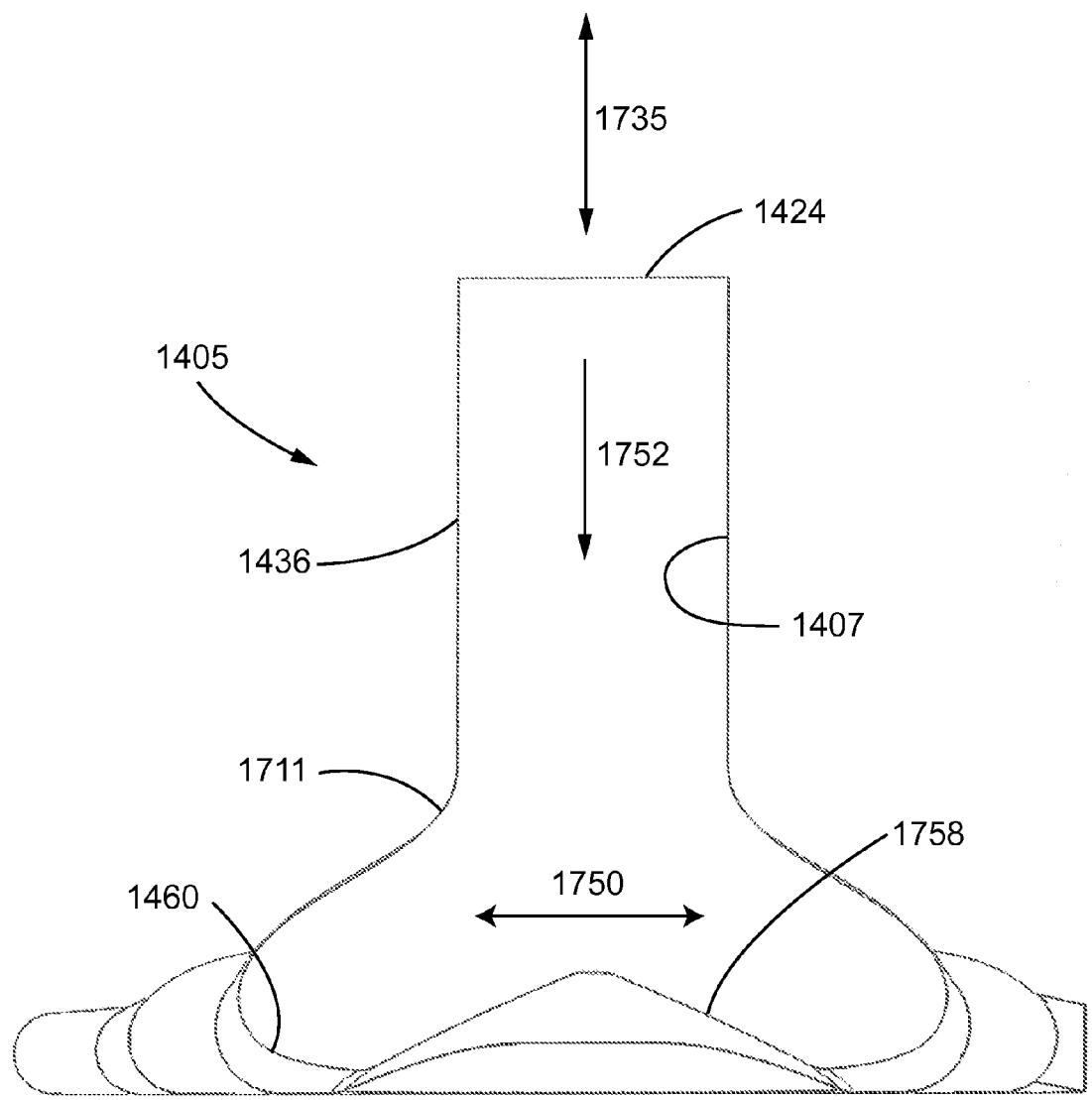
FIG. 47 is a cross-sectional view taken along line 47-47 in FIG. 44.
Figure 48:
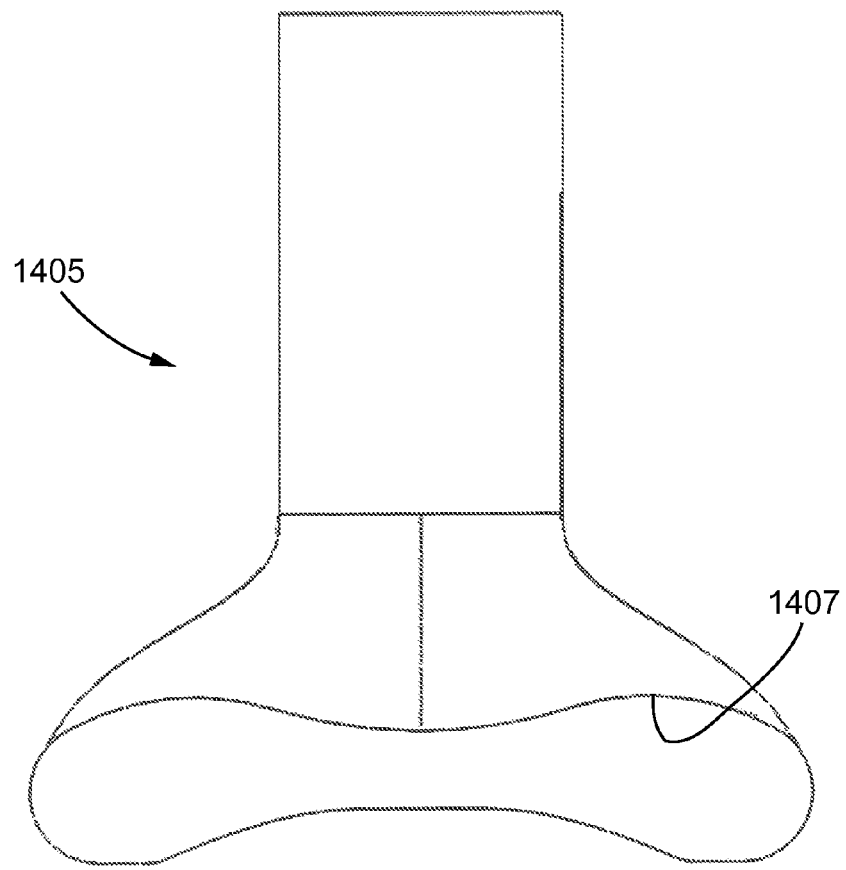
FIG. 48 is a cross-sectional view taken along line 48-48 in FIG. 44.
Figure 49:
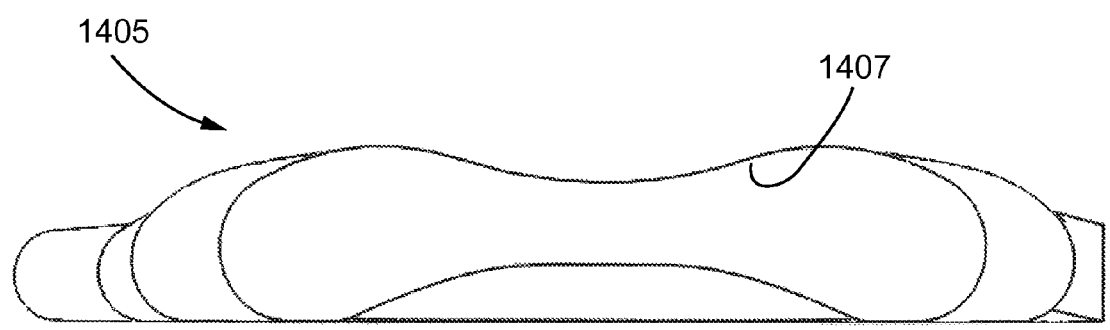
FIG. 49 is a cross-sectional view taken along line 49-49 in FIG. 44.
Figure 50:
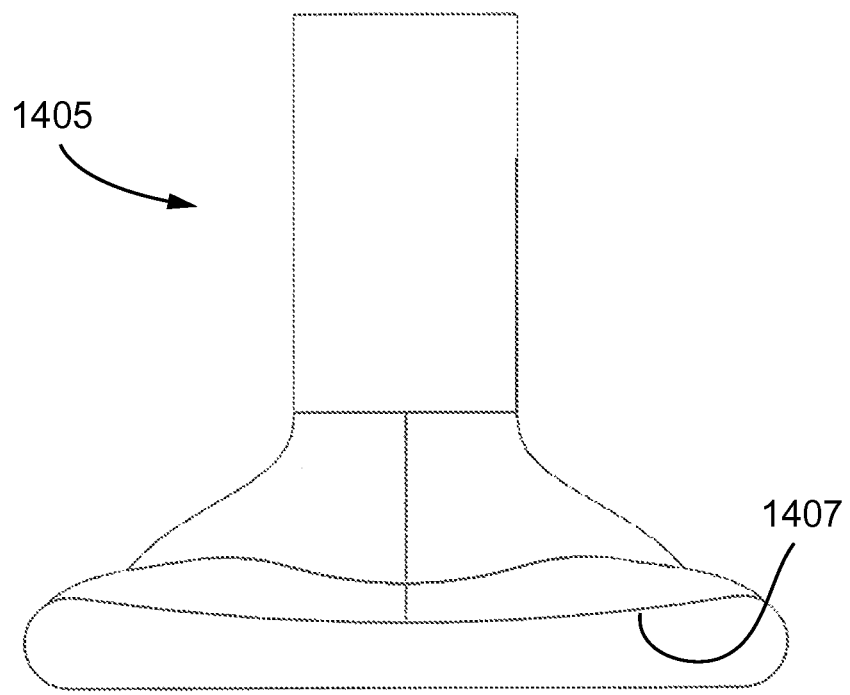
FIG. 50 is a cross-sectional view taken along line 50-50 in FIG. 44.
Figure 51:
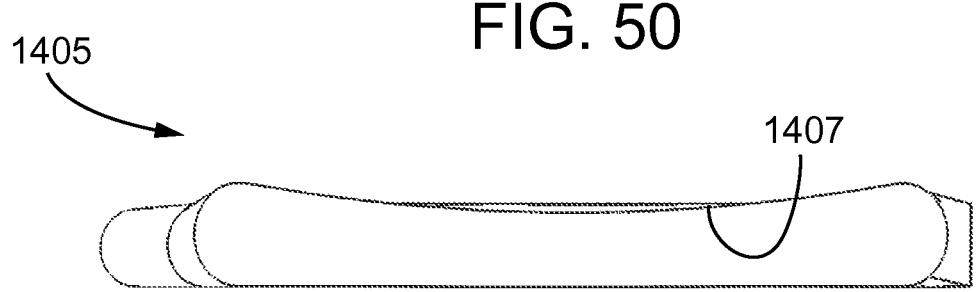
FIG. 51 is a cross-sectional view taken along line 51-51 in FIG. 44.
Figure 52:
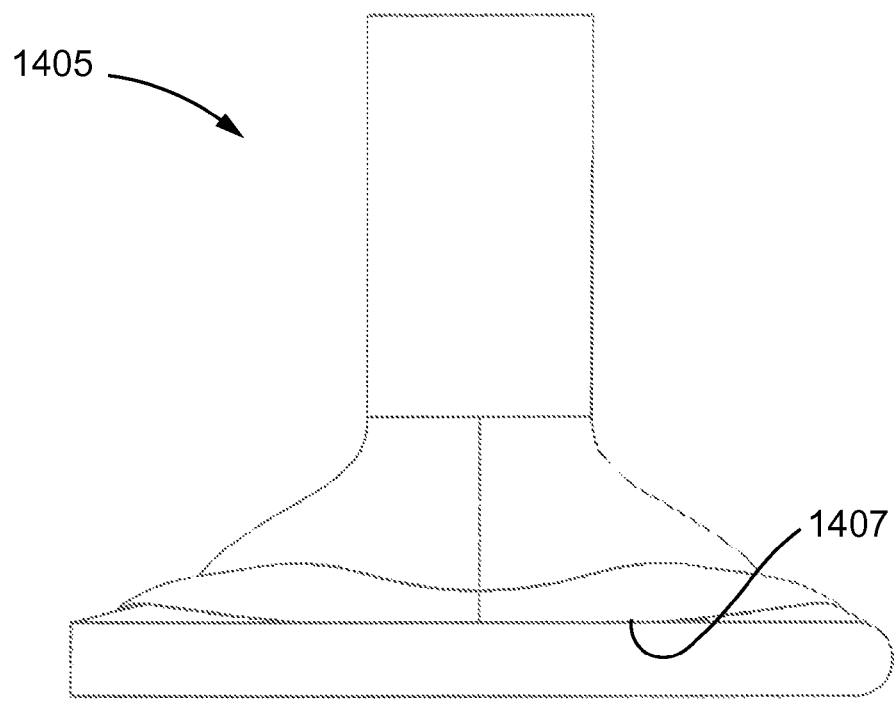
FIG. 52 is a cross-sectional view taken along line 52-52 in FIG. 44.
Figure 53:
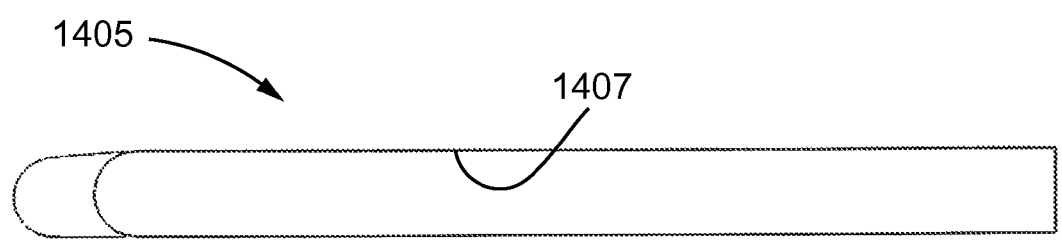
FIG. 53 is a cross-sectional view taken along line 53-53 in FIG. 44.

Referring to FIGS. 45-47, the bulb portion 1720 has an area of expansion 1750 with a cross-sectional flow area that is greater than a cross-sectional flow area of an adjacent area upstream from the area of expansion relative to a flow direction 1752 from the feed inlet 1424 toward the distribution outlet 1430 of the distribution conduit 1428. In embodiments, the bulb portion 1720 has a region 1752 with a cross-sectional area in a plane perpendicular to the first flow axis 1735 that is larger than the cross-sectional area of the feed entry outlet 1711.

The shaped duct 1441 has a convex interior surface 1758 in confronting relationship with the feed entry outlet 1711 of the entry segment 1436. The bulb portion 1720 has a generally radial guide channel 1460 disposed adjacent the convex interior surface. The guide channel 1460 is configured to promote radial flow in a plane substantially perpendicular to the first feed flow axis 1735. Referring to FIG. 45, the convex interior surface 1758 is configured to define a central restriction 1762 in the flow path which also helps increase the average velocity of the slurry in the radial guide channel 1760.

The shaped duct 1441 can be configured such that a flow of slurry moving through a region adjacent the convex interior surface 1758 and adjacent at least one of the lateral sidewalls 1740, 1741 toward the distribution outlet 1430 has a swirl motion ($S_m$) from about zero to about 10, up to about 3 in other embodiments, and from about 0.5 to about 5 in still other embodiments. In embodiments, the flow of slurry moving through the region adjacent the convex interior surface

1758 and adjacent at least one of the lateral sidewalls 1740, 1741 toward the distribution outlet 1430 has a swirl angle ($S_m$) from about 0° to about 84°, and from about 10° to about 80° in other embodiments.

Referring to FIGS. 34 and 35, the transition segment 1730 is in fluid communication with the bulb portion 1720. The illustrated transition segment 1730 extends along the longitudinal axis 50. The transition segment 1730 is configured such that its width, measured along the transverse axis 60, increases in the direction of flow from the bulb portion 1720 to the discharge outlet 1430. The transition segment 1730 extends along a second feed flow axis 1770, which is in non-parallel relationship with the first feed flow axis 1735.

In embodiments, the first feed flow axis 1735 is substantially perpendicular to the longitudinal axis 50. In embodiments, the first feed flow axis 1735 is substantially parallel to the vertical axis 55, which is perpendicular to the longitudinal axis 50 and the transverse axis 60. In embodiments, the second feed flow axis 1770 is disposed at a respective feed angle θ in a range up to about 135° with respect to the longitudinal axis 50.

In embodiments, the feed conduit 1422 includes a bifurcated connector segment 1439 including first and second guide surfaces 1780, 1781. In embodiments, the first and second guide surfaces 1781 can be respectively adapted to redirect first and second flows of slurry entering the feed conduit through the first and second inlets 1424, 1425 by a change in direction angle in a range up to about 135° to an outlet flow direction.

Figure 41:
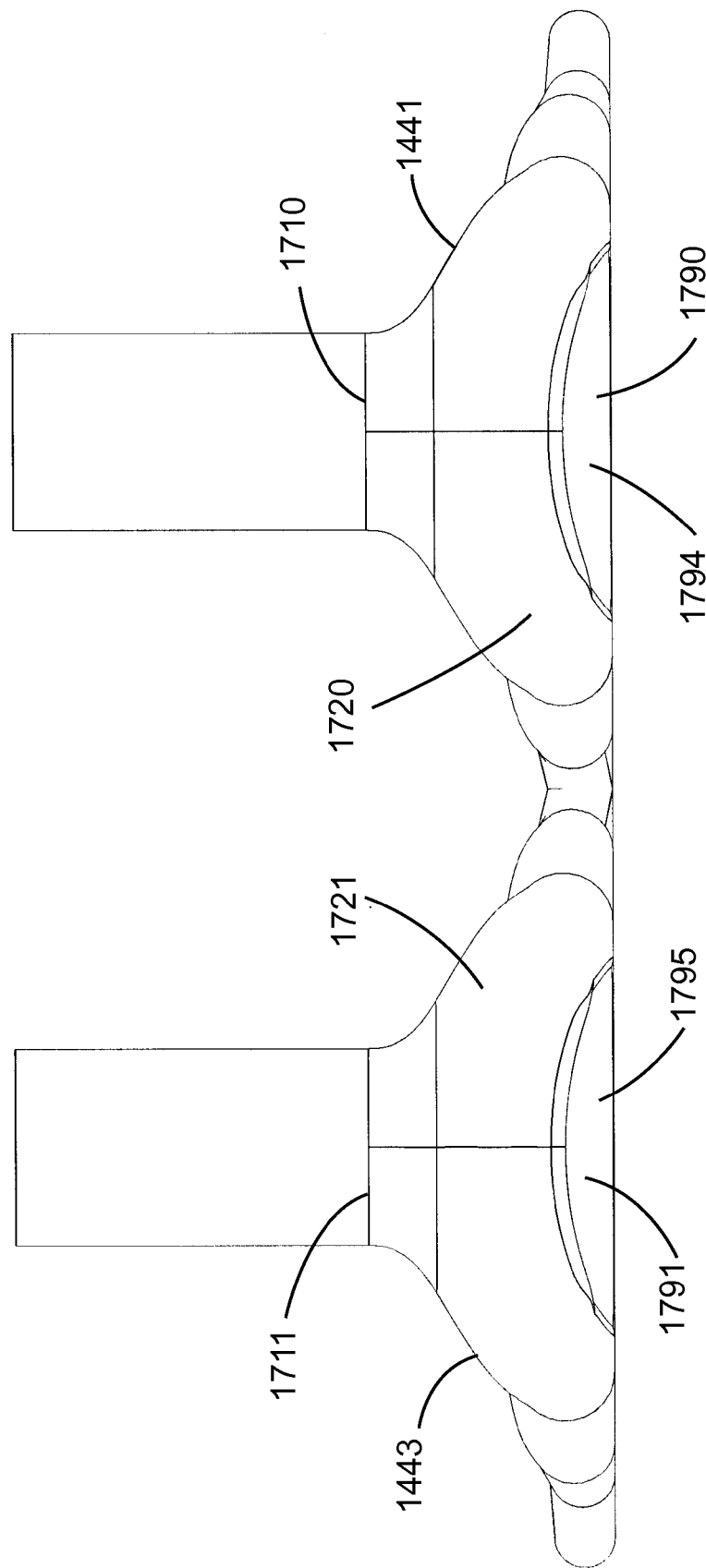
FIG. 41 is a rear elevational view of the slurry distributor of FIG. 22.
Figure 42:
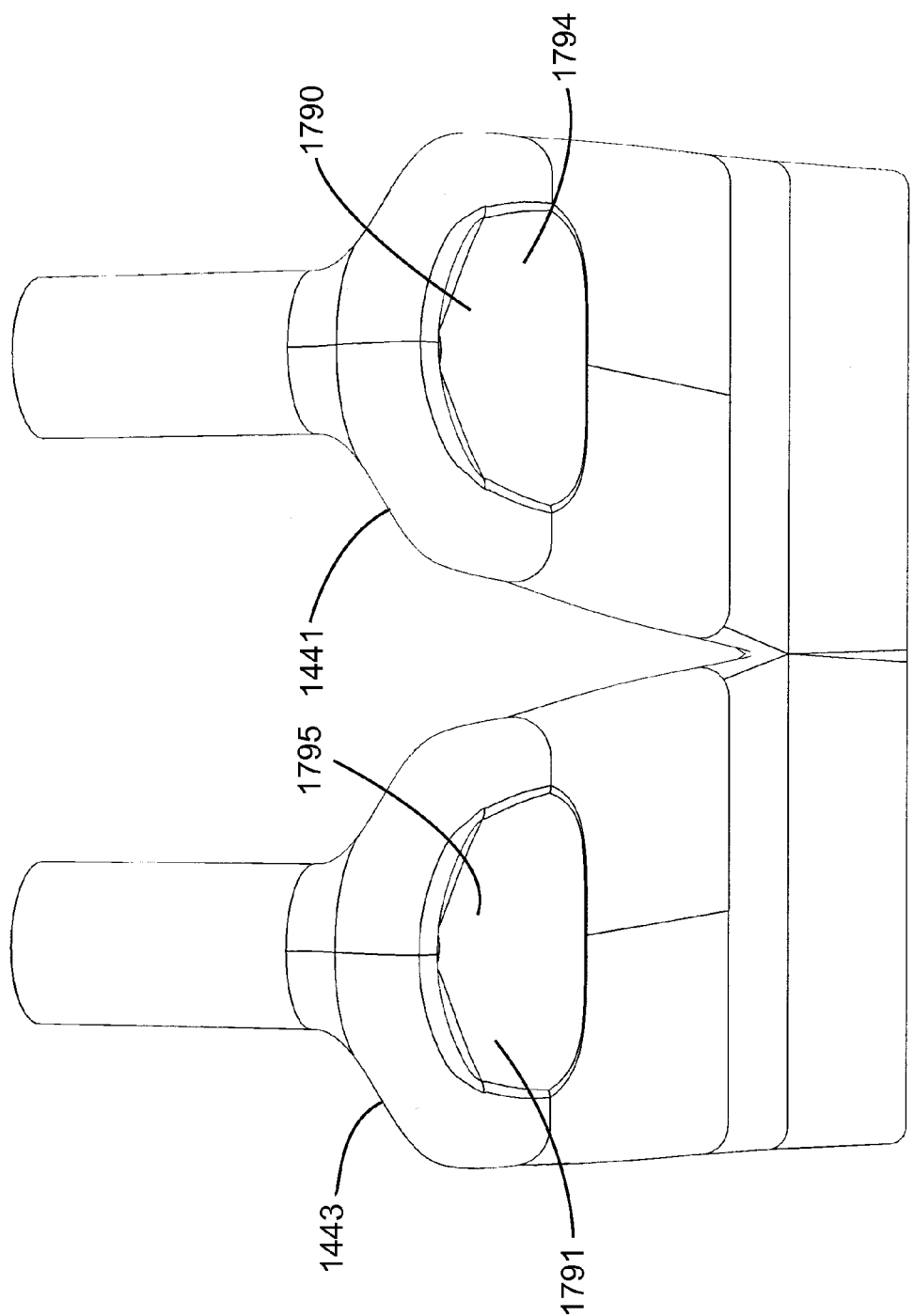
FIG. 42 is a bottom perspective view of the slurry distributor of FIG. 22.
Figure 43:
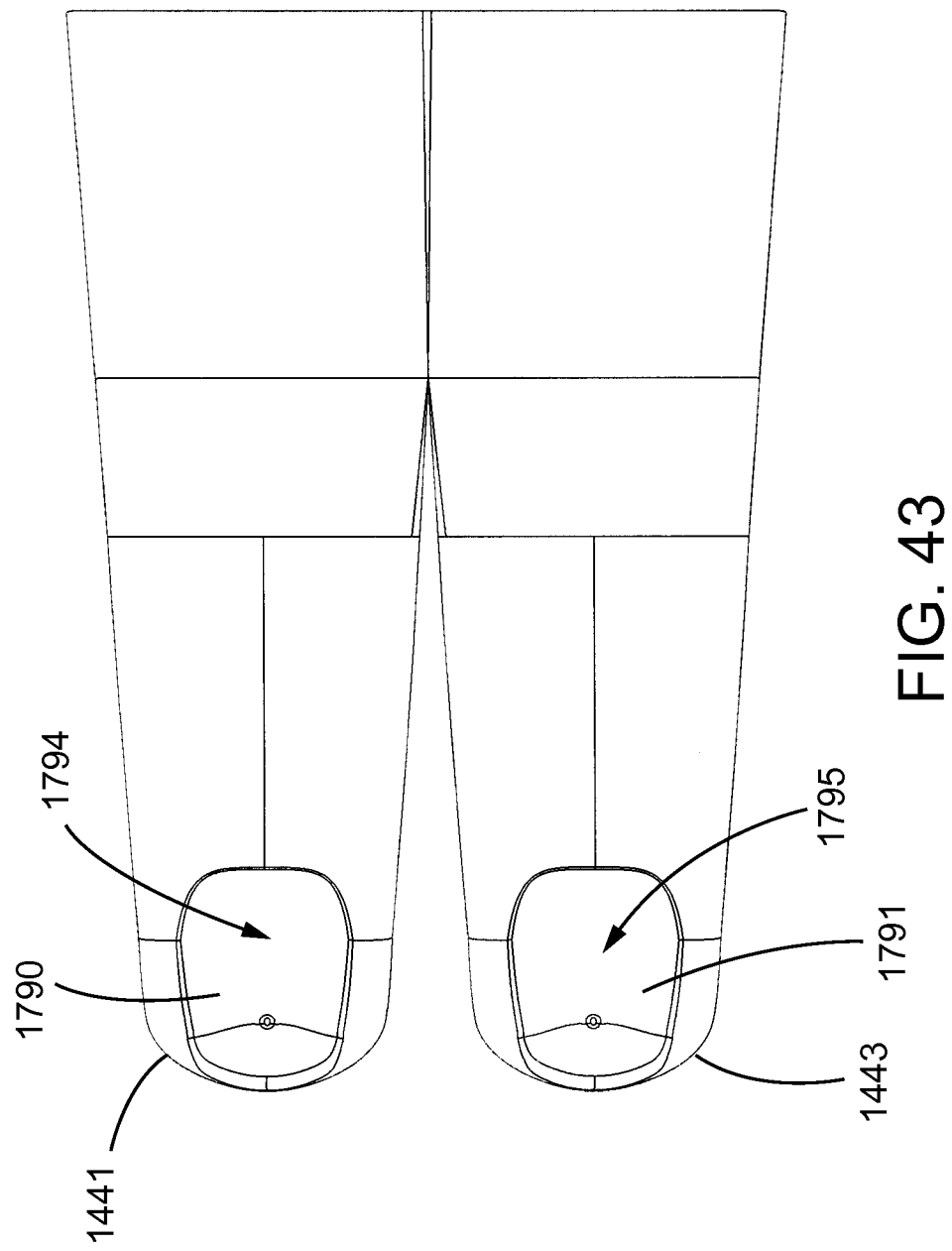
FIG. 43 is a bottom plan view of the slurry distributor of FIG. 22.
Figure 44:
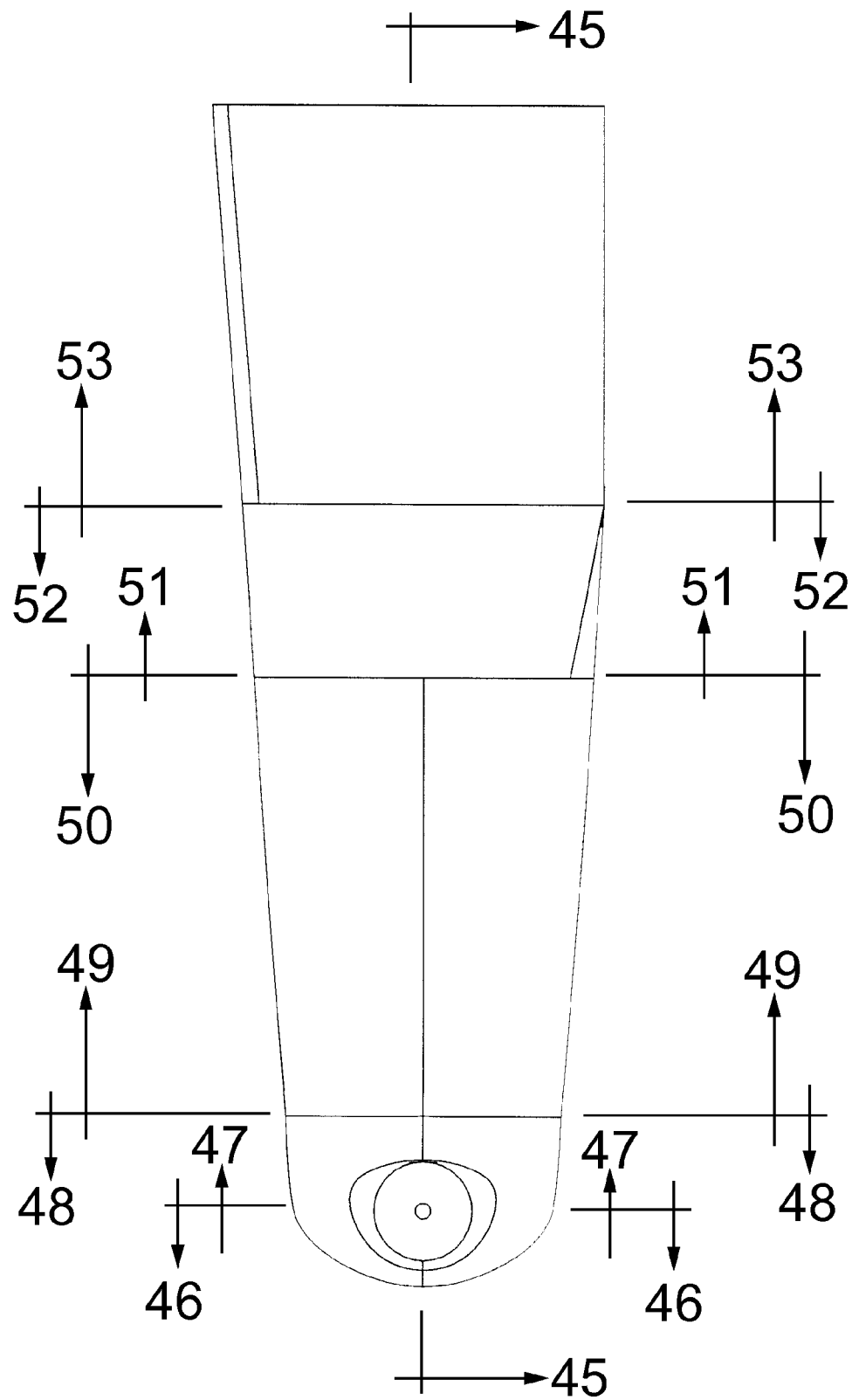
FIG. 44 is a top plan view of a half portion of the slurry distributor of FIG. 22.

Referring to FIGS. 41-43, each of the shaped ducts 1441, 1443 has a concave exterior surface 1790, 1791 substantially complementary to the shape of the convex interior surface 1758 thereof and in underlying relationship therewith. Each concave exterior surface 1790, 1791 defines a recess 1794, 1795.

Figure 27:
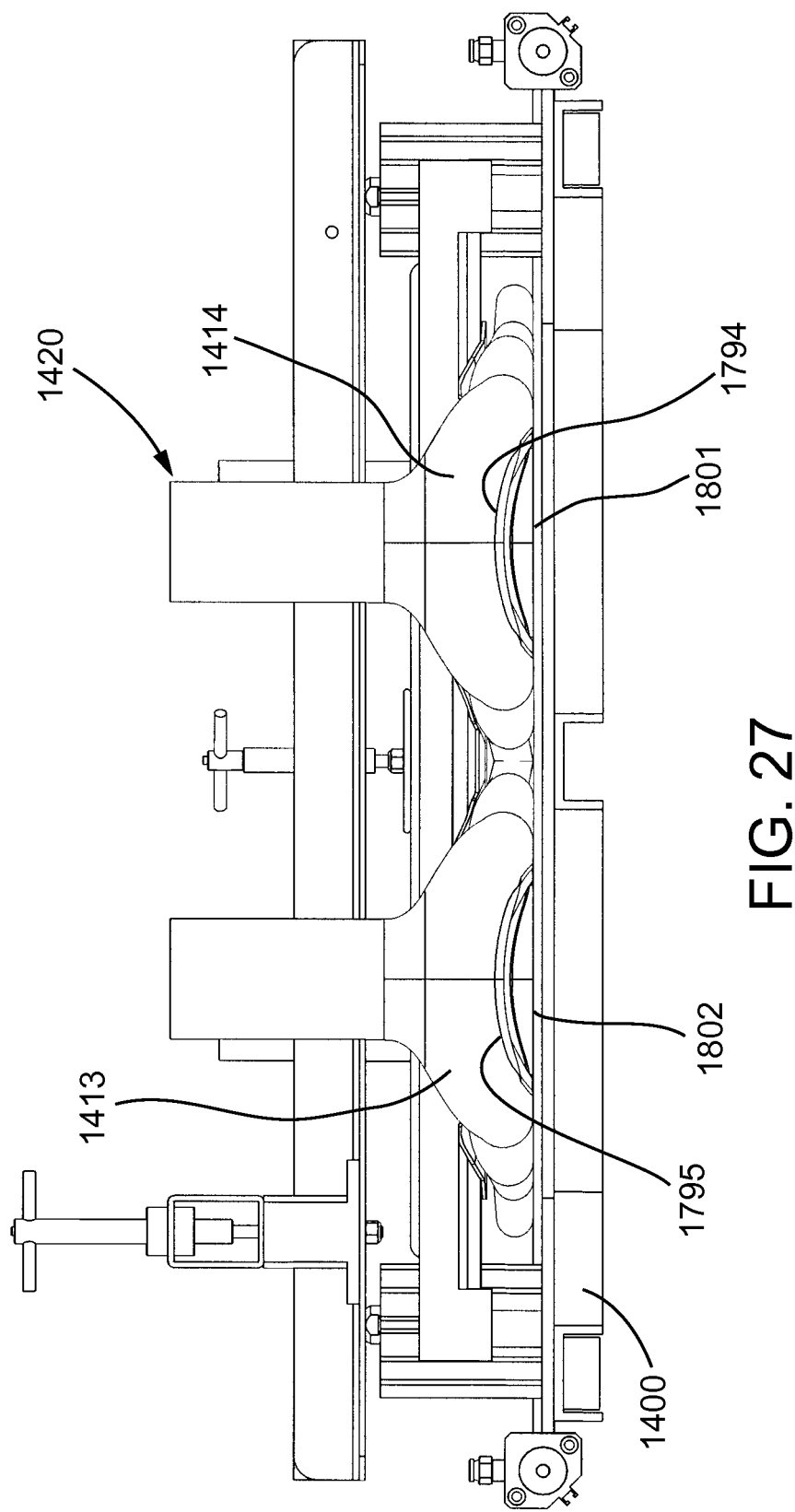
FIG. 27 is a rear elevational view of the slurry distributor and the support system of FIG. 22.
Figure 36:
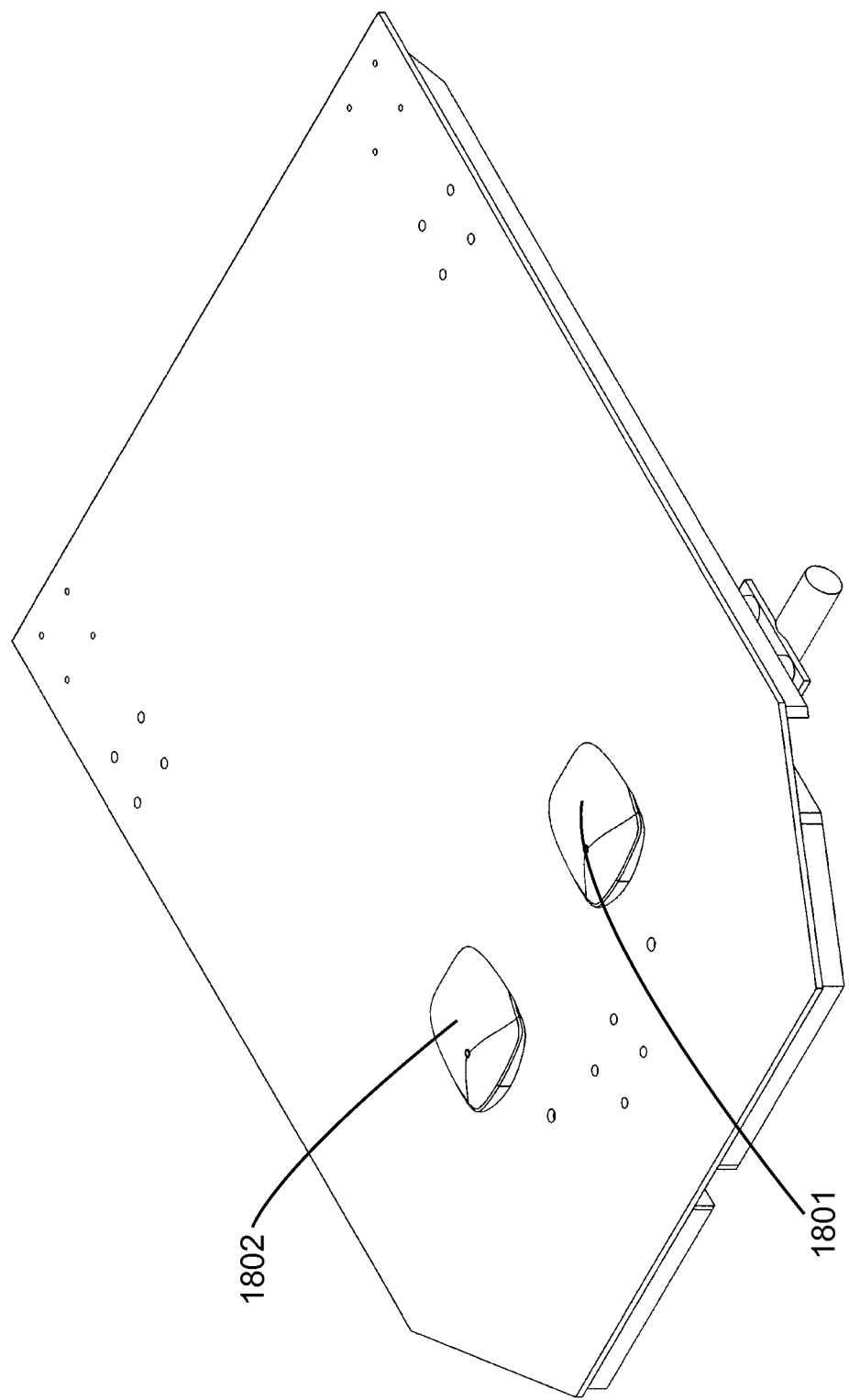
FIG. 36 is a perspective view of a pair of rigid support inserts resting upon a bottom support member of the support system of FIG. 22.

Referring to FIGS. 27, 35, and 36, a support insert 1801, 1802 is disposed within each recess 1794, 1795 of the slurry distributor 1420. The support inserts 1801, 1802 are disposed in underlying relationship to the respective convex interior surfaces of the shaped ducts 1441, 1443. The support inserts 1801, 1802 can be made from any suitable material which will help support the slurry distributor and maintain a desired shape for the overlying interior convex surface. In the illustrated embodiment, the support inserts 1801, 1802 are substantially the same. In other embodiments, different support inserts can be used or in still further embodiments the inserts are not used.

Figure 37:
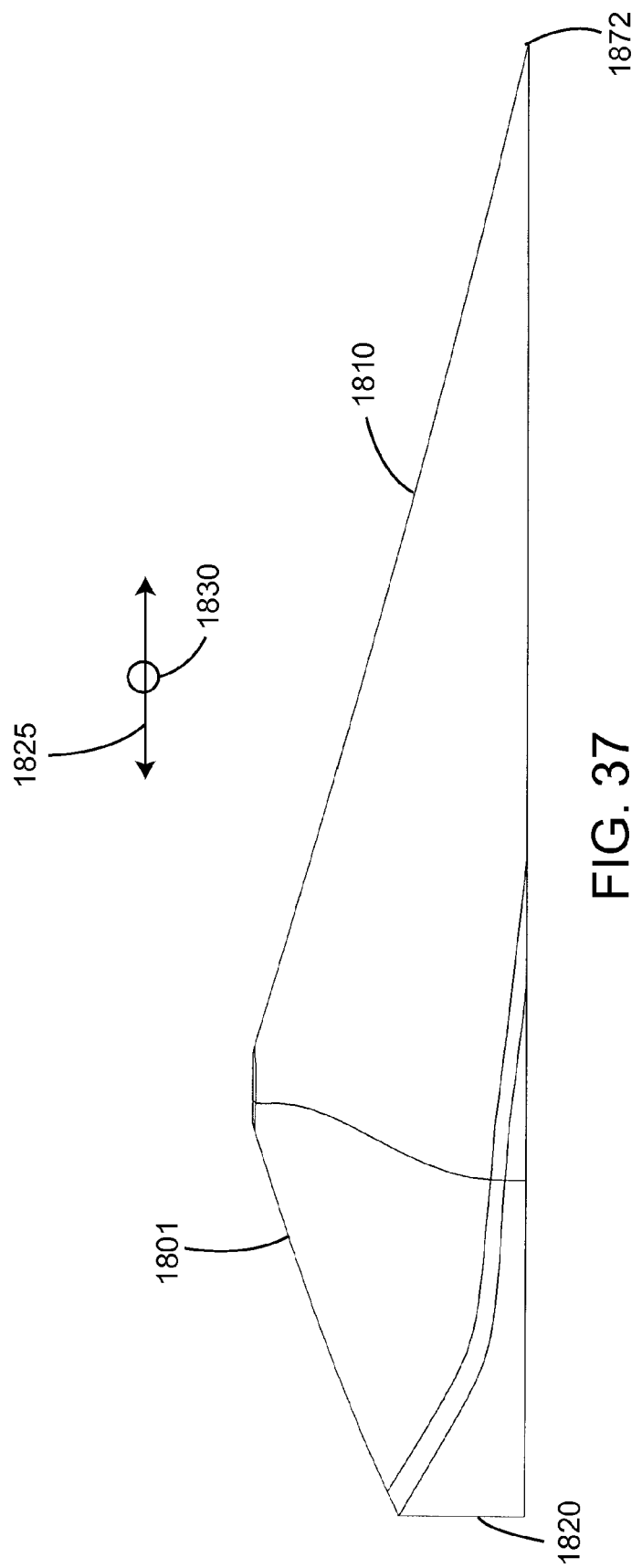
FIG. 37 is a side elevational view of the rigid support insert of FIG. 36.
Figure 38:
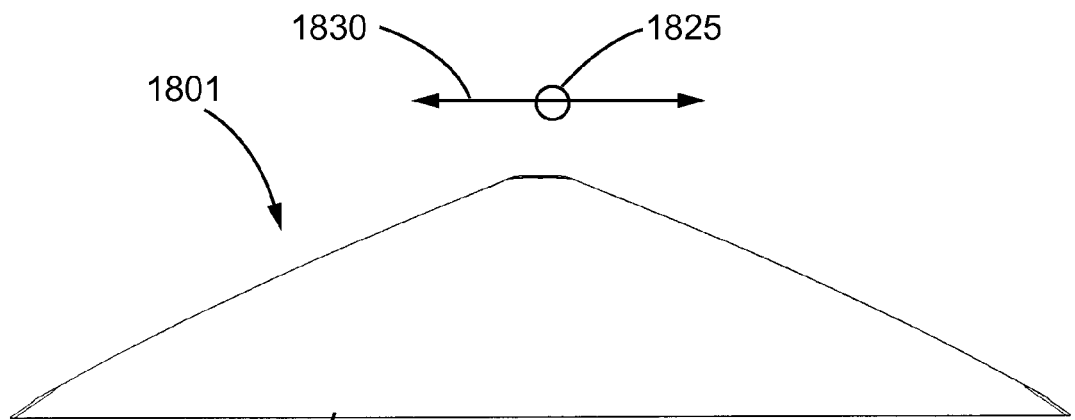
FIG. 38 is a front elevational view of the rigid support insert of FIG. 36.
Figure 39:
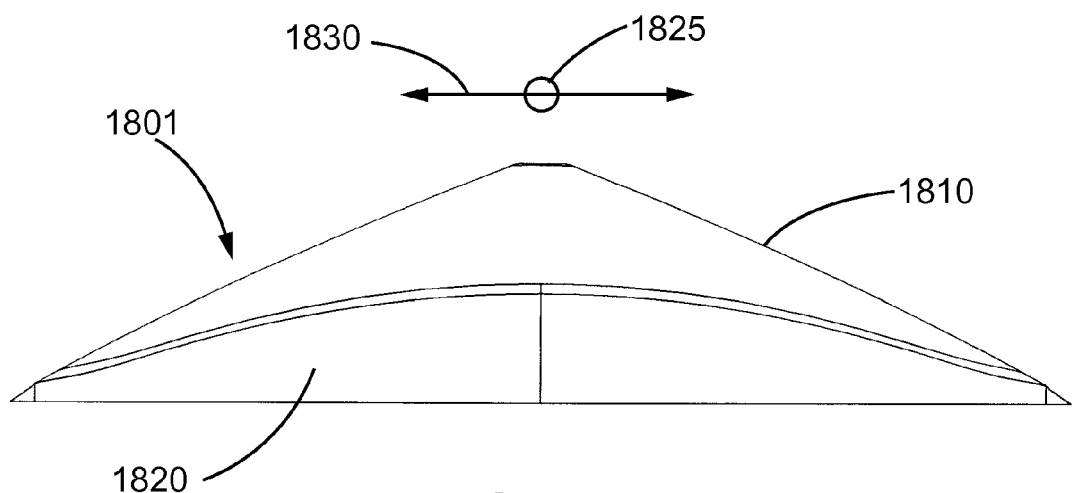
FIG. 39 is a rear elevational view of the rigid support insert of FIG. 36.

Referring to FIGS. 37-39, the rigid support insert 1801 includes a support surface 1810 substantially conforming to the shape of the convex interior surface of the shaped duct. In embodiments, the shaped duct of the slurry distributor can be made from a sufficiently flexible material such that the convex interior surface is defined by support surface 1810 of the support insert 1801. In such cases, the concave exterior surface of the shaped duct can be omitted.

The support insert 1801 includes a feed end 1820 and a distribution end 1822. The support insert 1801 extends along a central support axis 1825. The support insert 1801 is substantially symmetrical about the support axis 1825. The support insert 1801 is asymmetrical about a central axis 1830 perpendicular to the support axis 1825.

Referring to FIG. 34, the distribution conduit 1428 extends generally along the longitudinal axis 50 and includes an entry portion 1452 and a distribution outlet 1430 in fluid communication with the entry portion 1452. The entry portion 1452 is in fluid communication with the first and second feed inlets 1424, 1425 of the feed conduit 1422. The width of the distribution conduit 1428 increases from the entry portion 1452 to the distribution outlet 1430. In other embodiments, however, the width of the distribution conduit 1428 decreases or is constant from the entry portion 1452 to the distribution outlet 1430.

The entry portion 1452 includes an entry opening 1453 having a distribution entry width $W_5$, along the transverse axis 60, and an entry height $H_4$, along the vertical axis 55, wherein the distribution entry width $W_5$ is less than the width $W_2$ of the outlet opening 1481 of the distribution outlet 1430. In other embodiments the distribution entry width $W_5$ is greater than or equal to the width $W_2$ of the outlet opening 1481 of the distribution outlet 1430. In embodiments, the width-to-height ratio of the outlet opening 1481 is about four or more.

In embodiments, at least one of the feed conduit 1422 and the distribution conduit 1428 includes a flow stabilization region adapted to reduce an average feed velocity of a flow of slurry entering the feed inlets 1424, 1425 and moving to the distribution outlet 1430 such that the flow of slurry discharges from the distribution outlet at an average discharge velocity that is at least twenty percent less than the average feed velocity.

FIGS. 44-53 progressively depict the interior geometry 1407 of a half portion 1504 of the slurry distributor 1420 of FIG. 22. The slurry distributor 1420 of FIG. 22 is similar in other respects to the slurry distributor 120 of FIG. 1 and the slurry distributor 420 of FIG. 20.

Any suitable technique for making a slurry distributor constructed in accordance with principles of the present disclosure can be used. For example, in embodiments where the slurry distributor is made from a flexible material, such as PVC or urethane, a multi-piece mold can be used. In some embodiments, the mold piece areas are about 150% or less than the area of the molded slurry distributor through which the mold piece is being pulled during removal, about 125% or less in other embodiments, about 115% or less in still other embodiments, and about 110% or less in yet other embodiments.

Figure 54:
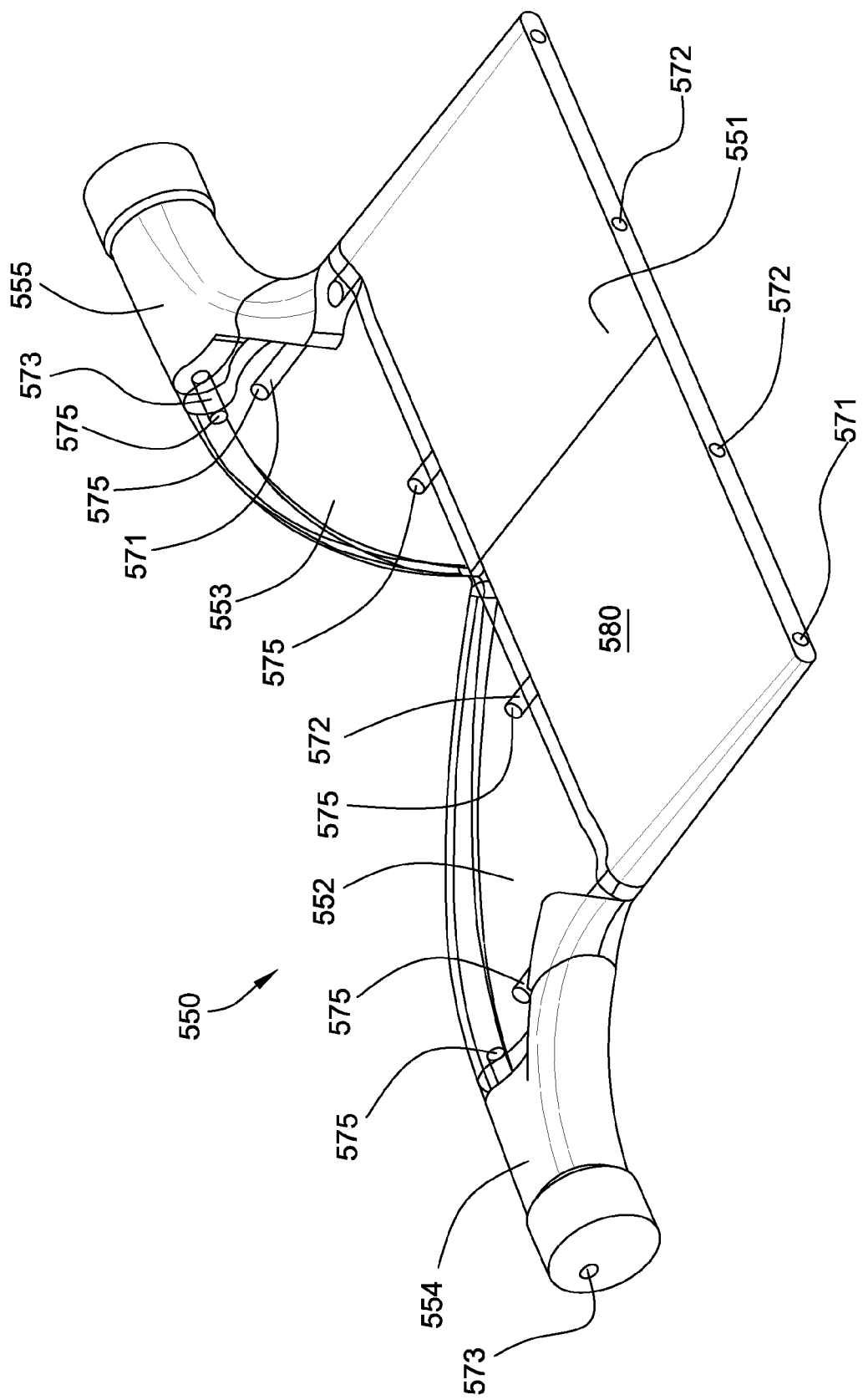
FIG. 54 is a perspective view of an embodiment of a multi-piece mold for making a slurry distributor as in FIG. 1 constructed in accordance with principles of the present disclosure.
Figure 55:
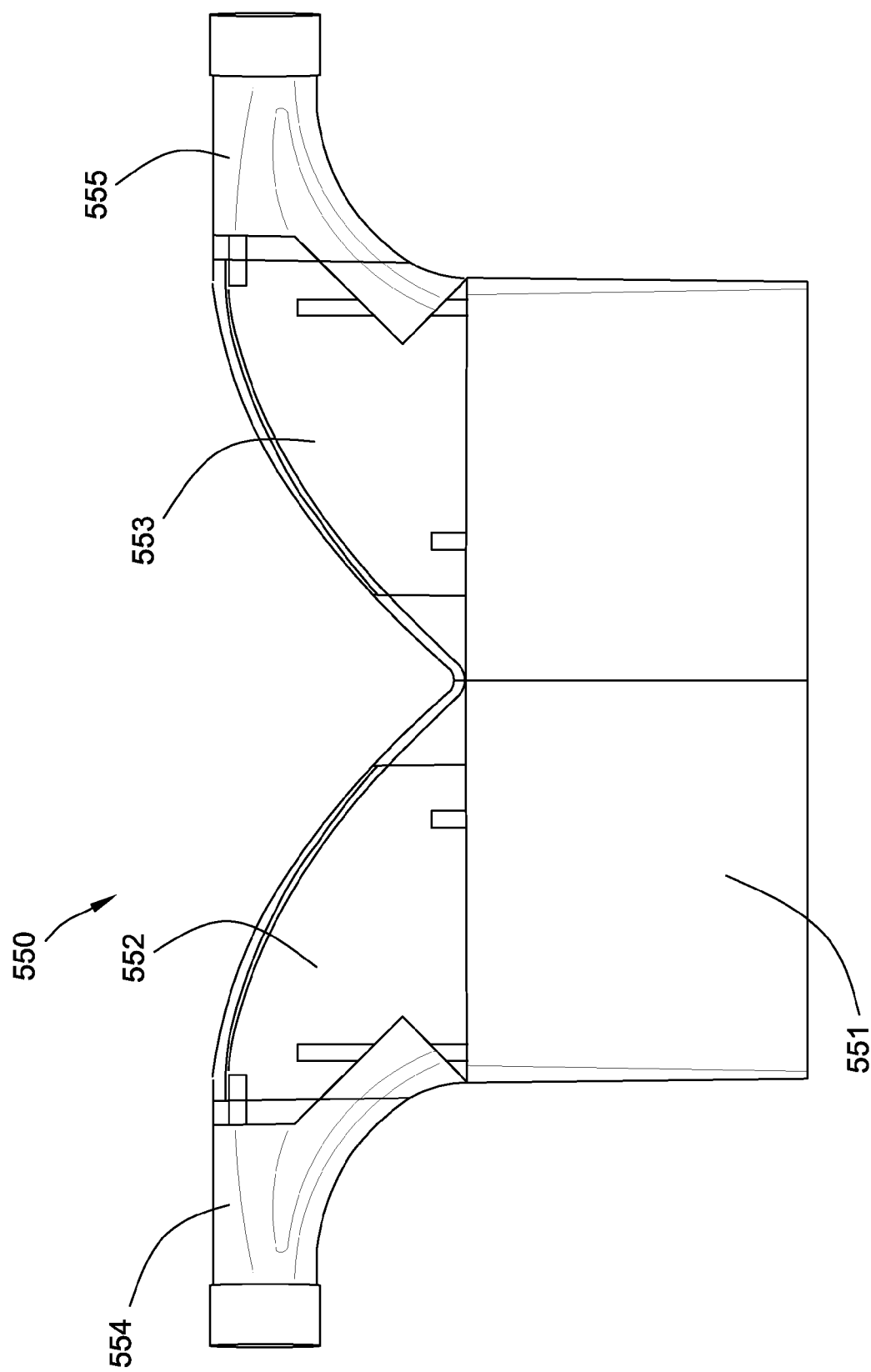
FIG. 55 is a top plan view of the mold of FIG. 54.

Referring to FIGS. 54 and 55, an embodiment of a multi-piece mold 550 suitable for use in making the slurry distributor 120 of FIG. 1 from a flexible material, such as PVC or urethane is shown. The illustrated multi-piece mold 550 includes five mold segments 551, 552, 553, 554, 555. The mold segments 551, 552, 553, 554, 555 of the multi-piece mold 550 can be made from any suitable material, such as aluminum, for example.

In the illustrated embodiment, the distributor conduit mold segment 551 is configured to define the interior flow geometry of the distributor conduit 128. The first and second shaped duct mold segments 552, 553 are configured to define the interior flow geometry of the first and the second shaped ducts 141, 143. The first and second entry mold segments 554, 555 define the interior flow geometry of the first entry segment 136 and the first feed inlet 124 and of the second entry segment 137 and the second feed inlet 125, respectively. In other embodiments, the multi-piece mold can include a different number of mold segments and/or the mold segments can have different shapes and/or sizes.

Referring to FIG. 54, connecting bolts 571, 572, 573 can be inserted through two or more mold segments to interlock and align the mold segments 551, 552, 553, 554, 555 such that a substantially continuous exterior surface 580 of the multi-piece mold 550 is defined. In some embodiments, a distal portion 575 of the connecting bolts 571, 572, 573 includes an external thread that is configured to threadingly engage one of the mold segments 551, 552, 553, 554, 555 to interconnect at least two of the mold segments 551, 552, 553, 554, 555. The exterior surface 580 of the multi-piece mold 550 is configured to define the interior geometry of the molded slurry distributor 120 so that flashing at the joints is reduced. The connecting bolts 571, 572, 573 can be removed to disassemble the multi-piece mold 550 during removal of the mold 550 from the interior of the molded slurry distributor 120.

The assembled multi-piece mold 550 is dipped into a solution of flexible material, such as PVC or urethane, such that the mold 550 is completely submersed in the solution. The mold 550 can then be removed from the dipped material. An amount of the solution can adhere to the exterior surface 580 of the multi-piece mold 550 which will constitute the molded slurry distributor 120 once the solution changes to a solid form. In embodiments, the multi-piece mold 550 can be used in any suitable dipping process to form the molded piece.

By making the mold 550 out of multiple separate aluminum pieces—in the illustrated embodiment, five pieces—that have been designed to fit together to provide the desired interior flow geometry, the mold segments 551, 552, 553, 554, 555 can be disengaged from each other and pulled out from the solution once it has begun to set but while it is still warm. At sufficiently-high temperatures, the flexible material is pliable enough to pull larger calculated areas of the aluminum mold pieces 551, 552, 553, 554, 555 through the smaller calculated areas of the molded slurry distributor 120 without tearing it. In some embodiments, the largest mold piece area is up to about 150% of the smallest area of the molded slurry distributor cavity area through which the particular mold piece traverses transversely during the removal process, up to about 125% in other embodiments, up to about 115% in still other embodiments, and up to about 110% in yet other embodiments.

Figure 56:
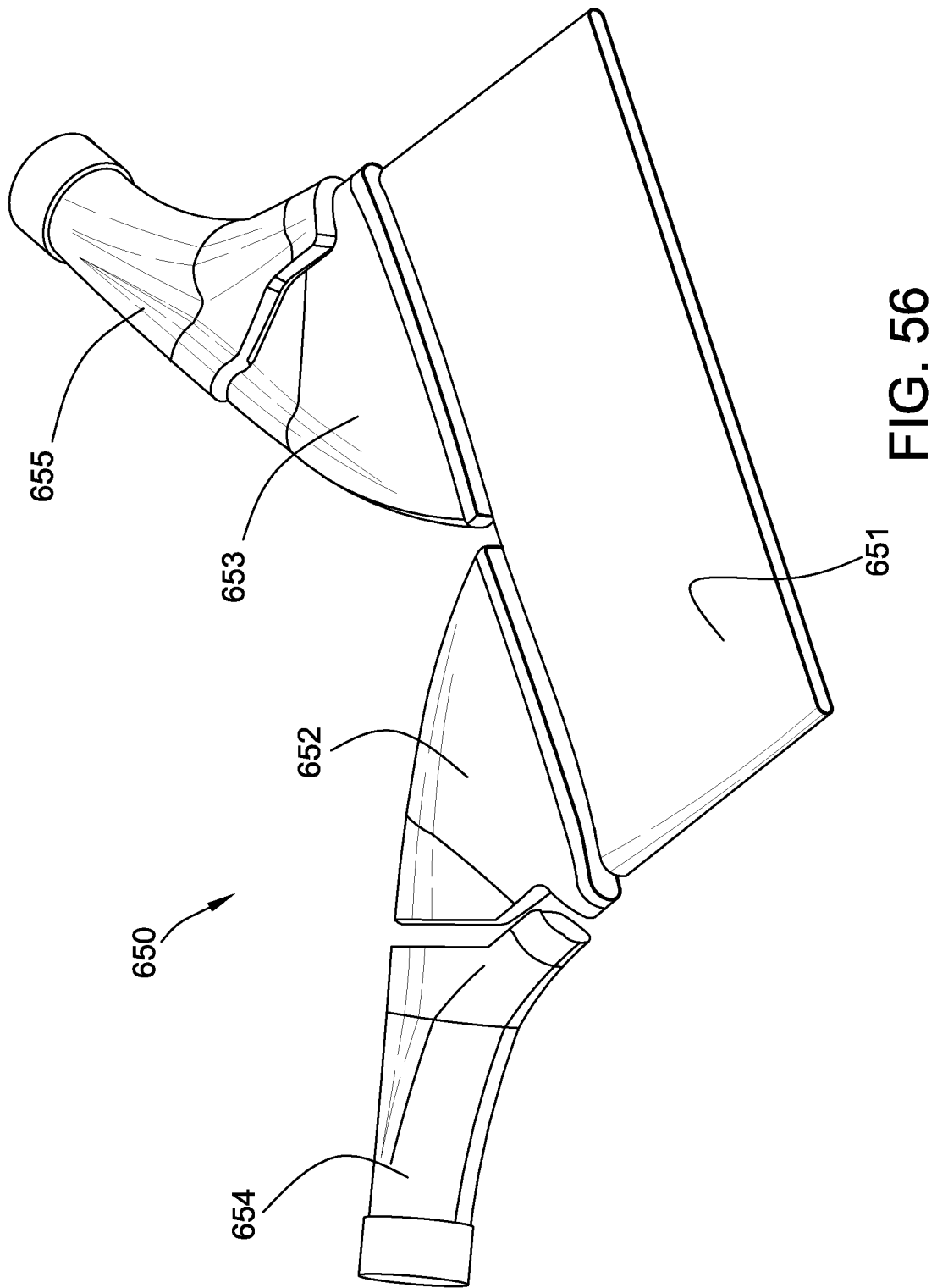
FIG. 56 is an exploded view of an embodiment of a multi-piece mold for making a slurry distributor as in FIG. 15 constructed in accordance with principles of the present disclosure.

Referring to FIG. 56, an embodiment of a multi-piece mold 650 suitable for use in making the slurry distributor 320 of FIG. 6 from a flexible material, such as PVC or urethane is shown. The illustrated multi-piece mold 650 includes five mold segments 651, 652, 653, 654, 655. The mold segments 651, 652, 653, 654, 655 of the multi-piece mold 550 can be made from any suitable material, such as aluminum, for example. The mold segments 651, 652, 653, 654, 655 are shown in a disassembled condition in FIG. 56.

Connecting bolts can be used to removably connect the mold segments 651, 652, 653, 654, 655 together to assemble the mold 650 such that a substantially continuous exterior surface of the multi-piece mold 650 is defined. The exterior surface of the multi-piece mold 650 defines the internal flow geometry of the slurry distributor 220 of FIG. 6. The mold 650 can be similar in construction to the mold 550 of FIGS. 54 and 55 in that each piece of the mold 650 of FIG. 56 is constructed such that its area is within a predetermined amount of the smallest area of the molded slurry distributor 220 through which the mold piece must traverse when it is being removed (e.g., up to about 150% of the smallest area of the molded slurry distributor cavity area through which the particular mold piece traverses transversely during the removal process in some embodiments, up to about 125% in other embodiments, up to about 115% in still other embodiments, and up to about 110% in yet other embodiments).

Figure 57:
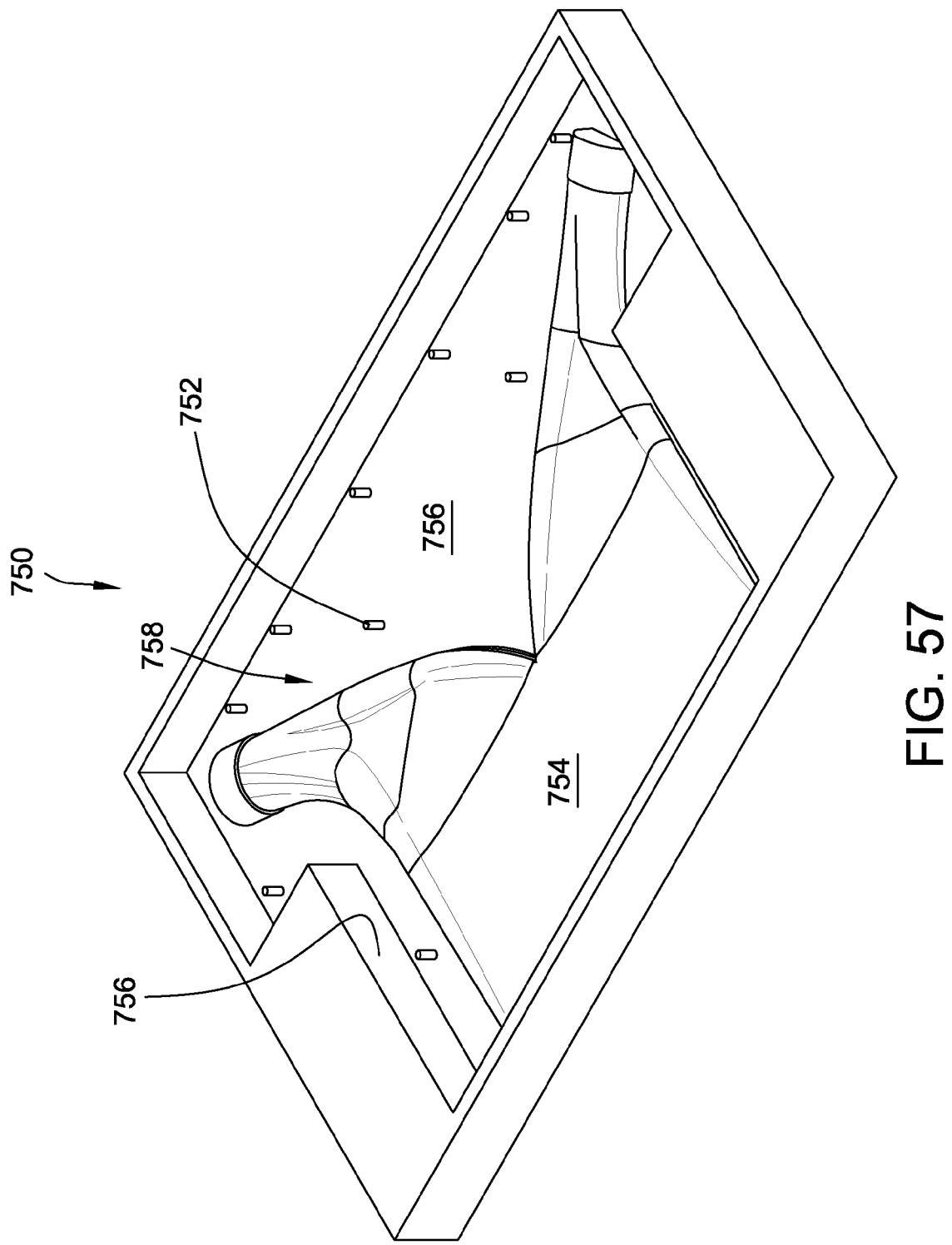
FIG. 57 is a perspective view of another embodiment of a mold for making a piece of a two-piece slurry distributor constructed in accordance with principles of the present disclosure.
Figure 58:
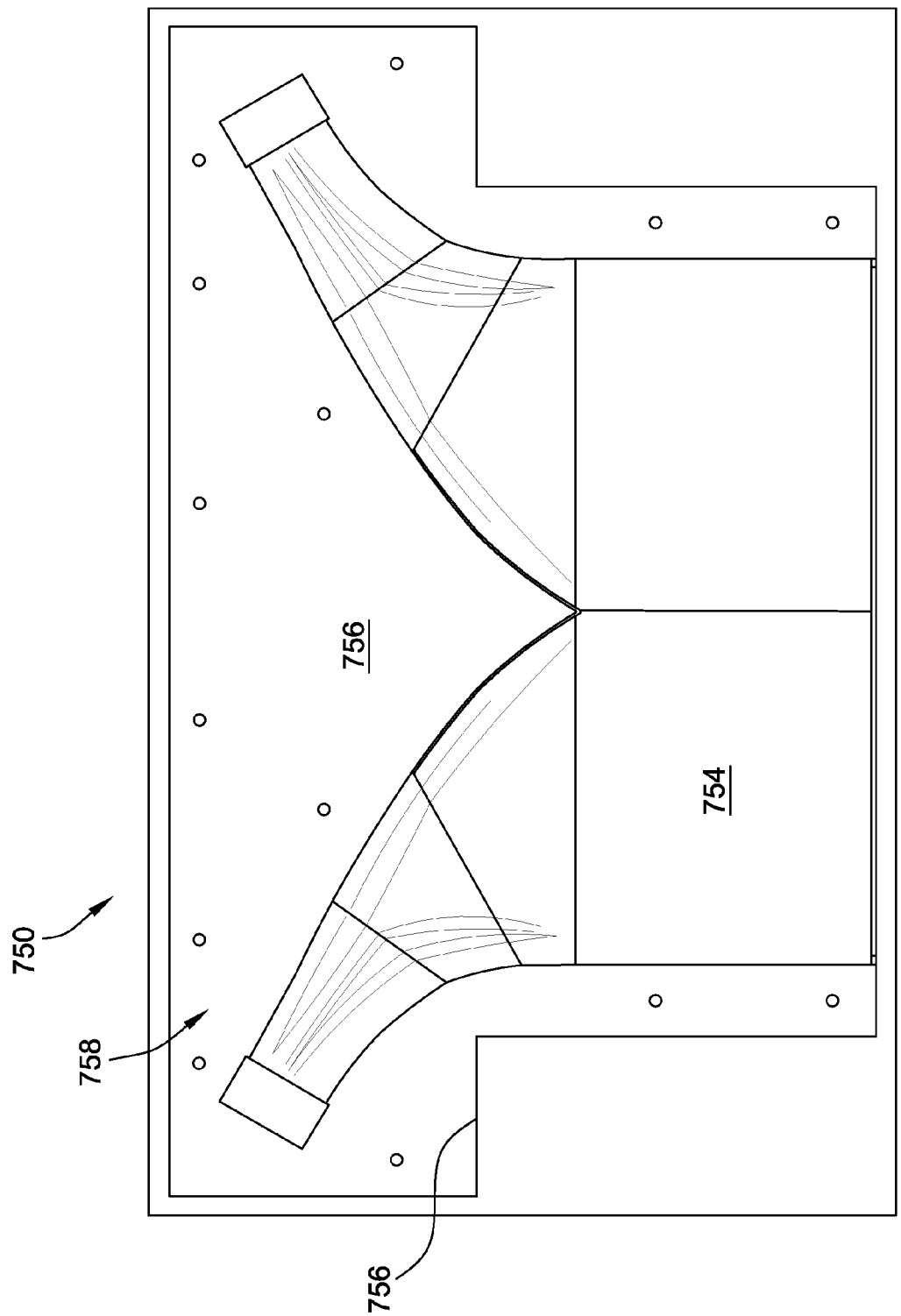
FIG. 58 is a top plan view of the mold of FIG. 57.

Referring to FIGS. 57 and 58, an embodiment of a mold 750 for use in making one of the pieces 221, 223 of the two-piece slurry distributor 220 of FIG. 4 is shown. Referring to FIG. 57, mounting bore-defining elements 752 can be included to define mounting bores in the piece of the two-piece slurry distributor 220 of FIG. 4 being made to facilitate its connection with the other piece.

Referring to FIGS. 57 and 58, the mold 750 includes a mold surface 754 projecting from a bottom surface 756 of the mold 750. A boundary wall 756 extends along the vertical axis and defines the depth of the mold. The mold surface 754 is disposed within the boundary wall 756. The boundary wall 756 is configured to allow the volume of a cavity 758 defined within the boundary wall to be filled with molten mold material such that the mold surface 754 is immersed. The mold surface 754 is configured to be a negative image of the interior flow geometry defined by the particular piece of the two-piece distributor being molded.

In use, the cavity 758 of the mold 750 can be filled with a molten material such that the mold surface is immersed and the cavity 758 is filled with molten material. The molten material can be allowed to cool and removed from the mold 750. Another mold can be used to form the mating piece of the slurry distributor 220 of FIG. 4.

Figure 59:
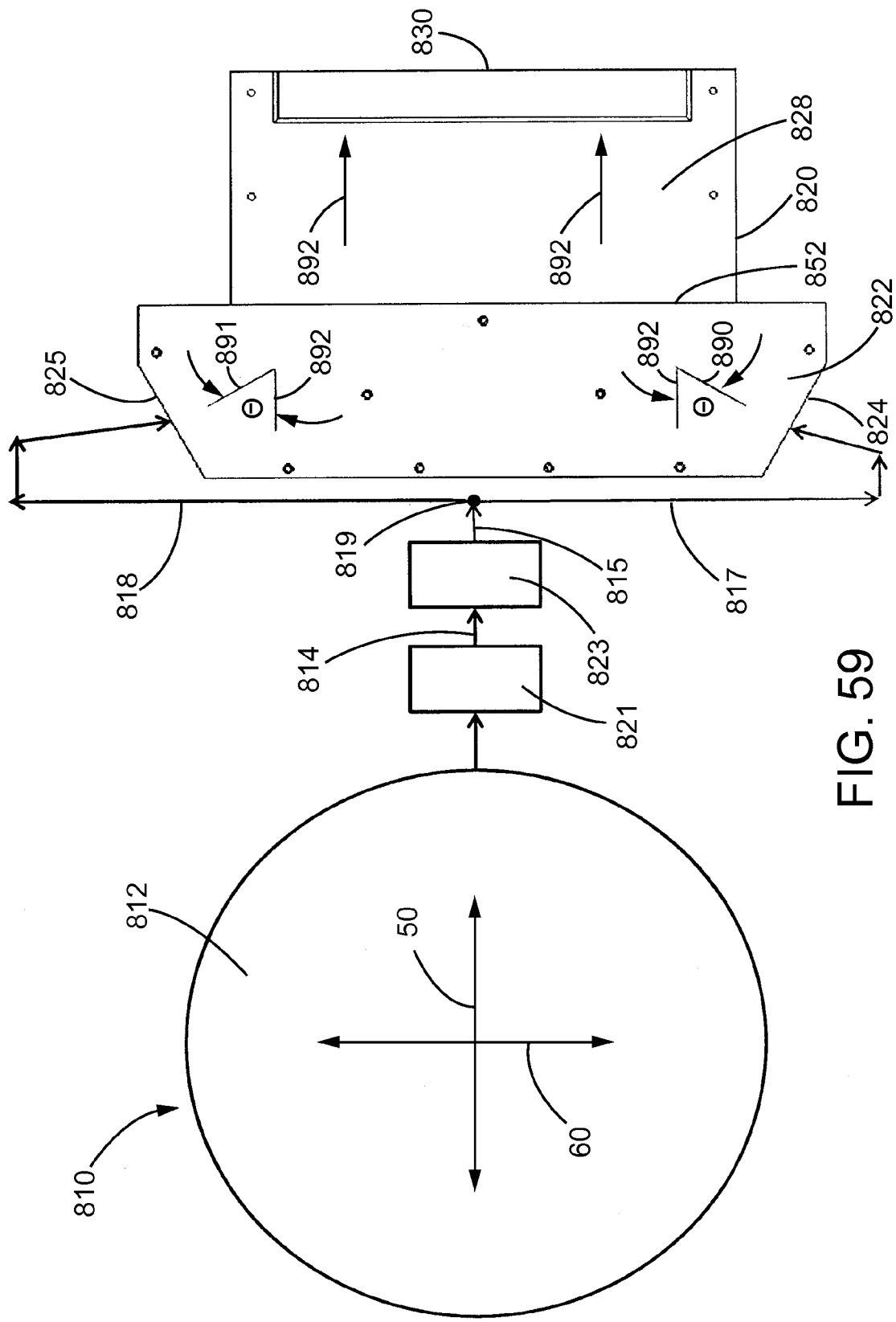
FIG. 59 is a schematic plan diagram of an embodiment of a gypsum slurry mixing and dispensing assembly including a slurry distributor in accordance with principles of the present disclosure.

Referring to FIG. 59, an embodiment of a gypsum slurry mixing and dispensing assembly 810 includes a gypsum slurry mixer 912 in fluid communication with a slurry distributor 820 similar to the slurry distributor 320 shown in FIG. 6. The gypsum slurry mixer 812 is adapted to agitate water and calcined gypsum to form an aqueous calcined gypsum slurry. Both the water and the calcined gypsum can be supplied to the mixer 812 via one or more inlets as is known in the art. Any suitable mixer (e.g., a pin mixer) can be used with the slurry distributor.

The slurry distributor 820 is in fluid communication with the gypsum slurry mixer 812. The slurry distributor 820 includes a first feed inlet 824 adapted to receive a first flow of aqueous calcined gypsum slurry from the gypsum slurry mixer 812 moving in a first feed direction 890, a second feed inlet 825 adapted to receive a second flow of aqueous calcined gypsum slurry from the gypsum slurry mixer 812 moving in a second feed direction 891, and a distribution outlet 830 in fluid communication with both the first and the second feed inlets 824, 825 and adapted such that the first and second flows of aqueous calcined gypsum slurry discharge from the slurry distributor 820 through the distribution outlet 830 substantially along a machine direction 50.

The slurry distributor 820 includes a feed conduit 822 in fluid communication with a distribution conduit 828. The feed conduit includes the first feed inlet 824 and the second feed inlet 825 disposed in spaced relationship to the first feed inlet 824, which are both disposed at a feed angle θ of about 60° with respect to the machine direction 50. The feed conduit 822 includes structure therein adapted to receive the first and second flows of slurry moving in the first and second feed flow direction 890, 891 and redirect the slurry flow direction by a change in direction angle α (see FIG. 9) such that the first and second flows of slurry are conveyed into the distribution conduit 828 moving substantially in the outlet flow direction 892, which is substantially aligned with the machine direction 50. The first and second feed inlets 824, 825 each has an opening with a cross-sectional area, and the entry portion 852 of the distribution conduit 828 has an opening with a cross-sectional area which is greater than the sum of the cross-sectional areas of the openings of the first and second feed inlets 824, 825.

The distribution conduit 828 extends generally along the longitudinal axis or machine direction 50, which is substantially perpendicular to a transverse axis 60. The distribution conduit 828 includes an entry portion 852 and the distribution outlet 830. The entry portion 852 is in fluid communication with the first and second feed inlets 824, 825 of the feed conduit 822 such that the entry portion 852 is adapted to receive both the first and the second flows of aqueous calcined gypsum slurry therefrom. The distribution outlet 830 is in fluid communication with the entry portion 852. The distribution outlet 830 of the distribution conduit 828 extends a predetermined distance along the transverse axis 60 to facilitate the discharge of the combined first and second flows of aqueous calcined gypsum slurry in the cross-machine direction or along the transverse axis 60. The slurry distributor 820 can be similar in other respects to the slurry distributor 320 of FIG. 6.

A delivery conduit 814 is disposed between and in fluid communication with the gypsum slurry mixer 812 and the slurry distributor 820. The delivery conduit 814 includes a main delivery trunk 815, a first delivery branch 817 in fluid communication with the first feed inlet 824 of the slurry distributor 820, and a second delivery branch 818 in fluid communication with the second feed inlet 825 of the slurry distributor 820. The main delivery trunk 815 is in fluid communication with both the first and second delivery branches 817, 818. In other embodiments, the first and second delivery branches 817, 818 can be in independent fluid communication with the gypsum slurry mixer 812.

The delivery conduit 814 can be made from any suitable material and can have different shapes. In some embodiments, the delivery conduit 814 can comprise a flexible conduit.

An aqueous foam supply conduit 821 can be in fluid communication with at least one of the gypsum slurry mixer 812 and the delivery conduit 814. An aqueous foam from a source can be added to the constituent materials through the foam supply conduit 821 at any suitable location downstream of the mixer 812 and/or in the mixer 812 itself to form a foamed gypsum slurry that is provided to the slurry distributor 220. In the illustrated embodiment, the foam supply conduit 821 is disposed downstream of the gypsum slurry mixer 812. In the illustrated embodiment, the aqueous foam supply conduit 821 has a manifold-type arrangement for supplying foam to an injection ring or block associated with the delivery conduit 814 as described in U.S. Pat. No. 6,874,930, for example.

In other embodiments, one or more foam supply conduits can be provided that are in fluid communication with the mixer 812. In yet other embodiments, the aqueous foam supply conduit(s) can be in fluid communication with the gypsum slurry mixer alone. As will be appreciated by those skilled in the art, the means for introducing aqueous foam into the gypsum slurry in the gypsum slurry mixing and dispensing assembly 810, including its relative location in the assembly, can be varied and/or optimized to provide a uniform dispersion of aqueous foam in the gypsum slurry to produce board that is fit for its intended purpose.

Any suitable foaming agent can be used. Preferably, the aqueous foam is produced in a continuous manner in which a stream of the mix of foaming agent and water is directed to a foam generator, and a stream of the resultant aqueous foam leaves the generator and is directed to and mixed with the calcined gypsum slurry. Some examples of suitable foaming agents are described in U.S. Pat. Nos. 5,683,635 and 5,643,510, for example.

When the foamed gypsum slurry sets and is dried, the foam dispersed in the slurry produces air voids therein which act to lower the overall density of the wallboard. The amount of foam and/or amount of air in the foam can be varied to adjust the dry board density such that the resulting wallboard product is within a desired weight range.

One or more flow-modifying elements 823 can be associated with the delivery conduit 814 and adapted to control the first and the second flows of aqueous calcined gypsum slurry from the gypsum slurry mixer 812. The flow-modifying element(s) 823 can be used to control an operating characteristic of the first and second flows of aqueous calcined gypsum slurry. In the illustrated embodiment of FIG. 59, the flow-modifying element(s) 823 is associated with the main delivery trunk 815. Examples of suitable flow-modifying elements include volume restrictors, pressure reducers, constrictor valves, canisters, etc., including those described in U.S. Pat. Nos. 6,494,609; 6,874,930; 7,007,914; and 7,296,919, for example.

The main delivery trunk 815 can be joined to the first and second delivery branches 817, 818 via a suitable Y-shaped flow splitter 819. The flow splitter 819 is disposed between the main delivery trunk 815 and the first delivery branch 817 and between the main delivery trunk 815 and the second delivery branch 818. In some embodiments, the flow splitter 819 can be adapted to help split the first and second flows of gypsum slurry such that they are substantially equal. In other embodiments, additional components can be added to help regulate the first and second flows of slurry.

In use, an aqueous calcined gypsum slurry is discharged from the mixer 812. The aqueous calcined gypsum slurry from the mixer 812 is split in the flow splitter 819 into the first flow of aqueous calcined gypsum slurry and the second flow of aqueous calcined gypsum slurry. The aqueous calcined gypsum slurry from the mixer 812 can be split such that the first and second flows of aqueous calcined gypsum slurry are substantially balanced.

Figure 60:
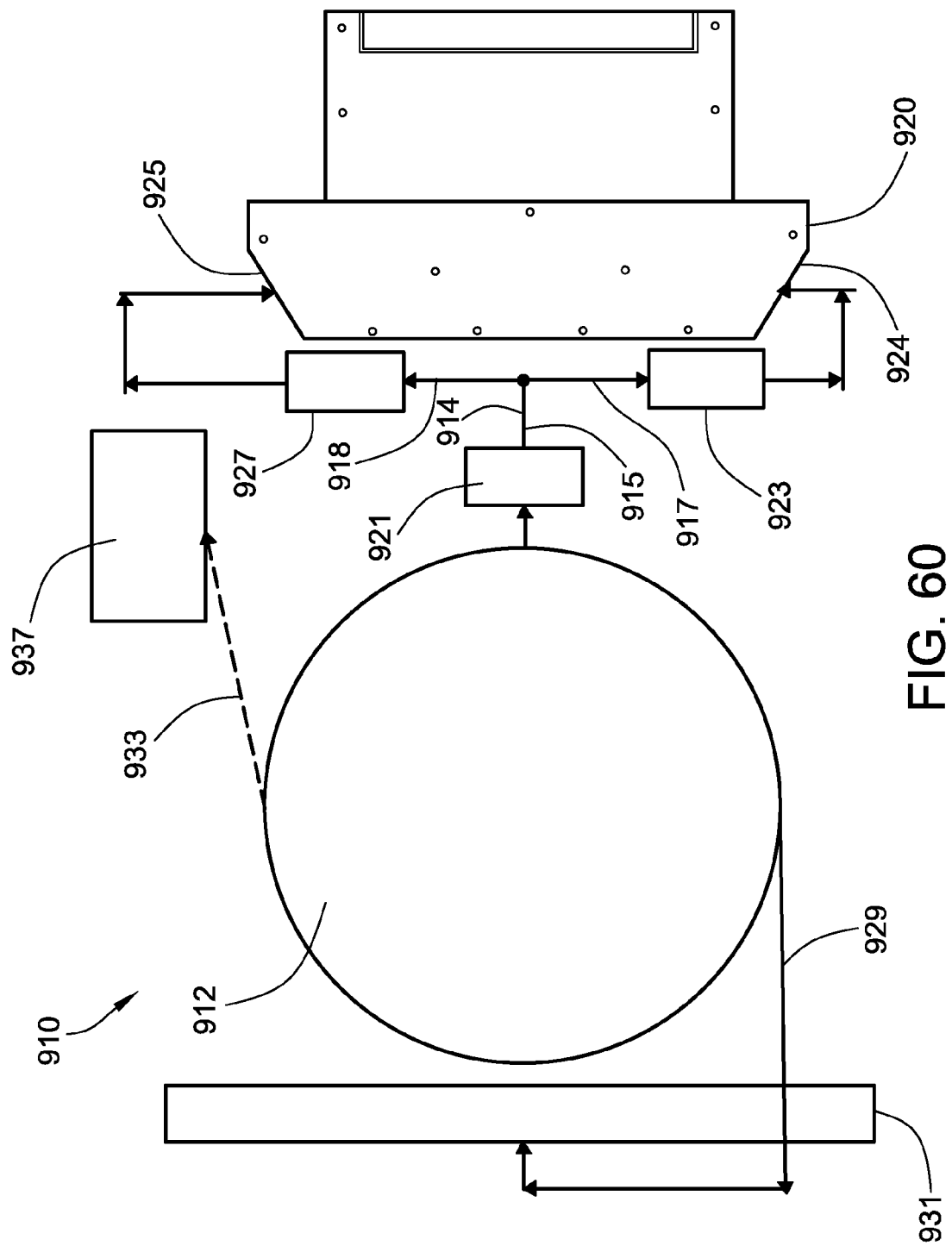
FIG. 60 is a schematic plan diagram of another embodiment of a gypsum slurry mixing and dispensing assembly including a slurry distributor in accordance with principles of the present disclosure.

Referring to FIG. 60, another embodiment of a gypsum slurry mixing and dispensing assembly 910 is shown. The gypsum slurry mixing and dispensing assembly 910 includes a gypsum slurry mixer 912 in fluid communication with a slurry distributor 920. The gypsum slurry mixer 912 is adapted to agitate water and calcined gypsum to form an aqueous calcined gypsum slurry. The slurry distributor 920 can be similar in construction and function to the slurry distributor 320 of FIG. 6.

A delivery conduit 914 is disposed between and in fluid communication with the gypsum slurry mixer 912 and the slurry distributor 920. The delivery conduit 914 includes a main delivery trunk 915, a first delivery branch 917 in fluid communication with the first feed inlet 924 of the slurry distributor 920, and a second delivery branch 918 in fluid communication with the second feed inlet 925 of the slurry distributor 920.

The main delivery trunk 915 is disposed between and in fluid communication with the gypsum slurry mixer 912 and both the first and the second delivery branches 917, 918. An aqueous foam supply conduit 921 can be in fluid communication with at least one of the gypsum slurry mixer 912 and the delivery conduit 914. In the illustrated embodiment, the aqueous foam supply conduit 921 is associated with the main delivery trunk 915 of the delivery conduit 914.

The first delivery branch 917 is disposed between and in fluid communication with the gypsum slurry mixer 912 and the first feed inlet 924 of the slurry distributor 920. At least one first flow-modifying element 923 is associated with the first delivery branch 917 and is adapted to control the first flow of aqueous calcined gypsum slurry from the gypsum slurry mixer 912.

The second delivery branch 918 is disposed between and in fluid communication with the gypsum slurry mixer 912 and the second feed inlet 925 of the slurry distributor 920. At least one second flow-modifying element 927 is associated with the second delivery branch 918 and is adapted to control the second flow of aqueous calcined gypsum slurry from the gypsum slurry mixer 912.

The first and second flow-modifying elements 923, 927 can be operated to control an operating characteristic of the first and second flows of aqueous calcined gypsum slurry. The first and second flow-modifying elements 923, 927 can be independently operable. In some embodiments, the first and second flow-modifying elements 923, 927 can be actuated to deliver first and second flows of slurries that alternate between a relatively slower and relatively faster average velocity in opposing fashion such that at a given time the first slurry has an average velocity that is faster than that of the second flow of slurry and at another point in time the first slurry has an average velocity that is slower than that of the second flow of slurry.

As one of ordinary skill in the art will appreciate, one or both of the webs of cover sheet material can be pre-treated with a very thin relatively denser layer of gypsum slurry (relative to the gypsum slurry comprising the core), often referred to as a skim coat in the art, and/or hard edges, if desired. To that end, the mixer 912 includes a first auxiliary conduit 929 that is adapted to deposit a stream of dense aqueous calcined gypsum slurry that is relatively denser than the first and second flows of aqueous calcined gypsum slurry delivered to the slurry distributor (i.e., a "face skim coat/hard edge stream"). The first auxiliary conduit 929 can deposit the face skim coat/hard edge stream upon a moving web of cover sheet material upstream of a skim coat roller 931 that is adapted to apply a skim coat layer to the moving web of cover sheet material and to define hard edges at the periphery of the moving web by virtue of the width of the roller 931 being less than the width of the moving web as is known in the art. Hard edges can be formed from the same dense slurry that forms the thin dense layer by directing portions of the dense slurry around the ends of the roller used to apply the dense layer to the web.

The mixer 912 can also include a second auxiliary conduit 933 adapted to deposit a stream of dense aqueous calcined gypsum slurry that is relatively denser than the first and second flows of aqueous calcined gypsum slurry delivered to the slurry distributor (i.e., a "back skim coat stream"). The second auxiliary conduit 933 can deposit the back skim coat stream upon a second moving web of cover sheet material upstream (in the direction of movement of the second web) of a skim coat roller 937 that is adapted to apply a skim coat layer to the second moving web of cover sheet material as is known in the art (see FIG. 61 also).

In other embodiments, separate auxiliary conduits can be connected to the mixer to deliver one or more separate edge streams to the moving web of cover sheet material. Other suitable equipment (such as auxiliary mixers) can be provided in the auxiliary conduits to help make the slurry therein denser, such as by mechanically breaking up foam in the slurry and/or by chemically breaking down the foam through use of a suitable de-foaming agent.

In yet other embodiments, first and second delivery branches can each include a foam supply conduit therein which are respectively adapted to independently introduce aqueous foam into the first and second flows of aqueous calcined gypsum slurry delivered to the slurry distributor. In still other embodiments, a plurality of mixers can be provided to provide independent streams of slurry to the first and second feed inlets of a slurry distributor constructed in accordance with principles of the present disclosure. It will be appreciated that other embodiments are possible.

The gypsum slurry mixing and dispensing assembly 910 of FIG. 60 can be similar in other respects to the gypsum slurry mixing and dispensing assembly 810 of FIG. 59. It is further contemplated that other slurry distributors constructed in accordance with principles of the present disclosure can be used in other embodiments of a cementitious slurry mixing and dispensing assembly as described herein.

Figure 61:
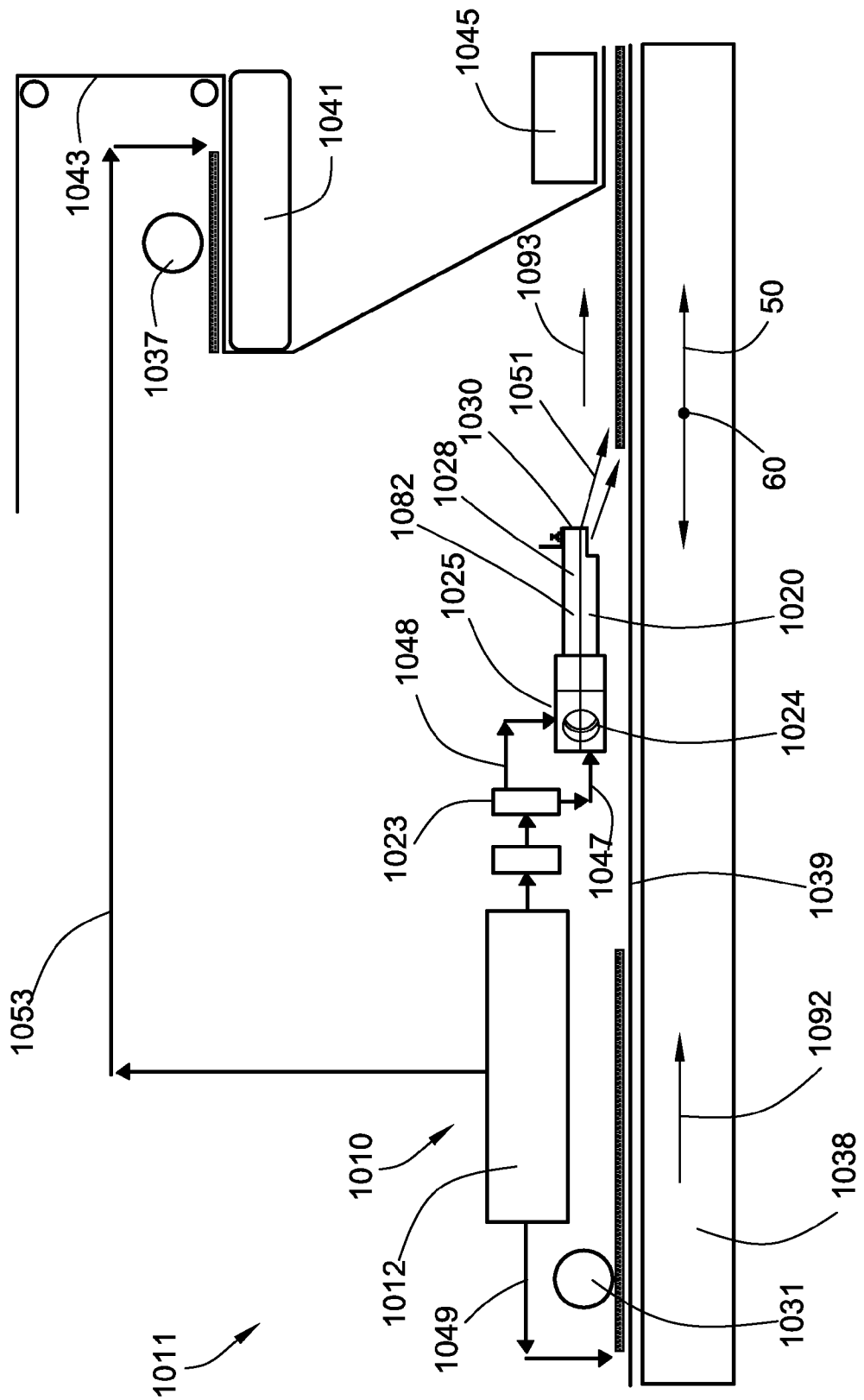
FIG. 61 is a schematic elevational diagram of an embodiment of a wet end of a gypsum wallboard manufacturing line in accordance with principles of the present disclosure.

Referring to FIG. 61, an exemplary embodiment of a wet end 1011 of a gypsum wallboard manufacturing line is shown. The wet end 1011 includes a gypsum slurry mixing and dispensing assembly 1010 having a gypsum slurry mixer 1012 in fluid communication with a slurry distributor 1020 similar in construction and function to the slurry distributor 320 of FIG. 6, a hard edge/face skim coat roller 1031 disposed upstream of the slurry distributor 1020 and supported over a forming table 1038 such that a first moving web 1039 of cover sheet material is disposed therebetween, a back skim coat roller 1037 disposed over a support element 1041 such that a second moving web 1043 of cover sheet material is disposed therebetween, and a forming station 1045 adapted to shape the preform into a desired thickness. The skim coat rollers 1031, 1037, the forming table 1038, the support element 1041, and the forming station 1045 can all comprise conventional equipment suitable for their intended purposes as is known in the art. The wet end 1011 can be equipped with other conventional equipment as is known in the art.

In another aspect of the present disclosure, a slurry distributor constructed in accordance with principles of the present disclosure can be used in a variety of manufacturing processes. For example, in one embodiment, a slurry distribution system can be used in a method of preparing a gypsum product. A slurry distributor can be used to distribute an aqueous calcined gypsum slurry upon the first advancing web 1039.

Water and calcined gypsum can be mixed in the mixer 1012 to form the first and second flows 1047, 1048 of aqueous calcined gypsum slurry. In some embodiments, the water and calcined gypsum can be continuously added to the mixer in a water-to-calcined gypsum ratio from about 0.5 to about 1.3, and in other embodiments of about 0.75 or less.

Gypsum board products are typically formed "face down" such that the advancing web 1039 serves as the "face" cover sheet of the finished board. A face skim coat/hard edge stream 1049 (a layer of denser aqueous calcined gypsum slurry relative to at least one of the first and second flows of aqueous calcined gypsum slurry) can be applied to the first moving web 1039 upstream of the hard edge/face skim coat roller 1031, relative to the machine direction 1092, to apply a skim coat layer to the first web 1039 and to define hard edges of the board.

The first flow 1047 and the second flow 1048 of aqueous calcined gypsum slurry are respectively passed through the first feed inlet 1024 and the second feed inlet 1025 of the slurry distributor 1020. The first and second flows 1047, 1048 of aqueous calcined gypsum slurry are combined in the slurry distributor 1020. The first and second flows 1047, 1048 of aqueous calcined gypsum slurry move along a flow path through the slurry distributor 1020 in the manner of a streamline flow, undergoing minimal or substantially no air-liquid slurry phase separation and substantially without undergoing a vortex flow path.

The first moving web 1039 moves along the longitudinal axis 50. The first flow 1047 of aqueous calcined gypsum slurry passes through the first feed inlet 1024, and the second flow 1048 of aqueous calcined gypsum slurry passes through the second feed inlet 1025. The distribution conduit 1028 is positioned such that it extends along the longitudinal axis 50 which substantially coincides with the machine direction 1092 along which the first web 1039 of cover sheet material moves. Preferably, the central midpoint of the distribution outlet 1030 (taken along the transverse axis/cross-machine direction 60) substantially coincides with the central midpoint of the first moving cover sheet 1039. The first and second flows 1047, 1048 of aqueous calcined gypsum slurry combine in the slurry distributor 1020 such that the combined first and second flows 1051 of aqueous calcined gypsum slurry pass through the distribution outlet 1030 in a distribution direction 1093 generally along the machine direction 1092.

In some embodiments, the distribution conduit 1028 is positioned such that it is substantially parallel to the plane defines by the longitudinal axis 50 and the transverse axis 60 of the first web 1039 moving along the forming table. In other embodiments, the entry portion of the distribution conduit can be disposed vertically lower or higher than the distribution outlet 1030 relative to the first web 1039.

The combined first and second flows 1051 of aqueous calcined gypsum slurry are discharged from the slurry distributor 1020 upon the first moving web 1039. The face skim coat/hard edge stream 1049 can be deposited from the mixer 1012 at a point upstream, relative to the direction of movement of the first moving web 1039 in the machine direction 1092, of where the first and second flows 1047, 1048 of aqueous calcined gypsum slurry are discharged from the slurry distributor 1020 upon the first moving web 1039. The combined first and second flows 1047, 1048 of aqueous calcined gypsum slurry can be discharged from the slurry distributor with a reduced momentum per unit width along the cross-machine direction relative to a conventional boot design to help prevent "washout" of the face skim coat/hard edge stream 1049 deposited on the first moving web 1039 (i.e., the situation where a portion of the deposited skim coat layer is displaced from its position upon the moving web 339 in response to the impact of the slurry being deposited upon it).

The first and second flows 1047, 1048 of aqueous calcined gypsum slurry respectively passed through the first and second feed inlets 1024, 1025 of the slurry distributor 1020 can be selectively controlled with at least one flow-modifying element 1023. For example, in some embodiments, the first and second flows 1047, 1048 of aqueous calcined gypsum slurry are selectively controlled such that the average velocity of the first flow 1047 of aqueous calcined gypsum slurry passing through the first feed inlet 1024 and the average velocity of the second flow 1048 of aqueous calcined gypsum slurry passing through the second feed inlet 1025 are substantially the same.

In embodiments, the first flow 1047 of aqueous calcined gypsum slurry is passed at an average first feed velocity through the first feed inlet 1024 of the slurry distributor 1020. The second flow 1048 of aqueous calcined gypsum slurry is passed at an average second feed velocity through the second feed inlet 1025 of the slurry distributor 1020. The second feed inlet 1025 is in spaced relationship to the first feed inlet 1024. The first and second flows 1051 of aqueous calcined gypsum slurry are combined in the slurry distributor 1020. The combined first and second flows 1051 of aqueous calcined gypsum slurry are discharged at an average discharge velocity from a distribution outlet 1030 of the slurry distributor 1020 upon the web 1039 of cover sheet material moving along a machine direction 1092. The average discharge velocity is less than the average first feed velocity and the average second feed velocity.

In some embodiments, the average discharge velocity is less than about 90% of the average first feed velocity and the average second feed velocity. In some embodiments, the average discharge velocity is less than about 80% of the average first feed velocity and the average second feed velocity.

The combined first and second flows 1051 of aqueous calcined gypsum slurry are discharged from the slurry distributor 1020 through the distribution outlet 1030. The opening of the distribution outlet 1030 has a width extending along the transverse axis 60 and sized such that the ratio of the width of the first moving web 1039 of cover sheet material to the width of the opening of the distribution outlet 1030 is within a range including and between about 1:1 and about 6:1. In some embodiments, the ratio of the average velocity of the combined first and second flows 1051 of aqueous calcined gypsum slurry discharging from the slurry distributor 1020 to the velocity of the moving web 1039 of cover sheet material moving along the machine direction 1092 can be about 2:1 or less in some embodiments, and from about 1:1 to about 2:1 in other embodiments.

The combined first and second flows 1051 of aqueous calcined gypsum slurry discharging from the slurry distributor 1020 form a spread pattern upon the moving web 1039. At least one of the size and shape of the distribution outlet 1030 can be adjusted, which in turn can change the spread pattern.

Thus, slurry is fed into both feed inlets 1024, 1025 of the feed conduit 1022 and then exits through the distribution outlet 1030 with an adjustable gap. A converging portion 1082 can provide a slight increase in the slurry velocity so as to reduce unwanted exit effects and thereby further improve flow stability at the free surface. Side-to-side flow variation and/or any local variations can be reduced by performing cross-machine (CD) profiling control at the discharge outlet 1030 using the profiling system. This distribution system can help prevent air-liquid slurry separation in the slurry resulting in a more uniform and consistent material delivered to the forming table 1038.

A back skim coat stream 1053 (a layer of denser aqueous calcined gypsum slurry relative to at least one of the first and second flows 1047, 1048 of aqueous calcined gypsum slurry) can be applied to the second moving web 1043. The back skim coat stream 1053 can be deposited from the mixer 1012 at a point upstream, relative to the direction of movement of the second moving web 1043, of the back skim coat roller 1037.

In other embodiments, the average velocity of the first and second flows 1047, 1048 of aqueous calcined gypsum slurry are varied. In some embodiments, the slurry velocities at the feed inlets 1024, 1025 of the feed conduit 1022 can oscillate periodically between relatively higher and lower average velocities (at one point in time one inlet has a higher velocity than the other inlet, and then at a predetermined point in time vice versa) to help reduce the chance of buildup within the geometry itself.

In embodiments, the first flow 1047 of aqueous calcined gypsum slurry passing through the first feed inlet 1024 has a shear rate that is lower than the shear rate of the combined first and second flows 1051 discharging from the distribution outlet 1030, and the second flow 1048 of aqueous calcined gypsum slurry passing through the second feed inlet 1025 has a shear rate that is lower than the shear rate of the combined first and second flows 1051 discharging from the distribution outlet 1030. In embodiments, the shear rate of the combined first and second flows 1051 discharging from the distribution outlet 1030 can be greater than about 150% of the shear rate of the first flow 1047 of aqueous calcined gypsum slurry passing through the first feed inlet 1024 and/or the second flow 1048 of aqueous calcined gypsum slurry passing through the second feed inlet 1025, greater than about 175% in still other embodiments, and about double or greater in yet other embodiments. It should be understood that the viscosity of the first and second flows 1047, 1048 of aqueous calcined gypsum slurry and the combined first and second flows 1051 can be inversely related to the shear rate present at a given location such that as the shear rate goes up, the viscosity decreases.

In embodiments, the first flow 1047 of aqueous calcined gypsum slurry passing through the first feed inlet 1024 has a shear stress that is lower than the shear stress of the combined first and second flows 1051 discharging from the distribution outlet 1030, and the second flow 1048 of aqueous calcined gypsum slurry passing through the second feed inlet 1025 has a shear stress that is lower than the shear stress of the combined first and second flows 1051 discharging from the distribution outlet 1030. In embodiments, the shear stress of the combined first and second flows 1051 discharging from the distribution outlet 1030 can be greater than about 110% of the shear rate of the first flow 1047 of aqueous calcined gypsum slurry passing through the first feed inlet 1024 and/or the second flow 1048 of aqueous calcined gypsum slurry passing through the second feed inlet 1025.

In embodiments, the first flow 1047 of aqueous calcined gypsum slurry passing through the first feed inlet 1024 has a Reynolds number that is higher than the Reynolds number of the combined first and second flows 1051 discharging from the distribution outlet 1030, and the second flow 1048 of aqueous calcined gypsum slurry passing through the second feed inlet 1025 has a Reynolds number that is higher than the Reynolds number of the combined first and second flows 1051 discharging from the distribution outlet 1030. In embodiments, the Reynolds number of the combined first and second flows 1051 discharging from the distribution outlet 1030 can be less than about 90% of the Reynolds number of the first flow 1047 of aqueous calcined gypsum slurry passing through the first feed inlet 1024 and/or the second flow 1048 of aqueous calcined gypsum slurry passing through the second feed inlet 1025, less than about 80% in still other embodiments, and less than about 70% in still other embodiments.

Figure 62:
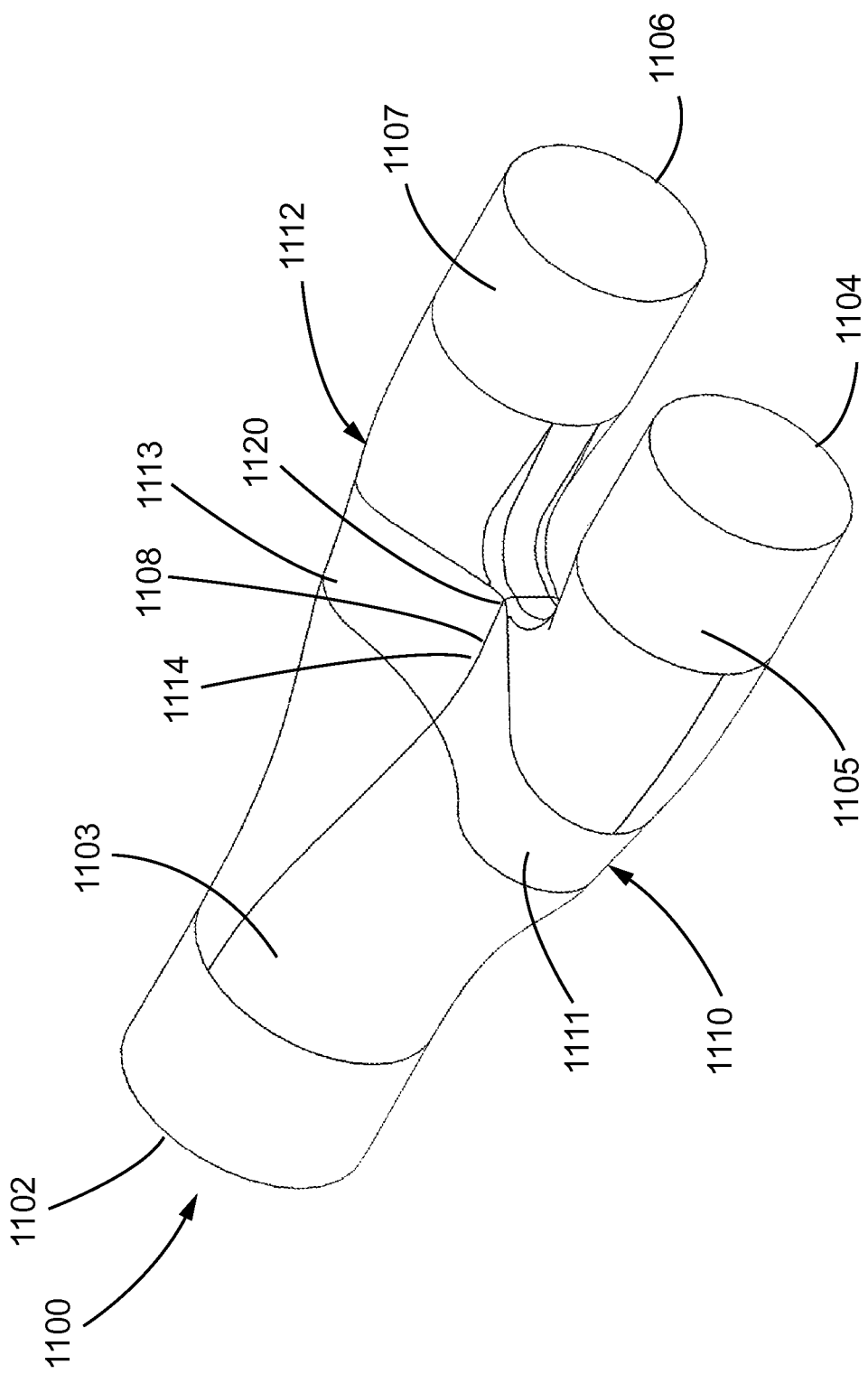
FIG. 62 is a perspective view of an embodiment of a flow splitter constructed in accordance with principles of the present disclosure suitable for use in a gypsum slurry mixing and dispensing assembly including a slurry distributor.
Figure 63:
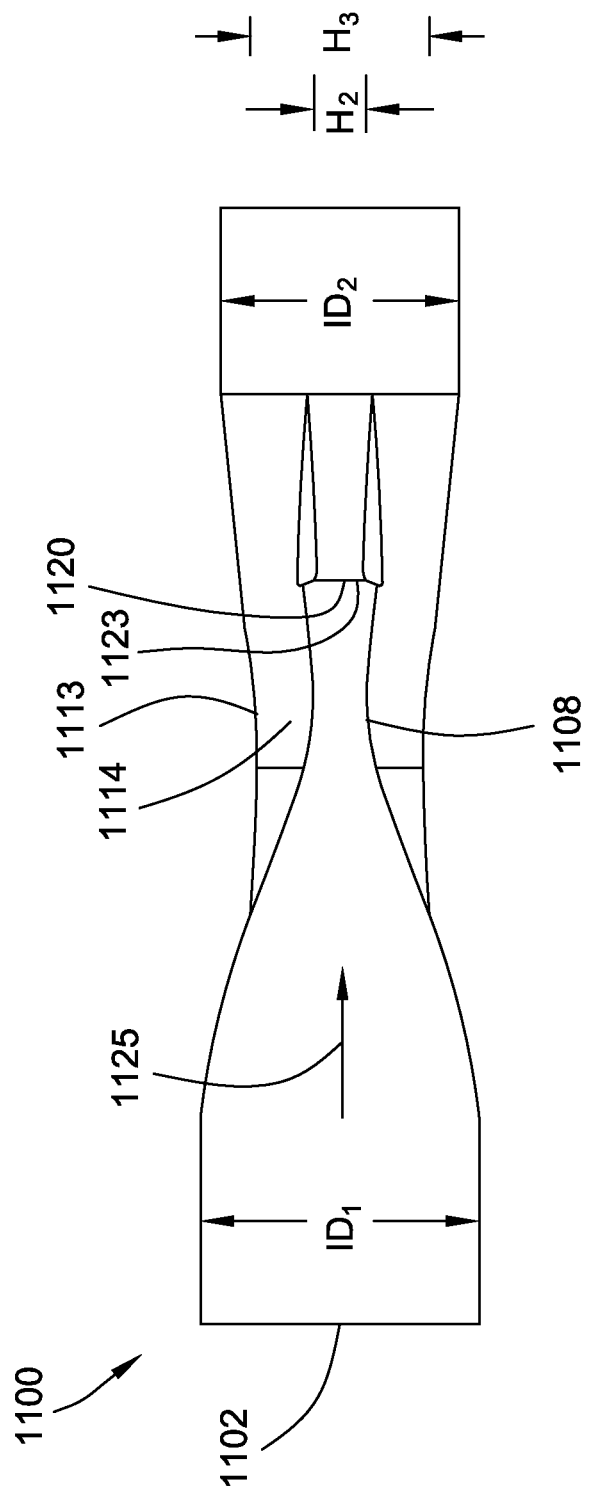
FIG. 63 is a side elevational view, in section, of the flow splitter of FIG. 62.

Referring to FIGS. 62 and 63, an embodiment of a Y-shaped flow splitter 1100 suitable for use in a gypsum slurry mixing and dispensing assembly constructed in accordance with principles of the present disclosure is shown. The flow splitter 1100 can be placed in fluid communication with a gypsum slurry mixer and a slurry distributor such that the flow splitter 1100 receives a single flow of aqueous calcined gypsum slurry from the mixer and discharges two separate flows of aqueous calcined gypsum slurry therefrom to the first and second feed inlets of the slurry distributor. One or more flow-modifying elements can be disposed between the mixer and the flow splitter 1100 and/or between one or both of the delivery branches leading between the splitter 1100 and the associated slurry distributor.

The flow splitter 1100 has a substantially circular inlet 1102 disposed in a main branch 1103 adapted to receive a single flow of slurry and a pair of substantially circular outlets 1104, 1106 disposed respectively in first and second outlet branches 1105, 1107 that allow two flows of slurry to discharge from the splitter 1100. The cross-sectional areas of the openings of the inlet 1102 and the outlets 1104, 1106 can vary depending on the desired flow velocity. In embodiments where the cross-sectional areas of the openings of outlet 1104, 1106 are each substantially equal to cross-sectional area of the opening of the inlet 1102, the flow velocity of the slurry discharging from each outlet 1104, 1106 can be reduced to about 50% of the velocity of the single flow of slurry entering the inlet 1102 where the volumetric flow rate through the inlet 1102 and both outlets 1104, 1106 is substantially the same.

In some embodiments, the diameter of the outlets 1104, 1106 can be made smaller than the diameter of the inlet 1102 in order to maintain a relatively high flow velocity throughout the splitter 1100. In embodiments where the cross-sectional areas of the openings of the outlets 1104, 1106 are each smaller than the cross-sectional area of the opening of the inlet 1102, the flow velocity can be maintained in the outlets 1104, 1106 or at least reduced to a lesser extent than if the outlets 1104, 1106 and the inlet 1102 all have substantially equal cross-sectional areas. For example, in some embodiments, the flow splitter 1100 has the inlet 1102 has an inner diameter ($ID_1$) of about 3 inches, and each outlet 1104, 1106 has an $ID_2$ of about 2.5 inches (though other inlet and outlet diameters can be used in other embodiments). In an embodiment with these dimensions at a line speed of 350 fpm, the smaller diameter of the outlets 1104, 1106 causes the flow velocity in each outlet to be reduced by about 28% of the flow velocity of the single flow of slurry at the inlet 1102.

The flow splitter 1100 can includes a central contoured portion 1114 and a junction 1120 between the first and second outlet branches 1105, 1107. The central contoured portion 1114 creates a restriction 1108 in the central interior region of the flow splitter 1100 upstream of the junction 1120 that helps promote flow to the outer edges 1110, 1112 of the splitter to reduce the occurrence of slurry buildup at the junction 1120. The shape of the central contoured portion 1114 results in guide channels 1111, 1113 adjacent the outer edges 1110, 1112 of the flow splitter 1100. The restriction 1108 in the central contoured portion 1114 has a smaller height $H_2$ than the height $H_3$ of the guide channels 1111, 1113. The guide channels 1111, 1113 have a cross-sectional area that is larger than the cross-sectional area of the central restriction 1108. As a result, the flowing slurry encounters less flow resistance through the guide channels 1111, 1113 than through the central restriction 1108, and flow is directed toward the outer edges of the splitter junction 1120.

The junction 1120 establishes the openings to the first and second outlet branches 1105, 1107. The junction 1120 is made up of a planar wall surface 1123 that is substantially perpendicular to an inlet flow direction 1125.

Figure 64:
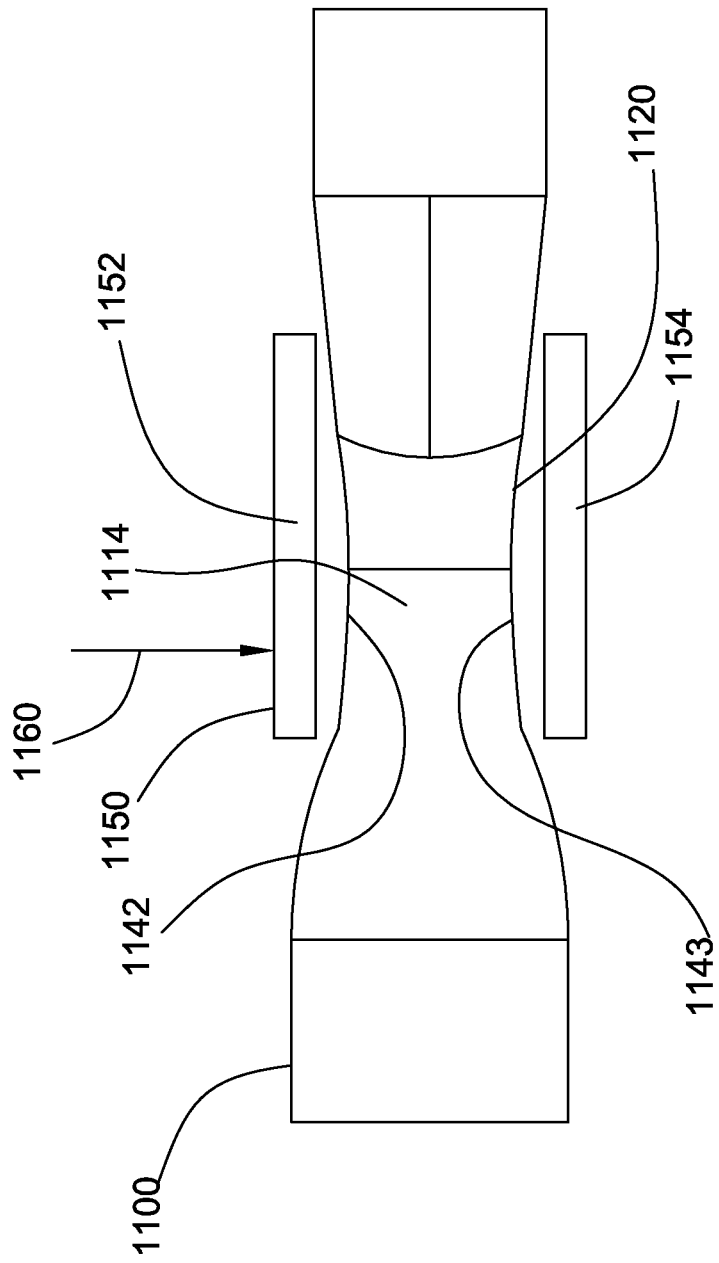
FIG. 64 is a side elevational view of the flow splitter of FIG. 62 with an embodiment of a squeezing apparatus constructed in accordance with principles of the present disclosure mounted thereto.

Referring to FIG. 64, in some embodiments, an automatic device 1150 for squeezing the splitter 1100 at adjustable and regular time intervals can be provided to prevent solids building up inside the splitter 1100. In some embodiments, the squeezing apparatus 1150 can include a pair of plates 1152, 1154 disposed on opposing sides 1142, 1143 of the central contoured portion 1114. The plates 1152, 1154 are movable relative to each other by a suitable actuator 1160. The actuator 1160 can be operated either automatically or selectively to move the plates 1152, 1154 together relative to each other to apply a compressive force upon the splitter 1100 at the central contoured portion 1114 and the junction 1120.

When the squeezing apparatus 1150 squeezes the flow splitter, the squeezing action applies compressive force to the flow splitter 1100, which flexes inwardly in response. This compressive force can help prevent buildup of solids inside the splitter 1100 which may disrupt the substantially equally split flow to the slurry distribution through the outlets 1104, 1106. In some embodiments, the squeezing apparatus 1150 is designed to automatically pulse through the use of a programmable controller operably arranged with the actuators. The time duration of the application of the compressive force by the squeezing apparatus 1150 and/or the interval between pulses can be adjusted. Furthermore, the stroke length that the plates 1152, 1154 travel with respect to each other in a compressive direction can be adjusted.

In an embodiment, a method of preparing a cementitious product can be performed using a slurry distributor constructed according to principles of the present disclosure. A flow of aqueous cementitious slurry is discharged from a mixer. A flow of aqueous cementitious slurry is passed at an average feed velocity through a feed inlet of a slurry distributor along a first feed flow axis. The flow of aqueous cementitious slurry is passed into a bulb portion of the slurry distributor. The bulb portion has an area of expansion with a cross-sectional flow area that is greater than a cross-sectional flow area of an adjacent area upstream from the area of expansion relative to a flow direction from the feed inlet. The bulb portion is configured to reduce the average velocity of the flow of aqueous cementitious slurry moving from the feed inlet through the bulb portion. The shaped duct has a convex interior surface in confronting relationship with first feed flow axis such that the flow of aqueous cementitious slurry moves in radial flow in a plane substantially perpendicular to the first feed flow axis. The flow of aqueous cementitious slurry is passed into a transition segment extending along a second feed flow axis, which is in non-parallel relationship with the first feed flow axis.

The flow of aqueous cementitious slurry is passed into a distribution conduit. The distribution conduit includes a distribution outlet extending a predetermined distance along a transverse axis, which is substantially perpendicular to the longitudinal axis.

In embodiments, the flow of slurry moving through a region adjacent the convex interior surface and adjacent at least one of the lateral sidewalls toward the distribution outlet has a swirl motion ($S_m$) from about zero to about 10, and from about 0.5 to about 5 in other embodiments. In embodiments, the flow of slurry moving through the region adjacent the convex interior surface and adjacent at least one of the lateral sidewalls toward the distribution outlet has a swirl angle ($S_m$) from about 0° to about 84°.

In embodiments, the flow of aqueous cementitious slurry is passed through a flow stabilization region adapted to reduce an average feed velocity of the flow of aqueous cementitious slurry entering the feed inlet and moving to the distribution outlet. The flow of aqueous cementitious slurry is discharged from the distribution outlet at an average discharge velocity that is at least twenty percent less than the average feed velocity.

In another embodiment, a method of preparing a cementitious product includes discharging a flow of aqueous cementitious slurry from a mixer. The flow of aqueous cementitious slurry is passed through an entry portion of a distribution conduit of a slurry distributor. The flow of aqueous cementitious slurry is discharged from a distribution outlet of the slurry distributor upon a web of cover sheet material moving along a machine direction. A wiper blade is reciprocally moved over a clearing path along a bottom surface of the distribution conduit between a first position and a second position to clear aqueous cementitious slurry therefrom. The clearing path is disposed adjacent the distribution outlet.

In embodiments, the distribution conduit extends generally along a longitudinal axis between the entry portion and the distribution outlet. The wiper blade reciprocally moves longitudinally along the clearing path.

In embodiments, the wiper blade moves in a clearing direction from the first position to the second position over a wiping stroke, and the wiper blade moves in an opposing, return direction from the second position to the first position over a return stroke. The wiper blade reciprocally moves such that the time to move over the wiping stroke is substantially the same as the time to move over the return stroke.

In embodiments, the wiper blade moves in a clearing direction from the first position to the second position over a wiping stroke, and the wiper blade moves in an opposing, return direction from the second position to the first position over a return stroke. The wiper blade reciprocally moves between the first position and the second position in a cycle having a sweep period. The sweep period includes a wiping portion comprising the time to move over the wiping stroke, a returning portion comprising the time to move over the return stroke, and an accumulation delay portion comprising a predetermined period of time in which the wiper blade remains in the first position. In embodiments, the wiping portion is substantially the same as the returning portion. In embodiments, the accumulation delay portion is adjustable.

In still another embodiment, a method of preparing a cementitious product includes discharging a flow of aqueous cementitious slurry from a mixer. The flow of aqueous cementitious slurry is passed through an entry portion of a distribution conduit of a slurry distributor. The flow of aqueous cementitious slurry is discharged from an outlet opening of a distribution outlet of the slurry distributor upon a web of cover sheet material moving along a machine direction. The distribution outlet extends a predetermined distance along a transverse axis, which is substantially perpendicular to the longitudinal axis. The outlet opening has a width, along the transverse axis, and a height, along a vertical axis mutually perpendicular to the longitudinal axis and the transverse axis. A portion of the distribution conduit adjacent the distribution outlet is compressively engaged to vary the shape and/or size of the outlet opening. In embodiments, the distribution conduit is compressively engaged by a profiling mechanism such that the flow of aqueous cementitious slurry is discharged from the outlet opening with an increased spread angle relative to the machine direction.

In embodiments, the distribution conduit is compressively engaged by a profiling mechanism having a profiling member in contacting relationship with the distribution conduit. The profiling member is movable over a range of travel such that the profiling member is in a range of positions over which the profiling member is in increasing compressive engagement with the distribution conduit. In embodiments the method includes moving the profiling member along the vertical axis to adjust the size and/or shape of the outlet opening. In embodiments the method includes moving the profiling member such that the profiling member translates along at least one axis and/or rotates about at least one axis to adjust the size and/or shape of the outlet opening.

Embodiments of a slurry distributor, a cementitious slurry mixing and dispensing assembly, and methods of using the same are provided herein which can provide many enhanced process features helpful in manufacturing cementitious products, such as gypsum wallboard in a commercial setting. A slurry distributor constructed in accordance with principles of the present disclosure can facilitate the spreading of aqueous calcined gypsum slurry upon a moving web of cover sheet material as it advances past a mixer at the wet end of the manufacturing line toward a forming station.

A gypsum slurry mixing and dispensing assembly constructed in accordance with principles of the present disclosure can split a flow of aqueous calcined gypsum slurry from a mixer into two separate flows of aqueous calcined gypsum slurry which can be recombined downstream in a slurry distributor constructed in accordance with principles of the present disclosure to provide a desired spreading pattern. The design of the dual inlet configuration and the distribution outlet can allow for wider spreading of more viscous slurry in the cross-machine direction over the moving web of cover sheet material. The slurry distributor can be adapted such that the two separate flows of aqueous calcined gypsum slurry enter a slurry distributor along feed inlet directions which include a cross-machine direction component, are re-directed inside the slurry distributor such that the two flows of slurry are moving in substantially a machine direction, and are recombined in the distributor in a way to enhance the cross-direction uniformity of the combined flows of aqueous calcined gypsum slurry being discharged from the distribution outlet of the slurry distributor to help reduce mass flow variation over time along the transverse axis or cross machine direction. Introducing the first and second flows of aqueous calcined gypsum slurry in first and second feed directions that include a cross-machine directional component can help the re-combined flows of slurry discharge from the slurry distributor with a reduced momentum and/or energy.

The interior flow cavity of the slurry distributor can be configured such that each of the two flows of slurry move through the slurry distributor in a streamline flow. The interior flow cavity of the slurry distributor can be configured such that each of the two flows of slurry move through the slurry distributor with minimal or substantially no air-liquid slurry phase separation. The interior flow cavity of the slurry distributor can be configured such that each of the two flows of slurry move through the slurry distributor substantially without undergoing a vortex flow path.

A gypsum slurry mixing and dispensing assembly constructed in accordance with principles of the present disclosure can include flow geometry upstream of the distribution outlet of the slurry distributor to reduce the slurry velocity in one or multiple steps. For example, a flow splitter can be provided between the mixer and the slurry distributor to reduce the slurry velocity entering the slurry distributor. As another example, the flow geometry in the gypsum slurry mixing and dispensing assembly can include areas of expansion upstream and within the slurry distributor to slow down the slurry so it is manageable when it is discharged from the distribution outlet of the slurry distributor.

The geometry of the distribution outlet can also help control the discharge velocity and momentum of the slurry as it is being discharged from the slurry distributor upon the moving web of cover sheet material. The flow geometry of the slurry distributor can be adapted such that the slurry discharging from the distribution outlet is maintained in substantially a two-dimensional flow pattern with a relatively small height in comparison to the wider outlet in the cross-machine direction to help improve stability and uniformity.

The relatively wide discharge outlet yields a momentum per unit width of the slurry being discharged from the distribution outlet that is lower than the momentum per unit width of a slurry discharged from a conventional boot under similar operating conditions. The reduced momentum per unit width can help prevent washout of a skim coat of a dense layer applied to the web of cover sheet material upstream from the location where the slurry is discharged from the slurry distributor upon the web.

In the situation where a conventional boot outlet is 6 inches wide and 2 inches thick is used, the average velocity of the outlet for a high volume product can be about 761 ft/min. In embodiments where the slurry distributor constructed in accordance with principles of the present disclosure includes a distribution outlet having an opening that is 24 inches wide and 0.75 inches thick, the average velocity can be about 550 ft/min. The mass flow rate is the same for both devices at 3,437 lb/min. The momentum of the slurry (mass flow rate*average velocity) for both cases would be ~2,618,000 and 1,891,000 lb·ft/min$^2$ for the conventional boot and the slurry distributor, respectively. Dividing the respective calculated momentum by the widths of the conventional boot outlet and the slurry distributor outlet, the momentum per unit width of the slurry discharging from the convention boot is 402,736 (lb·ft/min$^2$)/(inch across boot width), and the momentum per unit width of the slurry discharging from the slurry distributor constructed in accordance with principles of the present disclosure is 78,776 (lb·ft/min$^2$)/(inch across slurry distributor width). In this case, the slurry discharging from the slurry distributor has about 20% of the momentum per unit width compared to the conventional boot.

A slurry distributor constructed in accordance with principles of the present disclosure can achieve a desired spreading pattern while using an aqueous calcined gypsum slurry over a broad range of water-stucco ratios, including a relatively low WSR or a more conventional WSR, such as, a water-to-calcined gypsum ratio from about 0.4 to about 1.2, for example, below 0.75 in some embodiments, and between about 0.4 and about 0.8 in other embodiments. Embodiments of a slurry distributor constructed in accordance with principles of the present disclosure can include internal flow geometry adapted to generate controlled shear effects upon the first and second flows of aqueous calcined gypsum slurry as the first and second flows advance from the first and second feed inlets through the slurry distributor toward the distribution outlet. The application of controlled shear in the slurry distributor can selectively reduce the viscosity of the slurry as a result of being subjected to such shear. Under the effects of controlled shear in the slurry distributor, slurry having a lower water-stucco ratio can be distributed from the slurry distributor with a spread pattern in the cross-machine direction comparable to slurries having a conventional WSR.

The interior flow geometry of the slurry distributor can be adapted to further accommodate slurries of various water-stucco ratios to provide increase flow adjacent the boundary wall regions of the interior geometry of the slurry distributor. By including flow geometry features in the slurry distributor adapted to increase the degree of flow around the boundary wall layers, the tendency of slurry to re-circulate in the slurry distributor and/or stop flowing and set therein is reduced. Accordingly, the build up of set slurry in the slurry distributor can be reduced as a result.

A slurry distributor constructed in accordance with principles of the present disclosure can include a profile system mounted adjacent the distribution outlet to alter a cross machine velocity component of the combined flows of slurry discharging from the distribution outlet to selectively control the spread angle and spread width of the slurry in the cross machine direction on the substrate moving down the manufacturing line toward the forming station. The profile system can help the slurry discharged from the distribution outlet achieve a desired spread pattern while being less sensitive to slurry viscosity and WSR. The profile system can be used to change the flow dynamics of the slurry discharging from the distribution outlet of the slurry distributor to guide slurry flow such that the slurry has more uniform velocity in the cross-machine direction. Using the profile system can also help a gypsum slurry mixing and dispensing assembly constructed in accordance with principles of the present disclosure be used in a gypsum wallboard manufacturing setting to produce wallboard of different types and volumes.

EXAMPLES

Figure 65:
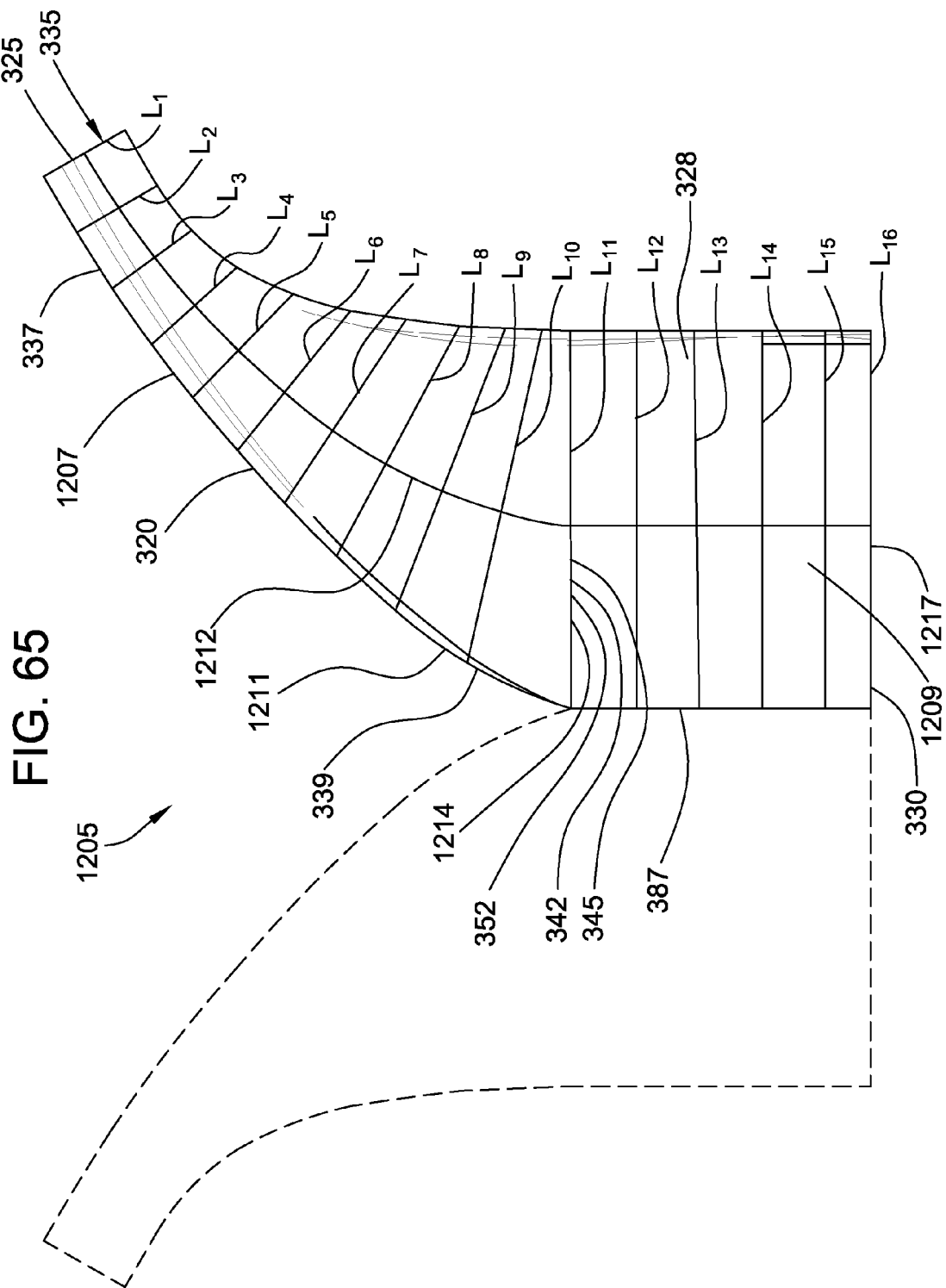
FIG. 65 is a top plan view of a half portion of a slurry distributor similar to the slurry distributor of FIG. 15.

Referring to FIG. 65, the geometry and flow characteristics of an embodiment of a slurry distributor constructed in accordance with principles of the present disclosure were evaluated in Examples 1-3. A top plan view of a half portion 1205 of a slurry distributor is shown in FIG. 65. The half portion 1205 of the slurry distributor includes a half portion 1207 of a feed conduit 320 and a half portion 1209 of a distribution conduit 328. The half portion 1207 of the feed conduit 322 includes a second feed inlet 325 defining a second opening 335, a second entry segment 337, and a half portion 1211 of a bifurcated connector segment 339. The half portion 1209 of the distribution conduit 328 includes a half portion 1214 of an entry portion 352 of the distribution conduit 328 and a half portion 1217 of a distribution outlet 330.

It should be understood that another half portion of a slurry distributor, which is a mirror image of the half portion 1205 of FIG. 65, can be integrally joined and aligned with the half portion 1205 of FIG. 65 at a transverse central midpoint 387 of the distribution outlet 330 to form a slurry distributor which is substantially similar to the slurry distributor 420 of FIG. 15. Accordingly, the geometry and flow characteristics described below are equally applicable to the mirror image half portion of the slurry distributor as well.

Figure 72:
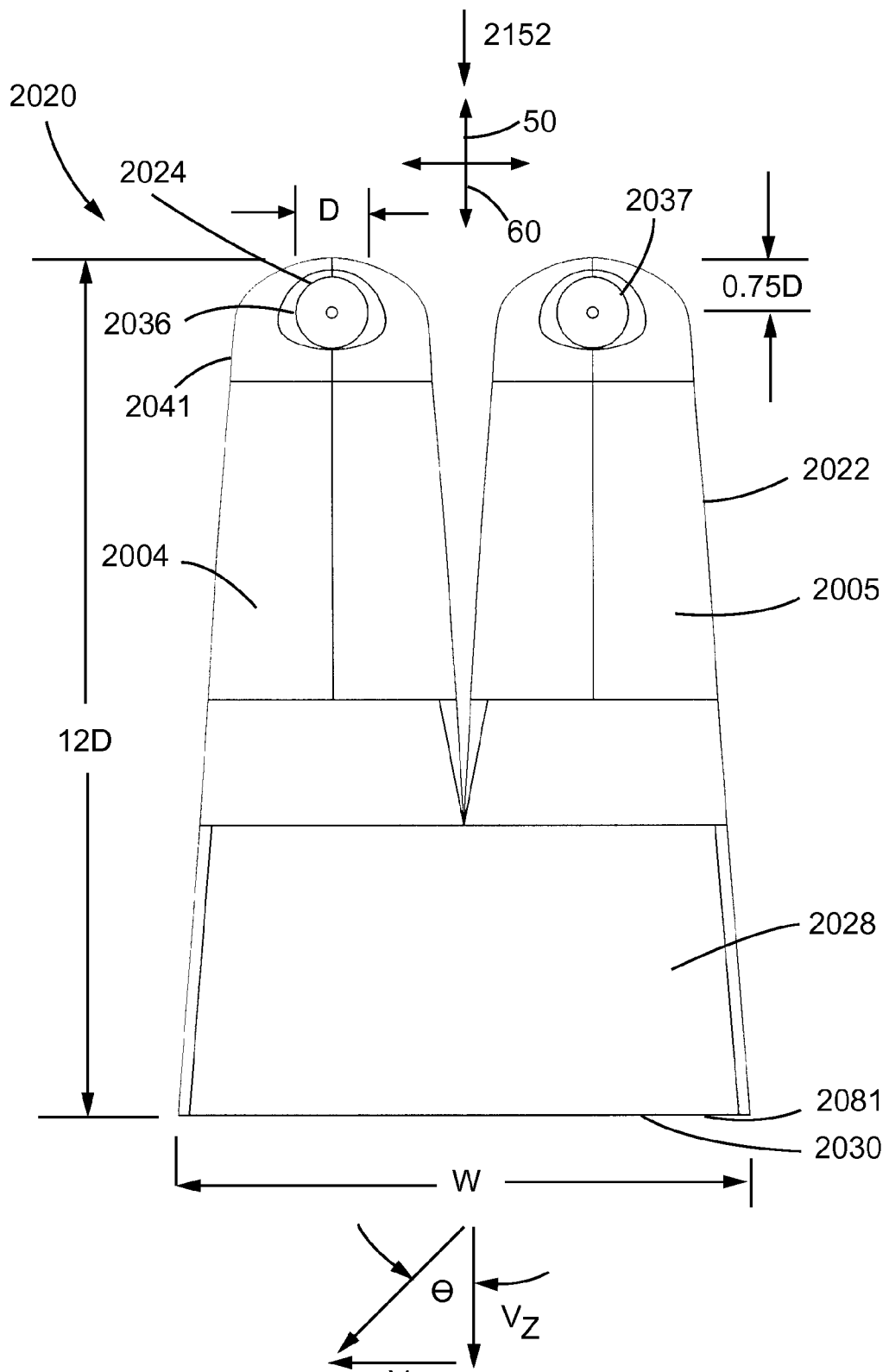
FIG. 72 is a top plan view of a slurry distributor similar to the slurry distributor of FIG. 22.

Referring to FIG. 72, the geometry and flow characteristics of another embodiment of a slurry distributor 2020 constructed in accordance with principles of the present disclosure were evaluated in Examples 4-6. The slurry distributor 2020 shown in FIG. 72 is substantially the same as the slurry distributor 1420 of FIG. 34. The flow characteristics of the slurry distributor 2020 of FIG. 72 using a profiling mechanism constructed in accordance with principles of the present disclosure were evaluated in Example 7. The profiling mechanism evaluated in Example 7 is substantially the same as the profiling mechanism 1432 of FIG. 22.

Example 1

In this Example and referring to FIG. 65, the particular geometry of the half portion 1205 of the slurry distributor was evaluated at sixteen different locations $L_{1-16}$ between a first location $L_1$ at the second feed inlet 325 and a sixteenth location $L_{16}$ at a half portion 1207 of the distribution outlet 330. Each location $L_{1-16}$ represents a cross-sectional slice of the half portion 1205 of the slurry distributor as indicated by the corresponding line. A flow line 1212 along the geometric center of each cross-sectional slice was used to determine the distance between adjacent locations $L_{1-16}$. The eleventh location $L_{11}$ corresponds to the half portion 1214 of the entry portion 352 of the distribution conduit 328 which corresponds to an opening 342 of a second feed outlet 345 of the half portion 1207 of the feed conduit 320. Accordingly, the first through the tenth locations $L_{1-10}$ are taken in the half portion 1207 of the feed conduit 320, and the eleventh through the sixteenth locations are taken in the half portion 1209 of the distribution conduit 328.

Figure 66:
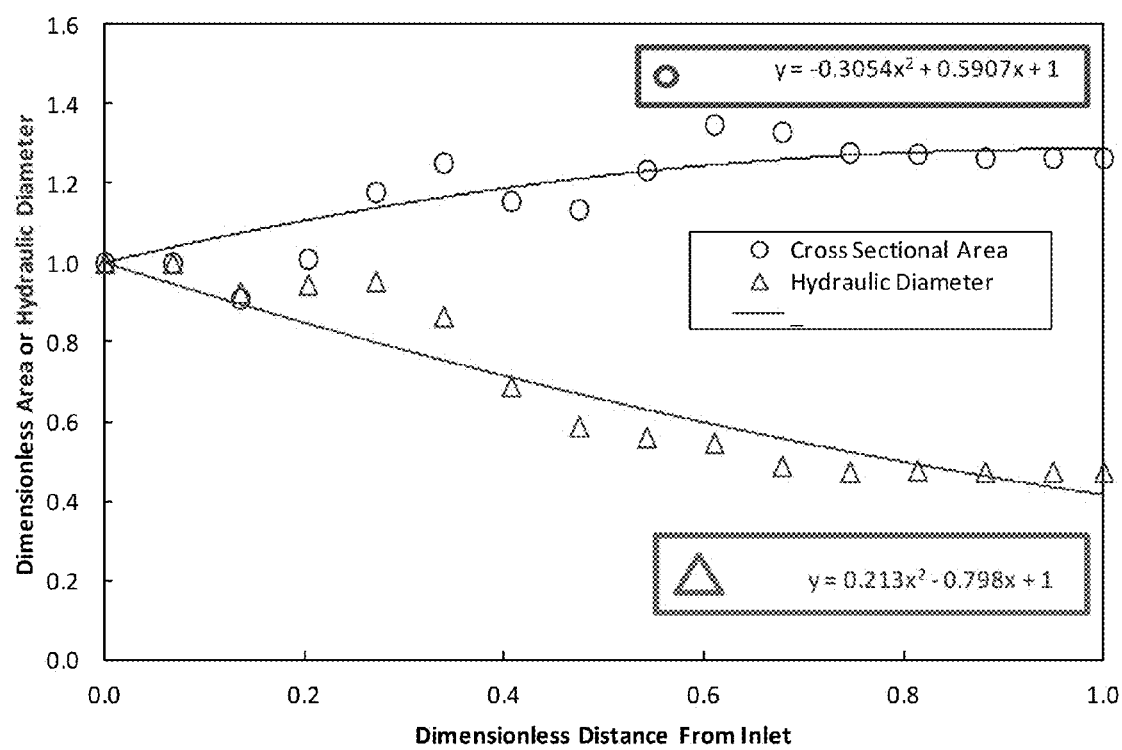
FIG. 66 is a plot of the data from Table I of Example 1 showing the dimensionless distance from the feed inlet versus the dimensionless area and the dimensionless hydraulic radius of the half portion of the slurry distributor of FIG. 65.

For each location $L_{1-16}$, the following geometric values were determined: the distance along the flow line 1212 between the second feed inlet 325 and the particular location $L_{1-16}$; the cross-sectional area of the opening at the location $L_{1-16}$; the perimeter of the location $L_{1-16}$; and the hydraulic diameter of the location $L_{1-16}$. The hydraulic diameter was calculated using the following formula:

$$D_{hyd} = 4 \times A/P \qquad (Eq. 1)$$

where $D_{hyd}$ is the hydraulic diameter,
A is the area of the particular location $L_{1-16}$, and
P is the perimeter of the particular location $L_{1-16}$.
Using the inlet conditions, the dimensionless values for each location $L_{1-16}$ can be determined to describe the interior flow geometry, as shown in Table 1. Curve-fit equations were used to describe the dimensionless geometry of the half portion 1205 of the slurry distributor in FIG. 66, which shows the dimensionless distance from inlet versus the dimensionless area and the hydraulic diameter.

The analysis of the dimensionless values for each location $L_{1-16}$ shows that the cross sectional flow area increases from the first location $L_1$ at the second feed inlet 325 to the eleventh location $L_{11}$ at the half portion 1214 of the entry portion 352 (also the opening 342 of the second feed outlet 345). In the exemplary embodiment, the cross-sectional flow area at the half portion 1214 of the entry portion 352 is about ⅓ larger than the cross-sectional flow area at the second feed inlet 325. Between the first location $L_1$ and the eleventh location $L_{11}$, the cross-sectional flow area of the second entry segment 337 and the second shaped duct 339 varies from location to location $L_{1-11}$. In this region, at least two adjacent locations $L_6$, $L_7$ are configured such that the location $L_7$ located further from the second feed inlet 325 has a cross sectional flow area that is smaller than the adjacent location $L_6$ that is closer to the second feed inlet 325.

Between the first location $L_1$ and the eleventh location $L_{11}$, in the half portion 1207 of the feed conduit 322 there is an area of expansion (e.g., $L_{4-6}$) having a cross-sectional flow area that is greater than a cross-sectional flow area of an adjacent area (e.g., $L_3$) upstream from the area of expansion in a direction from the second inlet 335 toward the half portion 1217 of the distribution outlet 330. The second entry segment 337 and the second shaped duct 341 have a cross section that varies along the direction of flow 1212 to help distribute the second flow of slurry moving therethrough.

The cross sectional area decreases from the eleventh location $L_{11}$ at the half portion 1214 of the entry portion 352 of the distribution conduit 328 to the sixteenth location $L_{16}$ at the half portion 1217 of the distribution outlet 330 of the distribution conduit 328. In the exemplary embodiment, the cross-sectional flow area of the half portion 1214 of an entry portion 352 is about 95% of that of the half portion 1217 of the distribution outlet 330.

The cross-sectional flow area at the first location $L_1$ at the second feed inlet 325 is smaller than the cross-sectional flow area at the sixteenth location $L_{16}$ at the half portion 1217 of the distribution outlet 330 of the distribution conduit 328. In the exemplary embodiment, the cross-sectional flow area at the half portion 1217 of the distribution outlet 330 of the distribution conduit 328 is about ¼ larger than the cross-sectional flow area at the second feed inlet 325.

The hydraulic diameter decreases from the first location $L_1$ at the second feed inlet 325 to the eleventh location $L_{11}$ at the half portion 1214 of the entry portion 352 of the distribution conduit 328. In the exemplary embodiment, the hydraulic diameter at the half portion 1214 of the entry portion 352 of the distribution conduit 328 is about ½ the hydraulic diameter at the second feed inlet 325.

The hydraulic diameter decreases from the eleventh location $L_{11}$ at the half portion 1214 of an entry portion 352 of the distribution conduit 328 to the sixteenth location $L_{16}$ at the half portion 1217 of the distribution outlet 330 of the distribution conduit 328. In the exemplary embodiment, the hydraulic diameter of the half portion 1217 of the distribution outlet 330 of the distribution conduit 328 is about 95% of that of the half portion 1214 of the entry portion 352 of the distribution conduit 328.

The hydraulic diameter at the first location $L_1$ at the second inlet 325 is larger than the hydraulic diameter at the sixteenth location $L_{16}$ at the half portion 1217 of the distribution outlet 330 of the distribution conduit 328. In the exemplary embodiment, the hydraulic diameter at the half portion 1217 of the distribution outlet 330 of the distribution conduit 328 is less than about half of that of the second feed inlet 325.

TABLE I

GEOMETRY

| Location | Distance From Inlet | Area | Perimeter | Hydraulic Dia. |
|---|---|---|---|---|
| | Dimensionless | | | |
| L1 | 0.00 | 1.00 | 1.00 | 1.00 |
| L2 | 0.07 | 1.00 | 1.00 | 1.00 |
| L3 | 0.14 | 0.91 | 0.98 | 0.93 |
| L4 | 0.20 | 1.01 | 1.07 | 0.94 |
| L5 | 0.27 | 1.18 | 1.24 | 0.95 |
| L6 | 0.34 | 1.25 | 1.45 | 0.87 |
| L7 | 0.41 | 1.16 | 1.68 | 0.69 |
| L8 | 0.47 | 1.13 | 1.93 | 0.59 |
| L9 | 0.54 | 1.23 | 2.20 | 0.56 |
| L10 | 0.61 | 1.35 | 2.47 | 0.55 |
| L11 | 0.68 | 1.33 | 2.73 | 0.49 |
| L12 | 0.75 | 1.28 | 2.70 | 0.47 |
| L13 | 0.81 | 1.27 | 2.68 | 0.48 |
| L14 | 0.88 | 1.26 | 2.67 | 0.47 |
| L15 | 0.95 | 1.26 | 2.67 | 0.47 |
| L16 | 1.00 | 1.26 | 2.67 | 0.47 |

Example 2

In this Example, the half portion 1205 of the slurry distributor of FIG. 65 was used to model the flow of gypsum slurry therethrough under different flow conditions. For all flow conditions, the density ($\rho$) of the aqueous gypsum slurry was set at 1,000 kg/m³. Aqueous gypsum slurry is a shear-thinning material such that as shear is applied to it, its viscosity can decrease. The viscosity ($\mu$) Pa·s of the gypsum slurry was calculated using the Power Law Fluid Model which has the following equation:

$$\mu = K\dot{\gamma}^{n-1} \qquad (Eq.\ 2)$$

where,

K is a constant, $\dot{\gamma}$ is the shear rate, and n is a constant equal to 0.133 in this case.

In a first flow condition, the gypsum slurry has a viscosity K factor of 50 in the Power Law model and enters the second feed inlet 325 at 2.5 m/s. A computational fluid dynamics technique with a finite volume method was used to determine flow characteristics in the distributor. At each location $L_{1-16}$, the following flow characteristics were determined: area-weighted average velocity (U), area-weighted average shear rate ($\dot{\gamma}$), viscosity calculated using the Power Law Model (Eq. 2), shear stress, and Reynolds Number (Re).

The shear stress was calculated using the following equation:

$$\text{Shear stress} = \mu \times \dot{\gamma} \qquad (Eq.\ 3)$$

where $\mu$ is the viscosity calculated using the Power Law Model (Eq. 2), and $\dot{\gamma}$ is the shear rate.

The Reynolds Number was calculated using the following equation:

$$Re = = \rho \times U \times D_{hyd}/\mu \qquad (Eq.\ 4)$$

where $\rho$ is the density of the gypsum slurry,

U is the area-weighted average velocity, $D_{hyd}$ is the hydraulic diameter, and $\mu$ is the viscosity calculated using the Power Law Model (Eq. 2).

In a second flow condition case, the feed velocity of the gypsum slurry into the second feed inlet 325 was increased to 3.55 m/s. All other conditions were the same as in the first flow condition of this Example. The dimensional values for the mentioned flow characteristics at each location $L_{1-16}$ for both the first flow condition where the inlet velocity is 2.5 m/s and the second flow condition where the inlet velocity is 3.55 m/s were modeled. Using the inlet conditions, dimensionless values of the flow characteristics for each location $L_{1-16}$ were determined, as shown in Table II.

Figure 67:
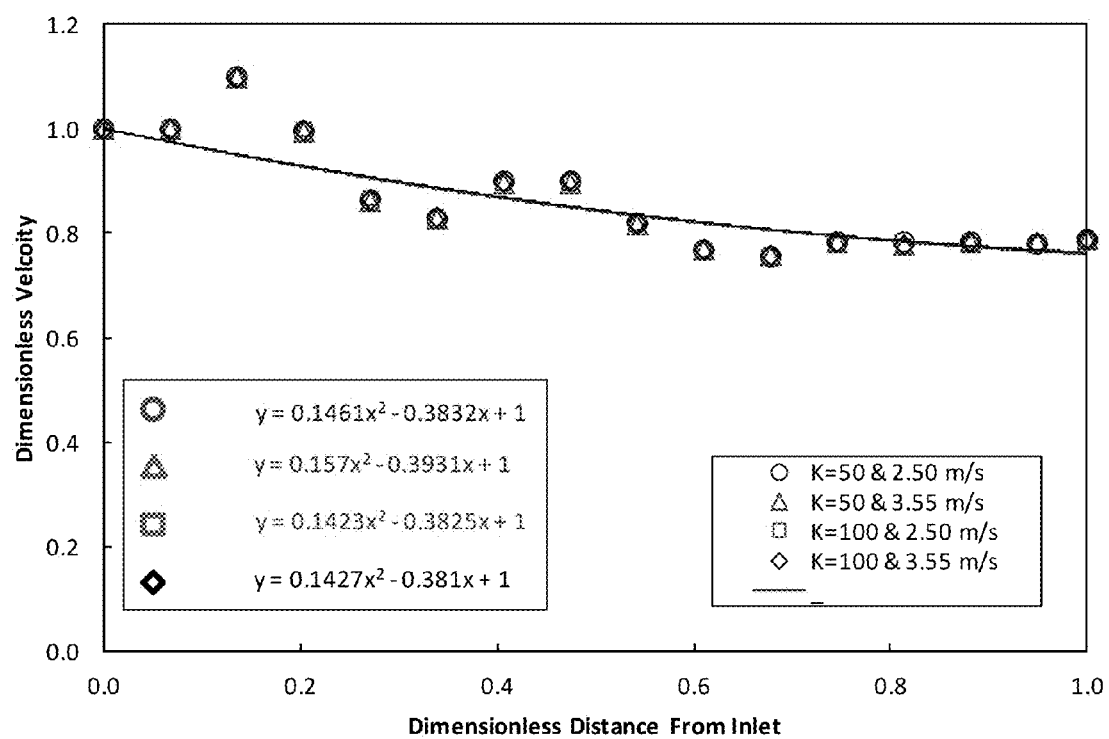
FIG. 67 is a plot of the data from Tables II and III of Examples 2 and 3, respectively, showing the dimensionless distance from the feed inlet versus the dimensionless velocity of a flow of modeled slurry moving through the half portion of the slurry distributor of FIG. 65.

For both flow conditions where K was set equal to 50, the average velocity was reduced from the first location $L_1$ at the second feed inlet 325 to the sixteenth location $L_{16}$ at the half portion 1217 of the distribution outlet 330 of the distribution conduit 328. In the illustrated embodiment, the average velocity was reduced by about ⅕, as shown in FIG. 67.

Figure 68:
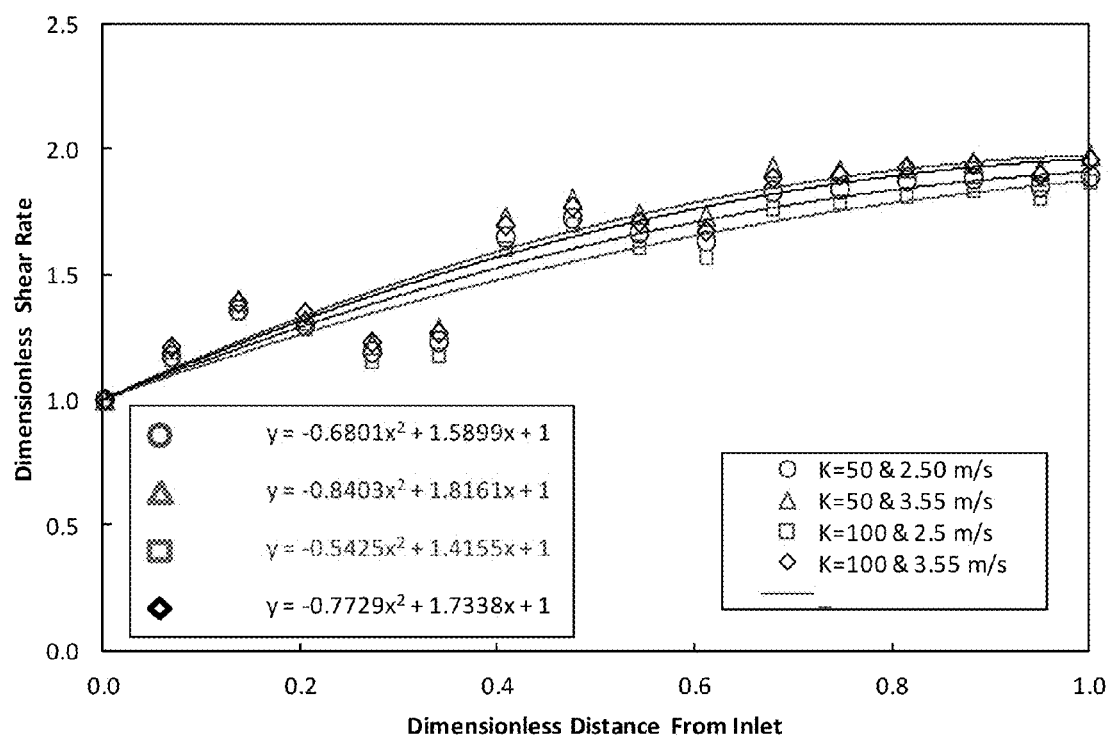
FIG. 68 is a plot of the data from Tables II and III of Examples 2 and 3, respectively, showing the dimensionless distance from the feed inlet versus the dimensionless shear rate in the modeled slurry moving through the half portion of the slurry distributor of FIG. 65.

For both flow conditions, the shear rate increased from the first location $L_1$ at the second feed inlet 325 to the sixteenth location $L_{16}$ at the half portion 1217 of the distribution outlet 330 of the distribution conduit 328. In the illustrated embodiment, the shear rate approximately doubled from the first location $L_1$ at the second feed inlet 325 to the sixteenth location $L_{16}$ at the half portion 1217 of the distribution outlet 330 of the distribution conduit 328, as shown in FIG. 68.

Figure 69:
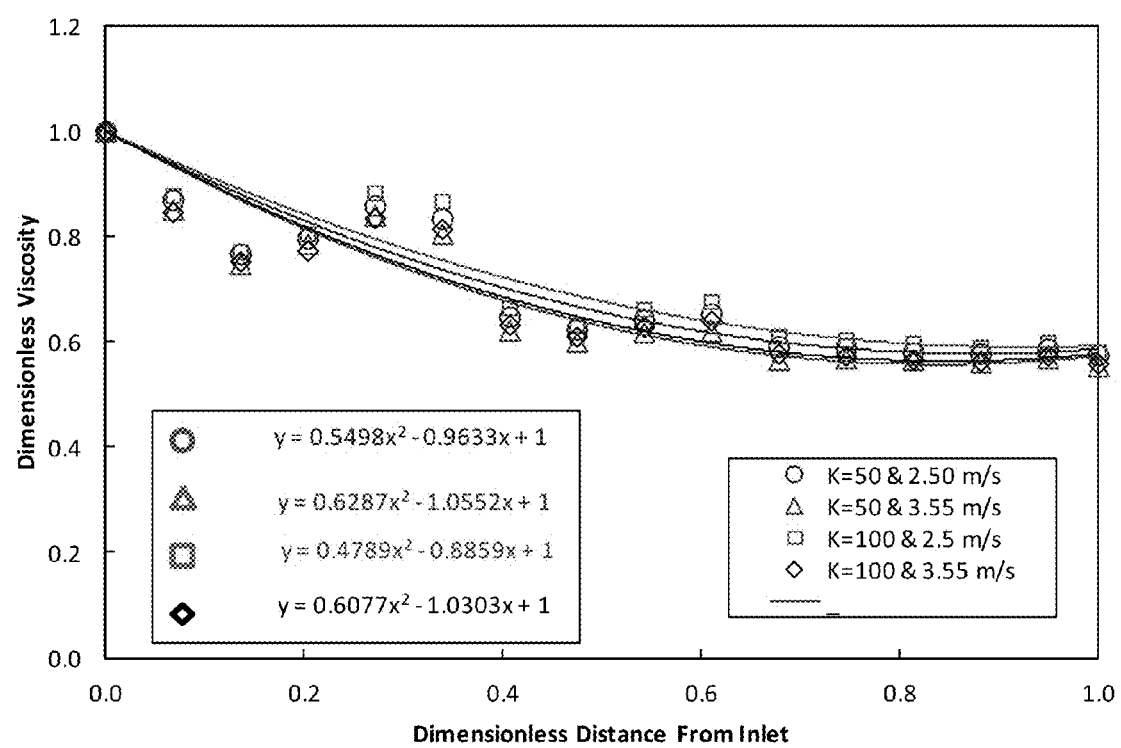
FIG. 69 is a plot of the data from Tables II and III of Examples 2 and 3, respectively, showing the dimensionless distance from the feed inlet versus the dimensionless viscosity of the modeled slurry moving through the half portion of the slurry distributor of FIG. 65.

For both flow conditions, the calculated viscosity was reduced from the first location $L_1$ at the second feed inlet 325 to the sixteenth location $L_{16}$ at the half portion 1217 of the distribution outlet 330 of the distribution conduit 328. In the illustrated embodiment, the calculated viscosity was reduced from the first location $L_1$ at the second feed inlet 325 to the sixteenth location $L_{16}$ at the half portion 1217 of the distribution outlet 330 of the distribution conduit 328 by about half, as illustrated in FIG. 69.

Figure 70:
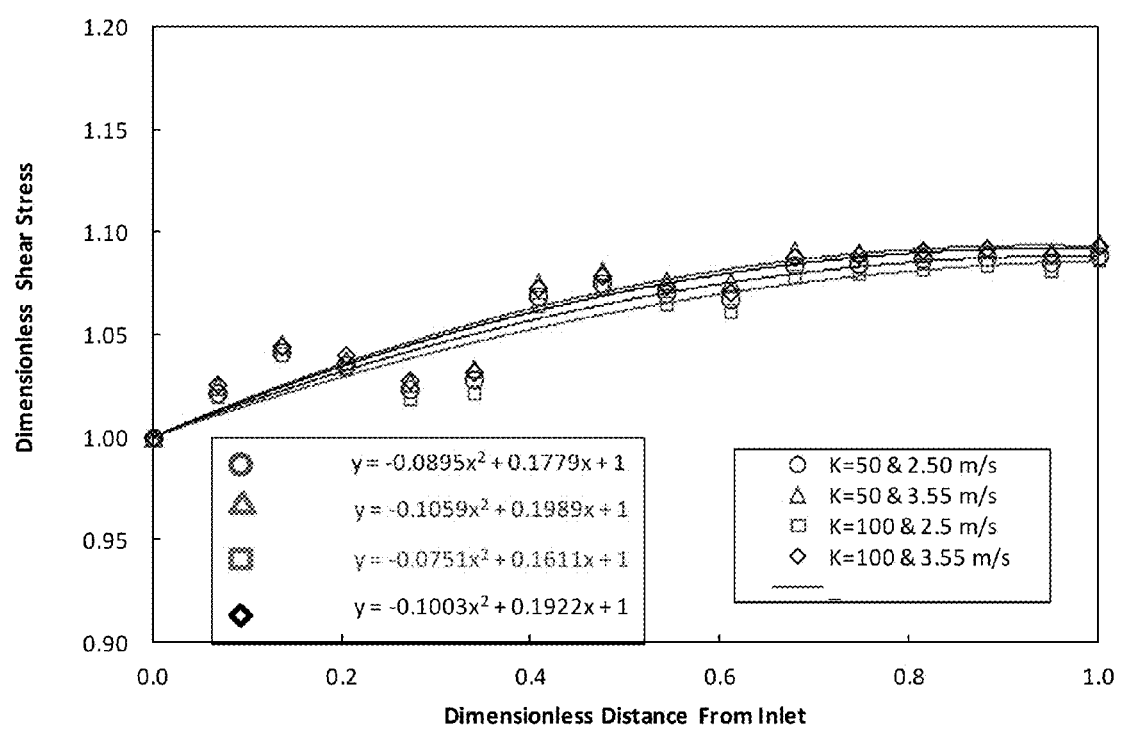
FIG. 70 is a plot of the data from Tables II and III of Examples 2 and 3, respectively, showing the dimensionless distance from the feed inlet versus the dimensionless shear stress in the modeled slurry moving through the half portion of the slurry distributor of FIG. 65.

For both flow conditions in FIG. 70, the shear stress increased from the first location $L_1$ at the second feed inlet 325 to the sixteenth location $L_{16}$ at the half portion 1217 of the distribution outlet 330 of the distribution conduit 328. In the illustrated embodiment, the shear stress increased by about 10% from the first location $L_1$ at the second feed inlet 325 to the sixteenth location $L_{16}$ at the half portion 1217 of the distribution outlet 330 of the distribution conduit 328.

Figure 71:
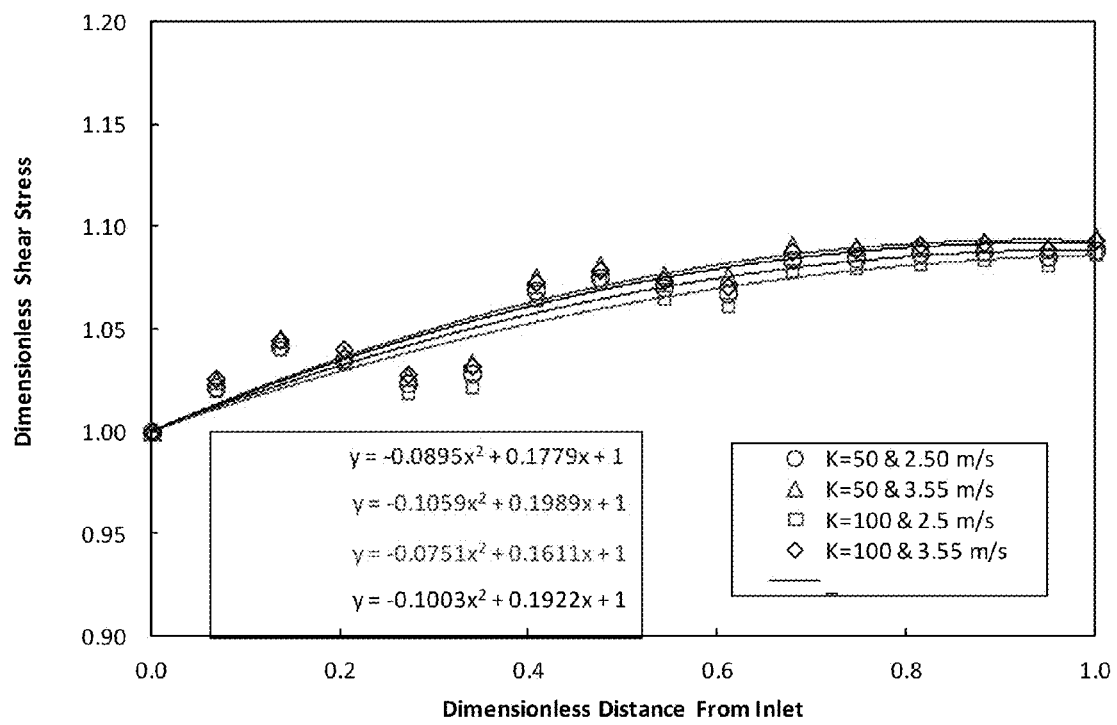
FIG. 71 is a plot of the data from Tables II and III of Examples 2 and 3, respectively, showing the dimensionless distance from the feed inlet versus the dimensionless Reynolds number of the modeled slurry moving through the half portion of the slurry distributor of FIG. 65.

For both flow conditions, the Reynolds number in FIG. 71 was reduced from the first location $L_1$ at the second feed inlet 325 to the sixteenth location $L_{16}$ at the half portion 1217 of the distribution outlet 330 of the distribution conduit 328. In the illustrated embodiment, the Reynolds number was reduced from the first location $L_1$ at the second feed inlet 325 to the sixteenth location $L_{16}$ at the half portion 1217 of the distribution outlet 330 of the distribution conduit 328 by about ⅓. For both flow conditions, the Reynolds number at the sixteenth location $L_{16}$ at the half portion 1217 of the distribution outlet 330 of the distribution conduit 328 is in the laminar region.

TABLE II

| | Inlet Velocity = 2.50 m/s | | | | | Inlet Velocity = 3.55 m/s | | | | |
|---|---|---|---|---|---|---|---|---|---|---|
| Location | Velocity | Shear Rate | Calc Visc. | Shear Stress | Re | Velocity | Shear Rate | Calc Visc. | Shear Stress | Re |
| L1 | 1.00 | 1.00 | 1.00 | 1.00 | 1.00 | 1.00 | 1.00 | 1.00 | 1.00 | 1.00 |
| L2 | 1.00 | 1.18 | 0.87 | 1.02 | 1.15 | 1.00 | 1.20 | 0.85 | 1.03 | 1.17 |
| L3 | 1.10 | 1.36 | 0.77 | 1.04 | 1.33 | 1.10 | 1.40 | 0.75 | 1.05 | 1.36 |
| L4 | 1.00 | 1.30 | 0.80 | 1.04 | 1.18 | 0.99 | 1.32 | 0.79 | 1.04 | 1.19 |
| L5 | 0.86 | 1.19 | 0.86 | 1.02 | 0.96 | 0.86 | 1.22 | 0.84 | 1.03 | 0.98 |
| L6 | 0.83 | 1.23 | 0.83 | 1.03 | 0.86 | 0.83 | 1.28 | 0.81 | 1.03 | 0.89 |
| L7 | 0.90 | 1.65 | 0.65 | 1.07 | 0.96 | 0.90 | 1.73 | 0.62 | 1.08 | 0.99 |
| L8 | 0.90 | 1.73 | 0.62 | 1.08 | 0.85 | 0.90 | 1.80 | 0.60 | 1.08 | 0.88 |
| L9 | 0.82 | 1.67 | 0.64 | 1.07 | 0.72 | 0.82 | 1.74 | 0.62 | 1.08 | 0.74 |
| L10 | 0.77 | 1.63 | 0.65 | 1.07 | 0.64 | 0.77 | 1.73 | 0.62 | 1.08 | 0.68 |
| L11 | 0.76 | 1.83 | 0.59 | 1.08 | 0.62 | 0.76 | 1.93 | 0.57 | 1.09 | 0.65 |
| L12 | 0.78 | 1.84 | 0.59 | 1.08 | 0.63 | 0.78 | 1.92 | 0.57 | 1.09 | 0.65 |
| L13 | 0.78 | 1.88 | 0.58 | 1.09 | 0.64 | 0.78 | 1.93 | 0.57 | 1.09 | 0.65 |
| L14 | 0.78 | 1.88 | 0.58 | 1.09 | 0.64 | 0.78 | 1.95 | 0.56 | 1.09 | 0.66 |
| L15 | 0.78 | 1.85 | 0.59 | 1.09 | 0.63 | 0.78 | 1.92 | 0.57 | 1.09 | 0.65 |
| L16 | 0.79 | 1.89 | 0.58 | 1.09 | 0.65 | 0.79 | 1.98 | 0.55 | 1.09 | 0.67 |

Example 3

In this Example, the half portion 1205 of the slurry distributor of FIG. 65 was used to model the flow of gypsum slurry therethrough under flow conditions similar to those in Example 2 except that the value for the coefficient K in the Power Law Model (Eq. 2) was set at 100. The flow conditions were similar to those in Example 2 in other respects.

Again, the flow characteristics were evaluated both for a feed velocity of the gypsum slurry into the second feed inlet 325 of 2.50 m/s and of 3.55 m/s. At each location $L_{1\text{-}16}$, the following flow characteristics were determined: area-weighted average velocity (U), area-weighted average shear rate ($\dot{\gamma}$), viscosity calculated using the Power Law Model (Eq. 2), shear stress (Eq. 3), and Reynolds Number (Re) (Eq. 4). Using the inlet conditions, dimensionless values of the flow characteristics for each location $L_{1\text{-}16}$ were determined, as shown in Table III.

For both flow conditions where K was set equal to 100, the average velocity was reduced from the first location $L_1$ at the second feed inlet 325 to the sixteenth location $L_{16}$ at the half portion 1217 of the distribution outlet 330 of the distribution conduit 328. In the illustrated embodiment, the average velocity was reduced by about ⅕. The results for average velocity, on a dimensionless basis, were substantially the same as those in Example 2 and FIG. 67.

For both flow conditions, the shear rate increased from the first location $L_1$ at the second feed inlet 325 to the sixteenth location $L_{16}$ at the half portion 1217 of the distribution outlet 330 of the distribution conduit 328. In the illustrated embodiment, the shear rate approximately doubled from the first location $L_1$ at the second feed inlet 325 to the sixteenth location $L_{16}$ at the half portion 1217 of the distribution outlet 330 of the distribution conduit 328. The results for shear rate, on a dimensionless basis, were substantially the same as those in Example 2 and FIG. 68.

For both flow conditions, the calculated viscosity was reduced from the first location $L_1$ at the second feed inlet 325 to the sixteenth location $L_{16}$ at the half portion 1217 of the distribution outlet 330 of the distribution conduit 328. In the illustrated embodiment, the calculated viscosity was reduced from the first location $L_1$ at the second feed inlet 325 to the sixteenth location $L_{16}$ at the half portion 1217 of the distribution outlet 330 of the distribution conduit 328 by about half. The results for the calculated viscosity, on a dimensionless basis, were substantially the same as those in Example 2 and FIG. 69.

For both flow conditions, the shear stress increased from the first location $L_1$ at the second feed inlet 325 to the sixteenth location $L_{16}$ at the half portion 1217 of the distribution outlet 330 of the distribution conduit 328. In the illustrated embodiment, the shear stress increased by about 10% from the first location $L_1$ at the second feed inlet 325 to the sixteenth location $L_{16}$ at the half portion 1217 of the distribution outlet 330 of the distribution conduit 328. The results for the shear stress, on a dimensionless basis, were substantially the same as those in Example 2 and FIG. 70.

For both flow conditions, the Reynolds number was reduced from the first location $L_1$ at the second feed inlet 325 to the sixteenth location $L_{16}$ at the half portion 1217 of the distribution outlet 330 of the distribution conduit 328. In the illustrated embodiment, the Reynolds number was reduced from the first location $L_1$ at the second feed inlet 325 to the sixteenth location $L_{16}$ at the half portion 1217 of the distribution outlet 330 of the distribution conduit 328 by about ⅓. For both flow conditions, the Reynolds number at the sixteenth location $L_{16}$ at the half portion 1217 of the distribution outlet 330 of the distribution conduit 328 is in the laminar region. The results for the Reynolds number, on a dimensionless basis, were substantially the same as those in Example 2 and FIG. 71.

FIGS. 67-71 are graphs of the flow characteristics computed for the different flow conditions of Examples 2 and 3. Curve-fit equations were used to describe the change in the flow characteristics over the distance between the feed inlet to the half portion of the distribution outlet. Accordingly, Examples 2 and 3 show that the flow characteristics are consistent over variations in inlet velocity and/or viscosity.

TABLE III

DIMENSIONLESS FLOW CHARACTERISTICS (K = 100)

| | Inlet Velocity = 2.50 m/s | | | | | Inlet Velocity = 3.55 m/s | | | | |
|---|---|---|---|---|---|---|---|---|---|---|
| Location | Velocity | Shear Rate | Calc Visc. | Shear Stress | Re | Velocity | Shear Rate | Calc Visc. | Shear Stress | Re |
| L1 | 1.00 | 1.00 | 1.00 | 1.00 | 1.00 | 1.00 | 1.00 | 1.00 | 1.00 | 1.00 |
| L2 | 1.00 | 1.16 | 0.88 | 1.02 | 1.13 | 1.00 | 1.21 | 0.85 | 1.03 | 1.18 |
| L3 | 1.10 | 1.35 | 0.77 | 1.04 | 1.32 | 1.10 | 1.39 | 0.75 | 1.04 | 1.35 |
| L4 | 1.00 | 1.28 | 0.80 | 1.03 | 1.17 | 1.00 | 1.35 | 0.77 | 1.04 | 1.22 |
| L5 | 0.87 | 1.15 | 0.88 | 1.02 | 0.94 | 0.86 | 1.23 | 0.84 | 1.03 | 0.99 |
| L6 | 0.83 | 1.18 | 0.87 | 1.02 | 0.83 | 0.83 | 1.27 | 0.81 | 1.03 | 0.88 |
| L7 | 0.90 | 1.60 | 0.66 | 1.06 | 0.93 | 0.90 | 1.70 | 0.63 | 1.07 | 0.98 |
| L8 | 0.90 | 1.70 | 0.63 | 1.07 | 0.84 | 0.90 | 1.77 | 0.61 | 1.08 | 0.87 |
| L9 | 0.82 | 1.61 | 0.66 | 1.07 | 0.69 | 0.82 | 1.71 | 0.63 | 1.07 | 0.73 |
| L10 | 0.77 | 1.57 | 0.68 | 1.06 | 0.62 | 0.77 | 1.67 | 0.64 | 1.07 | 0.66 |
| L11 | 0.76 | 1.76 | 0.61 | 1.08 | 0.60 | 0.76 | 1.88 | 0.58 | 1.09 | 0.64 |
| L12 | 0.78 | 1.79 | 0.60 | 1.08 | 0.61 | 0.78 | 1.90 | 0.57 | 1.09 | 0.64 |
| L13 | 0.78 | 1.81 | 0.60 | 1.08 | 0.62 | 0.78 | 1.93 | 0.57 | 1.09 | 0.65 |
| L14 | 0.78 | 1.84 | 0.59 | 1.08 | 0.63 | 0.78 | 1.94 | 0.56 | 1.09 | 0.66 |
| L15 | 0.78 | 1.80 | 0.60 | 1.08 | 0.62 | 0.78 | 1.90 | 0.57 | 1.09 | 0.64 |
| L16 | 0.79 | 1.87 | 0.58 | 1.09 | 0.64 | 0.79 | 1.96 | 0.56 | 1.09 | 0.67 |

Example 4

In this Example, the slurry distributor 2020 of FIG. 72 was used to model the flow of gypsum slurry at one of the bulb portions 2120 of the feed conduit 2022. Referring to FIG. 72, the first and second entry segments 2036, 2037 of the slurry distributor 2020 each have a diameter D. The slurry distributor 2020 has a length, along the longitudinal axis, of about 12×D. The slurry distributor 2020 is symmetrical about a central longitudinal axis 50 extending generally in the machine direction 2192. The slurry distributor 2020 can be separated into two half portions 2004, 2005 which are substantially symmetrical about the central longitudinal axis.

Figure 73:
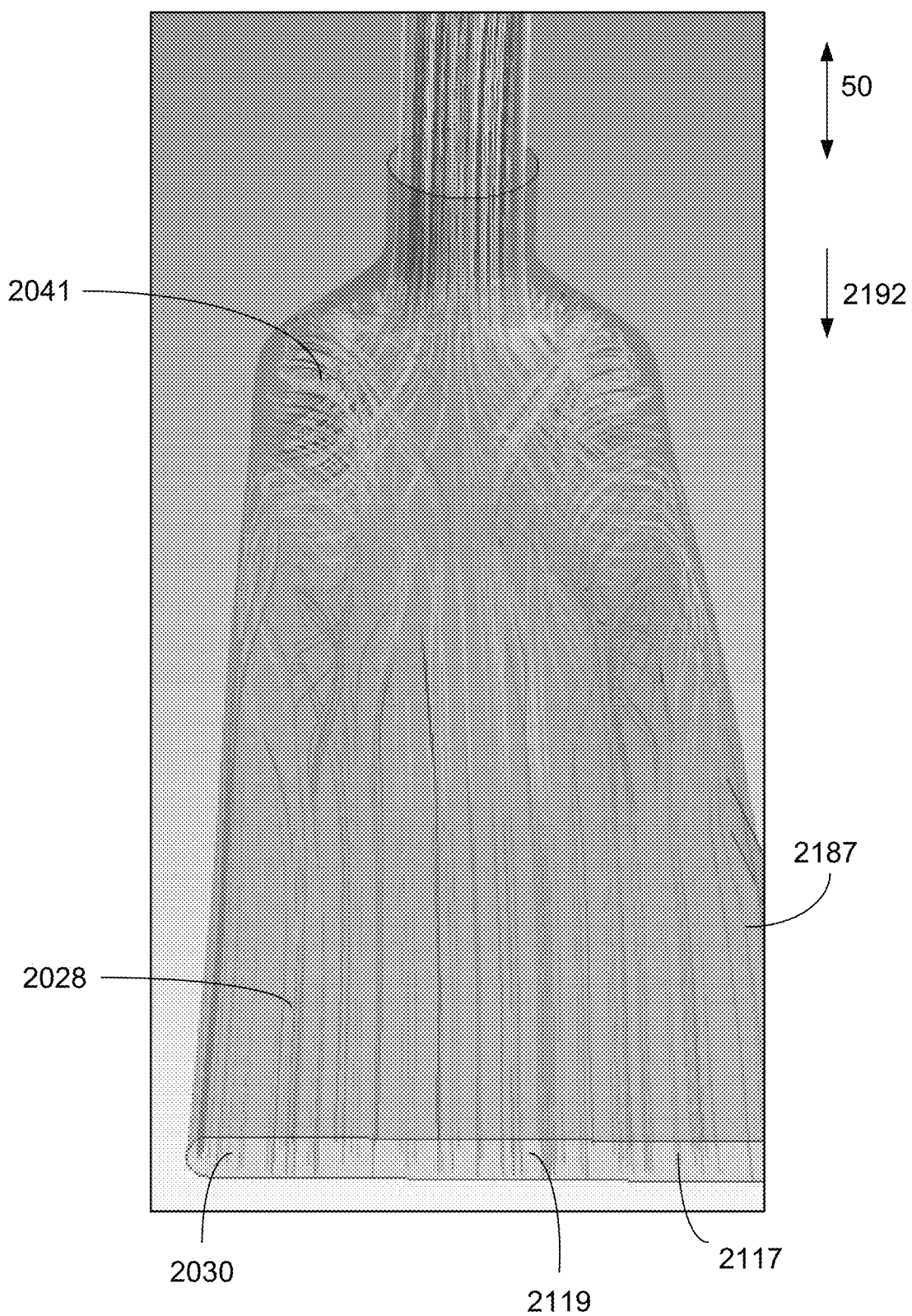
FIG. 73 is a top perspective view of a computational fluid dynamics (CFD) model output for a half portion of the slurry distributor of FIG. 72.

Referring to FIG. 73, the half portion 2004 of the slurry distributor of FIG. 72 was used to model the flow of gypsum slurry therethrough under flow conditions similar to those in Example 2 except using different dimensionless expressions of velocity. An inlet diameter D (x*=x/D) was selected as the length scale to non-dimensionalize the position vector x (x*=x/D), and an average inlet velocity (U) was used as the velocity scale to non-dimensionalize velocity vector u (u*=u/U). The flow conditions were similar to those in Example 2 in other respects.

Figure 74:
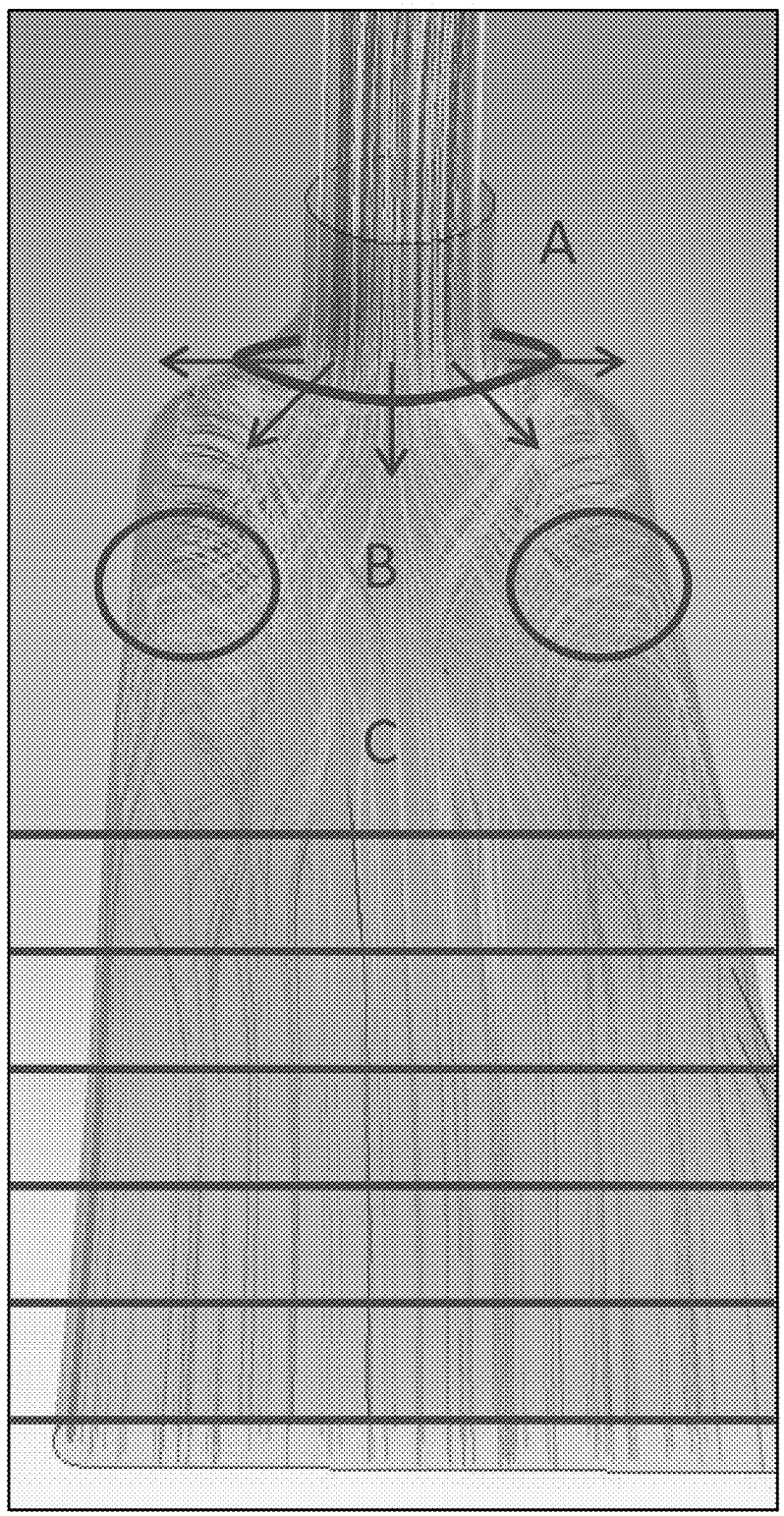
FIG. 74 is a view as in FIG. 73, illustrating various regions discussed in Examples 4-6.
Figure 75:
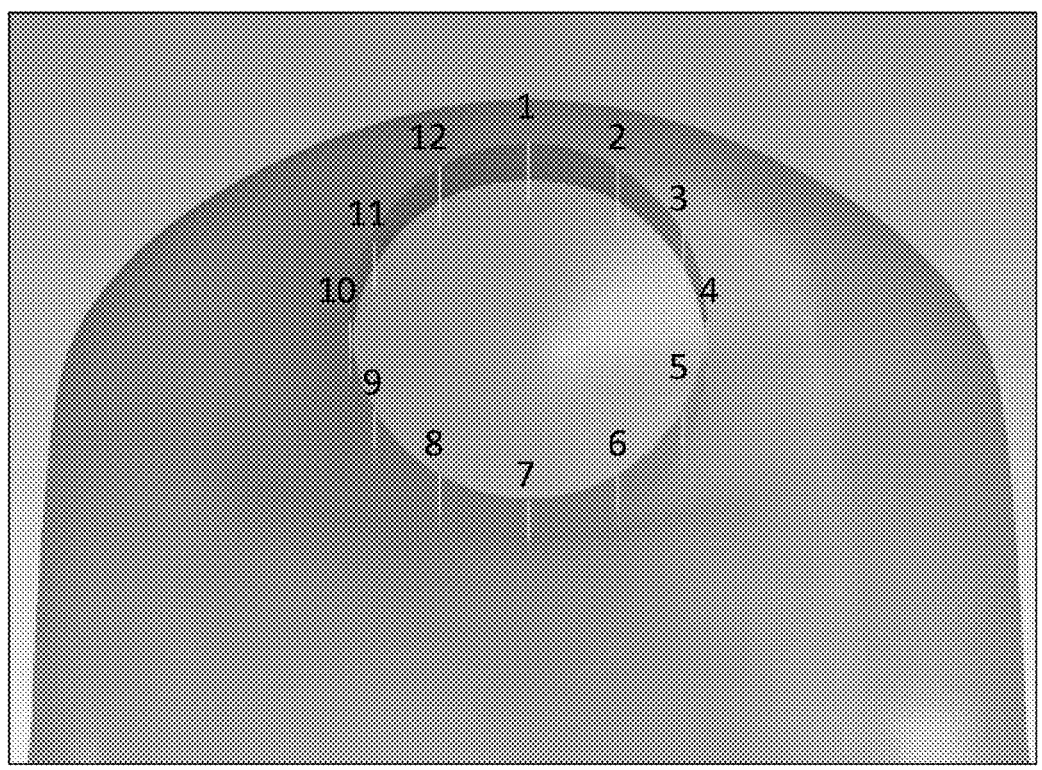
FIG. 75 is a view of the region A indicated in FIG. 74.
Figure 76:
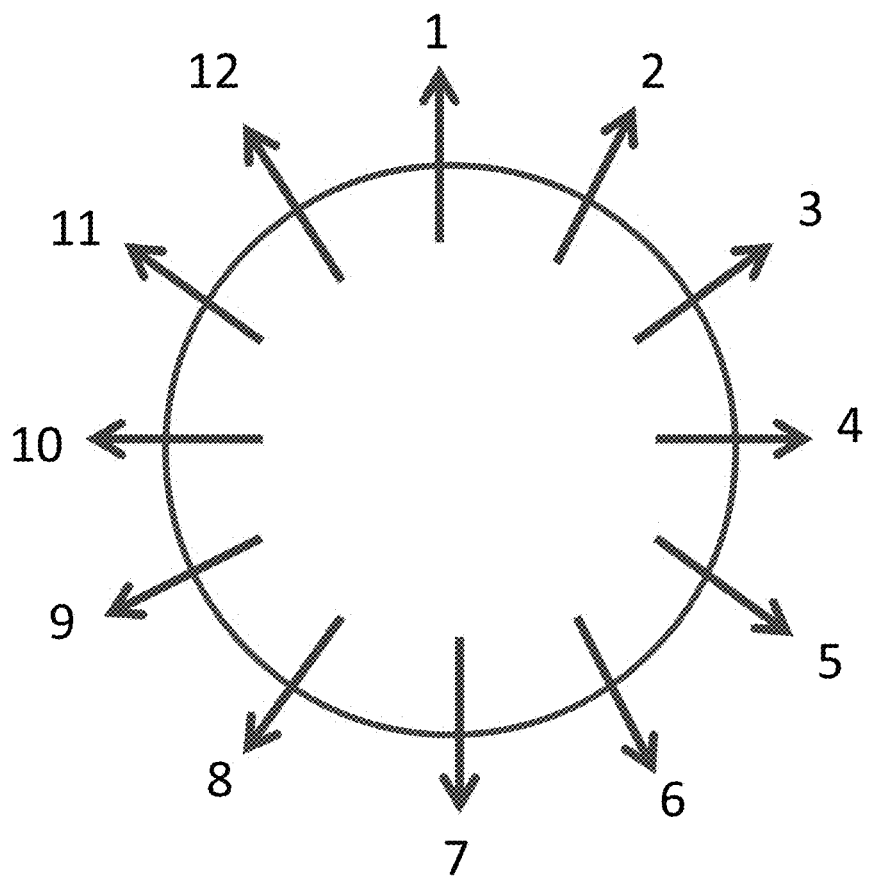
FIG. 76 is a top plan view of the region A illustrating radial locations used to conduct CFD analysis.

Referring to FIGS. 73-76, a computational fluid dynamics (CFD) technique with a finite volume method was used to determine flow characteristics in the half portion of the distributor. In particular, average velocities at different vertical locations from the area A were calculated. The area extending about 0.75D from a center of the entry segment at area A was analyzed. Twelve radially-spaced vertical slices were analyzed to calculate twelve different average slurry velocities radially around the bulb portion. The twelve locations were substantially radially spaced apart such that each adjacent radial location is about 30° apart. Referring to FIGS. 75 and 76, radial location 1 corresponds to a direction in opposing relationship to the machine direction 2192, and radial location 7 corresponds to the machine direction 2192. Radial locations 4 and 10 are substantially aligned with the transverse axis 60.

Figure 77:
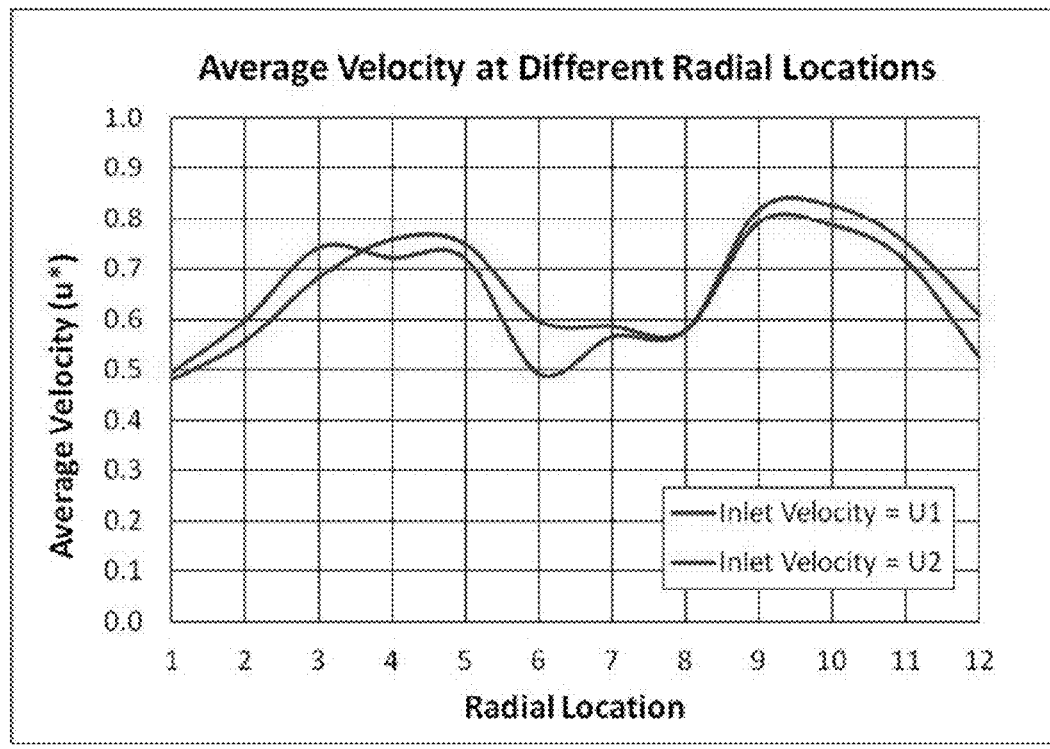
FIG. 77 is a plot of the data from Table IV of Example 4 showing the radial location at region A versus the dimensionless average velocity moving through region A of the half portion of the slurry distributor of FIG. 73.

The CFD technique was used with two different inlet velocity conditions, $u_1=U$ and $u_2=1.5U$. The results of the CFD analysis are found in Table IV. Magnitude of velocity is expressed as a dimensionless absolute value ($|u|*=|u|/U$). The data is also plotted in FIG. 77. It should be understood that the other half portion 2005 of the slurry distributor 2020 would exhibit similar flow characteristics.

For both flow conditions, the average velocity at each radial location 1-12 was less than the inlet velocity, but was greater than zero. The average velocity ranged from about half to about ⅞ of the inlet velocity (u*~0.48 to 0.83 of the inlet velocity). The contoured convex dimple surface in the bulb portion helped redirect flow from the entry segment radially outward in all directions.

The slurry velocity also slowed down relative to the inlet velocity. The average velocity of all twelve radial locations for a given flow condition was substantially similar (~0.65 or 65% of inlet velocity).

Also, in each flow condition, the highest average velocities occurred at radial locations 3-5 and 9-11. The higher average velocity along the transverse axis, or along the cross-machine direction 60, help provide more edge flow to the lateral sidewalls.

Accordingly, this Example illustrates the bulb portion 2120 helps slow down the slurry and change the direction of the slurry from a downward vertical direction to a radially outward horizontal plane. Furthermore, the bulb portion 2120 helps divert slurry flow to the lateral outer and inner sidewalls of the shaped duct of the half portion 2004 of the slurry distributor 2020 to encourage slurry movement in the cross-machine direction 60.

TABLE IV

DIMENSIONLESS RADIAL VELOCITY DISTRIBUTION

| | Inlet Velocity | |
|---|---|---|
| Location | $U_1 = U$<br>$u* = u/U_1$ | $U_2 = 1.5\ U$<br>$u* = u/U_2$ |
| R1 | 0.48 | 0.50 |
| R2 | 0.56 | 0.60 |
| R3 | 0.68 | 0.74 |
| R4 | 0.76 | 0.72 |
| R5 | 0.75 | 0.72 |
| R6 | 0.60 | 0.49 |
| R7 | 0.59 | 0.57 |
| R8 | 0.58 | 0.58 |
| R9 | 0.79 | 0.82 |
| R10 | 0.79 | 0.83 |
| R11 | 0.72 | 0.75 |

TABLE IV-continued

DIMENSIONLESS RADIAL VELOCITY DISTRIBUTION

| Location | Inlet Velocity | |
|---|---|---|
| | $U_1 = U$<br>$u^* = u/U_1$ | $U_2 = 1.5\,U$<br>$u^* = u/U_2$ |
| R12 | 0.53 | 0.61 |
| Average u* | 0.65 | 0.66 |

Example 5

Figure 78:
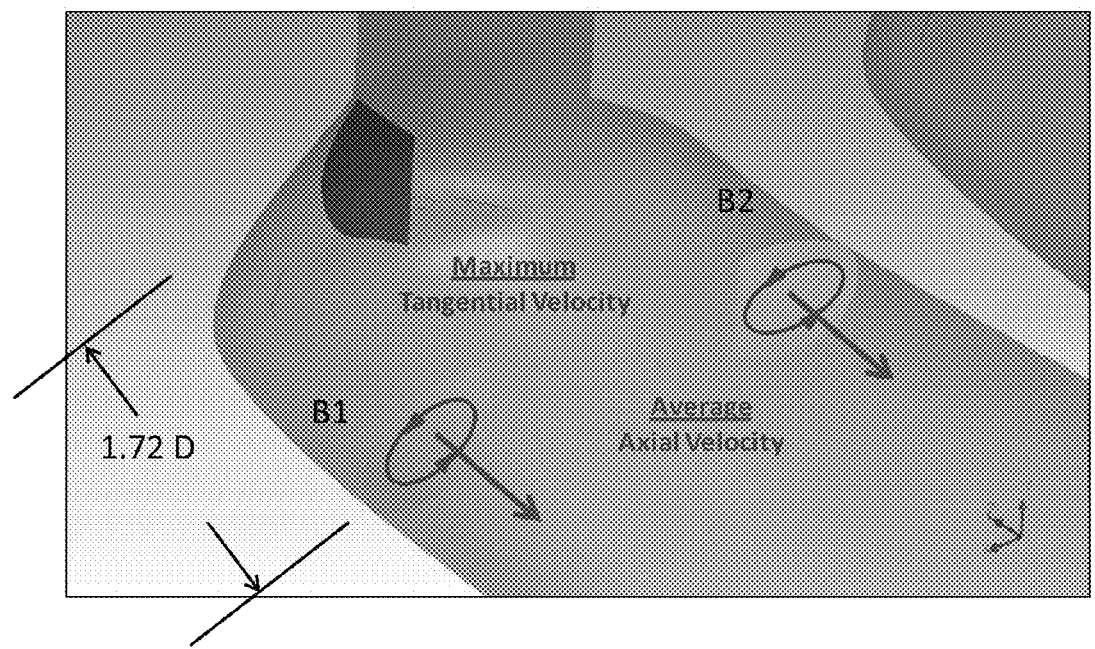
FIG. 78 is an enlarged, detail view taken from FIG. 72, illustrating a region B of the slurry distributor in which a flow of slurry moving therethrough has a swirl motion.

In this Example, the slurry distributor 2020 of FIG. 72 was used to model the flow of gypsum slurry at one of the shaped ducts 2041 of the feed conduit 2022. Referring to FIG. 78, the half portion 2004 of the slurry distributor 2020 of FIG. 72 was used to model the flow of gypsum slurry therethrough under flow conditions similar to those in Example 2 except using a dimensionless expression of velocity similar to that in Example 4. In particular, the swirl motion of the slurry at the lateral inner and outer walls of the shaped duct was analyzed.

Referring to FIGS. 73, 74, and 78, a computational fluid dynamics (CFD) technique with a finite volume method was used to determine flow characteristics in the half portion 2004 of the distributor 2020. In particular, the swirl motion of the slurry near the lateral inner and outer sidewalls of the shaped duct 2041 was analyzed. Referring to FIG. 73, the slurry moves in a swirling manner as it enters the shaped duct 2041. As the slurry moves along the machine direction 2192 to the distribution outlet 2030, the slurry streamlines become more ordered. The swirl motion of the slurry was analyzed in a region of the shaped duct 2041 at a longitudinal location of about 1¾ D (1.72D) in areas B1 and B2, as shown in FIGS. 74 and 78.

The swirl motion of the slurry is a function of its tangential velocity and its axial (or machine direction) velocity. Referring to FIG. 78, the degree of swirl for swirling flow is usually characterized by the swirl number (S) as the fluxes of angular and linear momentum using the following formula:

$$S = \frac{\text{Momentum of Tangential Velocity Component}}{\text{Momentum of Axial Velocity Component}} \quad \text{(Eq. 5)}$$

$$= \frac{\int wu\, r dr}{\int uu\, r dr}$$

with $w$ = tangential velocity and $u$ = axial velocity and r represents the radial location.

If the average values of tangential velocity and axial velocity are used in Equation 5, it becomes:

$$S \sim \frac{\text{Average Tangential Velocity}}{\text{Average Axial Velocity}} = \frac{w_{ave}}{u_{ave}} \quad \text{(Eq. 6)}$$

For this Example, the characteristic swirl motion ($S_m$) is expressed using the following formula:

$$S_m \sim \frac{\text{Maximum Tangential Velocity}}{\text{Average Axial Velocity}} \quad \text{(Eq. 7)}$$

In this Example, the calculated swirl motion was used to calculate the swirl angle using the following formula:

$$\text{Swirl Angle} \sim \tan^{-1}(S_m) \quad \text{(Eq. 8).}$$

The CFD technique was used with two different dimensionless inlet velocity conditions, $u_1 = U$ and $u_2 = 1.5U$. The results of the CFD analysis are found in Table V. It should be understood that the other half portion of the slurry distributor would exhibit similar flow characteristics. Through this analysis it has been found that in embodiments, the slurry distributor can be constructed to produce a swirl motion $S_m$ in a range from about zero to about 10 in the slurry distributor and a swirl angle in a range from about zero degrees to about 84°.

For both flow conditions, the maximum tangential velocity at the edges was at least about half of the inlet velocity in an edge region of the entry portion of the shaped duct. The swirl motion near the lateral sidewalls is expected to help maintain the cleanliness of the interior geometry of the slurry distributor while in use. As shown in FIG. 73, the swirl motion of the slurry decreases along the machine axis 50 in the direction of flow to the distribution outlet 2030.

TABLE V

SWIRL MOTION

| | Inlet Velocity | | | | | |
|---|---|---|---|---|---|---|
| | $U_1 = U$<br>$u^* = u/U_1$ | | $U_2 = 1.5\,U$<br>$u^* = u/U_2$ | | Lower | Upper |
| MD Location = 1.72 D | B1 | B2 | B1 | B2 | Bound | Bound |
| Max Tangential Velocity | 0.50 | 0.75 | 0.55 | 0.74 | | |
| Ave Axial Velocity | 0.71 | 0.63 | 0.67 | 0.65 | | |
| Swirl Motion, Sm | 0.71 | 1.19 | 0.82 | 1.14 | 0 | 10 |
| Swirl Angle (°) | 35 | 50 | 39 | 49 | 0 | 84 |

Example 6

In this Example, the slurry distributor 2020 of FIG. 72 was used to model the flow of gypsum slurry through the feed conduit 2022 and the distribution conduit 2028. Referring to FIGS. 73 and 74, the half portion 2004 of the slurry distributor 2020 of FIG. 72 was used to model the flow of gypsum slurry therethrough under flow conditions similar to those in Example 2 except using a dimensionless expression of velocity similar to that in Example 4.

For all flow conditions, the density (ρ) of the aqueous gypsum slurry was set at 1,000 kg/m³ and the viscosity K factor was set at 50. Again, the flow characteristics were evaluated both for a dimensionless feed velocity of the gypsum slurry into the feed inlet 2024 of B and of 1.5B. The following flow characteristics were determined at each successive dimensionless location downstream from the entry portion of the shaped duct 2041 along the machine direction 2192 expressed as a function of the inlet diameter D: area-weighted average velocity (U), area-weighted average shear rate (γ), viscosity calculated using the Power Law Model (Eq. 2), and Reynolds Number (Re) (Eq. 4). The hydraulic diameter (Eq. 1) was also calculated at the noted successive dimensionless locations along the longitudinal axis 50. Using the inlet flow conditions, dimensionless values of the flow characteristics for each location were determined, as shown in Table VI.

FIGS. 79-82 are graphs of the flow characteristics computed for the different flow conditions of Example 6. Curve-fit equations were used to describe the change in the flow characteristics over the distance between the feed inlet to the half portion 2004 of the distribution outlet 2030. Accordingly, the Examples show that the flow characteristics are consistent over variations in inlet velocity.

Figure 79:
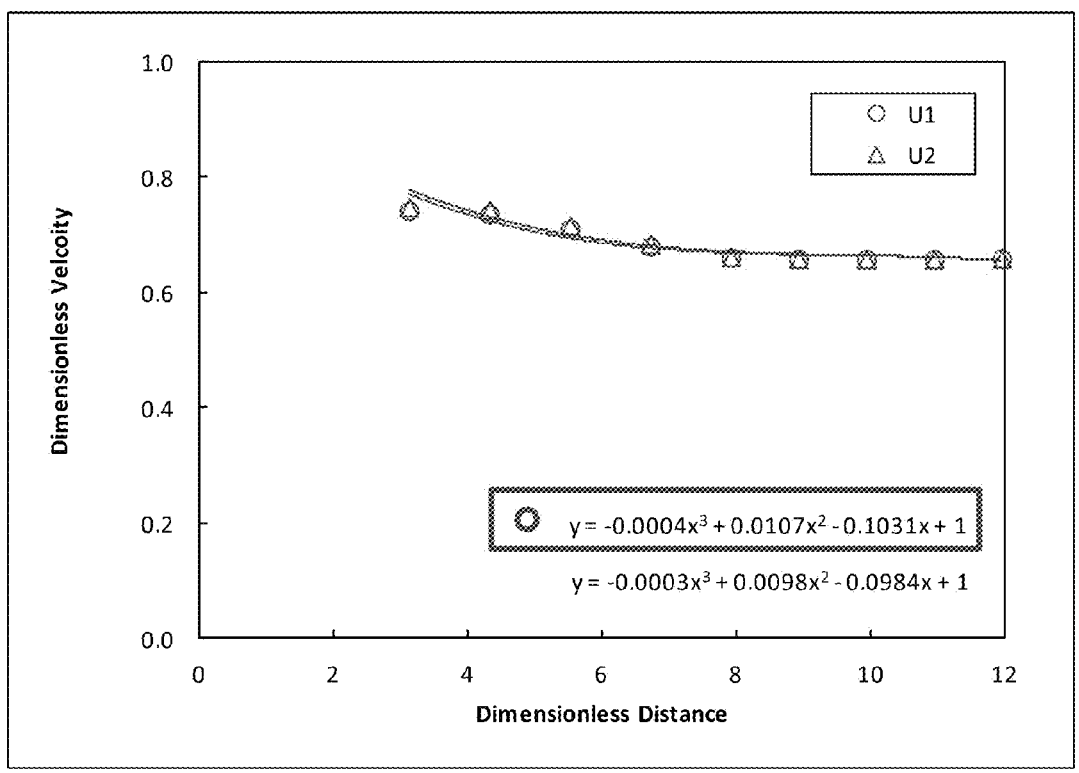
FIG. 79 is a plot of the data from Table VI of Example 6 showing the dimensionless distance from the feed inlet versus the dimensionless velocity of a flow of modeled slurry moving through the half portion of the slurry distributor of FIG. 73.

For both flow conditions, the average velocity was reduced from the first location (about 3D) in the feed conduit to the last location (about 12D) at the half portion 2117 of the distribution outlet 2030 of the distribution conduit 2028. The average velocity substantially progressively decreased as the slurry moved along the machine direction 2192. In the illustrated embodiment, the average velocity was reduced by about ⅓ from the inlet velocity, as shown in FIG. 79.

Figure 80:
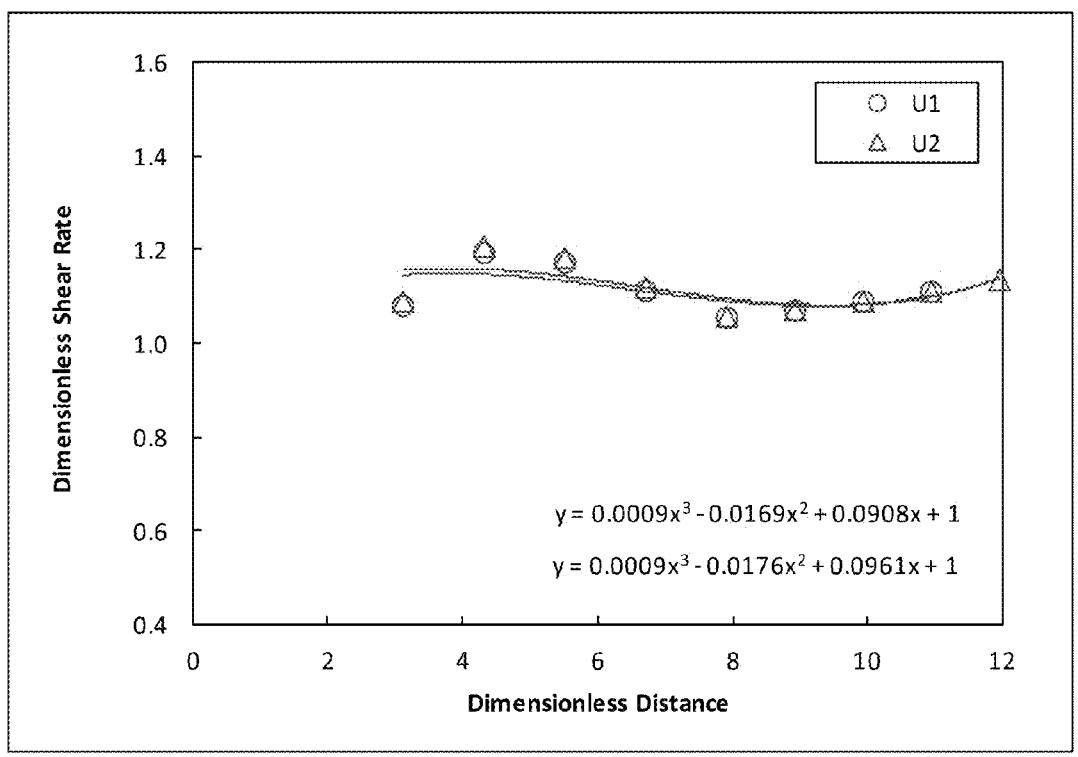
FIG. 80 is a plot of the data from Table VI of Example 6 showing the dimensionless distance from the feed inlet versus the dimensionless shear rate in the modeled slurry moving through the half portion of the slurry distributor of FIG. 73.

For both flow conditions, the shear rate increased from the first location (about 3D) in the feed conduit 2022 to the last location (about 12D) at the half portion 2117 of the distribution outlet 2030 of the distribution conduit 2028. The shear rate varied from location to location. In the illustrated embodiment, the shear rate increased at the half portion 2117 of the distribution outlet 2030 of the distribution conduit 2028 relative to the inlet, as shown in FIG. 80.

Figure 81:
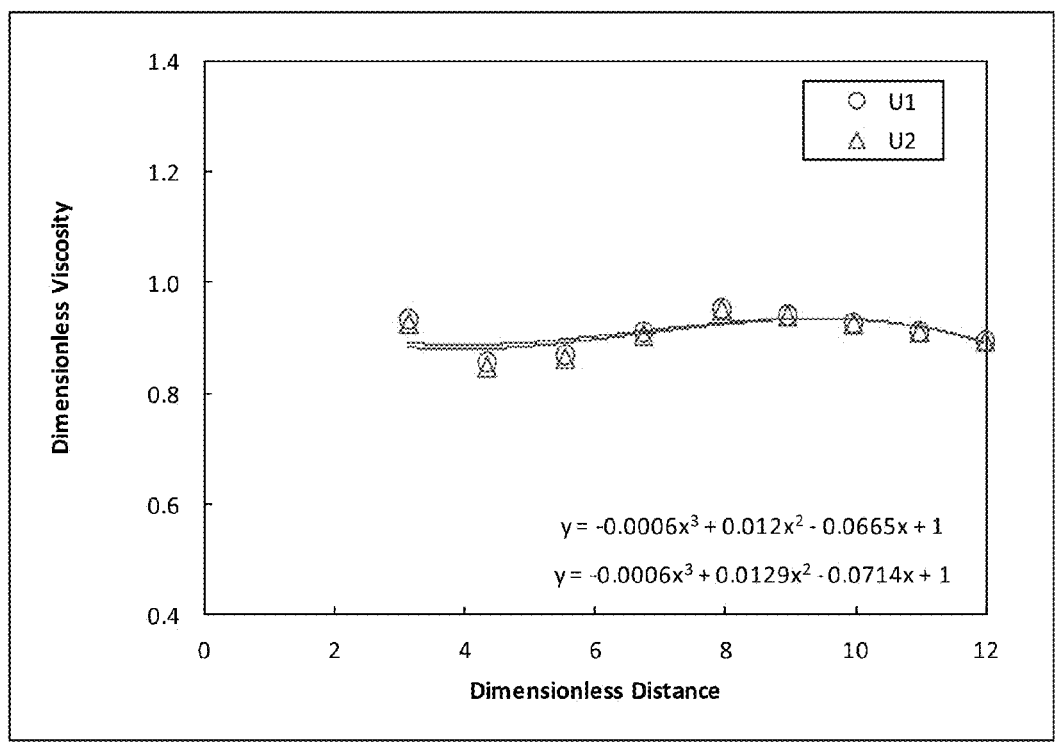
FIG. 81 is a plot of the data from Table VI of Example 6 showing the dimensionless distance from the feed inlet versus the dimensionless viscosity of the modeled slurry moving through the half portion of the slurry distributor of FIG. 73.

For both flow conditions, the calculated viscosity was reduced from the first location (about 3D) in the feed conduit to the last location (about 12D) at the half portion 2117 of the distribution outlet 2030 of the distribution conduit 2028. The calculated viscosity varied from location to location. In the illustrated embodiment, the calculated viscosity decreased at the half portion 2117 of the distribution outlet 2030 of the distribution conduit 2028 relative to the inlet, as shown in FIG. 81.

Figure 82:
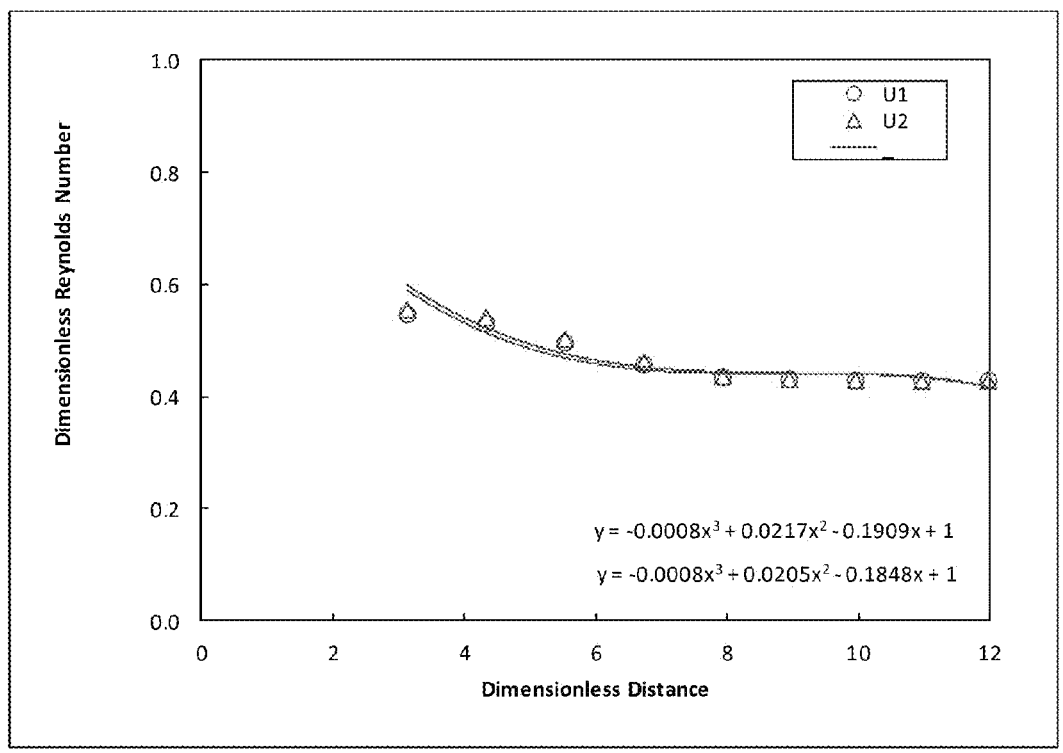
FIG. 82 is a plot of the data from Table VI of Example 6 showing the dimensionless distance from the feed inlet versus the dimensionless Reynolds number of the modeled slurry moving through the half portion of the slurry distributor of FIG. 73.
Figure 83:
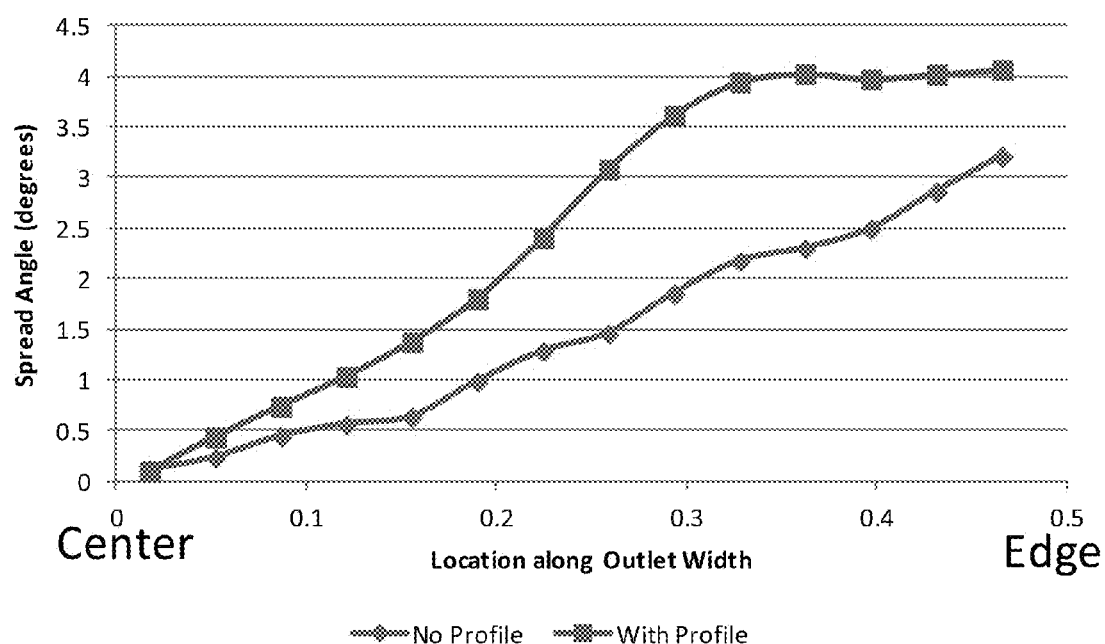
FIG. 83 is a plot of the data from Table VII of Example 7 showing the dimensionless distance along the width of the outlet opening from a central transverse midpoint versus the spread angle of the modeled slurry discharging from the half portion of the slurry distributor of FIG. 73.

For both flow conditions, the Reynolds number in FIG. 82 was reduced from the first location (about 3D) in the feed conduit to the last location (about 12D) at the half portion 2117 of the distribution outlet 2030 of the distribution conduit 2028. In the illustrated embodiment, the Reynolds number decreased at half portion 2117 of the distribution outlet 2030 of the distribution conduit 2028 relative to the inlet by about ½. For both flow conditions, the Reynolds number at the half portion 2117 of the distribution outlet 2030 of the distribution conduit 2028 is in the laminar region.

Accordingly, it has been found that the distal half of the slurry distributor (between about 6D and about 12D) is configured to provide a flow stabilization region in which the average velocity of the slurry and the Reynolds number are generally stable and decreased relative to the feed inlet conditions. As shown in FIG. 73, the slurry moves in generally a streamline fashion along the machine direction 2192 through this flow stabilization region.

TABLE VI

DIMENSIONLESS FLOW CHARACTERISTICS (K = 50)

| Geometry | | Inlet Velocity = $U_1$ | | | | Inlet Velocity = $U_2$ | | | |
| --- | --- | --- | --- | --- | --- | --- | --- | --- | --- |
| MD Distance | Hydraulic Dia. | Velocity | Shear Rate | Calc Visc. | Re | Velocity | Shear Rate | Calc Visc. | Re |
| 3.11 | 0.35 | 0.74 | 1.08 | 0.93 | 0.55 | 0.75 | 1.09 | 0.93 | 0.56 |
| 4.31 | 0.31 | 0.74 | 1.19 | 0.86 | 0.53 | 0.75 | 1.21 | 0.85 | 0.54 |
| 5.51 | 0.31 | 0.71 | 1.17 | 0.87 | 0.50 | 0.72 | 1.18 | 0.86 | 0.50 |
| 6.71 | 0.31 | 0.68 | 1.11 | 0.91 | 0.46 | 0.69 | 1.12 | 0.91 | 0.46 |
| 7.91 | 0.32 | 0.66 | 1.05 | 0.95 | 0.44 | 0.66 | 1.06 | 0.95 | 0.44 |
| 8.92 | 0.31 | 0.66 | 1.07 | 0.94 | 0.43 | 0.66 | 1.07 | 0.94 | 0.43 |
| 9.93 | 0.31 | 0.66 | 1.09 | 0.93 | 0.43 | 0.66 | 1.09 | 0.93 | 0.43 |
| 10.94 | 0.30 | 0.66 | 1.11 | 0.91 | 0.43 | 0.66 | 1.11 | 0.91 | 0.43 |
| 11.95 | 0.30 | 0.66 | 1.13 | 0.89 | 0.43 | 0.66 | 1.14 | 0.89 | 0.43 |

Example 7

In this Example, the slurry distributor 2020 of FIG. 72 was used to model the flow of gypsum slurry at the distribution outlet 2030 of the distribution conduit 2028. In this Example, the half portion 2004 of the slurry distributor of FIG. 73 was used to model the flow of gypsum slurry therethrough under flow conditions similar to those in Example 2 except using a dimensionless expression of the width of the outlet opening 2081. A dimensionless width (w/W) across the half portion 2119 of the outlet opening 2081 of the distribution outlet 2030 (with a centerline at the transverse central midpoint 2187 being equal to zero as shown in FIG. 72). The flow conditions were similar to those in Example 2 in other respects.

A CFD technique with a finite volume method was used to determine flow characteristics in the half portion 2004 of the distributor 2020. In particular, the angle of spread of the slurry discharging from the outlet opening 2081 at various locations across the width of the half portion 2119 of the outlet opening 2081 of the distribution outlet 2030 was analyzed. The angle of spread was determined using the following formula:

$$\text{angle of spread} = \tan^{-1}(V_x/V_z), \quad \text{(Eq. 9)}$$

where $V_x$ is the average velocity in the cross-machine direction and $V_z$ is the average velocity in the machine direction.

The angle of spread was calculated for two different conditions: one in which the profiling mechanism did not compress the outlet opening 2081 ("no profiler") and one in which the profiling mechanism compressed the outlet opening 2081 ("profiler"). In the modeled slurry distributor 2020, the outlet opening 2081 has a height of about % of an inch across its entire width of approximately ten inches for each half portion 2004, 2005, for a total of twenty inches for the total width of the outlet opening 2081. The modeled profiling mechanism has a profile member that is about 15 inches wide and is aligned with the transverse central midpoint such that a lateral portion of the distribution outlet is in offset relationship with the profiling member and is uncompressed. In the modeled "profiler" condition, the profiling mechanism compresses the outlet opening by about ⅛ of an inch such that the outlet opening is about ⅝ of an inch in the area underneath the profiling member. The angle of spread for both conditions was determined, as shown in Table VII.

Under both conditions, the angle of spread increases as the location moves further outward from the transverse central midpoint 2187 (width=0). The angle of spread is greatest at the lateral edge of the outlet opening 2081.

The angle of spread increased by using the profiling mechanism to compress the discharge outlet 2030, thereby reducing the height of the outlet opening 2081. In the modeled "profiler" condition, the maximum angle of spread at the lateral edge (width=0.466) increased over 25 percent relative to the "no profiler" condition. In the "profiler" condition, the average angle of spread increased by over 50 percent relative to the "no profiler" condition.

TABLE VII

SLURRY SPREAD ANGLE WITH PROFILING MECHANISM

| Outlet Width Location | Spread Angle(°) | |
|---|---|---|
| (relative to centerline) | No Profiler | Profiler |
| 0.017 | 0.108 | 0.093 |
| 0.052 | 0.232 | 0.435 |
| 0.086 | 0.440 | 0.739 |
| 0.121 | 0.561 | 1.032 |
| 0.155 | 0.634 | 1.374 |
| 0.190 | 0.981 | 1.800 |
| 0.224 | 1.279 | 2.402 |
| 0.259 | 1.458 | 3.079 |
| 0.293 | 1.848 | 3.612 |
| 0.328 | 2.173 | 3.941 |
| 0.362 | 2.298 | 4.027 |
| 0.397 | 2.488 | 3.972 |
| 0.431 | 2.857 | 4.020 |
| 0.466 | 3.208 | 4.064 |
| AVERAGE | 1.469 | 2.471 |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A slurry distributor comprising:
a distribution conduit extending generally along a longitudinal axis and including an entry portion, a distribution outlet in fluid communication with the entry portion, and a bottom surface extending between the entry portion and the distribution outlet, the distribution outlet extending a predetermined distance along a transverse axis, the transverse axis being substantially perpendicular to the longitudinal axis;
a slurry wiping mechanism including a movable wiper blade in contacting relationship with the bottom surface of the distribution conduit, the wiper blade reciprocally movable over a clearing path between a first position and a second position, the clearing path disposed adjacent the distribution outlet.

2. The slurry distributor of claim 1, wherein the distribution outlet includes an outlet opening having a width, along the transverse axis, and a height, along a vertical axis mutually perpendicular to the longitudinal axis and the transverse axis, wherein the width-to-height ratio of the outlet opening is about 4 or more.

3. The slurry distributor of claim 1, wherein the distribution outlet includes an outlet opening having a width, along the transverse axis, the wiper blade extending a predetermined second distance along the transverse axis, the width of the outlet opening being smaller than the second distance along the transverse axis such that the wiper blade is wider than the outlet opening.

4. The slurry distributor of claim 1, wherein the wiper blade reciprocally moves longitudinally along the clearing path, and the first position of the wiper blade is longitudinally upstream of the distribution outlet, and the second position is longitudinally downstream of the distribution outlet.

5. The slurry distributor of claim 1, wherein the slurry wiping mechanism includes an actuator operably arranged with the wiper blade to selectively reciprocally move the wiper blade.

6. The slurry distributor of claim 5, wherein the actuator comprises a pneumatic cylinder having a reciprocally movable piston, the piston connected to the wiper blade.

7. The slurry distributor of claim 5, wherein the slurry wiping mechanism includes a controller, the controller being adapted to selectively control the actuator to reciprocally move the wiper blade.

8. The slurry distributor of claim 7, wherein the controller is adapted to move the wiper blade in a clearing direction from the first position to the second position over a wiping stroke, and the controller is adapted to move the wiper blade in an opposing, return direction from the second position to the first position over a return stroke, and wherein the controller is adapted to move the wiper blade such that the time to move over the wiping stroke is substantially the same as the time to move over the return stroke.

9. The slurry distributor of claim 1, wherein the controller is adapted to move the wiper blade in a clearing direction from the first position to the second position over a wiping stroke, and the controller is adapted to move the wiper blade in an opposing, return direction from the second position to the first position over a return stroke, and wherein the controller is adapted to move the wiper blade reciprocally between the first position and the second position in a cycle having a sweep period, the sweep period including a wiping portion comprising the time to move over the wiping stroke, a returning portion comprising the time to move over the return stroke, and an accumulation delay portion comprising a predetermined period of time in which the wiper blade remains in the first position.

10. The slurry distributor of claim 9, wherein the wiping portion is substantially the same as the returning portion.

11. The slurry distributor of claim 9, wherein the accumulation delay portion is adjustable.

12. The slurry distributor of claim 1, further comprising:
a feed conduit including a first entry segment with a first feed inlet and a second entry segment with a second feed inlet disposed in spaced relationship to the first feed inlet;
wherein the entry portion is in fluid communication with the first and second feed inlets of the feed conduit.

13. The slurry distributor of claim 12, wherein the first and second feed inlets and the first and second entry segments are disposed at a respective feed angle in a range up to about 135° with respect to the longitudinal axis.

14. A cementitious slurry mixing and dispensing assembly comprising:
a mixer adapted to agitate water and a cementitious material to form an aqueous cementitious slurry;
a slurry distributor in fluid communication with the mixer, the slurry distributor including:
a distribution conduit extending generally along a longitudinal axis and including an entry portion, a distribution outlet in fluid communication with the entry portion, and a bottom surface extending between the entry portion and the distribution outlet, the distribution outlet extending a predetermined distance along a transverse axis, the transverse axis being substantially perpendicular to the longitudinal axis, and
a slurry wiping mechanism including a movable wiper blade in contacting relationship with the bottom surface of the distribution conduit, the wiper blade reciprocally movable over a clearing path between a first position and a second position, the clearing path disposed adjacent the distribution outlet.

15. The cementitious slurry mixing and dispensing assembly of claim 14, wherein the distribution outlet includes an outlet opening having a width, along the transverse axis, the wiper blade extending a predetermined second distance along the transverse axis, and wherein the wiper blade reciprocally moves longitudinally along the clearing path.

16. The cementitious slurry mixing and dispensing assembly of claim 15, further comprising:
a bottom support member supporting the bottom surface of the distribution conduit, the bottom support member having a perimeter, the distribution outlet longitudinally offset from the bottom support member such that a distal outlet portion of the distribution conduit extends from the perimeter of the bottom support member;
wherein the wiper blade supports the distal outlet portion of the slurry distributor when the wiper blade is in the first position.

17. The cementitious slurry mixing and dispensing assembly of claim 14, further comprising:
a delivery conduit disposed between and in fluid communication with the mixer and the slurry distributor;
a flow-modifying element associated with the delivery conduit and adapted to control a flow of the aqueous cementitious slurry from the mixer;
an aqueous foam supply conduit in fluid communication with at least one of the mixer and the delivery conduit.

18. The cementitious slurry mixing and dispensing assembly of claim 14, wherein the slurry distributor includes a feed conduit including a first entry segment with a first feed inlet and a second entry segment with a second feed inlet disposed in spaced relationship to the first feed inlet, the entry portion of the distribution conduit being in fluid communication with the first and second feed inlets of the feed conduit, the first feed inlet adapted to receive a first flow of aqueous cementitious slurry from the mixer, the second feed inlet adapted to receive a second flow of aqueous cementitious slurry from the mixer, and the distribution outlet in fluid communication with both the first and the second feed inlets and adapted such that the first and second flows of aqueous cementitious slurry discharge from the slurry distributor through the distribution outlet.

19. The gypsum slurry mixing and dispensing assembly of claim 18, further comprising:
a delivery conduit disposed between and in fluid communication with the mixer and the slurry distributor, the delivery conduit including a main delivery trunk and first and second delivery branches;
a flow splitter joining the main delivery trunk and the first and second delivery branches, the flow splitter disposed between the main delivery trunk and the first delivery branch and between the main delivery trunk and the second delivery branch;
wherein the first delivery branch is in fluid communication with the first feed inlet of the slurry distributor, and the second delivery branch is in fluid communication with the second feed inlet of the slurry distributor.

20. A method of preparing a cementitious product comprising:
discharging a flow of aqueous cementitious slurry from a mixer;
passing the flow of aqueous cementitious slurry through an entry portion of a distribution conduit of a slurry distributor;
discharging the flow of aqueous cementitious slurry from a distribution outlet of the slurry distributor upon a web of cover sheet material moving along a machine direction;
reciprocally moving a wiper blade over a clearing path along a bottom surface of the distribution conduit between a first position and a second position to clear aqueous cementitious slurry therefrom, the clearing path disposed adjacent the distribution outlet.

21. The method of preparing a cementitious product of claim 20, wherein the distribution conduit extending generally along a longitudinal axis between the entry portion and the distribution outlet, and wherein the wiper blade reciprocally moves longitudinally along the clearing path.

22. The method of preparing a cementitious product of claim 20, wherein the wiper blade moves in a clearing direction from the first position to the second position over a wiping stroke, and the wiper blade moves in an opposing, return direction from the second position to the first position over a return stroke, and wherein the wiper blade reciprocally moves such that the time to move over the wiping stroke is substantially the same as the time to move over the return stroke.

23. The method of preparing a cementitious product of claim 20, wherein the wiper blade moves in a clearing direction from the first position to the second position over a wiping stroke, and the wiper blade moves in an opposing, return direction from the second position to the first position over a return stroke, and wherein the wiper blade reciprocally moves between the first position and the second position in a cycle having a sweep period, the sweep period including a wiping portion comprising the time to move over the wiping stroke, a returning portion comprising the time to move over the return stroke, and an accumulation delay portion comprising a predetermined period of time in which the wiper blade remains in the first position.

24. The method of preparing a cementitious product of claim 23, wherein the wiping portion is substantially the same as the returning portion.

25. The method of preparing a cementitious product of claim 23, wherein the accumulation delay portion is adjustable.

* * * * *